(12) United States Patent
Salzberg et al.

(10) Patent No.: US 6,636,585 B2
(45) Date of Patent: Oct. 21, 2003

(54) METRICS-RELATED TESTING OF AN OPERATIONAL SUPPORT SYSTEM (OSS) OF AN INCUMBENT PROVIDER FOR COMPLIANCE WITH A REGULATORY SCHEME

(75) Inventors: Alan J. Salzberg, Brooklyn, NY (US); Jonathan C. Scott, Decatur, GA (US); Raymond W. Sears, III, Philadelphia, PA (US); Charles H. King, Jr., Basking Ridge, NJ (US); Linda G. Blockus, Basking Ridge, NJ (US)

(73) Assignee: BearingPoint, Inc., McLean, VA (US)

( * ) Notice: Subject to any disclaimer, the term of this patent is extended or adjusted under 35 U.S.C. 154(b) by 0 days.

(21) Appl. No.: 09/892,243

(22) Filed: Jun. 26, 2001

(65) Prior Publication Data

US 2003/0086536 A1 May 8, 2003

Related U.S. Application Data

(60) Provisional application No. 60/214,927, filed on Jun. 26, 2000.

(51) Int. Cl.$^7$ ................................................ H04M 3/22
(52) U.S. Cl. ........................... 379/22; 379/379; 379/2; 379/9.03; 379/15.01; 379/15.03; 379/25; 379/26.01; 379/27.01
(58) Field of Search ........................ 379/15.01, 9.03, 379/2, 15.03, 22, 25, 26.01, 27.01; 370/244

(56) References Cited

U.S. PATENT DOCUMENTS

| | | | |
|---|---|---|---|
| 5,353,327 A | 10/1994 | Adari et al. | 379/22 |
| 5,566,162 A | 10/1996 | Gruber et al. | 370/13 |
| 5,673,255 A | 9/1997 | Dunn et al. | 370/244 |
| 6,091,712 A | 7/2000 | Pope et al. | 370/244 |

OTHER PUBLICATIONS

PCT, Notification of Transmittal of the International Search Report or the Declaration, 4 pages, Mar. 5, 2002.
Unknown, "State Public Utility Commissions and OSS Testing," OSS Testing, http://www.osstesting.com/Other%20Sites.htm, 2 pages.
Unknown, "Communications News," New York State Public Utility Commissions, http://www.dps.state.ny.us/telecom-News.html, 3 pages.
Unknown, "New York Telephone Company 271 Proceeding," New York State Public Utility Commission, http://www.dps.state.ny.us/tel271.htm, 11 pp.
T.G. Dvorsky letter to Potential Bidders regarding seeking a vendor to build OSS Interface with attachment titled "CLEC Test Transaction Generator Request for Proposal," State of New York Department of Public Service, 7 pp.

(List continued on next page.)

*Primary Examiner*—Curtis Kuntz
*Assistant Examiner*—Barry W Taylor
(74) *Attorney, Agent, or Firm*—Baker Botts L.L.P.

(57) ABSTRACT

Methods are provided for metrics-related testing of one or more operational support systems (OSSs) of an incumbent provider for compliance with a regulatory scheme, the method performed by an independent testing entity attempting to emulate a competitive provider that would access the OSSs in attempting to compete with the incumbent provider in an open competitive market. Each method includes an active testing phase in which one or more OSSs are tested. Performance of the incumbent provider during active testing is evaluated according to predetermined evaluation criteria. Test results are generated according to the evaluation and a final report is issued. The final report includes the test results and provides a sufficient basis for a regulatory entity administering the regulatory scheme to determine compliance of the incumbent provider with the regulatory scheme.

32 Claims, 15 Drawing Sheets

OTHER PUBLICATIONS

Unknown, "Notice to Potential Bidders," Public Service Commission, http://www.dps.state.ny.us/bidnotice.htm, 1 page letter dated.

T.G. Dvorsky letter to potential bidders seeking vendor to conduct an evaluation of Bell Atlantic New York OSS with an enclosure titled Request for Proposal to Perform an Evaluation of the OSS Interface Systems Offered by Bell Atlantic New York, 21 pp.

P.A. Crotty letter to Honorable John C. Crary, Secretary, New York Public Service Commission with attached Pre–Filing Statement of Bell Atlantic—New York, 79 pp.

C. Thielemann, "Customer Care Installation Centers serve BA retail customers and a comparable group is not available for wholesale customers," KPMG Exception ID 2, Bany Response to Exception ID 2, and KPMG Exception Closure Report, 3 pp.

B. Hendricks, "Directory Listings dropping out of CLEC Provisioned orders," KPMG Exception, Bell Atlantic Response to NY PSC KPMG Exception, Bell Atlantic NYPSC KPMG Exception, Bell Atlantic Directory Listings slides, and KPMG Exception Closure Report 17 pp.

Dan Kennedy, Bell Atlantic Network Services, letter to John Rubino which includes a copy of the letter from J.T. Cullen of Hewlett Packard to John Rubino dated Nov. 4, 1998 and a copy of the CTTG Project Report, 390 pp.

James T. Cullen, Senior Program Manager, Hewlett–Packard Consulting letter to John Rubino, State of New York Public Service Commission enclosing Hewlett Packard Consulting's updated Bell Atlantic New York (BANY) CLEC Test Transaction Generator (CTTG) Project Final Report, 487 pp.

Unknown, Agreement Among KPMG Peat Marwick LLP and Bell Atlantic and State of New York Public Service Commission, CG Library, 29 pp.

Unknown, "Bell Atlantic OSS Evaluation Project," Revised Master Test Plan, Final Version 3.0, State of New York Department of Public Service, submitted by KPMG Peat Marwick LLP, 397 pp.

Unknown, "Bell Atlantic OSS Evaluation Project," Final Report, Final Version 2.0, State of New York Department of Public Service, submitted by KPMG Peat Marwick LLP, 938 pages.

Unknown, Pennsylvania Public Utility Commission General Information and Special Announcements, Internet, http://puc.paonline.com/, 3 pp.

Unknown, "Competiton in Pennsylvania," Competition Information, Pennsylvania Public Utility Commission, http://puc.paonline.com/competition.asp, 2 pp.

Unknown, "Local Telephone Competition," Local Telephone Competition Main Page, Pennsylvania Public Utility Commission, http://puc.paonline.com/Telephone/Local-Competition/local_telephone_copetition.asp, 5 pp.

Unknown, PUC OSS Orders and Other Documents, PUC OSS Orders, Pennsylvania Public Utility Commission, http://puc.paonline.com/Telephone/OSSTesting/PUC%20orders%20and%20other%20docu. . . , 2 pp.

Unknown, "OSS Testing," Main OSS Page, Pennsylvania Public Utility Commission, http://puc.paonline.com/Telephone/Oss.asp, 3 pp.

Agreement Among KPMG LLP and Bell Atlantic–Pennsylvania, Inc. and Pennsylvania Public Utility Commission, fax from KPMG Consulting, 33 pp.

Confidentiality Agreement between KPMG LLP retained by Bell Atlantic–Pennsylvania, faxed by KPMG Consulting, 3 pp.

"Bell Atlantic OSS Evaluation Project Master Test Plan," for Commonwealth of Pennsylvania Public Utility Commission Draft, Version 1.0, submitted by KPMG, 123 pp.

"Bell Atlantic OSS Evaluation Project Master Test Plan," for Commonwealth of Pennsylvania Public Utility Commission, Draft, Version 1.1, submitted by KPMG, 129 pp.

Unknown, "Observations," Observations page, Pennsylvania Public Utility Commission, http://puc.paonline.com/Telephone/OSSTesting/observation/observation_calls_page.asp, 5 pp.

Pennsylvania PUC/Bell Atlantic Observations Status Summary, 18 pp.

Unknown, "Exceptions," Exceptions Page, Pennsylvania Public Utility Commission, http://puc.paonline.com/telephone/OSSTesting/exceptions/exceptions–page.asp, 3 pages.

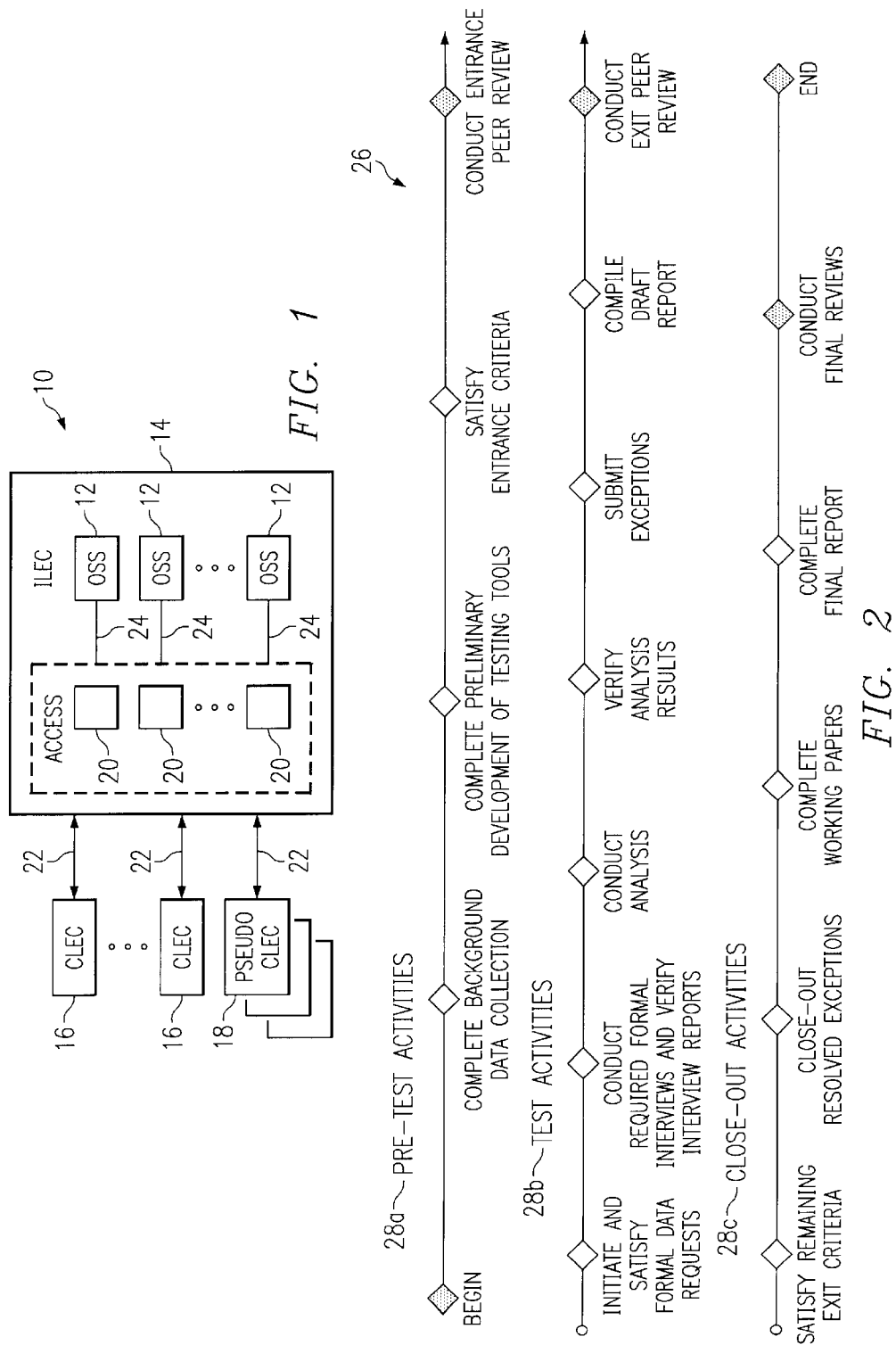

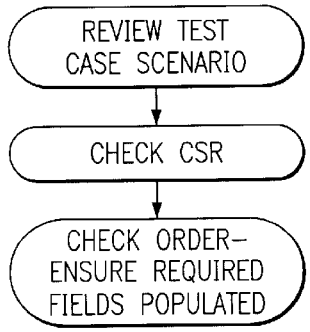
FIG. 11A
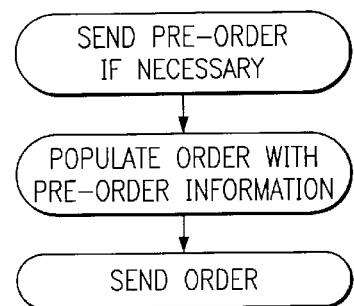
FIG. 11B
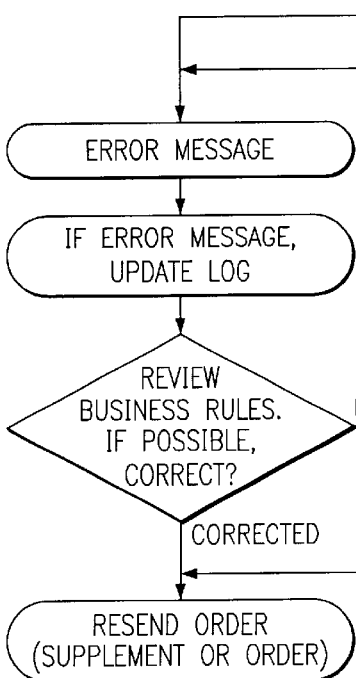

FIG. 16

SUPPLIED TO TESTERS. DETAILS WITHIN CSR PROVIDE FOR CHARGE ELEMENTS TO BE VERIFIED
→ CUSTOMER SERVICE RECORD (CSR FROM ILEC)
↓
EXPECTED RESULTS WORKSHEET (CREATED BY THE BILLING TEAM, LISTS RESULTS VALIDATED AGAINST THE BILL)

COPIES OF ACTUAL BILLS ARE PART OF THE TEST PACKAGE USED BY TEST VALIDATORS
→ BILLS (FROM ILEC)

↓ ↓
WORKSHEET (CREATED BY BILLING TEAM TO VALIDATE BILLS) — EVALUATION TOOL USED TO DOCUMENT ANY DISCREPANCIES FOUND DURING TEST VALIDATION
↑ ↑

PROCEDURES (CREATED BY BILLING TEAM, WORKSHEET DIRECTIONS)
PROVIDES DIRECTIONS TO THE TEST VALIDATORS ON ITEMS REQUIRED WHEN VALIDATING AS WELL AS DETAILS OF THE WORKSHEET USED

BILL DIAGRAM (CREATED BY BILLING TEAM, USED FOR BILL VALIDATION)
AN EXAMPLE OF THE BILL, HIGHLIGHTING SECTIONS TO BE REVIEWED

FIG. 17

PRE-ORDER, ORDER LINES (TE)
↓
PROVISION LINES (ILEC)
↓
TEST LINES FOR FEATURES, BEGIN USAGE SCRIPTS (TE)
↓
REVIEW FIRST SET OF BILLS FOR ACCURACY (TE)
↓
CONTINUE USAGE SCRIPT (TE)
↓
REVIEW FINAL BILLS (TE)
↓
DISCONNECT LINES (ILEC)

INTENTIONALLY DAMAGE LINES AND REPORT PROBLEMS (TE)
↓
RESPOND TO TROUBLE (ILEC)
↓
TEST LINE FOR FUNCTIONALITY AND FEATURES (TE)

METRICS-RELATED TESTING OF AN OPERATIONAL SUPPORT SYSTEM (OSS) OF AN INCUMBENT PROVIDER FOR COMPLIANCE WITH A REGULATORY SCHEME

RELATED APPLICATIONS

This application claims priority under 35 U.S.C. §119(e) to U.S. Provisional Application No. 60/214,927, filed Jun. 26, 2000.

TECHNICAL FIELD OF THE INVENTION

This invention relates generally to testing methodologies and more particularly to metrics-related testing of an Operational Support System (OSS) of an incumbent provider for compliance with a regulatory scheme.

BACKGROUND OF THE INVENTION

In the United States, a regulatory entity of a state or other jurisdiction may be tasked with considering whether, and to what extent, an ILEC is in compliance with the requirements of Section 271 of The Telecommunications Act of 1996 ("the 1996 Act"). The 1996 Act, together with associated Federal Communications Commission (FCC) interpretations, generally require an ILEC seeking to enter the market for long distance telecommunications services to: (1) provide the relevant CLEC community with non-discriminatory access to the ILEC's OSSs, subject to suitable terms and conditions; (2) provide documentation and support necessary for CLECs to use these OSSs; and (3) demonstrate that these OSSs are operationally ready and provide an acceptable level of performance to the CLEC community. Compliance with these requirements should, for example, allow CLECs to obtain pre-ordering information, fulfill orders for resale services and unbundled network elements (UNEs), manage problems, and obtain billing information in a manner that is non-discriminatory as compared to the ILEC's own retail operations.

The regulatory entity may retain an independent testing entity to test and evaluate the readiness of the ILEC's OSS interfaces, documentation, and processes to support local market entry by CLECs. Based on its testing activities, the testing entity may generate a report documenting the manner in which its testing activities were conducted, results of the testing activities, and its evaluations based on the results. The audience for the report will generally fall into two main categories: (1) readers who will use the report in connection with the regulatory process, and (2) any other interested parties who may have some stake in the matter and wish to have visibility into the testing activities, results, and evaluations (e.g., the ILEC being evaluated, the CLECs, and other ILECs). While many of the above parties may have some interest in the outcome of the testing activities, typically only the regulatory entity and the ILEC are parties to the contract with the testing entity.

SUMMARY OF THE INVENTION

According to the present invention, problems and disadvantages associated with testing OSSs of an incumbent provider may be reduced or eliminated.

In one embodiment of the present invention, a method for testing one or more OSSs of an incumbent provider for compliance with a regulatory scheme is performed by an independent testing entity attempting to emulate a competitive provider that would access the OSSs in attempting to compete with the incumbent provider in an open competitive market. The method includes conducting active testing of the OSSs with respect to one or more variables and evaluating performance of the incumbent provider during active testing with respect to the one or more variables according to predetermined evaluation criteria comprising one or more performance metrics. Evaluation of incumbent provider performance includes, for performance metrics requiring the incumbent provider to meet a particular performance standard, using a one-sample t-test for continuous variable performance metrics and a binomial test for discrete variable performance metrics. For performance metrics requiring parity between incumbent provider performance for operations of the incumbent provider associated with its interaction with competitive providers and incumbent provider performance for its internal operations, a two-sample t-test is used for continuous variable performance metrics and a hyper-geometric test is used for discrete variable performance metrics. The method further includes generating test results according to the evaluation and issuing a final report comprising the test results and providing a sufficient basis for a regulatory entity administering the regulatory scheme to determine compliance of the incumbent provider with the regulatory scheme.

In another embodiment of the present invention, a method for testing one or more OSSs of an incumbent provider for compliance with a regulatory scheme is performed by an independent testing entity attempting to emulate a competitive provider that would access the OSSs in attempting to compete with the incumbent provider in an open competitive market. The testing is associated with metrics capture, tracking, and reporting activities of the incumbent provider with respect to a particular operational domain. For testing of an OSS, the method includes within a data integrity testing component during active testing, to determine whether filtered data the incumbent provider uses to calculate values for each of one or more metrics is accurately derived from raw data the incumbent provider collects in connection with transactions associated with the OSS: (a) identifying one or more fields in the filtered data that the incumbent provider uses in calculating values for the metric; (b) identifying a random sample of transactions associated with the OSS; (c) obtaining from the incumbent provider copies of records associated with the identified transactions, the records containing raw data for these transactions from which filtered data for these transactions in the identified fields was derived; and (d) for each identified field, determining whether the filtered data for the identified transactions in the identified field is consistent with the raw data for the identified transactions contained in the associated records. The method further includes within a metrics replication testing component during active testing, for each of one or more metrics for which the incumbent provider has calculated values: (a) obtaining from the incumbent provider a description of the metric, filtered data on which the incumbent provider based its calculation of values for the metric, and an algorithm according to which the incumbent provider made its calculation of values for the metric, the filtered data being associated with a specified time period, the filtered data being derived from raw data the incumbent provider collected in connection with transactions associated with the OSS; (b) re-calculating values for the metric according to the description, data, and algorithm obtained from the incumbent provider; and (c) determining whether the re-calculated values are consistent with the values calculated by the incumbent provider. The method further includes evaluating performance of the incumbent provider during active testing according to predetermined evaluation criteria, generating test results according to the evaluation, and issuing a final report comprising the test results and providing a sufficient basis for a regulatory entity administering the regulatory scheme to determine compliance of the incumbent provider with the regulatory scheme.

In another embodiment of the present invention, a method for testing one or more OSSs of an incumbent provider for compliance with a regulatory scheme is performed by an independent testing entity attempting to emulate a competitive provider that would access the OSSs in attempting to compete with the incumbent provider in an open competitive market. The testing is associated with performance metrics capture, tracking, and reporting activities of the incumbent provider across a plurality of operational domains. The method includes conducting a metrics data collection and storage test during active testing to evaluate incumbent provider policies and practices for collecting and storing data used for calculating performance metric values, both for internal operations of the incumbent provider and for operations of the incumbent provider associated with its interaction with competitive providers. The method also includes conducting a metrics definition documentation and implementation test during active testing to evaluate incumbent provider policies and practices for documenting and implementing performance metric definitions, implementation of performance metrics definitions comprising applying exclusions and business rules in calculating performance metric values based on raw data. The method also includes conducting a metrics change management test during active testing to evaluate incumbent provider policies and practices for developing, implementing, monitoring, and reporting changes concerning performance metrics, conducting a metrics data integrity test during active testing to evaluate incumbent provider policies and practices for processing data necessary to calculate performance metric values, and conducting a metrics calculation and reporting test during active testing to evaluate policies and practices of the incumbent provider for calculating performance metric values. The metrics calculation and reporting test includes (a) accessing calculated performance metric values for operations of the incumbent provider associated with its interaction with competitive providers, these values having been calculated by the incumbent provider and thereafter reported to the regulatory entity; (b) re-calculating the accessed performance metric values; (c) comparing the re-calculated values with the accessed values to identify any discrepancies; (d) attempting to reconcile any identified discrepancies between the re-calculated values and the accessed values; and (e) determining whether the incumbent provider calculated the accessed values consistent with documented instructions for doing so. The method also includes conducting a statistical evaluation of transactions test during active testing to evaluate metrics-related service performance of the incumbent provider according to statistical techniques. This test includes accessing test performance metric values calculated based on interaction between the incumbent provider and the testing entity, accessing benchmark performance metric values calculated based on interaction between the incumbent provider and one or more competitive providers, and comparing the test performance metric values with the benchmark performance metric values according to statistical techniques to determine whether and to what extent parity exists between the compared values. The method further includes evaluating performance of the incumbent provider during active testing according to predetermined evaluation criteria, generating test results according to the evaluation, and issuing a final report comprising the test results and providing a sufficient basis for a regulatory entity administrating the regulatory scheme to determine a net impact of identified metrics-related issues on the ability of competitive providers to compete with the incumbent provider in an open competitive market.

BRIEF DESCRIPTION OF THE DRAWINGS

To provide a more complete understanding of the present invention and features and advantages thereof, the following description refers to the accompanying drawings, in which:

FIGS. 11A and 11B illustrates example processes to be conducted before an order is submitted and in connection with order submission, respectively;

FIG. 16 illustrates example relationships between components that may be used in connection with billing testing; and FIG. 17 illustrates an example cross-domain testing process.

DESCRIPTION OF EXAMPLE EMBODIMENTS

Figure 6A:
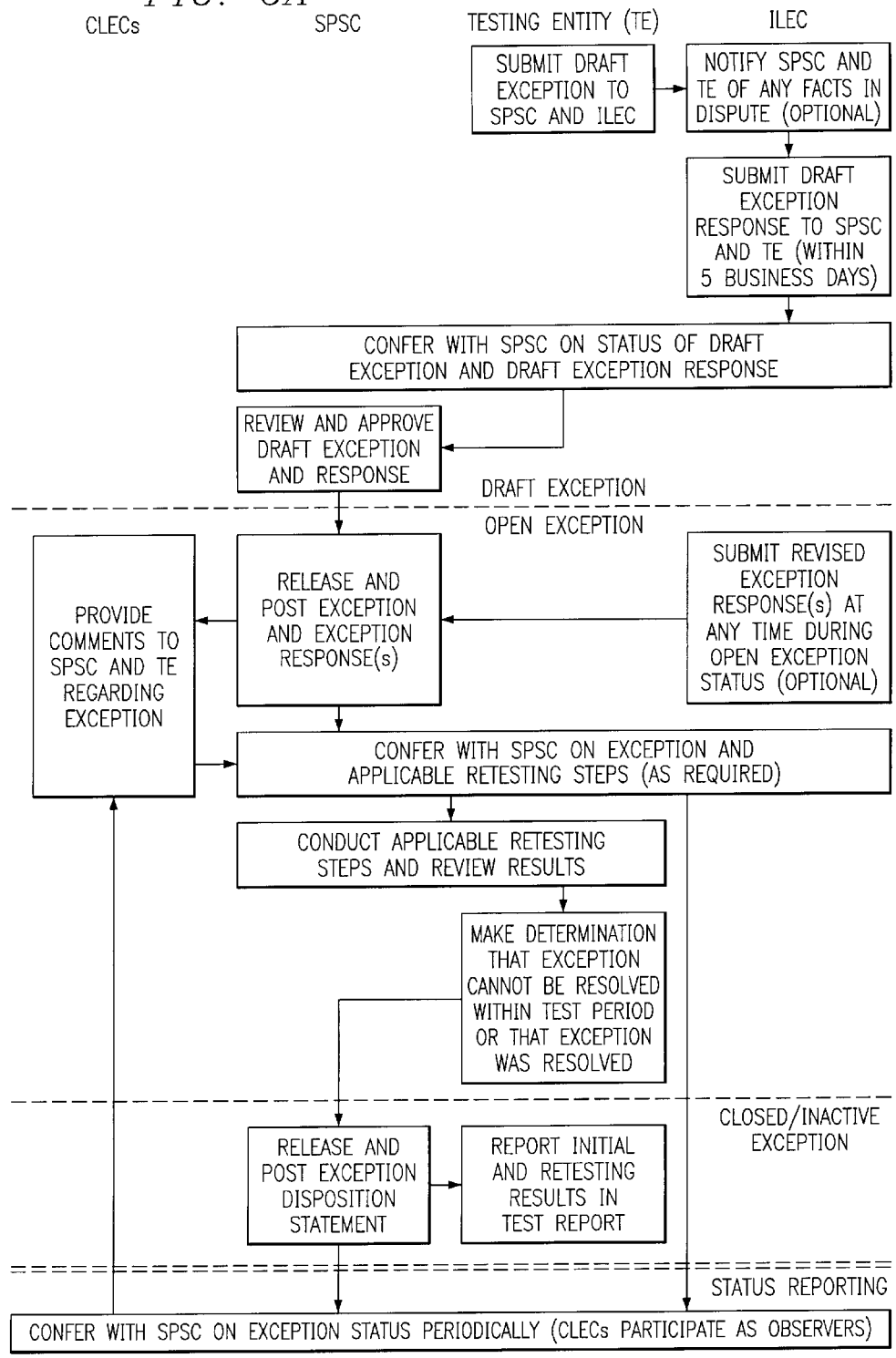
FIGS. 6A and 6B illustrate example exceptions processes.
Figures 1, 6B:
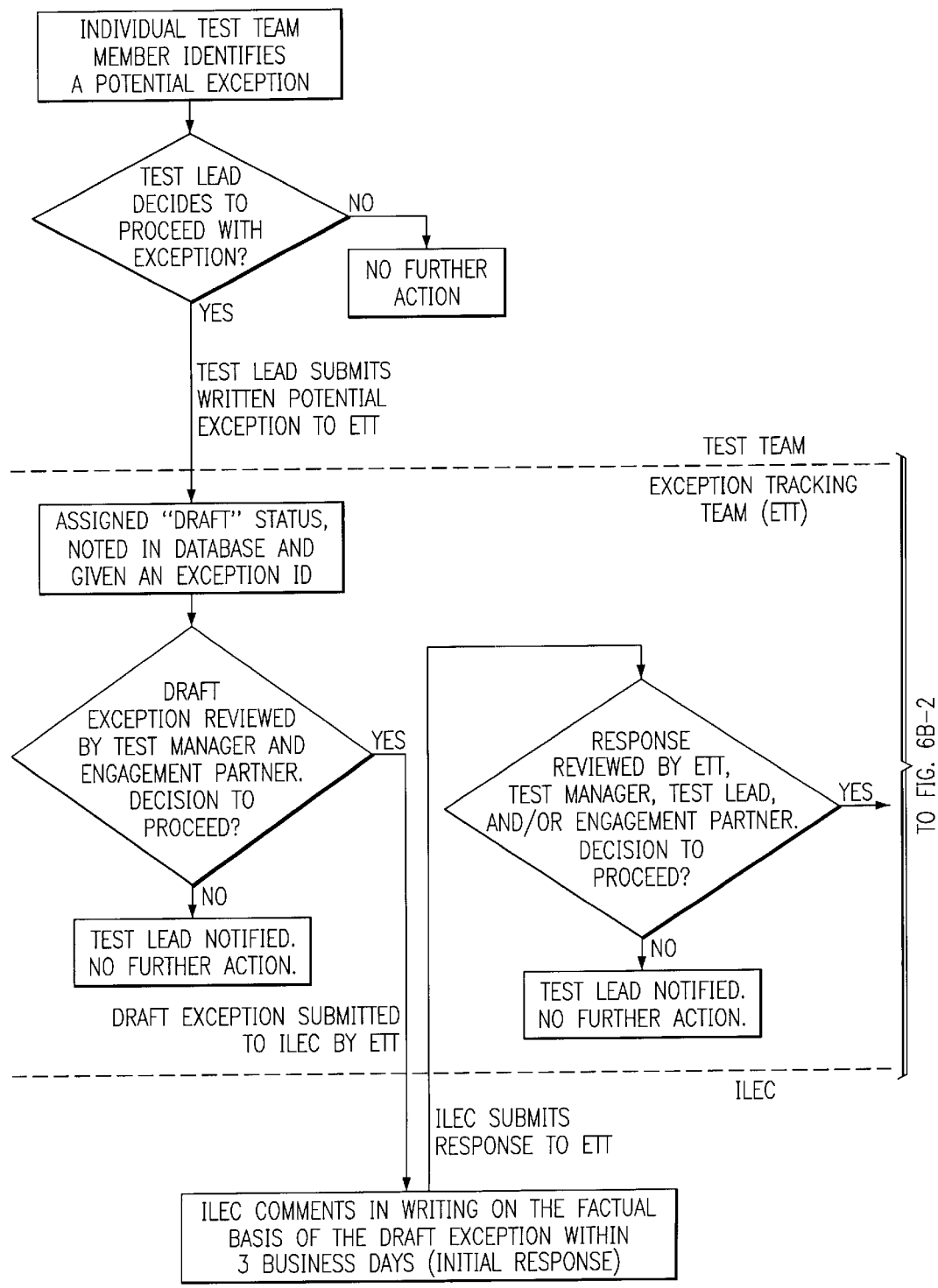
FIG. 1 illustrates an example system for testing one or more OSSs of an ILEC.

FIG. 1 illustrates an example system 10 for testing one or more OSSs 12 of an ILEC 14. In one embodiment, testing is performed to allow a regulatory entity to consider whether and to what extent ILEC 14 provides a relevant community of CLECs 16 with non-discriminatory access to, use of, and support in connection with OSSs 12 when compared with the ILEC's own retail operations. Although the present invention is described primarily in the context of United States operations, in which the relevant regulatory framework may include the 1996 Act and a regulatory entity may be, for example, a State Public Service Commission (SPSC), those skilled in the art will appreciate that the present invention encompasses any suitable regulatory framework, regulatory entity, or jurisdiction in the United States or elsewhere. In addition, while "ILEC," "CLEC," and other terms principally associated with United States operations are used for purposes of explanation, those skilled in the art will appreciate that the present inventions encompasses any suitable incumbent carriers, competitive carriers, and any associated terminology according to the jurisdiction in which system 10 is implemented. Moreover, while testing may be described in some instances as involving particular service types, circuit types, line types, equipment types, bill types, or the like, those skilled in the art will appreciate that the present invention is not limited to such particularities and is meant to be limited only as set forth in the appended claims.

In one embodiment, an independent testing entity is responsible for defining and performing testing activities associated with system 10. To perform the testing activities, the testing entity establishes one or more appropriate pseudo-CLECs 18, each of which supports at least some of the systems, processes, personnel, or other resources that a real CLEC 16 would support, such that from the ILEC's perspective pseudo-CLEC 18 substantially resembles (to the extent possible) a real CLEC 16 in the context of a resource being tested. Although it may not be possible, practicable, or even desirable for pseudo-CLEC 18 to emulate a real CLEC 16 in each aspect of operation, the ability of the regulatory entity to fairly evaluate ILEC 14 will usually improve with the accuracy with which the pseudo-CLEC 18 is able to successfully duplicate experiences that a real CLEC 16 would face in interacting with the ILEC's OSSs 12. As such, efforts should be made to establish a pseudo-CLEC 18 that is representative of one or more real CLECs 16, at least in the aspects that relate to the criteria on which ILEC 14 will be evaluated. Where appropriate, the terms testing entity, testing personnel, and pseudo-CLEC 18 may be used interchangeably. Also where appropriate, reference to ILEC 14 or CLEC 16 is meant to encompass one or more associated systems, processes, personnel, or other resources.

CLECs 16 and the pseudo-CLEC 18 may interact with the ILEC's OSSs 12 using one or more intervening OSS access systems 20, which collectively provide a gateway for OSS processing and an interface to "downstream" support systems. An OSS access system 20 may be associated with one or more OSSs 12, according to particular needs. OSS access systems 20 may be coupled to CLECs 16 and pseudo-CLEC 18 (on the CLEC side) and to OSSs 12 (on the ILEC side) using links 22 and links 24, respectively. Each link 22, 24 may include at least a portion of one or more local area networks (LANs), metropolitan area networks (MANs), wide area networks (WANs), a global computer network such as the Internet, or any other appropriate wired, optical, or wireless links. CLECs 16 and pseudo-CLEC 18 may also access one or more OSSs 12 directly without using OSS access systems 20, depending on the nature of this access and the particular implementation. Components of OSSs 12, OSS access systems 20, CLECs 16, and pseudo-CLEC 18 may operate on one or more computer systems at one or more locations, may access data storage at one or more suitable locations internal or external to system 10, and may share one or more computing resources as appropriate. Where components rely in part on computer systems, those computer systems may operate autonomously or subject to input from one or more users according to particular needs and implementations.

As described above, one of the objectives of the testing activities is to "live" the real CLEC experience. However, it may be difficult or even impossible for all testing activities to be truly blind to ILEC 14. For example, test transactions may arrive at ILEC 14 on dedicated circuits which ILEC 14 knows are associated with pseudo-CLEC 18. Furthermore, ILEC 14 will typically assign to each CLEC 16 (as well as pseudo-CLEC 18) a unique set of identifiers that must be included in all transactions submitted to ILEC 14. To partially offset this lack of blindness, the testing entity preferably implements procedures to help ensure that pseudo-CLEC 18 will not receive any treatment from ILEC 14 that is significantly different from that received by real CLECs 16. For example, the testing entity might require that all documentation received from ILEC 14 be generally available to all CLECs 16, the regulatory entity may monitor telephone calls, meetings, and other communications between pseudo-CLEC 18 and ILEC 14, CLECs 16 may be invited to monitor some or all such communications, pseudo-CLEC 18 may report problems using the same ILEC help desk available to CLECs 16, and the testing entity may make concurrent observations of service quality delivered to real CLECs 16 during the course of its testing activities and compare its observations to the quality of the service pseudo-CLEC 18 receives. These techniques are merely examples; any suitable techniques may be used according to particular needs.

The general scope of the testing activities may be documented in advance in an MTP, which the testing entity creates based on its understanding of the ILEC's products, industry trends, input from the regulatory entity, ILEC 14, and CLECs 16, and any other suitable information. As an example, the testing entity may consider actual ILEC and CLEC business plans and projections in developing the MTP. To determine the scope of its testing activities, all stages of the CLEC-LEC relationship are preferably considered, including establishing the relationship, performing daily operations, and maintaining the relationship. To better organize and facilitate the testing activities, the MTP may be divided into a number of testing domains which each generally correspond to one broad aspect of a customer's relationship with its LEC. In one embodiment, these testing domains may include, for example only and not by way of limitation, a Pre-Ordering, Ordering, and Provisioning (POP) Domain, a Maintenance and Repair (M&R) Domain, a Billing Domain, and a Relationship Management and Infrastructure (RMI) Domain. In each domain, the testing entity devises and implements testing activities to evaluate ILEC performance. Although particular domains are described for purposes of illustration, those skilled in the art will readily appreciate that the present invention is meant to encompass any suitable domains according to particular needs. Based on its testing activities, the testing entity may generate one or more reports documenting the manner in which testing activities were conducted, results of those testing activities, and evaluations of the ILEC 14 based on those results.

The testing activities, which are preferably representative of all CLECs 16 within the CLEC community, may be broader than activities likely to be experienced by any single CLEC 16. However, the testing activities are not necessarily intended to be exhaustive, because it is generally neither feasible nor desirable to test all the possible combinations of all features and functions across all offered products. In some cases, it might not be practicable to simulate some order types, problems, or processes in a test situation. Examples might include orders with very long interval periods, large volumes of test transactions which would exceed the capacity of the ILEC's help desk, or complex and time-consuming network design reviews. In such cases, the testing entity will preferably attempt alternative test procedures, such as conducting structured interviews with ILEC and CLEC personnel, inspecting live orders in process, reviewing historical performance or operational reports, and any other appropriate procedures to capture the ILEC's performance with respect to the activities in question. It will also generally not be practicable to execute certain live tests that might unduly disrupt service to ILEC or CLEC customers. As a result, ILEC performance for such tests should preferably be evaluated using other more suitable techniques. The reports for each domain tested will preferably identify the tests that were executed using live transactions and those that were executed using other techniques.

In one embodiment, in order to accomplish the testing activities, ILEC 14 provisions a "test bed" of accounts suitable to represent a market share of ILEC or other CLEC accounts that might be lost to the pseudo-CLEC 18 within an open competitive environment. The notion of a test bed is a logical concept, in that test accounts are actually created in the ILEC's central offices (COs) and its associated production systems rather than in a separate, isolated test environment. The testing entity may define the test bed alone or based on input from other parties such as the regulatory entity, ILEC 14, CLECs 16, other ILECs 14, or any other suitable parties. If ILEC 14 represents that a scarcity of resources exists in its COs and associated production systems, pseudo-CLEC 18 may be forced to use the same test accounts in connection with multiple test scenarios. For example, the same test account might need to be used to test one or more migration scenarios, one or more feature change scenarios, and one or more disconnect scenarios. Dependencies between scenarios may create scheduling problems for the testing entity and thus lengthen the testing period, since the testing entity might need to go through the entire pre-order, order, and provisioning cycle several times for a single test account.

In formulating an approach to testing, the testing entity may solicit input from both the regulatory entity and CLECs 16 since it is important for the testing entity to appreciate the types of activities that have either previously presented problems for CLECs 16 attempting to enter the market for local telecommunications services, or are otherwise of greatest concern to the regulatory entity and/or CLECs 16. The testing entity preferably combines such input with its own experience in developing its testing approach.

In one embodiment, two primary types of tests are identified: (1) transaction-driven tests, and (2) operational tests. Transaction-driven testing generally involves initiating transactions, tracking transaction progress, and analyzing results regarding completed transactions to evaluate a system or process under test. This may require defining the data sources, system components, and transaction volumes to be used in connection with a transaction-driven test. In one embodiment, the transactions to be used in each transaction-driven test are derived from higher level sets of one or more transactions referred to as test cases, which in turn have been developed from base test scenarios. These scenarios are described more fully below.

In one embodiment, for transaction-driven testing, pseudo-CLEC 18 generates and submits pre-order and order transactions to ILEC 14 using one or more of the ILEC's electronic interfaces—much like a real CLEC 16 would do. Transaction-driven testing may be used extensively in the POP, M&R, and Billing domains as described more fully below. To execute transaction-driven tests, the testing entity may assume the role of a CLEC "Operations" group, possibly including performing such tasks as understanding applicable business rules, submitting and tracking pre-order and order transactions, logging trouble tickets, and evaluating ILEC-to-CLEC ("carrier-to-carrier") bills. The testing entity might also (typically at the same time) assume the role of a CLEC "Information Technology" group, possibly including the establishment of electronic bonding with ILEC 14, translating between business and other rule formats, and resolving any problems associated with pre-order and order processing. These are merely examples, the testing entity may assume any suitable role or roles typically associated with a CLEC 14 in connection with its transaction-driven testing of ILEC 14.

In one embodiment, for example and without limitation, ILEC 14 may offer CLECs 16 access to its OSSs 12 through both an electronic data interchange (EDI) interface and a web-based or other appropriate graphical user interface (GUI). The testing entity will preferably test all interface types for all appropriate transactions. However, because an EDI or other substantially automated interface is likely to be more heavily used than a GUI or other user-oriented interface within a competitive marketplace, testing of the substantially automated interfaces may be emphasized if appropriate. As an example, many transaction-driven tests in the POP and Billing domains may primarily use an EDI interface created according to publicly available ILEC specifications, although a GUI may also be used for selected POP and Billing transactions. In contrast, all M&R trouble tickets may need to be submitted using a GUI since application-to-application electronic bonding with ILEC 14 might not be available for M&R domain activities. In one embodiment, as described more fully below with respect to the POP Domain, the testing entity establishes a transaction engine to support its transaction-driven testing efforts. In general, the testing engine simulates real CLEC behavior by generating and submitting test transactions to the ILEC's OSSs 12; records the success or failure of each transaction; records response times, intervals, or other compliance measures; and generates corresponding reports. The testing engine may perform only a subset of these tasks if appropriate.

Test scenarios are developed to model the way CLECs 16 interact with ILEC 14 in satisfying the needs of their customers, providing a contextual basis for testing by defining the transactions, products and services, volumes, data elements, or other variables to be considered during testing. Scenarios provide a way to bridge across test domains, preferably facilitating point-specific, end-to-end, or both point-specific and end-to-end testing of various systems and processes. Some scenarios might be specific to one particular domain, while others might span multiple domains. In one embodiment, a key principle in defining these test scenarios is to emulate real-world coverage, mix, and types of transactions while balancing the requirement for practical and reasonably executable transactions that would not unduly disrupt normal ILEC production or negatively impact service to ILEC customers. The test scenarios will preferably provide a breadth and depth of coverage of products and services to be tested, encompassing the procurement of resale services and UNEs from ILEC 14, querying of customer-specific and ILEC-specific information from the ILEC's OSSs 12, and identifying and resolving any problems that arise in connection with these activities. In general, each test scenario describes a range of interactions between a CLEC 16 and ILEC 14, and may be used to create one or more specific test cases, each of which may in turn be used to create one or more specific test transactions. Test scenarios may be adjusted through introduction of errors, changes to orders, or the like to provide a variety of possible CLEC-ILEC interactions. The testing entity preferably uses a relatively large number of test scenarios in structuring transaction testing of OSSs 12 and related systems and processes. Example test scenarios may include, in any suitable combination and without limitation, those set forth below in Appendix A.

Testing activities will preferably evaluate the ability of ILEC 14 to scale to handle increased CLEC transaction volumes at estimated future levels. As discussed above, the overall goal of the testing activities is to evaluate the systems, processes, and other operational elements associated with the ILEC's support of a competitive market for local telecommunications services. The purpose of volume testing is to evaluate the ILEC's availability to process representative future transaction volumes to support the entry of CLECs 16 into the local market. Volume tests are preferably performed at both peak and normal volumes. In addition, stress tests are preferably performed to test overall system capacity as to selected transactions and to identify potential "choke points." The scope of these volume tests are defined within each domain section.

Test volumes may be assigned to particular test cases based on complexity, expected real world production, and other appropriate factors, and may be developed through a synthesis of information obtained from ILEC 14 and various CLECs 16. This information is preferably solicited independently by the testing entity. Items suitable for review in connection with determination of test volumes may include historic and forecasted ILEC service demand, historic and forecasted CLEC service demand, historic and forecasted CLEC usage of the ILEC's OSSs 12 (which might include transactions types and volumes), market studies, and any other appropriate information. Although more complex test scenarios may be expected to occur less frequently, test case generation should preferably ensure that such test scenarios are represented to obtain adequate coverage.

In one embodiment, actual ILEC volume data may be used as the basis for developing normal, peak, and stress volumes for each appropriate test case. Normal daily volumes may be calculated, for example, based on an estimate of market share captured by CLECs 16 during a selected time period and an expected run rate. For example, the testing entity may estimate that in a certain month, CLECs 16 gained lineshare at a certain rate, resulting in a certain number of lines CLECs 16 would be expected to gain during a longer (e.g., three-month) period containing that month. A normal volume test may then simulate a corresponding (though possibly not equal) number of transactions for the ILEC's OSSs 12 to process during a testing period of the same (e.g., three-month) length. Other assumptions used in the calculation may include, for example, the number of orders per net line added, the number of one or more types (e.g., change/disconnect/move) orders per net line added, the percentage of orders from jurisdictions other than the home or primary jurisdiction of ILEC 14, or any other assumptions. In a particular embodiment, peak volumes are based on a suitable multiplier of normal volumes, while stress volumes are based on a suitable multiplier of normal and/or peak volumes.

Volumes by service and/or order type may be developed using the ILEC's forecast of competitive lines, viewed by service and order type. The testing entity may determine a proportion for each service and order type based on forecasted net adds during a selected time period, then extend or contract the normal daily volume by that proportion to yield the daily volume by service and order type. The daily volumes for order supplements, order changes/disconnects/ moves, and other detailed order information may be calculated by applying historical factors to daily volumes by service and order type. Pre-order daily volumes may be derived from historical ILEC actuals during a selected time period of pre-order type as a percent of order volume. Daily volumes by service and order type may be extended or contracted by an appropriate factor based on that percentage to determine pre-order daily volumes. Order confirmation daily volumes may be derived analogously. Gross, initial, and subsequent trouble report rates may be derived from historical ILEC actuals, applied to the anticipated embedded base in some selected time period. These are merely examples; test volumes may be developed in any suitable manner.

In contrast to transaction-driven tests, operational tests focus on the format, structure, and content of the ILEC's business processes under review. Operational tests are used to assess the ILEC's day-to-day operations and operational management practices, including such things as policy development, procedural development, and procedural change management. Operational tests evaluate the ILEC's processes to determine whether these processes appear to function correctly and in accordance with documentation and expectations. Operational tests also preferably evaluate any appropriate ILEC management practices and operating procedures, comparing these results to legal, statutory, and other requirements.

CLEC live test cases, involving one or more real CLECs 16, may provide an alternative test approach for transactions that are not practicable to provide in the test environment, due to certain limitations such as those described above. Moreover, CLEC live test cases may provide the testing entity with a different perspective on actual CLEC production. CLEC live production may be monitored during the test period to assess the service levels experienced by real CLECs 16. In some cases, information may also be gathered from historical CLEC transactions for systems and processes that have been sufficiently stable for a sufficient length of time.

Figures 2, 6B:
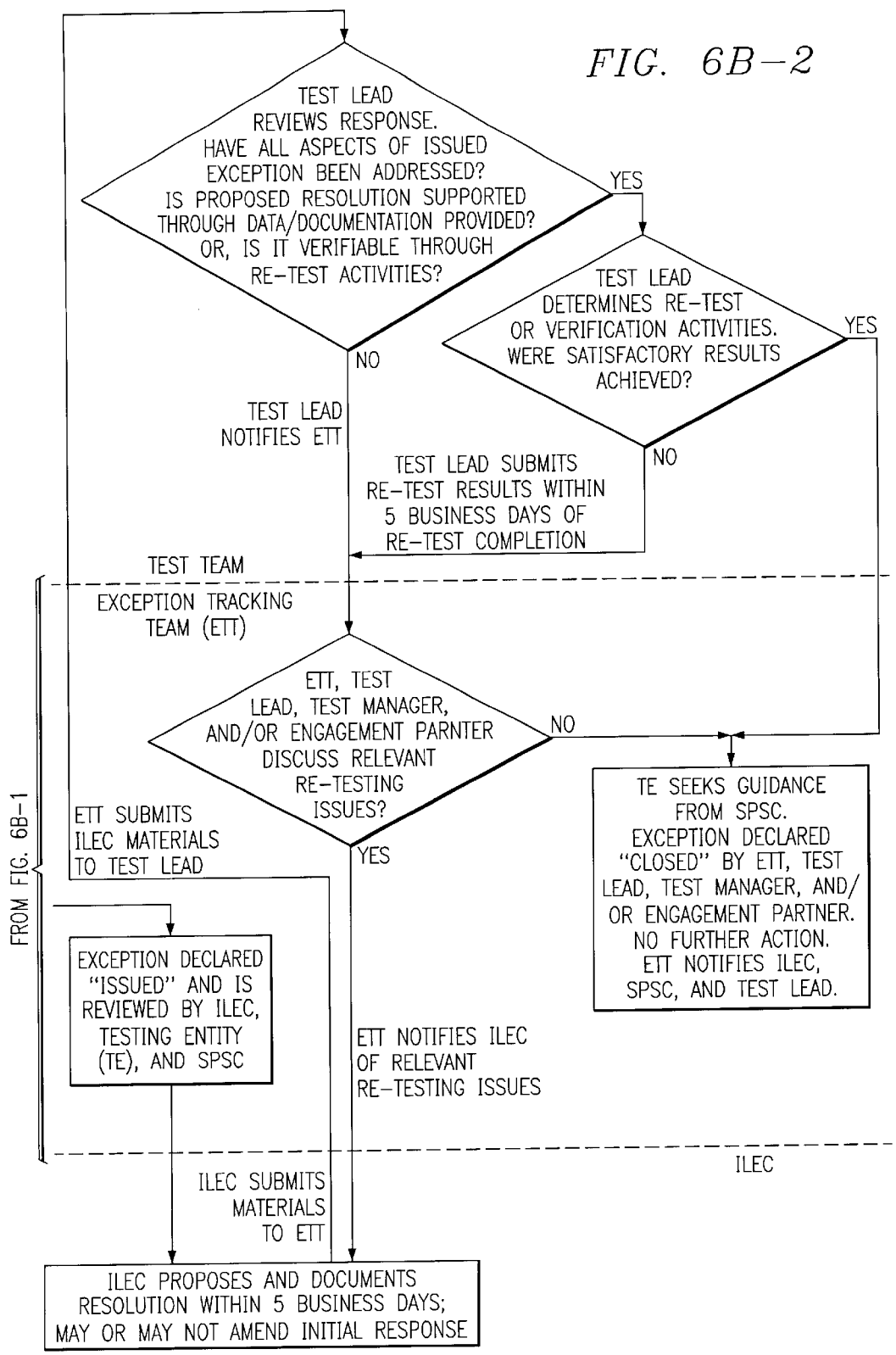
FIG. 2 illustrates an example test life cycle.

FIG. 2 illustrates an example test life cycle 26 incorporating the major milestones (filled diamonds) and interim milestones (unfilled diamonds) that, in one embodiment, generally apply to each test described below. Pre-test activities 28a may include completing background data collection, completing preliminary development of testing systems, tool, and interfaces, satisfying any remaining entrance criteria, and conducting an appropriate test entrance review process.

Figure 3:
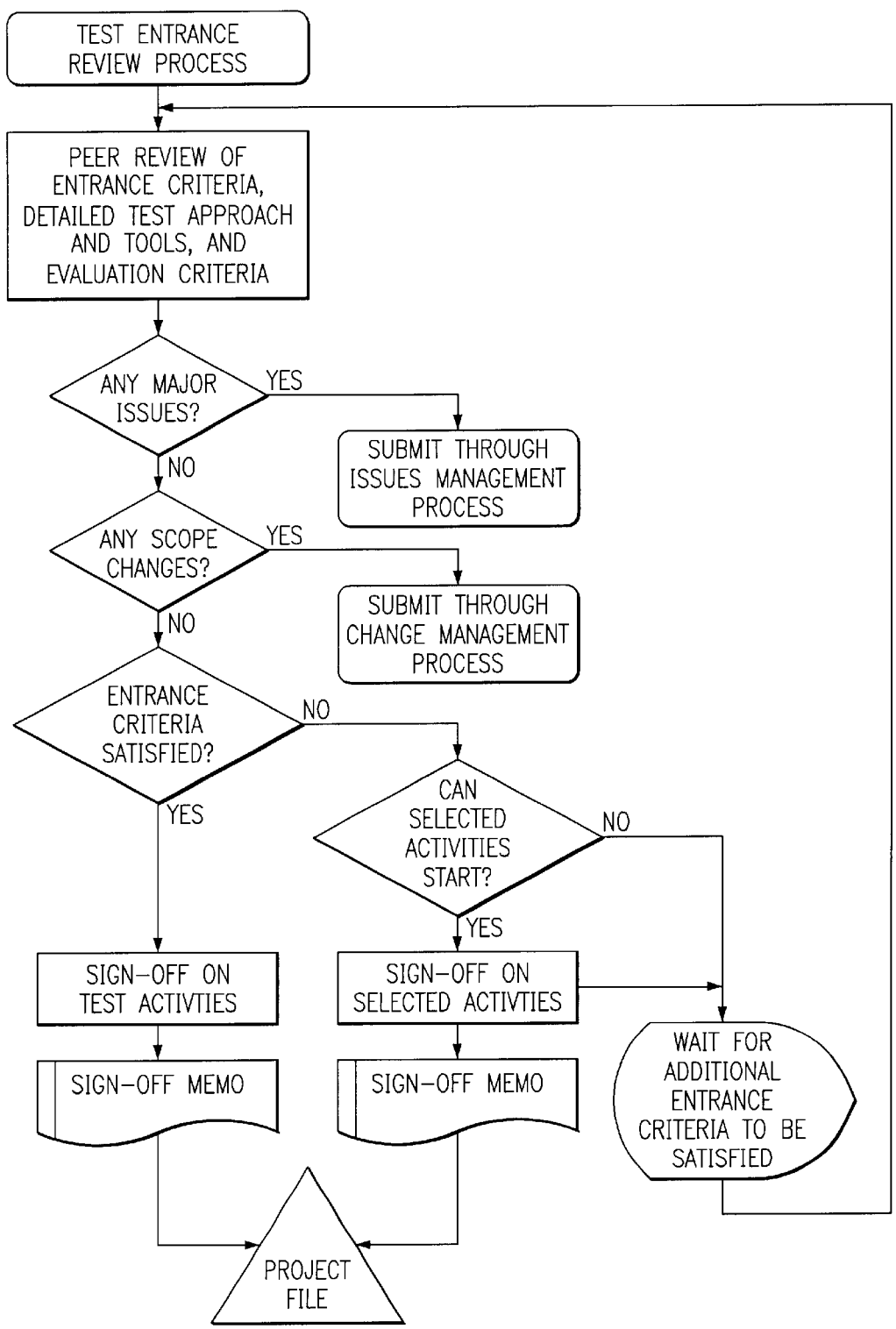
FIG. 3 illustrates an example entrance review process.

An example test entrance review process is illustrated in FIG. 3. The entrance review process may include a peer review aspect. Peer reviews are internal project reviews conducted at one or more appropriate times during the life of a test. Peer reviews may be desirable in connection with entrance review (being required in one embodiment), during the course of a test (being optional in one embodiment), or in connection with an exit review (being required in one embodiment). An entrance review is preferably required prior to initiation of the active testing phase of a test. The purpose of this review is to ensure that all entrance criteria are satisfied, that the test approach is consistent with the MTP, and that all test design elements (e.g., data collection tools, evaluation criteria, interview guides, test cases, etc.) are sufficiently developed for testing to proceed. Peer reviews are preferably conducted according to predetermined peer review guidelines concerning the selection of appropriate peers, scheduling and communications protocols, topics of discussion, escalation protocols, and the like. Although peer review are desirable and should serve to enhance the reliability of the test, and may be required in certain embodiment, peer reviews may be omitted in other embodiments.

Entrance criteria are those requirements that must be met before individual tests can begin. Global entrance criteria, which may apply to each individual test, may include but are not limited to: (1) a detailed test plan has been approved by the regulatory entity; (2) any pending legal or regulatory proceedings that might impact the ability to perform the test have been concluded in a manner that allows testing to proceed; (3) the regulatory entity has verified measurements to be used in the test, which sufficiently support collection of test results; (4) all pertinent ILEC interfaces have been tested and operationally ready; (5) all the pertinent pseudo-CLEC and/or CLEC interfaces have been tested and operationally ready; and (6) CLEC facilities and personnel are available to support elements of the test plan requiring CLEC involvement. In addition to these or any other global entrance criteria, one or more test-specific entrance criteria may be defined for each test as appropriate.

Test activities 28b may include initiating and satisfying formal data requests, conducting required formal interviews and verifying interview reports, conducting analyses, verifying analysis results, submitting exceptions, compiling a draft report, and conducting an exit review process.

Figure 4:
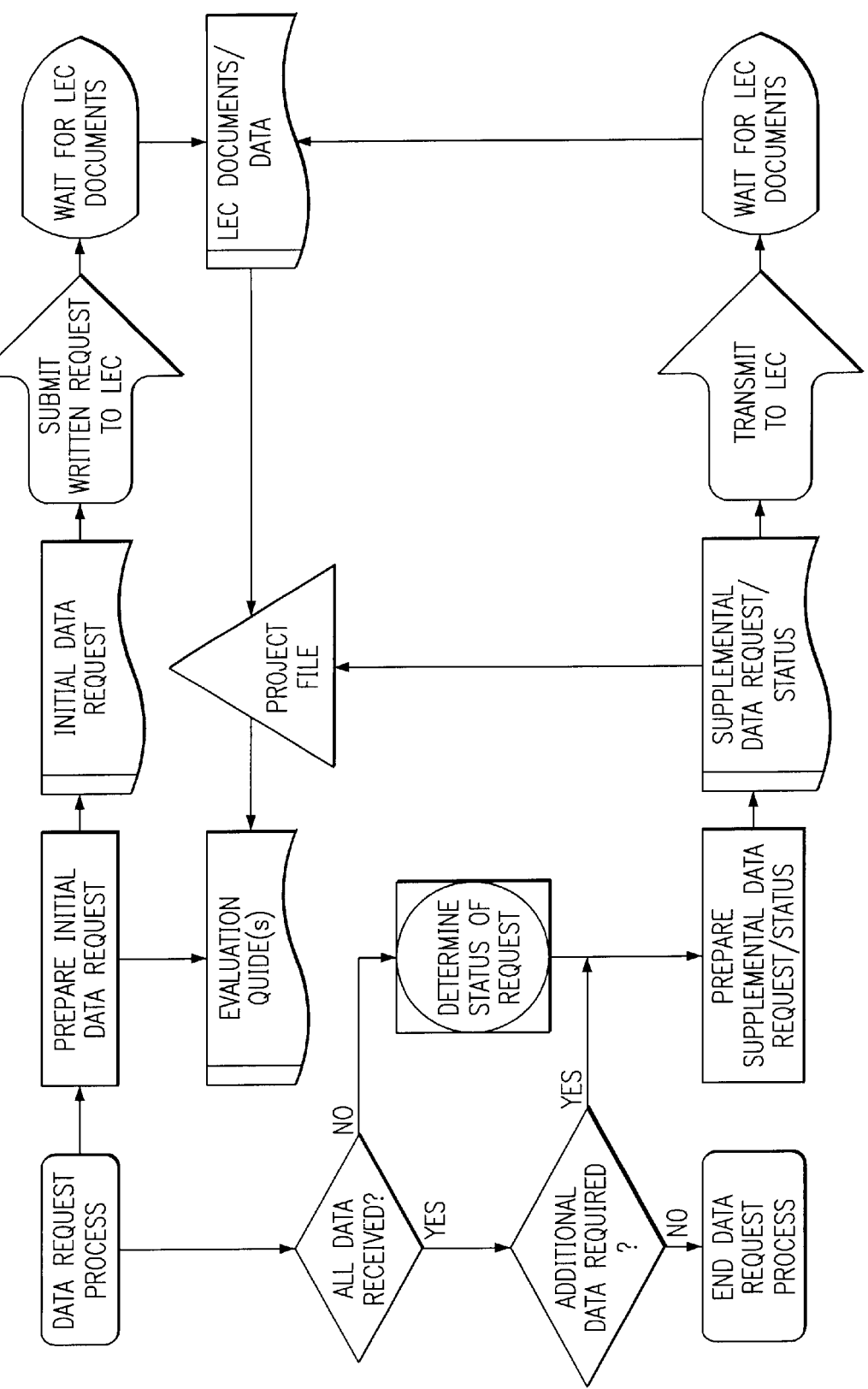
FIG. 4 illustrates an example data request process.

An example data request process through which the testing entity may solicit information from the ILEC 14 and/or CLECs 16 (referred to collectively as "LEC") depending on the particular test, is illustrated in FIG. 4. In one embodiment, all materials that are not publicly available should be sought using a formal, written data request. A written data request should be used when the information requested must be provided within a specified timeframe or when traceability is essential (i.e. the working papers need to show that the appropriate ILEC source provided a complete and current version of the information requested). As just example, one should not assume a file copy of an internal procedures document is the most current version without the confirmation provided by a written data request. A standard data request form is preferably made available to all testing entity personnel to help streamline and standardize information requests across all tests. One or more test-specific or other more particular data request forms may also be provided.

Figure 5:
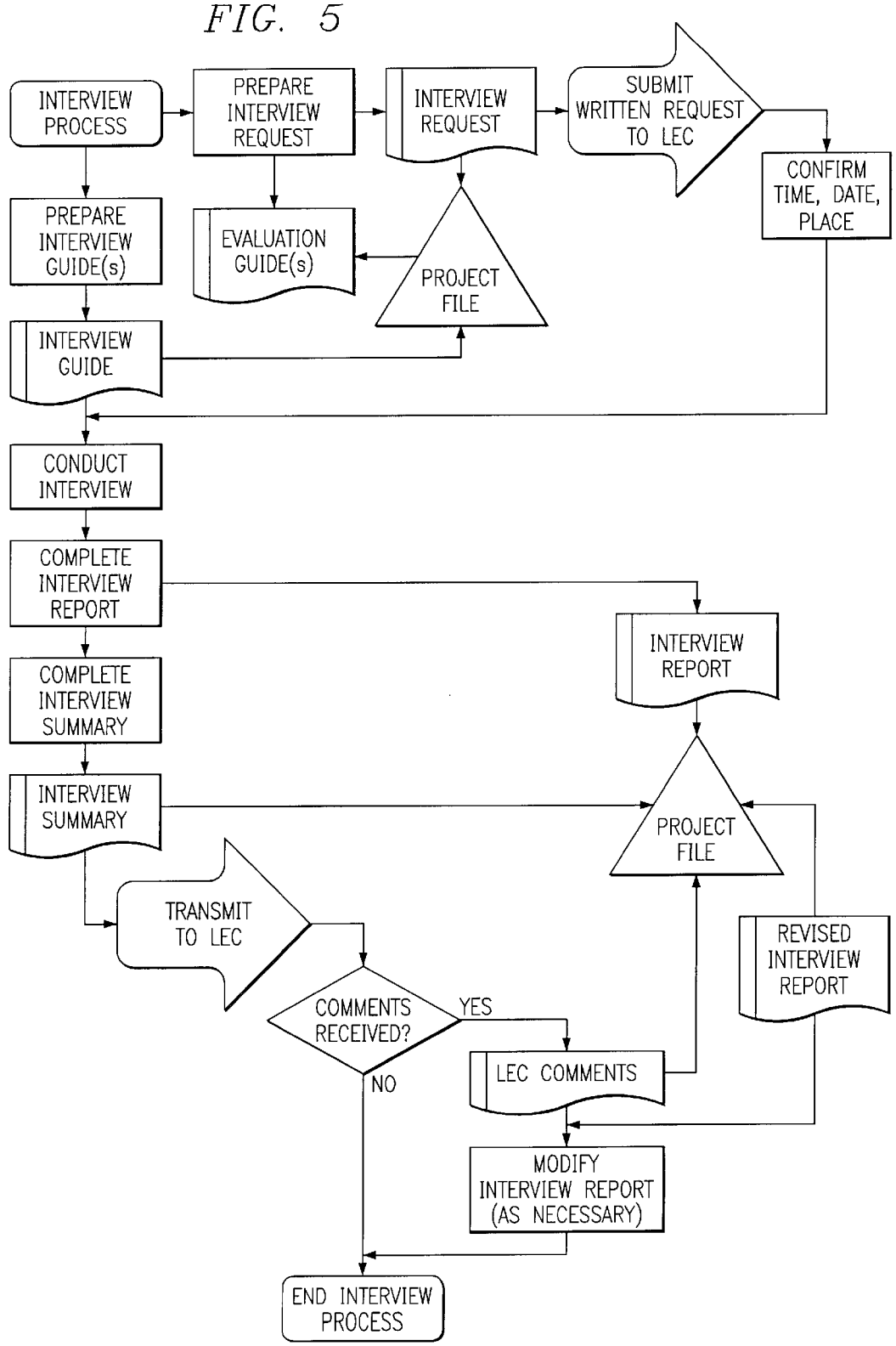
FIG. 5 illustrates an example interview process.

An example interview process, by which the testing entity interviews ILEC and/or CLEC personnel depending on the test, is illustrated in FIG. 5. In one embodiment, there are two categories of interviews—formal and informal. Informal interviews take place outside active testing; for example, background conversations with ILEC and CLEC representatives. Formal interviews take place during active testing; participants in formal interviews are considered "on the record" for testing purposes. Interviewing guidelines developed by the testing entity may provide the interview parameters and instructions for testers conducting formal interviews, and should preferably not be distributed to ILEC 14, CLECs 16, or any other external party. Certain interview guidelines regarding interview protocol and documentation may apply to informal interviews as well as formal interviews. Each interview team (e.g., for each test or each domain) may develop a more specific interview guide, including a set of test-specific or domain-specific questions, based upon the generic interview guidelines.

Notes should be taken at each interview and, following the interview, all test team notes may be compiled into a detailed internal interview report which further includes any handouts or written material provided during the interview. Interview reports are preferably not distributed to the interviewees. However, a brief summary of each interview may be created to record key facts provided during the interview and then forwarded to the interview participants. This provides interviewees with an opportunity to review and confirm their statements in writing. The summary should preferably not include any test conclusions or analysis. Once comments from the interview summary are received in writing, or the time to respond has elapsed, the interview summary may be finalized. Testers are not obliged to provide an amended version of the interview summary based on written or verbal comments. However, original written comments may be included in the working papers for the test. Any follow-up conversations directly relating to a formal interview may be recorded as an addendum to the interview report or as a note to the file.

Situations may arise in which the scope of a test as defined in the MTP will need to change. For example, additional tests or modified tests may be required in order to meet the overall objectives of the testing process. The testing entity may be responsible for instituting and enforcing change control procedures to accommodate these circumstances. If a change to the test appears necessary, the responsible parties should prepare a change proposal containing a description of the changed (or new) test case; a justification for the proposed change; identification of one or more test domains, scenarios, test processes, and test cases impacted; revised text for pertinent test plan sections and test reports; identification of resource and schedule impacts; or any other suitable information. A change control number may be assigned to each change proposal. All changes to the MTP should preferably be approved by testing entity management, the ILEC 14, and the regulatory entity before being incorporated into active testing, for example, using a standard "sign-off" approval form.

In process peer reviews are conducted on an elective basis during the active phase of a test. These are most appropriate when the scope of a test has changed materially. In process peer reviews may be conducted according to the same peer review guidelines as the peer reviews associated with entrance and exit reviews. In contrast to entrance and exit reviews, which in one embodiment may require formal "sign-off" approval, since in process peer reviews are elective they do not require such approval.

The exit review process may be analogous to the entrance review process illustrated in FIG. 3, and preferably includes a peer review component, which as discussed above may be a required aspect of an exit review. In one embodiment, an exit review is required to complete a test. The primary purpose of this review is to ensure the test has been conducted consistent with the test plan, that test results are appropriately reported and supported, and that exit criteria are satisfied.

Evaluation measures and corresponding evaluation criteria provide the basis for conducting tests. In general, evaluation criteria include the norms, benchmarks, standards, and guidelines used to evaluate the measures identified for testing. The evaluation criteria provide a framework for identifying the scope of testing activities, the types of measures to be made during testing, and the approach used to analyze results. Test results are compared against evaluation criteria to assess the ILEC's performance. Evaluation measures and associated criteria may be identified by the testing entity using its professional judgment, the regulatory entity, or the testing and regulatory entities in concert. An evaluation checklist may be created for each test based on the evaluation criteria for the test, for use by testing entity personnel in conducting testing activities and evaluation ILEC performance with respect to the evaluation criteria. After an evaluation checklist is developed for a specific test, it should be reviewed during the corresponding entrance review. Once reviewed, the checklist is preferably subject to formal change control procedures, at least as to any material changes. For example, changes made in order to clarify the meaning or to facilitate results reporting, without changing the scope of the test, may not be subject to formal change control procedures.

In a particular embodiment, types of evaluation criteria may include, without limitation: (1) quantitative, which set a threshold for performance where a numerical range is possible (e.g., response time is four seconds or less); (2) qualitative, which set a threshold for performance where a range of qualitative values is possible (e.g., the documentation defining daily usage feeds is adequate); (3) parity, which require two measurements to be made and compared (e.g., CLEC transaction time is not greater than the ILEC retail transaction time); and (4) existence, where only two possible test results (e.g., true/false, presence/absence, etc.) can exist (e.g., documentation defining daily usage feeds exists). In cases in which a metric or an associated standard does not exist or the testing entity determines that the standard provides a competitive advantage either to ILEC 14 or the CLECs 16, the testing entity may recommend a new standard to the regulatory entity. In general, all evaluation criteria are not of equal importance. Some may be less important as standalone measures, but may be significant when viewed with other evaluation criteria. Others may be significant in their own right. Thus, simple numerical counting or averaging of test results for one or more domains or tests may be misleading and should be avoided.

For certain tests, testing entity may rely on statistical methods to conduct its analyses and render conclusions about ILEC performance. The test plan for each test for which a statistical analysis is used should preferably define the data population to be observed, the measurements to be taken, and the statistical techniques to be used. Data should be tabulated and archived in a way that allows verification of test results and re-analysis of data using the same or alternate statistical methods, if appropriate. In instances in which sampling is used, sampling should be designed so that samples are sufficiently representative of data populations with respect to the measures being studied to ensure that the resulting statistical inferences made about the populations are valid and reliable.

In one embodiment, testing employs a hypothesis testing approach to frame the analysis of test results. In this approach, the "null" hypothesis is that ILEC 14 is meeting the relevant performance standard (i.e. it is assumed that parity exists). The null hypothesis will be rejected if the differences in the ILEC and CLEC statistics are statistically significant at a suitable significance level (e.g., at the 5% significance level). For metrics that require a particular performance standard, a one-sample t-test will typically be used for continuous variables (e.g., response time) and a binomial test will typically be used for discrete variables (e.g., whether an appointment was missed). For metrics requiring parity, a two-sample t-test will typically be used for continuous variables and a hyper-geometric test will typically be used for discrete variables. For samples of small or moderate size, where the variable is continuous, a permutation test may be used. There may be instances where tests described above are not appropriate, due to assumption violations or other anomalies in the data. In these situations, other statistical methods and tests should be used as appropriate. Test results for a test will preferably include a summary of any statistics calculated, the hypotheses postulated for the test, the conclusion drawn based on the statistical results, and the significance level or p-value for the test.

In one embodiment, as opposed to a one-time "pass/fail" evaluation of the ILEC's OSSs 12, the testing entity implements a "military-style" test approach that incorporates a "test until you pass" mindset. This philosophy may help ensure that a baseline set of working components will be available to CLECs 16 at the end of the testing period. This will often be in the best interest of all parties seeking an open competitive market for local telecommunications services. However, this philosophy will generally lengthen the testing period due to the need to iterate through the test, fix, and retest cycle, sometimes more than once per component tested.

In one embodiment, for each component tested, the test process proceeds as follows: (1) the testing entity tests the component; (2) the testing entity informs ILEC 14 of any problems encountered by generating a written "exception" describing the failed component and the potential impact on CLECs 16; (3) ILEC 14 prepares a written response to the exception describing any intended fixes; (4) after the ILEC fixes are completed, the testing entity retests the component as required; (5) if the exception is cleared, the test process is considered complete as to the component and the testing entity prepares a written closure statement; and (6) if the exception is not cleared, the testing entity continues to iterate through the test, fix, re-test cycle until closure is reached. While a military-style testing philosophy is primarily described, the present invention contemplates relaxing these restrictions if appropriate, whether on a global, component-by-component, or other basis. For example, the testing entity may determine that a component will not be subject to any further re-testing, despite lack of closure, in which case the test results for the component will remain in a less than fully satisfied state.

Exceptions are results that do not meet the evaluation criteria or performance standards established for a test. Exceptions may be processed in a formal manner as described below. An exception should be documented in detail, including all details necessary to substantiate the exception, and reported as soon as it can be adequately substantiated. In one embodiment, once initially documented, the exception may be considered a draft exception until it is approved and released, for example, by a test domain lead or other suitable individual. All draft exceptions are submitted to the ILEC 14 to provide ILEC 14 with an opportunity to verify the facts supporting the exception. All draft exceptions may be assigned an exception ID and placed on a master list of exceptions. ILEC 14 is provided a time period to refute any factual inaccuracies in the draft exception. A draft exception may be withdrawn based on ILEC feedback. If an exception is not withdrawn at this stage, it becomes a pending exception.

The ILEC 14 may be required to respond in writing to all pending exceptions. The pending exception and the ILEC's initial written response may be reviewed, for example, in a formal meeting or conference call in which the regulatory entity is a required participant. CLECs 16 or other interested parties may also be participants. Subsequent to this formal review, the pending exception may be withdrawn. If the pending exception is not withdrawn at this stage, it becomes an open exception. The ILEC 14 may elect to amend its initial response and provide additional data and documentation subsequent to the pending exception review. All ILEC 14 responses to exceptions should be made part of the working paper record for the test.

In one embodiment, one or more members of the applicable test team must review and assess the ILEC's initial and subsequent written responses to exception. This review may include verifying that all aspects of the exception are addressed in the responses and ensuring that all proposed resolutions to responses are supported through data and documentation provided or are verifiable through retest activities. If the response is incomplete or does not provide a basis for retesting, the ILEC 14 is notified that the exception resolution process cannot proceed. If a basis for retesting is established, retesting activities are performed.

There may be two possible avenues for active exceptions to be processed: (1) an open exception is closed out when retesting is completed with satisfactory results; or (2) an open exception may be deferred to end test activities in the absence of a satisfactory test result where there is no reasonable expectation that a resolution can be reached. For example, if the ILEC 14 commits to resolve the negative test results cited in an exception, but does not or cannot demonstrate corrective action during the test period, a deferral is in order. An exception should not be deferred without the prior approval of an appropriate individual. ILEC 14 may be required to propose a new resolution if a previously proposed resolution is not achieved or not achievable. Test reports should include all exceptions noted, retesting results, and written ILEC 14 responses.

Example exceptions processes, providing further detail, are illustrated in FIGS. 6A and 6B. The processes of FIGS. 6A and 6B may be separate alternatives to one another or may be combined in whole or in part in any appropriate manner according to particular needs. Although an SPSC is shown, as discussed above, the present invention contemplates any suitable regulatory entity, depending on the jurisdiction in which testing is conducted.

The exceptions process being used may be supplemented where appropriate with an observations process, which may supply a key component for meeting two criteria for independent third-party testing of the ILEC's OSSs 12. First, the process establishes a structure and mechanisms by which the "test until you pass" philosophy described above can function. Testers can generate preliminary observations and, according to a systematic process, these observations are communicated to ILEC 14, responses are solicited, ILEC 14 takes appropriate actions, and re-testing can occur. Second, the process creates a forum by which CLECs 16 and other interested parties can monitor the test and comment on specific findings. The observations process is therefore advantageous as an extension of the exceptions process.

Observations are created where the testing entity determines that a system, process, policy, or practice characteristic of ILEC 14, as revealed by a test, might result in a negative finding in the final test report. In one embodiment, there are two types of observations, differentiated by the certainty of the existence of a problem. The first type of observation is a question regarding an area of an ILEC component being tested that cannot be answered without additional guidance from the ILEC 14. The source of the confusion is described in an observation document. This type of observation is meant to clarify issues, and will either be satisfactorily answered by the ILEC 14 and closed by the testing entity, or upgraded to a traditional observation or exception by the testing entity in view of the ILEC's response. The second type of observation is a means of identifying what may be a potential deficiency in an ILEC component that could contribute to a negative finding in the final report if validated and left unresolved. Observations are meant to alert the ILEC 14, and all concerned parties, to the existence of potential deficiencies so that they can be addressed in a timely and satisfactory manner. ILEC 14 may be permitted to resolve observations with workarounds until permanent fixes can be implemented. In contrast, exceptions identify deficiencies in ILEC components that will result in a negative comment for one or more evaluation criteria in the final report if left unresolved. Observations may not become exceptions, and certain exceptions may not have been identified previously as observations.

For example, an observation report may have a unique identifier and may specify the date it was issued, the particular jurisdiction to which it is applicable, its owner (e.g., the specific testing entity), the role of the owner (e.g., "Test Manager" where the owner is the testing entity), and the particular test to which it pertains if appropriate. The observation report describes the general nature of the observation, the specific issue and how it arose, and a brief assessment of the impact of the issue on the ability of CLECs 16 to compete in the market for local telecommunications services. Other suitable information may be included if appropriate.

Observations may be handled similar to exceptions in terms of submission, review, resolution, etc. if desired. However, certain differences in treatment may be present in a particular embodiment. In one embodiment, once initially documented, the observation may be considered a draft observation until it is released. Once the draft observation is posted, it becomes an open observation and may be reported to ILEC 14, posted on a website accessible to CLECs 16 or other interested parties, or otherwise distributed. Each observation may be assigned an observation ID and be placed on a master list of observations.

A weekly or other conference call will be held to enable the testing entity, the ILEC 14, CLECs 16, the regulatory entity, and other interested parties to discuss open observations. These parties will preferably be able to ask clarifying questions during the calls. The testing entity may record minutes of conference calls held for each observation. These minutes may include the status of each observation as well as action items that arise during the conference call. The official minutes from each conference call may be posted on a website or otherwise distributed. The ILEC 14 may be invited to respond in writing to an observation, although a verbal responses may be sufficient depending on the circumstances. This request may be made when the observation is first released to ILEC 14 or after discussion of the observation on the conference call. In either case, ILEC 14 will have a specified number of business days, after being notified that a written response is requested, in which to provide a written response. ILEC 14 may also have the option to initiate a written response to an observation. These responses should describe either a clarification of the issues identified in the observation or the ILEC's intended fixes to the problem. Written responses from ILEC 14 may be posted on a website or otherwise distributed.

An observation can progress from open to closed status if the testing entity determines that the investigation of the observation is completed. Such investigation may include any retest activities that result from the ILEC's response. Additionally, an observation may be escalated to an exception if the testing entity determines that the issue would result in a "Not Satisfied" evaluation of one or more evaluation criteria defined for a particular test.

A central library for exceptions and/or observations may be established for comprehensive cataloging, tracking, and reporting of exceptions and/or observations across multiple tests, test domains, and jurisdictions. This exceptions/observations library may be supported using any suitable database(s) at one or more locations. As an example, the library may be contained in a database associated with a web server that communicates Hypertext Markup Language (HTML) pages to interested parties over the Internet. The actual exceptions and/or observation reports may be made available where appropriate. In addition, tracking information may be available for each exception and/or observation, including a brief description, classification (e.g., (e.g., active/inactive), status (e.g., deferred), status reason (e.g., "Resume discussion Jun. 26, 2001"), historical notes compiled since its initial issuance, any related exceptions and/or observations, and any other suitable information. This library may also be used advantageously as a flexible change or program management tool with respect to ILEC OSS testing.

In one embodiment, each evaluation criterion is analyzed separately and has its own associated test result and comment (where appropriate). Test results may fall into the following categories, without limitation: (1) "satisfied"—meaning that the evaluation criterion was satisfied; (2) "satisfied, with qualifications"—meaning the evaluation criterion was satisfied but one or more specific areas need improvement; (3) "not satisfied"—meaning the evaluation criterion was not satisfied in that one or more issues were identified that would have some business impact on CLECs 16, whether or not an exception is also generated; (4) "satisfied, exception resolved"—meaning that the evaluation criterion was not initially satisfied, an exception was generated, ILEC 14 made one or more fixes, and the evaluation criterion was then satisfied; and (5) "satisfied, with qualifications, exception addressed"—the evaluation criterion was not initially satisfied, an exception was generated, the ILEC 14 made one or more fixes, and the criterion was then satisfied with qualifications. These categories are merely examples; test results may be classified in any suitable manner according to particular needs.

In contrast to entrance criteria, exit criteria are the requirements that must be met before the individual tests can be concluded. Global exit criteria, which in one embodiment may apply to each individual test unless otherwise noted, may include but are not limited to: (1) all required fact-finding, analyses, and other test activities are completed; and (2) all appropriate change control, verification, and confirmation steps are completed, including documentation and review of test results for accuracy and confirmation of any test results that require clarification. In addition to global exit criteria, one or more test-specific exit criteria may be defined for each test as appropriate.

Figure 7A:
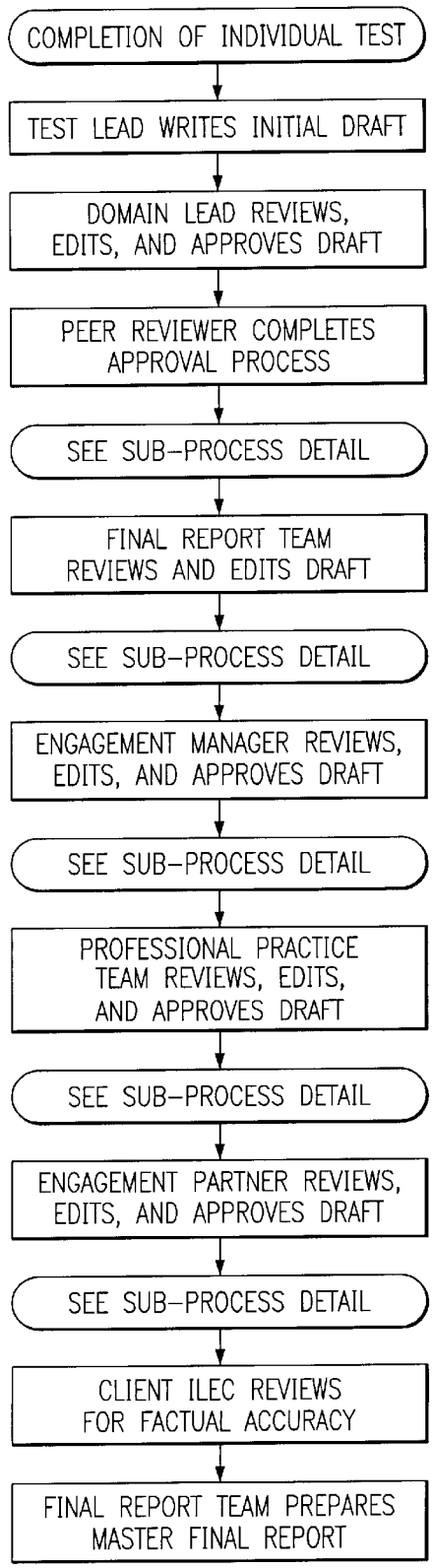
FIGS. 7A and 7B illustrates an example final report preparation process.
Figure 7B:
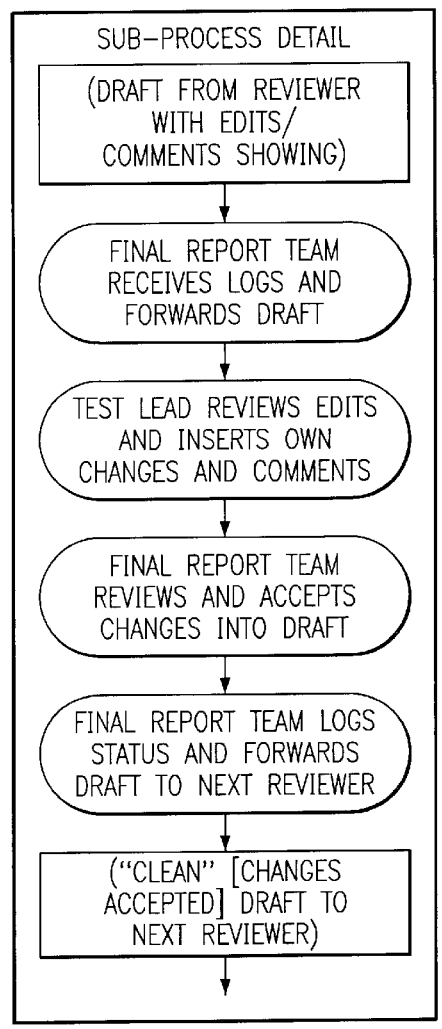

Post-test ("close-out") activities 28c may include satisfying remaining exit criteria, closing out resolved exceptions, completing working papers, completing a final report, and conducting one or more final reviews. An example final report preparation process is illustrated in FIGS. 7A and 7B. This process preferably includes a substantial peer review component, since the final report will become the basis for the regulatory entity to determine the compliance of ILEC 14 with the 1996 Act of other applicable regulatory framework as to the particular test for which the final report is prepared.

Pop Domain

In general, pre-order processing involves CLEC submission of requests to ILEC 14 for information that CLEC 16 needs to complete orders, order processing involves CLEC submission of orders to ILEC 14 to initiate or modify one or more aspects of a CLEC customer's service, and provisioning involves the work ILEC 14 must perform to implement the submitted orders. The POP Domain encompasses a variety of tests designed to provide a comprehensive review of systems, processes, and other operational elements associated with the ILEC's support of POP activities for its wholesale operations. The purpose of these tests is to evaluate functionality, evaluate compliance with measurement agreements, and provide a basis to compare the ILEC's support in this area to parallel systems, processes, and other operational elements supporting the ILEC's retail operations. In short, the tests are designed to evaluate whether the CLECs 16 receive a level of service comparable to the ILEC's retail service with respect to POP Domain activities. The report generated by the testing entity should allow the regulatory entity to assess the net impact of any POP-related problems that it identifies on the ability of CLECs 16 to function in an open competitive environment in the state or other jurisdiction of interest.

In one embodiment, the POP Domain may be broken down into a number of test target areas that collectively encompass, without limitation, pre-order processing, order processing, order flow through, provisioning, metrics, documentation, help desk support, and scalability. Each of these test target areas may be further broken down into increasingly discrete process and sub-process areas that identify particular areas to be tested and types of measures that apply to each area. According to the present invention, one or more tests are developed to evaluate each test target area based on the scope of testing to be performed in each area. There may not be a one-to-one correspondence between test target areas and specific tests designed to evaluate test target areas. In a particular embodiment, the POP Domain tests may include, without limitation: (1) an EDI Interface Certification Test, (2) an EDI Interface Functional Test, (3) a GUI Interface Functional Test, (4) an Order Flow Through Test, (5) a Live CLEC Functional Test, (6) a Manual Order Process Test, (7) a Metrics Test, (8) a Documentation Test, (9) a Help Desk Test, (10) a Provisioning Parity Test, (11) a Provisioning Coordination Test, and (12) a Scalability Test. Embodiments of these tests are described below.

A. POP EDI Interface Certification Test

As described above, all CLECs 16 entering the local market must establish some form of connectivity with ILEC 14 to submit pre-order and order transactions. This connectivity can be automated (e.g., an EDI interface or GUI) or manual (e.g., telephone calls and faxes). This test is designed to certify that CLECs 16 are able to submit valid pre-orders and orders and receive suitable responses using the ILEC's EDI transaction interface. Accordingly, the testing entity must provide the pseudo-CLEC 18 with systems and processes suitable to model the operating environment of a new CLEC 16 and its interfaces to ILEC 14. The testing may require extensive coordination between ILEC 14 and one or more CLECs 16. In a live production environment, the ILEC's processes and procedures for supporting CLEC interface development efforts, which includes support related to certification testing, may be assessed as part of RMI Interface Development Verification and Validation Test described below. This test preferably complements that RMI test by verifying and validating the ILEC's procedures through actual certification testing. In general, this test uses a non-exhaustive set of pre-order and order test transactions, representative of transactions expected to be submitted in the ILEC's live production environment. Although described primarily in the context of EDI formatted communications, the present invention contemplates the transactions and responses being in Extensible Markup Language (XML) or any other format appropriate for computer-to-computer communications.

Figure 8:
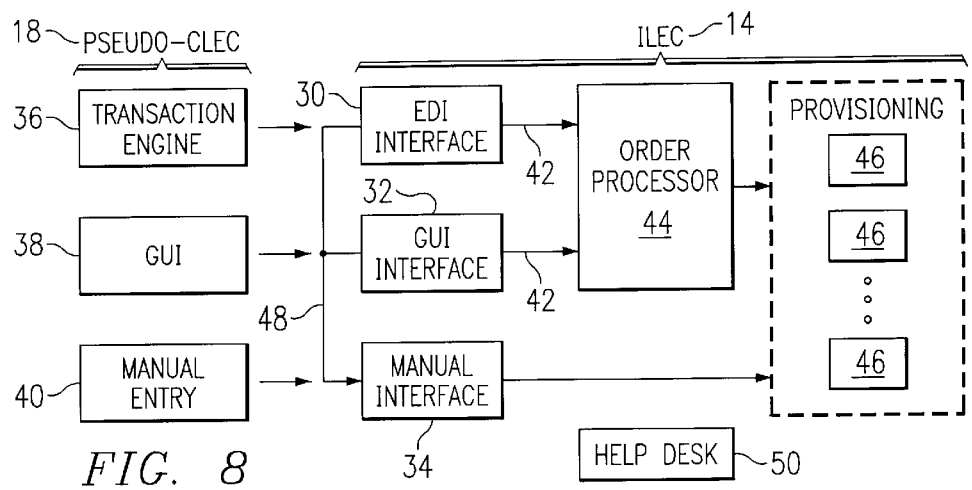
FIG. 8 illustrates an example system for pre-order, order, and provisioning testing.

Referring to FIG. 8, CLECs 16 may access pre-order information from and submit order requests to ILEC 14 electronically using one or more ILEC EDI interfaces 30, GUI interfaces 32, or manual interfaces 34, as appropriate, all of which may be encompasses within ILEC OSS access systems 20. For testing purposes, the pseudo-CLEC 18 may interact with these interfaces using one or more transaction engines 36, GUIs 38, or manual entry positions 40, respectively. Orders that "flow through" (indicated by arrows 42) are passed to one or more order processors 44 and on to provisioning systems 46, one or both of which may be encompassed within the ILEC's OSSs 12. Orders that do not flow through (indicated by arrows 48) are instead diverted to manual interface 34, which may be associated with an operations center of ILEC 14, for handling. Manual interface 34 may also orders submitted by telephone, fax, or other "manual" methods. One or more help desks 50 may handle questions, requests, and other communications from CLECs 16 (in this case from pseudo-CLEC 18) associated with pre-order and order processing. One or more suitable changes may be made to the illustrated embodiment without departing from the scope of the present invention.

CLECs 16 submitting pre-orders and orders to EDI interface 30 are likely to build front-end applications that make the system more efficient and user-friendly. These applications may be designed to provide a more "readable" format than EDI affords so as to reduce the time required for CLEC 16 personnel to process the order information and reduce the potential for such personnel to introduce errors into the orders. For any CLECs 16 that are attempting to integrate EDI pre-order and order processes, efficiencies can be achieved by automating the population of order input fields with the information returned in a corresponding pre-order response.

ILEC 14 provides test bed accounts against which pre-order and order test transactions may be placed. Preferably, ILEC 14 will publish a guide describing the transport format for EDI transactions and providing business rules specifying how pre-orders and orders should be structured. In one embodiment, using this or other suitable information, transaction engine 36 is established within pseudo-CLEC 18 to build the individual test transactions, based at least in part on the available test bed accounts, and submit the transactions to ILEC 14 for processing. Transaction engine 36 may populate pre-order and order data fields in a text or other suitable file. Prior to submission to ILEC 14, the pre-orders and orders may be translated from text to EDI format. Responses from ILEC 14 may be similarly translated from EDI format back into text for processing at pseudo-CLEC 18.

Figure 9:
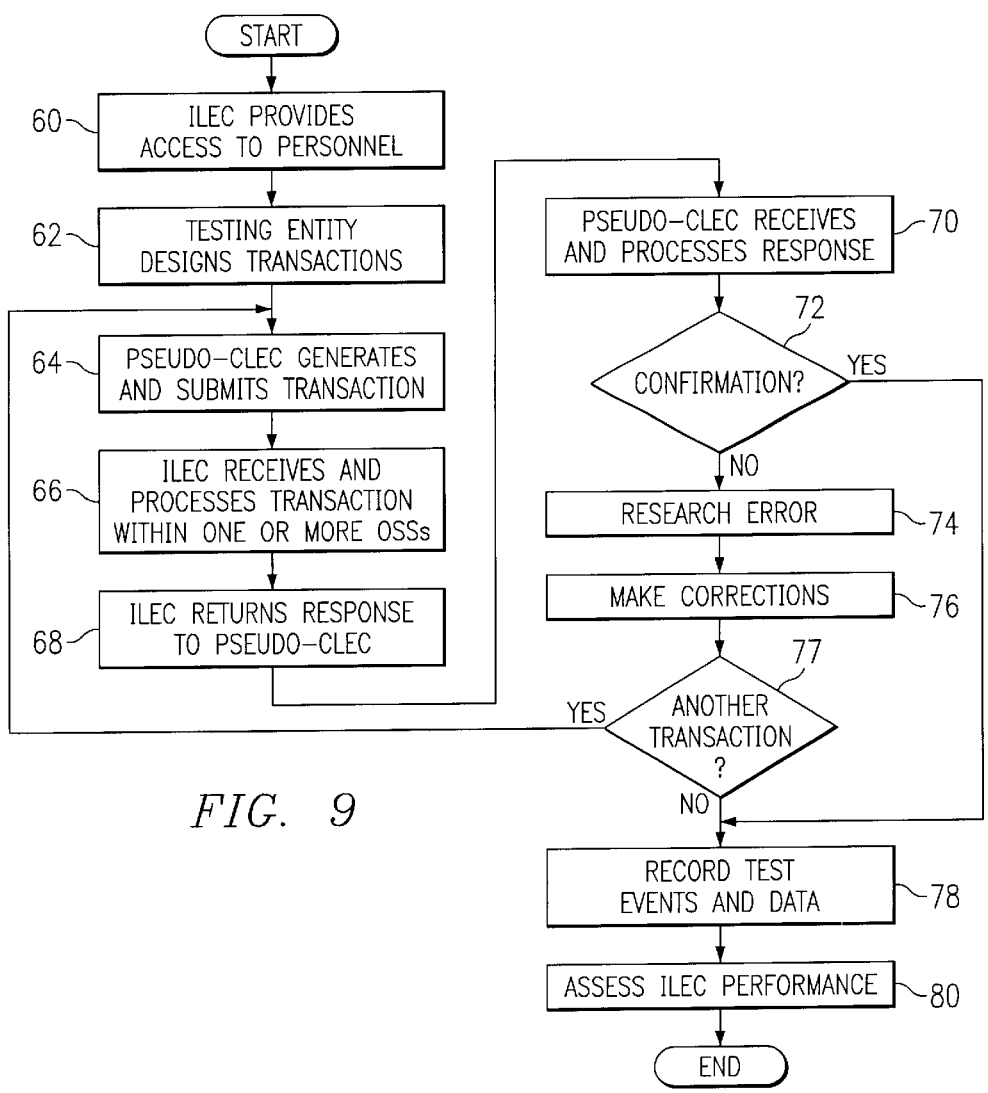
FIG. 9 illustrates an example interface certification test process.

FIG. 9 illustrates an example EDI interface certification test process. The process begins at step 60, where ILEC 14 provides access to its subject matter experts (SMEs) and other personnel using an open conference bridge or any other mechanism to enable the testing entity to uncover errors and make appropriate modifications in connection with certification testing. At step 62, the testing entity designs pre-order and order transactions based on test cases derived from test scenarios; knowledge it acquires during ILEC-provided training, ILEC business rules, or EDI documentation; and any other appropriate information. In one embodiment, orders are in the form of Local Service Requests (LSRs), although any suitable order format may be used. At step 64, pseudo-CLEC 18 generates and submits an appropriate pre-order or order transaction to ILEC 14 in EDI or another suitable format. In one embodiment, the transaction is generated and submitted automatically using the transaction engine 36, and transaction engine 36 logs the submittal date, time, and appropriate transaction information. Transactions may be generated in a proprietary format for conversion into EDI or another format for submission to the ILEC 14. Testing involving certain transactions may be conducted separately if they cannot be automatically generated using transaction engine 36.

Figure 10:
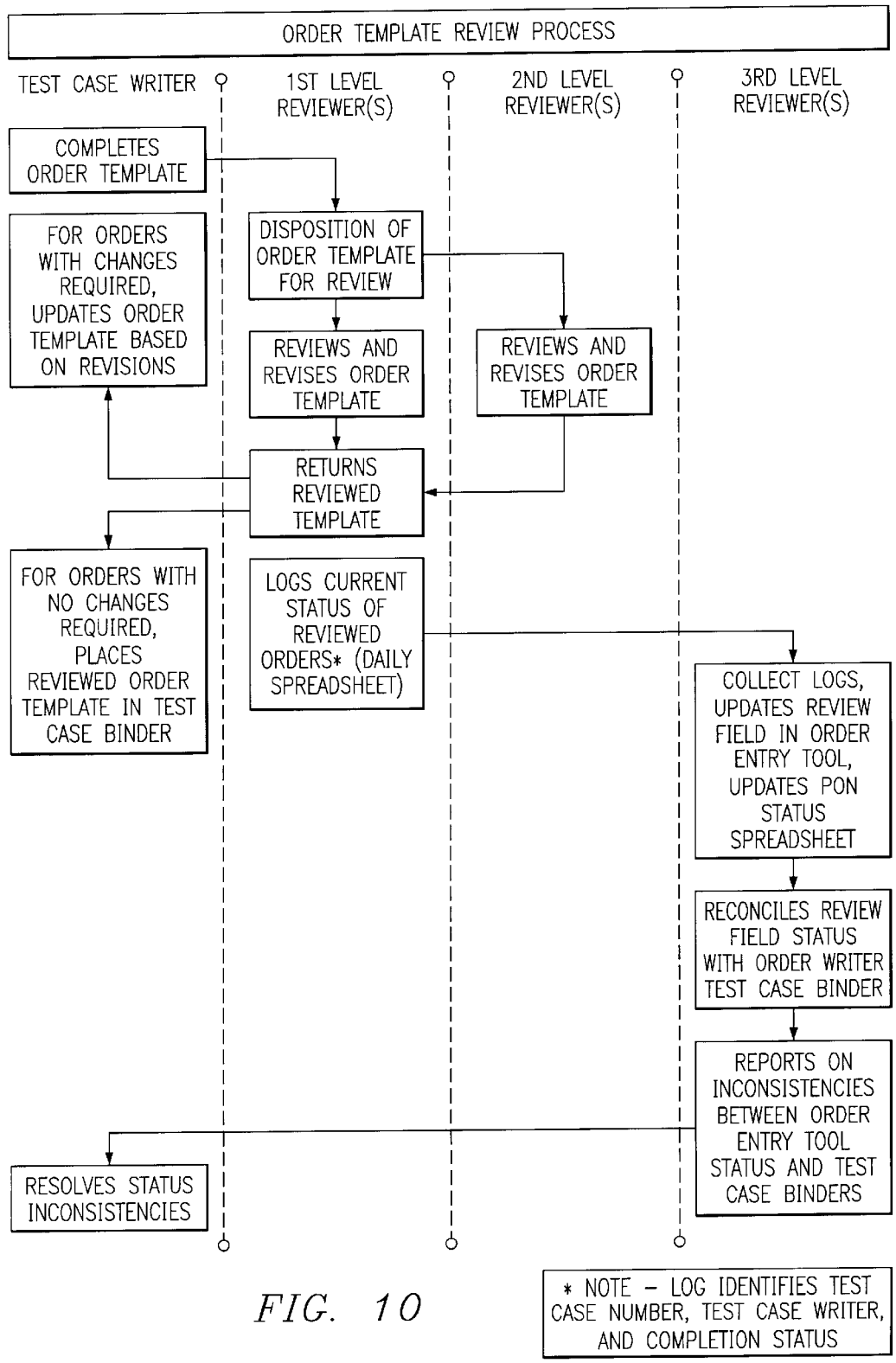
FIG. 10 illustrates an example order template review process.

Test case writers of the testing entity may construct test cases, which are the templates used to develop the actual test instances (pre-order and order transactions), according to specified requirements. For example, the testing entity may require the test case writer to have available all forms and fields in current pertinent industry documentation, such as Local Service Ordering Guide (LSOG) documentation in the United States defining pre-orders and orders. Test case writers may determine the forms as needed by selecting a type of order, selecting the individual forms, or both, and may modify existing forms as appropriate. Requirements for field population may include, without limitation: (1) that every field on a form must have an action assigned to it—"Static" where the value is the same for each test instance generated, "Dynamic" where the value is populated at instance generation using the test bed, "Run-Time" where the value is populated by a tester before instance submission, and "Blank" where no value will be assigned to the field; (2) that "Blank" is the default value for all fields; (3) that fields designated as "Dynamic" will be shaded a suitable color for the life of the test case and all of its instances to allow for easier checking of auto-population; and (4) that fields designated as "Run-Time" will be shaded another color for the life of the test case and all of its instances, with each such field needing to be filled in before submission of the instance. In one embodiment, before order submission, one or more run-time check requirements may need to be satisfied. For example, before an order is submitted, a checks may be performed to verify that all "Run-Time" designated fields are populated. If such a field is empty, the order may be allowed to be submitted only if the missing field is for a planned error (checked according to a purchase order number (PON) or otherwise). Alternatively, a warning may be generated while still allowing the order to be submitted. Suitable test bed information (e.g., new telephone number) may be automatically entered into a pre-order or order using a suitable tool. In one embodiment, test cases may be generated using one or more templates according to the example process illustrated in FIG. 10. While an order templates review process is shown, the process may apply to any suitable pre-order, order, or other test cases.

At step 66, the ILEC 14 receives and processes the transaction using one or more ILEC OSSs 12 and, at step 68, returns an EDI or other suitable response. Some or all of the transactions may be processed by an ILEC 14 quality assurance or other test system that is separate from the ILEC's production system. Instead, some or all transactions may be sent to the ILEC's production system in a "training mode." Use of the training mode may allow pseudo-CLEC 18 to more easily submit numerous transactions against a single test bed account. Orders submitted in training mode do not typically flow through and thus do not typically proceed beyond order processor 44 to provisioning systems 46. Transactions may be generated at pseudo-CLEC 14, submitted to ILEC 14, and processed at the ILEC 14 serially, concurrently, or in any other suitable manner.

At step 70, pseudo-CLEC 18 receives the response using transaction engine 36, perhaps after conversion from EDI or another format in which it was generated into a proprietary format, and records the date, time, transaction type, and condition (e.g., valid vs. reject) for the response. Transaction engine 36 may attempt to match the response to the original transaction (recording any mismatches) and may verify that the response contains expected data (flagging non-expected errors). The source of any errors may be determined manually and recorded. Help desk 50 may be used for unexpected errors, as indicated in test cases associated with the POP Help Desk Test described below, following the appropriate resolution procedures.

The response may be a confirmation or an error message. A confirmation is generated in response to ILEC 14 successfully processing an order or an associated pre-order and assigning a corresponding order number. An error message is instead generated in response to the ILEC 14 encountering an error in the order or pre-order. As just an example, an order confirmation may be in the form of a Local Service Confirmation (LSC) and an error message associated with an order may be in the form of a Standard Error Message (SEM), although any suitable format may be used according to particular needs. At step 72, if the response is a confirmation indicating successful processing of the transaction, the process is typically completed as to that transaction and the process proceeds to step 78.

If the response is instead an error message at step 72, then the pseudo-CLEC 18, the ILEC 14, or both may research the error at step 74 in the manner described above for mismatches. At step 76, corrections may be made and the process returns to step 64 where the transaction may be re-submitted if appropriate. The process iterates in this manner until a confirmation is received from the ILEC 14. At least some, and perhaps most, errors will need to be corrected through trial and error, with corrections being attempted multiple times prior to successful processing. Example processes to be performed (1) before an order is submitted and (2) in submitting an order are illustrated in FIGS. 11A and 11B, respectively. The processes may be combined with, may supplement, or may replace the process of FIG. 9 in whole or in part according to particular needs.

Testers associated with the testing entity may be required to assign a reason code to each transaction for which an error message is received. It may be desirable to provide an error log tool that is automatically presented when a tester selects an order (such as by clicking on a folder corresponding to the order through a GUI) or attempts to create an error-correction document. For example, the tester might be forced to provide an error message reason code in the error log before being allowed to create the error-correction document. The error log may be made electronically available to a help desk tracking system, a metrics data collection system, or one or more other suitable systems. Moreover, since much of the intelligence about a test instance may eventually be included in a "Comments" field, it may be desirable to provide standardized comments that testers can input into "Comments" fields (e.g., "Cancel via LSC"). If network problems occur or responses are lost in the "Status" field, the "Comments" field may still be searchable. Such standardized comments may also streamline status compilation and increase accuracy of reporting.

Since testers should track all order errors received and assign corresponding reason codes, and since help desk 50 is used when a tester cannot resolve an error, linking the tester error log with help desk 50 may be desirable. Automating both processes and making them available to testers through an associated GUI may also be desirable. For example, one or both processes may be implemented as a desktop application through which a tester may receive an error message for an order, select "Enter Error Info" or the like, provide appropriate information, and select "Send to Help Desk" or the like if needed, in which case information may be automatically routed to a database associated with help desk 50.

A problem may occur if a planned error-correction document is never sent because a tester forgets that there is such a planned error-correction document in the test instance folder. As an example, the ILEC 14 might return a confirmation and eventually generate a notification of completed provisioning, but with one or more versions of the error-correction document never having been sent. Therefore, it may be desirable to provide an automatic reminder that may be generated periodically to remind testers to submit planned error-correction documents. As a further safety measures, it may be desirable to provide a mechanism to automate the tracking of what is actually provisioned to ensure that it matches was what ordered. Absent an automated mechanism, verification may be performed manually. Another desirable feature may include alerting the testers when confirmations and/or notifications of completed provisioning are past due.

At step 78, the testing entity records any suitable test events and data not already recorded, such that substantially complete transaction histories are preferably maintained. If a response is not received for a transaction, this should be identified and recorded. If multiple responses are expected for the same transaction (e.g., a pre-order request), then each response may be monitored separately. Jeopardy and delay notifications may be received and recorded using transaction engine 36 or otherwise. Orders may be provisioned as part of this test if appropriate, these activities being addressed as described below in connection with other POP Domain tests. The testing entity uses the recorded information at step 80 to assess the ILEC's performance with respect to the test target areas described below, generating one or more appropriate reports, and the process ends.

Reports may include a carrier-to-carrier report to ILEC 14. Reports may also include, without limitation: (1) metrics supporting standards of performance defined in applicable agreements; (2) variance between actual performance and standards of performance defined in applicable agreements; (3) expected results vs. actual results; (4) unexpected error count by type and percentage of total; (5) rejects received after confirmation notification and percentage of total; (6) unexpected errors as a result of documentation problems; (7) transaction counts, error ratio, response time, and other metrics by transaction type, product family, delivery method, or another appropriate category; (8) minimum, maximum, mean, average, and aggregate response interval per transaction set; (9) transaction counts per response interval range per transaction set; (10) orders erred after initial confirmation; (11) flow-through orders by order type, product family, delivery method, or other appropriate category; (12) completed help desk logs and checklists; (13) completed provisioning logs and checklists; (14) completed jeopardy/delay notification logs; (15) help desk accuracy and timeliness; (16) provisioning accuracy and timeliness; (17) comparison of pseudo-CLEC 18 to one or more CLECs 16; (18) measurements pertaining to transaction engine 36; (19) measure of parity performance between retail and wholesale; and (20) a summary of appropriate test activities, results, and conclusions.

Any suitable test scenarios may be used for certification testing, according to particular needs. In one embodiment, these may include, without limitation, scenarios 1–38, 41–46, 54, 56–58, 60–61, 64–66, 70, 74, 76–82, 84–85, 92–94, 96–97, 102–105 107, 116–122, and 125–130 listed in Appendix A. Specific scenarios may be used to validate certain flow through capabilities. Details of the specific test case for a given scenario, such as the specific service delivery method and the type of listing, impact whether a test case is flow-through. Example flow through test cases are listed in Appendix B. Flow-through testing is described below in connection with the POP Order Flow Through Test.

Test target areas and associated evaluation measures are summarized in the table below. Evaluation criteria for these measures may include, in any appropriate combination and without limitation: (1) the ILEC 14 provides an effective and well-defined process for planning and coordinating certification testing activities; (2) ILEC 14 provides a stable test environment segregated from production and development environments; (3) the ILEC 14 provides suitably responsive and effective technical assistance to CLECs 16 during the certification process; and (4) the ILEC-provided interface specifications are sufficiently complete and accurate to allow CLECs 16 to carry out certification testing. The last column of the table indicates how particular evaluation criteria may, in one embodiment, correspond to the particular evaluation measures.

Test Target Areas and Measures

| Process Area | Sub-Process Area | Measures | Criteria |
| --- | --- | --- | --- |
| CLEC interface certification testing | Support for ILEC interface development and testing efforts | Adequacy and completeness of certification testing process | 1, 3 |
| | | Adequacy of documentation | 4 |
| | | Adequacy and capability of interface test environments | 2 |

Based on evaluation checklists or otherwise, test results may be generated ("Satisfied," "Not Satisfied," etc.) and comments provided for each of the evaluation criteria used in the particular instance of the test.

B. POP EDI Interface Functional Test

This test evaluates ILEC systems, processes, and other operational elements associated with the ability of ILEC 14 to provide CLECs 16 with non-discriminatory access to the ILEC's OSSs 12 with respect to pre-order and order transactions. The evaluation is designed to assess the ability of the ILEC 14 to accurately process such transactions and smoothly support normal and peak transaction volumes for CLECs 16 entering the market for local telecommunications services. This test involves end-to-end processing of pre-order and order requests that CLECs 16 submit using the ILEC's EDI or other automated computer-to-computer transaction interface. In order to measure the ability of ILEC 14 to provide CLECs 16 with suitable functionality and services, the test models the interaction between CLECs 16 and ILEC 14 using pseudo-CLEC 18.

As described above, ILEC 14 provides test bed accounts against which pre-order and order transactions may be placed. In one embodiment, transaction engine 36 is used to generate and submit individual test transactions. Prior to live testing, various aspects of the CLEC-ILEC interface will preferably be certified as described above in connection with the POP EDI Interface Certification Test. The test cases and actual test transactions may be developed based on test scenarios as described above. Some or all of the test scenarios described in connection with the POP EDI Interface Certification Test may be used. The test cases and test transactions will preferably span a variety of business and residential customer needs, a variety of service families (e.g., POTS, ISDN, Centrex), a variety of service delivery methods (e.g., resale, UNE-P, UNE-L), and any other variables to provide suitable coverage. The same test cases and test transactions may be used for normal, peak, and stress volume testing.

In addition to simulating CLEC systems and requirements, the testing entity should preferably attempt to replicate the operational and volume patterns of a real CLEC 16. Exemplary techniques might include, without limitation: (1) submitting transactions primarily during documented CLEC operational hours; (2) submitting some transactions outside of documented CLEC operational hours to further test the ILEC 14; (3) intentionally submitting some transactions with errors; (4) submitting transactions requiring ILEC 14 to respond from multiple COs, multiple cities, and locations supported by different work groups; and (5) submitting transactions at both normal, peak, and stress volumes to test ILEC 14 under various conditions.

Because the test is conducted with the testing entity acting as a pseudo-CLEC 18, it is important that the test processes be mapped, without interference, to the transactional processes that CLECs 16 normally encounter in doing business with ILEC 14. The two transactional processes central to this test are (1) the pre-order process, and (2) the order and provisioning process. These processes interrelate in that data from transactions conducted pursuant to the pre-order process may be used to initiate some transactions in the order and provisioning process. However, not every transaction in the order and provisioning process relies upon a preceding pre-order transaction. Additionally, at least some integrated pre-order/order transactions may be conducted in which information returned in a pre-order response is copied, without modification, into a corresponding order request. This may highlight any inconsistencies in field names, formats, and other information between the pre-order responses and order requests.

Figure 12:
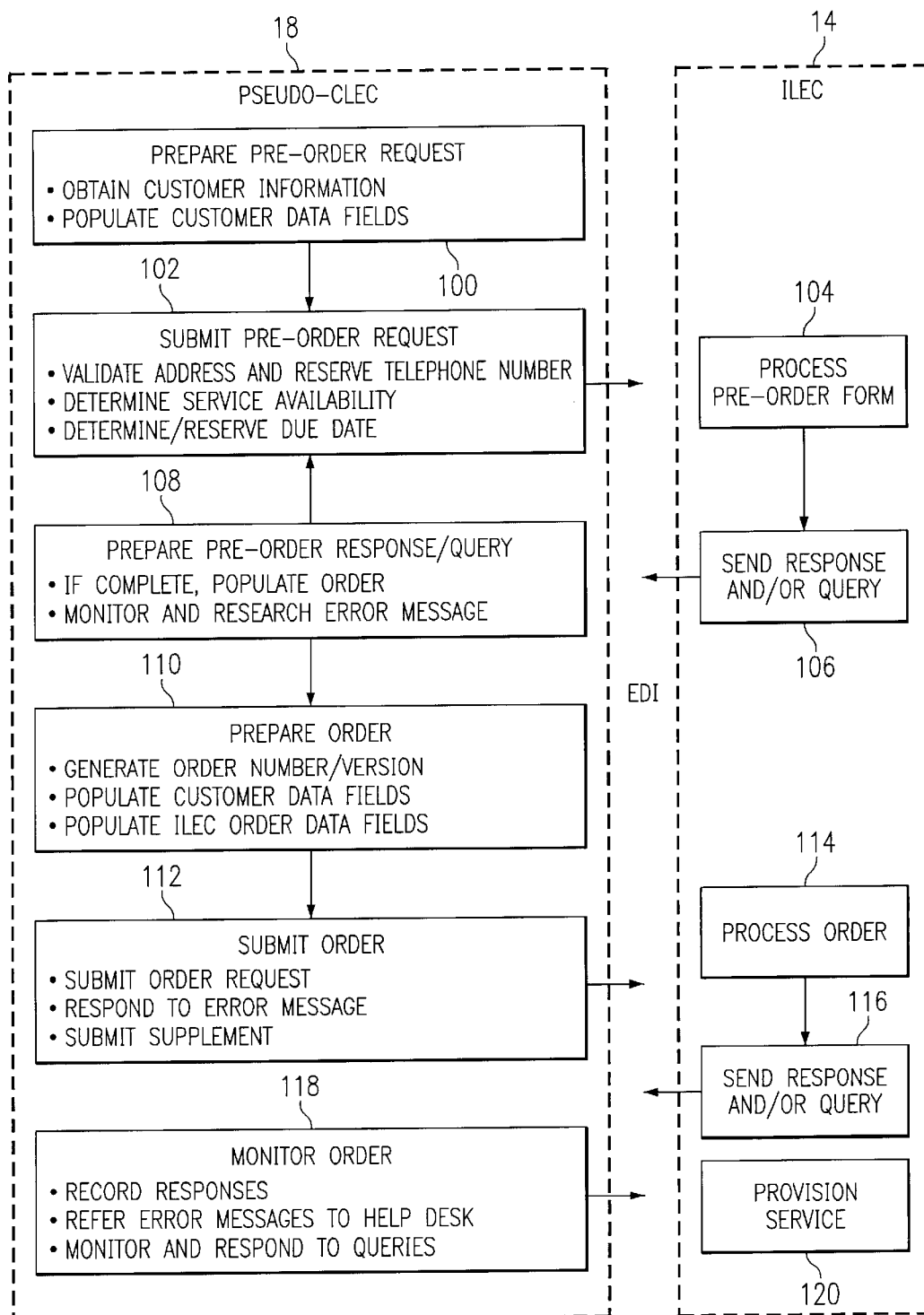
FIG. 12 illustrates an example transactional process associated with pre-ordering, ordering, and provisioning testing.

FIG. 12 provides an overview of these transactional processes, involving the sharing of information between pseudo-CLEC 18 and ILEC 14. In an actual CLEC 16 environment, CLEC 16 populates a pre-order request or other form with information collected from the CLEC customer. The pre-order process allows the CLEC 16 to verify the availability of particular services and delivery dates, validate some or all of the customer information, and reserve any telephone numbers before actually placing an order. In one embodiment, pre-order and order test transactions are created and loaded into transaction engine 36 to be finalized and automatically submitted on one or more scheduled dates determined prior to the start of the test. The loading, formatting, and time-stamping of transactions, as described more fully below, preferably occurs in batch mode, although these activities may occur in any suitable manner according to particular needs. One or more changes may be made to the embodiment illustrated in FIG. 12 without departing from the intended scope of the present invention. As an example, a format other than EDI may be used for automated communications between pseudo-CLEC 18 and ILEC 14.

A pre-order transaction is prepared (100) and submitted (102) to ILEC 14 using transaction engine 36. Transactions may be generated at transaction engine 36 in test file format, converted from text file format to EDI format within transaction engine 36 or a different system, time-stamped, and then forwarded to ILEC 14 for processing. ILEC 14 processes (104) the pre-order request and then returns (106) a response that contains the requested information, an error message, or a query. The response from the ILEC 14 may be converted from EDI format to text file format within transaction engine 36 or a different system, time-stamped, and forwarded to other systems of pseudo-CLEC 18 if appropriate. Pseudo-CLEC 18 processes (108) the response. If complete, the pre-order information may be used to automatically or otherwise populate an order. However, as described above, not all orders are based on pre-order information. If the pre-order response indicates an error, pseudo-CLEC 18 may modify the information and resubmit the pre-order to ILEC 14 to begin the process anew. If an error message is received, ILEC documentation and possibly support from its help desk 50 may be used to correct the error. The accuracy and timeliness of help desk support is preferably recorded in connection with the POP Help Desk Support Test described below. In one embodiment, pre-order transactions returning error messages, or not returning any responses, are researched, corrected, and re-submitted until a correct response is ultimately received.

In general, the order and provisioning process allows CLEC 16 to initiate and confirm delivery of particular services and service conditions. This process may or may not rely on information derived from the pre-order process. In an actual CLEC 16 environment, CLEC 16 populates an order form using information collected from the CLEC's customer, from a pre-order response, or from any other suitable source, and submits the order to ILEC 14. In the testing environment, order transactions may be prepared (110) and submitted (112) to ILEC 14 using transaction engine 36. The transactions may be generated at transaction engine 36 in test file format, converted from text file format to EDI format within transaction engine 36 or a different system, time-stamped, and forwarded to ILEC 14 for processing. ILEC 14 processes (114) the order and returns (116) a response that contains a confirmation, error message, or query. The response from ILEC 14 may be converted from EDI format to text file format within transaction engine 36 or a different system, time-stamped, and then forwarded to other systems of pseudo-CLEC 18 if appropriate. Pseudo-CLEC 18 processes (118) the response.

If the order contains all necessary information and is without error, ILEC 14 returns a confirmation to pseudo-CLEC 18 and then provisions (120) the requested services. If the order is incomplete or in error, ILEC 14 returns an error message. If the order response indicates an error, pseudo-CLEC 18 may modify the information and resubmit the order to ILEC 14, beginning the process anew. If an error message is received, ILEC documentation and possibly support from its help desk 50 may be used to correct the error. The accuracy and timeliness of such help desk support is preferably recorded in connection with the POP Help Desk Support Test described below. In one embodiment, orders returning error messages, or not returning any responses, are researched, corrected, and re-submitted until a confirmation has been received. After provisioning, the ILEC 14 may return a completion notification to pseudo-CLEC 18 (such a completion notification may not be expected for certain orders, such as those involving planned cancellations).

In one embodiment, activities performed during this test may include, without limitation: (1) use test cases to develop transactions and transaction content based on instructions provided in appropriate handbooks; (2) submit transactions, logging the submittal date, time, and appropriate transaction information; (3) receive responses to transactions, logging receipt date, time, response type, and response condition (valid vs. reject); (4) submit and monitor manual orders if required, logging submittal date, time, and suitable transaction information and logging receipt, date, time, response type, and response condition (valid vs. reject); (5) match the response to the original transaction verifying that the matching transaction can be found and recording any mismatches; (6) verify response contains expected data and flag unexpected errors; (7) manually review unexpected errors, identifying and logging the error source and reason; (8) contact help desk for support as indicated in test cases and following the appropriate resolution procedures, logging response time, availability and other help desk behavior identified on help desk checklist; (9) correct expected errors, logging re-submittal date, time, and appropriate transaction information; (10) identify any transactions for which responses have not been received, record missing responses, and where multiple response are expected for a single transaction monitor receipt of each response; (11) review status of pending orders, verifying and recording accuracy of response; (12) recognize and log any jeopardy and delay notifications, logging any jeopardy or delay notifications not received electronically; (13) perform joint testing, recording results using provisioning log and activity checklist; (14) perform joint provisioning, recording results using provisioning log and activity checklist; (15) test completion on sampling of orders that have been provisioned, recording results in provisioning log and activity checklist; (16) compare pseudo-CLEC metrics to ILEC retail metrics and review ILEC measures corresponding to pseudo-CLEC 18; (17) compare pseudo-CLEC 18 to aggregate, identifying any variance in service levels between pseudo-CLEC and live CLEC support; and (18) generate appropriate reports documenting and summarizing the test activities, results, and conclusions, including for example one or more of the reports described above in connection with the POP EDI Interface Certification Test.

In one embodiment, commencement of the test may be contingent upon all elements of a "Go/No Go" checklist being satisfied. These elements may include, without limitation: (1) all documentation necessary to complete test cases has been received (e.g., product descriptions and availability, business rules, flow-through list, interval guides, etc.); (2) EDI documentation needed to build transaction engine 36 and submit EDI transactions to EDI interface 30 has been received; (3) transaction engine 36 has been built and is operationally ready; (4) EDI connectivity between transaction engine 36 and EDI interface 30 is established and EDI interface 30 has been tested and deemed satisfactory; (5) ILEC 14 has provisioned the test bed; (6) selection and description of test cases has occurred; (7) test case instances (the test transactions) have been written; (8) a pseudo-CLEC help desk has been established and help desk logs and databases are in place; and (9) a conference bridge with the ILEC 14 has been established, a contact list has been created, and all suitable parties have been notified.

Test target areas and associated evaluation measures are summarized in the tables below. Evaluation criteria for these measures may include, in any appropriate combination and without limitation: (1) the ILEC's EDI interface 30 is consistently available during scheduled hours of operation for pre-orders; (2) ILEC 14 provides required pre-order functionality; (3) ILEC 14 provides pre-order responses in agreed on timeframe; (4) ILEC 14 provides accurate and complete pre-order responses; (5) ILEC 14 provides clear, accurate, and relevant pre-order error messages; (6) ILEC 14 provides timely pre-order error messages; (7) ILEC's EDI interface 30 is consistently available during scheduled hours of operation for orders; (8) the ILEC 14 provides required order functionality; (9) the ILEC 14 provides confirmations in agreed on timeframe; (10) ILEC 14 provides clear, accurate, and complete confirmations; (11) provisioning dates identified in order confirmation are consistent with valid due date requests; (12) ILEC 14 provides error messages in agreed upon timeframe; (13) the ILEC 14 provides clear, accurate, and complete error messages; (14) CLEC 16 has access to pre-order and post-order information that is available to the ILEC's retail representatives; (15) pre-order and order field names and field formats for address validation requests are compatible; (16) pre-order and order field names and field formats for directory listings are compatible; (17) the pre-order and order field names and field formats for product/service availability inquiries are compatible; (18) pre-order and order field names and field formats for due date/appointment availability inquiries are compatible; and (19) pre-order and order field names and field formats for loop qualification are compatible. The last columns of the tables indicate how particular evaluation criteria may, in one embodiment, correspond to the particular evaluation measures.

Test Target Areas and Measures—Pre-Order

| Process Areas | Sub-Process Areas | Measures | Criteria |
|---|---|---|---|
| Submit pre-order transaction | | Accessibility of interface | 1 |
| | Create copy usable for subsequent processing | Usability of response information | 25–29 |
| Validate address | Send address request using billing telephone number (TN) (BTN) | Presence of functionality | 2 |
| | Send address validation request using working TN (WTN) | Presence of functionality | 2 |
| | Send address validation request using WTN | Presence of functionality | 2 |
| | Send integrated pre-order/order transaction | Field name and field format compatibility | 25 |
| | | Field format compatibility | 25 |
| | Verify receipt of response | Presence of response | 2 |
| | Receive "match" message | Timeliness of response | 3 |
| | | Accuracy and completeness of response | 4 |
| | Receive "near match" response | Timeliness of response | 3 |
| | | Accuracy and completeness of response | 4 |
| | Receive error message | Timeliness of response | 6 |
| | | Accuracy of Response | 5 |
| | | Clarity and completeness of error message | 5 |
| Retrieve customer charge report (CSR) | Send CSR request using BTN | Presence of functionality | 2 |
| | Send CSR request using WTN | Presence of functionality | 2 |
| | Verify receipt of response | Presence of response | 2 |

-continued

| Process Areas | Sub-Process Areas | Measures | Criteria |
|---|---|---|---|
| | Receive "match" response | Timeliness of response | 3 |
| | | Accuracy and completeness of response | 4 |
| | Receive error message | Timeliness of response | 6 |
| | | Accuracy of response | 5 |
| | | Clarity and completeness of error message | 5 |
| Request available TN(s) | Send request for single TN(s) | Presence of functionality | 2 |
| | Send request for random TN(s) | Presence of functionality | 2 |
| | Send request for range of specific TN(s) | Presence of functionality | 2 |
| | Verify receipt of response | Presence of response | 2 |
| | Receive available TN(s) response | Timeliness of response | 3 |
| | | Accuracy and completeness of response | 4 |
| | Receive error message | Timeliness of response | 6 |
| | | Accuracy of response | 5 |
| | | Clarity and completeness of error message | 5 |
| Reserve TN(s) | Send reservation request for specific TN | Presence of functionality | 2 |
| | Send reservation request for single TN | Presence of functionality | 2 |
| | Send reservation request for multiple TNs | Presence of functionality | 2 |
| | Verify receipt of response | Presence of response | 2 |
| | Receive confirmation | Timeliness of response | 3 |
| | | Accuracy and completeness of response | 4 |
| | Receive error message | Timeliness of response | 6 |
| | | Accuracy of response | 5 |
| | | Clarity and completeness of error message | 5 |
| Cancel or exchange TN reservation | Send cancel or exchange reservation for single TN | Presence of functionality | 2 |
| | Send cancel or exchange for multiple TNs | Presence of functionality | 2 |
| | Verify receipt of response | Presence of response | 2 |
| | Receive confirmation | Timeliness of response | 3 |
| | | Accuracy and completeness of response | 4 |
| | Receive error message | Timeliness of response | 6 |
| | | Accuracy of response | 5 |
| | | Clarity and completeness of error message | 5 |
| Request available DID number block(s) | See sub-processes for "Request Available TN(s)" | | 2–6 |

-continued

| Process Areas | Sub-Process Areas | Measures | Criteria |
|---|---|---|---|
| Reserve DID number block(s) | See sub-processes for "Reserve TN(s)" | | 2–6 |
| Cancel DID number block reservation | See sub-processes identified for "Cancel TN reservation" | | 2–6 |
| Determine service and feature availability | Send service availability request | Presence of functionality | 2 |
| | Determine PIC/LPIC availability | Presence of functionality | 2 |
| | Send Integrated pre-order/order transaction | Field name compatibility | 27 |
| | | Field format compatibility | 27 |
| | Verify receipt of response | Presence of response | 2 |
| | Receive availability response | Timeliness of response | 3 |
| | | Accuracy of response | 4 |
| | | Consistency with retail capability | 14 |
| | Receive error message | Timeliness of response | 6 |
| | | Accuracy of response | 5 |
| | | Clarity and completeness of error message | 5 |
| Qualify loop | Send loop qualification inquiry | Presence of functionality | 2 |
| | Send loop qualification reservation | Presence of functionality | 2 |
| | Send integrated pre-order/order transaction | Field name compatibility | 29 |
| | | Field format compatibility | 29 |
| | Verify receipt of response | Presence of response | 2 |
| | Receive qualification | Timeliness of response | 3 |
| | | Accuracy and completeness of response | 4 |
| | | Consistency with retail capability | 14 |
| | Receive error message | Timeliness of response | 6 |
| | | Accuracy of response | 5 |
| | | Clarity and completeness of error message | 5 |
| Determine due date/appointment availability | Send request | Presence of functionality | 2 |
| | Send integrated pre-order/order transaction | Field name compatibility | 30 |
| | | Field format compatibility | 30 |
| | Verify receipt of response | Presence of response | 2 |
| | Receive valid response | Timeliness of response | P5–3 |
| | | Accuracy and completeness of response | P5–4 |
| | | Consistency with retail capability | P5–14 |
| | Receive error response | Timeliness of response | P5–6 |
| | | Accuracy of response | P5–5 |
| | | Clarity and completeness of error message | P5–5 |
| Request access billing charge record (ABCR) | Send ABCR request using BTN | Presence of functionality | 2, 4 |
| | Send ABCR request using WTN | Presence of functionality | 2, 4 |
| | Send ABCR request for one or more particular sections | Presence of functionality | 2, 4 |
| | Verify receipt of response | Presence of response | 2 |
| | Receive "match" response | Timeliness of response | 4 |
| | | Accuracy and completeness of response | 4 |
| | Receive error message | Timeliness of response | 6 |
| | | Accuracy of response | 5 |
| | | Clarity and completeness of error message | 5 |
| Request installation status | Send installation status request | Presence of functionality | 2 |
| | Verify receipt of response | Presence of response | 2 |
| | Receive installation status | Timeliness of response | 4 |
| | | Accuracy and completeness of response | 4 |
| | | Consistency with retail capability | 14 |
| | Receive error message | Timeliness of response | 6 |
| | | Accuracy of response | 5 |
| | | Clarity and completeness of error message | 5 |
| Retrieve service order from order processor | Send service order from order processor request | Presence of functionality | 2 |
| | Verify receipt of response | Presence of response | 2 |
| | Receive valid response | Timeliness of response | 4 |
| | | Accuracy and completeness of response | 4 |
| | | Consistency with retail capability | 14 |
| | Receive error message | Timeliness of response | 5 |
| | | Accuracy of Response | 5 |
| | | Clarity and completeness of error message | 5 |
| Retrieve directory listing | Send directory listing inquiry | Presence of functionality | 2 |
| | Send integrated pre-order/order transaction | Field name compatibility | 31 |
| | | Field format compatibility | 31 |
| | Verify receipt of response | Presence of response | 2 |

-continued

| Process Areas | Sub-Process Areas | Measures | Criteria |
|---|---|---|---|
| | Receive directory listing | Timeliness of response | 3 |
| | | Accuracy and completeness of response | 4 |
| | Receive error message | Timeliness of response | 6 |
| | | Clarity and completeness of error message | 5 |

Test Target Areas and Measures—Order

| Process Areas | Sub-Process Areas | Measures | Criteria |
|---|---|---|---|
| Submit order | | Accessibility of interface | 7 |
| | Send order transaction | Presence of functionality | 8 |
| | Send expedited order transaction | Presence of functionality | 8 |
| | Receive acknowledgment of request | Timeliness of response | 9 |
| | | Accuracy and completeness of response | 10 |
| | Verify receipt of response | Presence of response | 10, 12 |
| | Receive confirmation | Timeliness of response | 9 |
| | | Accuracy and completeness of response | 10–11 |
| | Receive error/reject message | Timeliness of response | 12 |
| | | Accuracy of response | 13 |
| | | Clarity and completeness of error message | 13 |
| | Receive acceptance of expedited due date | Timeliness of response | 9 |
| | | Accuracy and completeness of response | 10 |
| | Receive rejection of expedited due date request | Timeliness of response | 12 |
| | | Accuracy and completeness of response | 13 |
| Supplement order | Send supplement | Presence of functionality | 8 |
| | Receive acknowledgement of supplement | Timeliness of response | 9 |
| | | Accuracy and completeness of response | 10 |
| | Verify receipt of response | Presence of response | 10–11 |
| | Receive confirmation of supplement | Timeliness of response | 9 |
| | | Accuracy of response | |
| | Receive error reject message | Timeliness of response | 12 |
| | | Accuracy of response | 13 |
| | | Clarity and completeness of error message | 13 |
| View completed order information | Inquire on completed order | Presence of functionality | 8 |
| | | Consistency with retail capability | 14 |

Transaction volumes may be increased, beyond normal levels, to test the capacity of the ILEC's EDI interface 30 and identify potential "choke points" that might exist. Such stress testing is preferably performed during off-peak periods to minimize the impact on the ILEC's live production activities. Although the test is described as involving provisioning, certain transactions may be submitted in the "training mode" described above for the POP EDI Interface Certification Test. The ILEC 14 productions systems stop order transactions submitted in the training mode prior to the provisioning processes. In one embodiment, when the capacity of EDI interface 30 to handle peak and stress transaction volumes is being tested, training mode is preferred to minimize the impact on the ILEC's downstream provisioning systems 46.

In one embodiment, to determine order transaction volumes for stress testing, the testing entity observes one or more OSS access systems 20 or other indicators of order activity to determine the highest hourly order volume (i.e. peak volume) as a percentage of total daily order volume. That percentage of the total daily volume is used as a baseline hourly volume for stress testing during a first test segment, such as during the first hour of an example four hour test period. An appropriate percentage increase over this baseline hourly volume constitutes a stress load. During a second test segment, such as during the second hour of the example four hour test period, transaction volume may be progressively increased up to the specified stress load volume. This stress load volume may be maintained substantially constant for any remaining test segments, such as the final two hours of the example four hour test period. Although a particular volume variation is described, any constant or variable transaction volume may be used according to particular needs. Moreover, although primarily described in connection with orders, such stress testing may be performed for pre-orders, orders, or any suitable combination of the two.

Test target areas and associated evaluation measures are summarized in the tables below. In one embodiment, evaluation criteria used for normal volume testing are not applicable to stress testing since the goal is to gain insight into degradation of system performance as the transaction load is progressively increased from normal volume to stress volume.

Test Target Areas and Measures—Pre-Order & Order, Stress Volume

| Process Area | Sub-Process Area | Measures | Criteria |
|---|---|---|---|
| Submit orders | Receive responses | Presence and timeliness of response under stress volume conditions | N/A |

In one embodiment, after the completion notifications are received for certain orders, tests are conducted to ensure that at least some components of the ILEC 14 provisioning process were actually performed. For example, one or more test cases might be selected to verify that an installation, feature, or characteristic has been implemented correctly. Such tests may include physical observations made at ILEC COs of cutovers in the field ("hot cuts"), testing lines, comparing pre-transaction and post-transaction switch output reports and monthly customer charge reports, directory listing and directory assistance verification, test calling, or any other suitable test activities. Testing related to the ILEC's provisioning of orders may be performed in connection with the POP Provisioning Parity and Provisioning Coordination Tests described more fully below.

Test target areas and associated evaluation measures are summarized in the table below. Evaluation criteria for these measures may include, in any appropriate combination, without limitation: (1) ILEC 14 provides completion notifications in a timely manner; (2) ILEC 14 provides accurate and complete completion notifications; (3) ILEC 14 performs provisioning activities according to timeframes identified on confirmation; (4) CSRs are properly updated after completion of order; (5) directory listings and directory assistance are updated according to order specifications; (6) switch output reports reflect features expected after completion of order; (7) ILEC personnel adhere to policies and procedures when performing CO cross connects and cutovers; (8) calls made to numbers ordered with intercept feature receive intercept recording giving new number; (9) calls made to disconnected orders go to a vacant code announcement; and (10) the ILEC 14 provides timely jeopardy/delay notices in compliance with its established jeopardy procedures. The last column of the table indicates how particular evaluation criteria may, in one embodiment, correspond to the particular evaluation measures.

Test Target Areas and Measures—Provisioning

| Process Areas | Sub-Process Areas | Measures | Criteria |
|---|---|---|---|
| Receive completion notification | Receive completion notification | Timeliness of response | 1, 3 |
| | | Timeliness of dates | 2–3 |
| | | Accuracy of data | 2 |
| | Match response to order transaction and confirmation | Accuracy of provisioning | 4–9 |
| | Verify receipt of completion notification | Completion notification received for all transactions | 1–2 |
| Receive jeopardy notification | Receive jeopardy notification | Timeliness of notification | 10 |
| | | Timeliness of dates | 10 |
| | | Accuracy of data | 10 |
| | | Frequency of notification | 10 |
| | Identify reason for jeopardy | Accuracy of response | 10 |
| | Monitor follow-up activities | Timeliness of closure | 10 |
| | | Compliance with procedures | 10 |
| Receive delay nofification | Receive delay notification | Timeliness of response | |
| | | Timeliness of dates | 10 |
| | | Accuracy of data | 10 |
| | | Frequency of data | 10 |
| | Match response to transaction | Accuracy of response | 10 |
| | Identify reason for delay | Accuracy of response | 10 |
| Follow up on delayed provisioning activities | Contact provisioning help desk | Timeliness of answer | 10 |
| | | Availability of support | 10 |
| | Request status of response or delay | Accuracy of response | 10 |
| | | Completeness of response | 10 |
| | | Timeliness of response | 10 |
| | Escalate request for information | Accuracy and completeness of procedures | 10 |
| | | Compliance to procedures | 10 |
| | Escalate request for provisioning | Accuracy and completeness of procedures | 10 |
| | | Compliance to procedures | 10 |
| | Monitor to closure | Timeliness of closure | 10 |
| | | Compliance to procedures | 10 |

The testing entity evaluates ILEC 14, according to these or other evaluation criteria, and preferably categorizes test results by service family (e.g., POTS, ISDN, Centrex), service delivery method (e.g., resale, UNE-P, UNE-L), whether submitted transactions were flow through (as is described below in connection with the POP Order Flow Through Test), whether transactions were submitted in live or training mode, or in any other suitable manner, in any combination.

Based on evaluation checklists or otherwise, test results may be generated ("Satisfied," "Not Satisfied," etc.) and comments provided for each of the evaluation criteria used in the particular instance of the test.

C. POP GUI Interface Functional Test

This test is designed to provide a comprehensive review of elements within the POP Domain, as delivered through the ILEC's web-based or other GUI interface 32, and performance of the GUI interface 32. The test involves transactions that are manually entered using the GUI 38 of pseudo-CLEC 18. In one embodiment, for example, the GUI interface 32 includes one or more web servers that communicate HTML pages or other web-based files over the Internet to a web browser associated with GUI 38. The test transactions may include any suitable mix of pre-orders and orders, and preferably provide an end-to-end view of POP processes.

CLECs 16 typically order most services from an ILEC 14 using order forms such as LSRs, which automated interfaces such as EDI interface 30 are equipped to handle. However, some types of complex services (e.g., interoffice facilities) cannot usually be ordered using LSRs, instead requiring a different type of order form such as an Access Service Request (ASR). CLECs 16 may submit such orders to ILEC 14 using GUI 38 and GUI interface 32. In one embodiment, although the expectation will be that EDI interface 30 is the primary method of submitting transactions in a competitive environment, a CLEC 16 may be expected to use the GUI interface 32 when CLEC 16 is in a start-up mode and provides small transaction volumes or for more complex services requiring ASRs or the like. If attempts to use GUI interface 32 are unsuccessful (as for unsuccessful attempts to use EDI interface 30), CLEC 16 may submit orders manually to manual interface 34, as described more fully below in connection with the POP Manual Order Process Test.

As with the POP EDI Interface Functional Test described above, transaction test cases for this test should preferably span a variety of business and residential customer needs, a variety of service families (e.g., POTS, ISDN, and Centrex), and a variety of service delivery methods (e.g., resale, UNE-P, and UNE-L). Test cases used for the test may include a suitable subset of the test cases used during the POP EDI Interface Functional Test or any other suitable test cases. In one embodiment, test scenarios used to derive the test cases may include, without limitation, scenarios 1–7, 8–34, 36–38, 45–46, 49–51, 57–58, 62, 64–66, 91–93, 103–105, 107, 116, 118–127, 130 and 130 listed in Appendix A. Additional scenarios may be used to validate certain flow through capabilities. If GUI interface 32 is not expected to be used for large transaction volumes in the near future, stress testing of GUI interface 32 may not be warranted.

As described above, ILEC 14 provides test bed accounts against which pre-order and order transactions may be placed. For testing, various pre-order and order transactions are created using GUI 38, based on an appropriate test bed account, and submitted to GUI interface 32 for handling. For each pre-order request submitted, the expected result is a response from ILEC 14 containing the requested information. Responses may need to be sought out by the pseudo-CLEC 18, by requesting web pages containing response information for example, rather than simply waiting for responses to arrive from the ILEC 14 as in the POP EDI Interface Functional Test. Where actual responses are not actively sent to pseudo-CLEC 18, ILEC 14 may provide pseudo-CLEC 18 with notification that responses are available for access. Error correction and transaction re-submission may occur substantially as described above for the POP EDI Interface Functional Test, numerous cycles perhaps being needed for successful order confirmation. The testing entity may determine whether the transactions flow through without human intervention, as described more fully below in connection with the POP Order Flow Through Test, as may evaluate ILEC provisioning of orders as is described more fully above in connection with the POP EDI Functional Test.

Test target areas and associated evaluation measures are summarized in the tables below. Evaluation criteria for these measures may include, in any appropriate combination and without limitation: (1) the GUI pre-order capability is consistently available during scheduled hours of operation, (2) ILEC 14 provides necessary pre-order functionality, (3) the ILEC 14 provides pre-order responses in an agreed upon timeframe, (4) the ILEC 14 provides accurate and complete pre-order responses, (5) ILEC 14 provides clear, accurate, and relevant pre-order error messages, (6) ILEC 14 provides timely pre-order error messages, (7) the GUI order capability is consistently available during scheduled hours of operation, (8) ILEC 14 provides required GUI order functionality, (9) the ILEC 14 provides accurate and complete order responses, (10) ILEC 14 provides timely order responses, (11) ILEC 14 provides accurate and relevant order error messages, (12) ILEC 14 provides timely order error messages, (13) provisioning dates identified within the ILEC's order confirmation are consistent with valid due date request, (14) ILEC 14 performs provisioning activities according to timeframes identified on its confirmations, (15) ILEC 14 provides jeopardy/delay notices when appropriate in a timely manner in compliance with established jeopardy procedures, and (16) ILEC 14 is capable of supporting "ASR-like" orders submitted using GUI 38. The last columns of these tables indicates how particular evaluation criteria may, in one embodiment, correspond to particular evaluation measures.

Test Target Area and Measures—Pre-Order

| Process Areas | Sub-Process Areas | Measures | Criteria |
|---|---|---|---|
| Submit pre-order transaction | | Accessibility of interface | 1 |
| | Send address request using BTN | Presence of functionality | 2 |
| | Send address validation request using WTN | Presence of functionality | 2 |
| | Send address validation request using address | Presence of functionality | 2 |
| | Verify receipt of response | Presence of response | 4 |
| | Receive "match" response | Timeliness | 3 |
| | | Accuracy and completeness | 4 |
| | Receive error message | Timeliness | 6 |
| | | Accuracy | 5 |
| | | Clarity and completeness | 5 |
| Retrieve CR | Send CR request using BTN | Presence of functionality | 2 |
| | Send CR request using WTN | Presence of functionality | 2 |
| | Verify receipt of response | Presence of response | 4 |
| | Receive "match" response | Timeliness | 3 |
| | | Accuracy and completeness | 4 |
| | Receive error message | Timeliness | 3 |
| | | Accuracy | 4 |
| | | Clarity and completeness | 5 |
| Request available TN(s) | Send request for specific TN(s) | Presence of functionality | 2 |
| | Send request for random TN(s) | Presence of functionality | 2 |
| | Send request for range of specific TNs | Presence of functionality | 2 |
| | Verify receipt of response | Presence of response | 2 |
| | Receive available numbers response | Timeliness | 3 |
| | | Accuracy and completeness | 4 |
| | Receive error message | Timeliness | 6 |
| | | Accuracy | 5 |
| | | Clarity and completeness | 5 |
| Reserve TN(s) | Send reservation request for specific TN(s) | Presence of functionality | 2 |
| | Send reservation request for single TN | Presence of functionality | 2 |
| | Send reservation request for multiple TNs | Presence of functionality | 2 |
| | Verify receipt of response | Presence of response | 4 |
| | Receive confirmation | Timeliness | 3 |
| | | Accuracy and completeness | 4 |
| | Receive error message | Timeliness | 6 |
| | | Accuracy | 5 |
| | | Clarity and completeness | 5 |
| Cancel or exchange TN reservation | Send cancel or exchange reservation for single TN | Presence of functionality | 2 |
| | Send cancel or exchange for multiple TNs | Presence of functionality | 2 |
| | Verify receipt of response | Presence of response | 4 |
| | Receive confirmation | Timeliness | 3 |
| | | Accuracy and completeness | 5 |
| | Receive error message | Timeliness | 6 |
| | | Accuracy | 5 |
| | | Clarity and completeness | 5 |
| Determine service and feature availability | Send service availability request | Presence of functionality | 2 |
| | Determine PIC/LPIC availability | Presence of functionality | 2 |
| | Verify receipt of response | Presence of response | 4 |
| | Receive availability response | Timeliness | 3 |
| | | Accuracy | 4 |
| | | Consistency with retail capability | 13 |
| | Receive error message | Timeliness | 6 |
| | | Accuracy | 5 |
| | | Clarity and completeness | 5 |
| Qualify loop | Send loop qualification inquiry | Presence of functionality | 2 |
| | Send loop qualification reservation | Presence of functionality | 2 |
| | Verify receipt of response | Presence of response | 4 |
| | Receive qualification | Timeliness | 3 |
| | | Accuracy and completeness | 4 |
| | | Consistency with retail capability | 13 |
| | Receive error response | Timeliness | 6 |
| | | Accuracy | 5 |
| | | Clarity and completeness | 5 |

-continued

| Process Areas | Sub-Process Areas | Measures | Criteria |
|---|---|---|---|
| Determine due date/ appointment availability | Send request | Presence of functionality | 2 |
| | Verify receipt of response | Presence of response | 4 |
| | Receive valid message | Timeliness | 3 |
| | | Accuracy and completeness | 4 |
| | | Consistency with retail capability | 13 |
| | Receive error message | Timeliness | 6 |
| | | Accuracy | 5 |
| | | Clarity and completeness | 5 |
| Request installation status | Send installation status request | Presence of functionality | 2 |
| | Verify receipt of response | Presence of response | 4 |
| | Receive installation status | Timeliness | 3 |
| | | Accuracy and completeness | 4 |
| | | Consistency with retail capability | 13 |
| | Receive error message | Timeliness | 6 |
| | | Accuracy | 5 |
| | | Clarity and completeness | 5 |
| Retrieve service order from order processor | Send service order from order processor request | Presence of functionality | 2 |
| | Verify receipt of response | Presence of response | 4 |
| | Receive valid response | Timeliness | 3 |
| | | Accuracy and completeness | 4 |
| | | Consistency with retail capability | I 3 |
| | Receive error message | Timeliness | 6 |
| | | Accuracy | 5 |
| | | Clarity and completeness | 5 |
| Retrieve directory listing | Send directory listing inquiry | Presence of functionality | 2 |
| | Verify receipt of response | Presence of response | 4 |
| | Receive directory listing | Timeliness | 3 |
| | | Accuracy and completeness | 4 |
| | Receive error | Timeliness | 6 |
| | | Accuracy | 5 |
| | | Clarity and completeness | 5 |

Test Target Areas and Measures—Order

| Process Areas | Sub-Process Areas | Measures | Criteria |
|---|---|---|---|
| Submit order | | Accessibility of interface | 7 |
| | Send order transaction | Presence of functionality | 8 |
| | Send expedited order transaction | Presence of functionality | 8 |
| | Verify receipt of response | Presence of response | 10 |
| | Receive confirmation | Timeliness | 9 |
| | | Accuracy and completeness | 10 |
| | Receive error/reject message | Timeliness | 12 |
| | | Accuracy | 11 |
| | | Clarity and completeness | 11 |
| | Receive acceptance of expedited due date | Timeliness | 9 |
| | | Accuracy and completeness | 10 |
| | Receive rejection of expedited due date request | Timeliness | 13 |
| | | Accuracy and completeness | 11 |
| Supplement order | Send supplement | Presence of functionality | 7 |
| | Verify receipt of response | Presence of response | 10 |
| | Receive confirmation | Timeliness | 9 |
| | | Accuracy | 10 |
| | Receive error/reject message | Timeliness | 13 |
| | | Accuracy | 11 |
| | | Clarity and completeness | 11 |
| View completed order information | Inquire on completed order | Presence of functionality | 8 |
| | | Consistency with retail capability | 13 |

Test Target Areas and Measures—Provisioning

| Process Areas | Sub-Process Areas | Measures | Criteria |
|---|---|---|---|
| Receive design documents | Receive circuit layout | Timeliness of response | 10 |
| | | Timeliness of dates | 17 |
| | | Accuracy of data | 11 |
| | Receive design Layout | Timeliness of response | 10 |
| | | Timeliness of dates | 17 |
| | | Accuracy of data | 11 |
| | Verify receipt of response | Response received for all transactions | |
| | Receive transaction response | Accuracy and completeness of response | 11 |
| | Determine status of transaction response | Accuracy and completeness of capability | 9 |
| Receive completion notification | Receive completion notification | Timeliness of response | 10 |
| | | Timeliness of dates | 17 |
| | | Accuracy of data | 11 |
| | Match response to order transaction and confirmation | Accuracy of provisioning | 11 |
| | Verify receipt of completion notification | Completion notification received for all transactions | 11 |
| Receive jeopardy notification | Receive jeopardy notification | Timeliness of notification | 20 |
| | | Timeliness of dates | 17 |
| | | Accuracy of data | 11 |
| | | Frequency of notification | 20 |
| | Identify reason for jeopardy | Accuracy of response | 11 |
| | Monitor follow-up activities | Timeliness of closure | 18 |
| | | Compliance with procedures | 10 |
| Receive delay notification | Receive delay notification | Timeliness of response | 20 |
| | | Timeliness of dates | 11 |
| | | Accuracy of data | 11 |
| | | Frequency of delay | 20 |
| | Match response to transaction | Accuracy of response | 11 |
| | Identify reason for delay | Accuracy of response | 11 |
| Follow up on delayed provisioning activities | Contact provisioning help desk | Timeliness of answer | 18 |
| | | Availability of support | 17 |
| | Request status of response or delay | Accuracy of response | 18 |
| | | Completeness of response | 18 |
| | | Timeliness of response | 20 |

-continued

| Process Areas | Sub-Process Areas | Measures | Criteria |
|---|---|---|---|
| | Escalate request for information | Accuracy and completeness of procedures | 15 |
| | | Compliance to procedures | |
| | Escalate request for provisioning | Accuracy and completeness of procedures | 15 |
| | | Compliance to procedures | 16 |
| | Monitor to closure | Timeliness of closure | 18 |
| | | Compliance to procedures | 16 |

Based on evaluation checklists or otherwise, test results may be generated ("Satisfied," "Not Satisfied," etc.) and comments provided for each of the evaluation criteria used in the particular instance of the test.

D. POP Order Flow Through Test

This test evaluates the ability of orders to "flow" from CLECs 16 through the ILEC's order processor 44 without human intervention. In one embodiment, flow through orders may pass through EDI interface 30, GUI interface 32, or both. The test is preferably executed in connection with one or more of the POP EDI Interface Certification, EDI Interface Functional, and GUI Interface Functional Tests described above. Once submitted, the orders are monitored to identify orders requiring manual handling within the ILEC's manual interface 34 or otherwise. Test transactions are preferably generated with a unique PON having a flow through indicator to facilitate data collection and analysis. Receiving a confirmation from the ILEC 14 indicates successful flow through.

In one embodiment, testing of the ILEC's flow through capabilities includes the following tasks: (1) identifying tests cases eligible for flow through testing; (2) developing a log to track whether orders flowed through; (3) submitting transactions using transaction engine 36 and EDI interface 30, GUI 38 and GUI interface 32, or both as described above, logging the submittal date, time, and appropriate transaction information; (4) receiving transaction responses, logging receipt date, time, response transaction, and response condition (valid vs. reject); (5) identifying and recording which orders flowed through without manual intervention; (6) identifying, recording, and analyzing the reasons manual handling was required and, if caused by an error, identifying the error source and reason; (7) correct pseudo-CLEC errors, re-submit, and verify that re-submitted orders flow through (ILEC errors are not corrected); (8) identifying, recording, and analyzing the reasons for any missing responses; and (9) generating appropriate reports.

Preferably, only flow through eligible orders as specified by ILEC 14 are tested (including any supplements or cancels considered by the ILEC 14 to be flow through). Subject to any such restriction, the test may use any of the test cases used for the POP EDI Interface Functional and GUI Interface Functional Tests described above. In a particular embodiment, test cases for this test are derived from scenarios 1–2, 5–6, 8, 11, 13–14, 16–17, 23–24, 27, 31, 33–37, 45, 65, 92, 94, 96–97, 102, 105, 118–119, 127, 129, and 131 listed in Appendix A. It may be desirable to introduce planned errors that should result in automatic error/reject transactions. Preferably, any such planned errors will not be corrected and re-submitted.

Test target areas and associated evaluation measures are summarized in the table below. Evaluation criteria for these measures may include, in any appropriate combination and without limitation: (1) ILEC resale orders that are known to be flow through do fully flow through, (2) ILEC UNE-P orders that are known to be flow through do fully flow through, (3) ILEC UNE-L orders that are known to be flow through do fully flow through, and (4) confirmations are received within two hours for orders that fully flow through. The last column of the table indicates how the particular evaluation criteria may, in one embodiment, correspond to the particular evaluation measures.

Test Target Areas and Measures

| Process Area | Sub-Process Area | Measure | Criteria |
|---|---|---|---|
| Submit order | Determine if order should flow through | Applicability as flow through in pre-filing agreement and in existing system | 1–4 |
| | Submit order to EDI interface | Accessibility of interface | 7 from Test B |
| | Submit order to GUI interface | Accessibility of interface | 8 from Test C |
| Monitor order | Identify orders that did flow through | Compliance with flow through standards | 1–4 |
| | Identify orders that did not flow through | Clarity of manual steps | 1–5, 1 from Test F |
| | Verify all orders were processed | Completeness of order processing | 1–4 |

Flow through performance will preferably be evaluated at both normal and stress volumes. Test results may be categorized according to the associated test in which the results were generated. For example, test results for flow through testing performed in connection with the POP EDI Transaction Interface Functional Test at normal volume may be presented separate from results for testing performed at stress volume or testing performed in connection with the POP GUI Functional Test. Test results may include, without limitation: (1) the percentage and number of orders that flowed through, by order type, service type, and/or service delivery method; (2) the percentage and number of orders that did not flow through, by order type, service type, service delivery method, and/or reason code; (3) actual results versus expected results; and (4) actual results versus standards defined in any agreements.

In one embodiment, the test may incorporate "Achieved," "Commercial," and "Parity" test components. The activities described above may be performed for the Achieved component.

For the Commercial component, the testing entity will evaluate the "actual" order flow through process for a sample of CLEC orders, for example, UNE orders. Pseudo-CLEC orders are not included in this sample. A thorough review of order flow through data from the authentic CLEC orders should allow the testing entity to determine the actual flow through rates for the selected sample. The testing entity may also identify and document the cause of any orders falling out such that manual intervention is required. Specific activities for this component may include, without limitation: (1) solicit CLEC volunteers to provide submitted orders; (2) coordinate with ILEC to set up tracking reports on identified CLEC orders (e.g., by CLEC and PON); (3) receive orders and related responses from the participating CLECs 16; (4) determine which orders flowed through; (5) request corresponding orders from the ILEC 14, along with error messages for orders that fell out for manual handling; (6) determine error source and reason for orders that did not flow; and (7) document findings and prepare report. The Commercial component may serve as a control for the Achieved component and may enhance the blindness of test results.

For the Parity component, ILEC 14 will identify retail orders analogous to certain test scenarios, evaluate the level of parity between the retail orders and the orders based on these test scenarios, and generate a report. The testing entity will then review the ILEC's report and comment on its validity. Specific activities may include, without limitation: (1) establish appropriate parameters for ILEC retail vs. wholesale flow through eligibility report; (2) observe actual ILEC retail process; (3) receive and review the ILEC parity report; and (4) document findings and prepare report. The Commercial component, Parity component, or both may be performed instead of in addition to the Achieved component according to particular needs and available testing resources.

Based on evaluation checklists or otherwise, test results may be generated ("Satisfied," "Not Satisfied," etc.) and comments provided for each of the evaluation criteria used in the particular instance of the test.

E. POP Live CLEC Functional Test

In one embodiment, as part of its functional evaluation of the POP Domain, the testing entity seeks qualitative input and quantitative data on the "real world" experience of CLECs 16 operating in the ILEC's calling area. For certain types of transactions, involvement is sought from CLECs 16 that are willing to participate in live transaction testing. In some cases, where statistically relevant data is impossible or impractical to collect from one or more CLECs 16 for example, the testing entity may conduct focused interviews with CLEC 16 personnel to more fully capture the CLEC's 16 experiences with the ILEC's OSSs 12 and associated processes for the POP Domain and more fully evaluate any parity issues that may exist. CLECs 16 willing to participate in this aspect of the test are interviewed and their experiences relating to POP Domain activities incorporated into the test results, preferably after suitable validation by the testing entity.

Live CLEC testing may provide an important alternative for complex orders that may not be readily or adequately simulated in the regular testing environment. Examples may include complex facilities-based orders and orders, such as those for UNE-L with Local Number Portability (LNP), that require a coordinated cutover on an actual CLEC switch (typically within a collocation cage at an ILEC CO) to fully complete. It is also valuable to track ILEC performance in a real world environment to help control against bias in the results. The testing entity preferably asks CLECs 16 for data concerning live transactions that substantially replicate those submitted during the POP EDI Interface Functional and GUI Interface Functional Tests. This live data can be used to further validate, or possibly invalidate, data collected during such tests.

An attempt should be made to identify CLECs 16 that order a wide variety of products to ensure that the full range of service types and service delivery methods offered by ILEC 14 are tested. The testing entity may work with the CLECs 16 to choose specific transactions that best meet the objectives described above and are considered the most important to CLECs 16. The testing entity may review internal CLEC processes, observe live CLEC transactions, review CLEC measurements for such transactions (such as in confirmation logs, help desk logs, jeopardy notice logs, completion logs, or other documentation), and perform any other suitable activities designed to aid its evaluation of ILEC 14 performance. To capture a more complete set of metrics, where appropriate the testing entity may suggest that CLECs 16 make alternative or additional measurements of the ILEC's performance. Once the testing entity determines that appropriate and accurate measurements have been made, both recent historical and current data for the measurements is incorporated into the test data to be analyzed.

In one embodiment, the following activities are performed during the course of this test, without limitation: (1) solicit one or more CLECs 16 for live orders to support a selection of test cases; (2) record CLEC submissions for testing; (3) verify accuracy of CLEC gauges; (4) match submissions to selected test scenarios and test cases; (5) select submissions that will be included in live test; (6) identify scenarios and test cases for which live CLEC input was not received and determine how those scenarios and test cases are to be tested; (7) establish monitoring schedule for live CLEC orders; (8) monitor submission of live CLEC orders; (9) monitor transaction responses, for example, logging receipt date, time, transaction type, and condition (valid vs. reject) for the responses; (10) verify transaction responses contain expected data and record any errors; (11) manually review errors, identify error sources, and identify and log reasons for errors; (12) monitor contacts to help desk 50 as needed for errors and non-error related assistance, logging response time, availability, and other behavior as identified on a help-desk checklist; (13) log re-submission of any transactions after any errors have been corrected; (14) identify any transactions for which responses have not been received and record the missing responses; (15) log any jeopardy or delay notifications; (16) monitor order status, monitor provisioning activities, and complete a provisioning checklist; (17) generate appropriate reports; and (18) compare CLEC metrics to ILEC metrics for the test cases. Outputs for the test may include, without limitation, completed review of CLEC POP experiences, completed cutover tests executed in coordination with CLECs 16, completed review of any other CLEC cutover data and observations, completed review of the ILEC's confirmations to CLEC orders, completed review of CLEC collocation orders, and completed review of CLEC interface development activities.

Test target areas and associated evaluation measures are summarized in the table below. Evaluation criteria for these measures may include, in any appropriate combination and without limitation: (1) ILEC 14 has well-defined, documented, and understandable process for establishing manual transaction capabilities with CLECs 16; (2) the ILEC 14 has a well-defined, documented, and understandable process for establishing GUI transaction capabilities with CLECs 16; (3) ILEC 14 has a well-defined, documented, and understandable process for establishing EDI transaction capabilities with CLECs 16; (4) manual interface 34 is consistently available during scheduled hours of operation; (5) GUI interface 32 is consistently available during scheduled hours of operation; (6) EDI interface 30 is consistently available during scheduled hours of operation; (7) the GUI interface 32 provides CLECs 16 sufficient functionality to perform transaction set; (8) documentation supplied by ILEC 14 is sufficient to create transactions; (9) the ILEC 14 provides the required transaction functionality; (10) ILEC 14 provides response in agreed upon timeframe; (11) ILEC 14 provides accurate response; (12) ILEC 14 provides clear, accurate and relevant error messages; (13) data elements comprising transaction requests or responses are usable for subsequent processing; (14) the ILEC's wholesale service to CLECs 16 is consistent with its service to its retail organization; (15) help desk is accessible and responsive during scheduled hours of operation; (16) help desk provides meaningful order entry technical support to CLEC order entry questions; (17) ILEC 14 provides well-defined and documented escalation procedures; (18) ILEC 14 complies with its own escalation procedures; (19) the ILEC 14 provides order confirmation in required timeframe; (20) the ILEC 14 commits to provisioning dates identified in valid date requests; (21) the ILEC 14 performs provisioning activities according to timeframes identified on its order confirmation; (22) during any joint planning and coordination activities, ILEC 14 provides knowledgeable and capable personnel to support CLECs 16; (23) ILEC 14 consistently performs coordinated provisioning preparation work in timely and effective manner; (24) ILEC 14 provides jeopardy notices when they are appropriate in a timely manner in compliance with established procedures; (25) the ILEC 14 provides delay notices when appropriate in a timely manner in compliance with established procedures; (26) ILEC 14 provides completion notices in a timely manner in compliance with established procedures; (27) ILEC 14 provides clear and comprehensive procedures for ordering/provisioning activities which are complex or have an extended timeline; (28) the ILEC 14 provides knowledgeable and capable personnel to support CLECs 16 with respect to the ordering/provisioning activities which are complex or have an extended timeline; and (29) ILEC 14 complies with its own procedures in providing services to CLECs 16 involving ordering/provisioning activities which are complex or have an extended timeline. The last column of the table indicates how certain evaluation criteria may correspond to certain evaluation measures in a particular embodiment.

| Test Target Areas and Measures - Pre-Order | | | |
|---|---|---|---|
| Process Areas | Sub-Process Areas | Measures | Criteria |
| Validate address | Create address validation request transaction | Clarity, accuracy, and completeness of documentation Accessibility of interface | 1–3, 5–6, 8 |
| | Send address request using WTN | Accuracy and completeness of functionality | 5–7, 9 |
| | Send address validation request using address | Accessibility of interface Accuracy and completeness of funtionality | 5–7, 9 |
| | Receive "near match" response | Timeliness, accuracy, and completeness | 10–11 |
| | Receive "no match" response | Timeliness and accuracy | 10–11, 13 |
| | Receive error message | Timeliness, accuracy, clarity, and completeness | 10–13 |
| | Match response to validation request | Accuracy of response | 11 |
| | Correct errors | Clarity, accuracy, and completeness of documentation Accuracy and completeness of help desk information | 12, 15–16 |
| | Determine status of inquiry | Accuracy and completeness of capability | 9 |
| | Create copy usable for subsequent processing | Accuracy and completeness of information provided Usability of information Consistency with retail capability | 11, 13–14 |
| Retrieve CR | Determine type of inquiry to send (CSIQ or CTIQ) | Clarity, accuracy, and completeness of documentation | 1–3 |
| | Create CR request transaction | Clarity, accuracy, and completeness of documentation Accessibility of interface | 1–3, 5, 8 |
| | Send CR request using WTN | Accessibility of interface Accuracy and completeness of functionality | 5–7, 9 |
| | Receive "match" response | Timeliness and accuracy | 10–11, 13 |
| | Receive "no match" response | Timeliness and accuracy | 10–11, 13 |
| | Receive error message | Timeliness, accuracy, clarity, | 10–13 |

Test Target Areas and Measures - Pre-Order -continued

| Process Areas | Sub-Process Areas | Measures | Criteria |
|---|---|---|---|
| | Match response to validation request | and completeness<br>Accuracy of response | 11 |
| | Correct errors | Clarity, accuracy, and completeness of documentation | 12 |
| | | Accuracy and completeness of help desk information | 15–16 |
| | Determine status of inquiry | Availability of capability | 5–6 |
| | Create copy of information usable for subsequent processing | Accuracy and completeness of information provided<br>Usability of information<br>Consistency with retail capability | 8, 14 |
| Determine due date/ appointment availability | Create due date appointment availability request transaction | Clarity, accuracy, and completeness of documentation | 1–3 |
| | Send request | Accessibility of interface<br>Accuracy and completeness of functionality | 5–7 |
| | Receive valid response | Timeliness, accuracy, clarity, and completeness | 10–12 |
| | Match response to validation request | Accuracy of response | 11 |
| | Correct errors | Clarity, accuracy, and completeness of documentation | 12, 15–16 |
| | | Accuracy and completeness of help desk information | |
| | Resubmit available due date request | Accessibility of interface | 5–6 |
| | Verify response received | Accuracy and completeness of response | 11 |
| | Determine status of inquiry | Accuracy and completeness of capability | 9 |
| Reserve due date/ appointment | Create due date/ appointment reservation request transaction | Clarity, accuracy and completeness of documentation | 1–3 |
| | Send request | Accessibility of interface<br>Accuracy and completeness of functionality | 7 |
| | Receive valid response | Timeliness, accuracy, and completeness<br>Consistency with retail capability | 10–11, 14 |
| | Receive error message | Timeliness, accuracy, clarity, and completeness | 10–12 |
| | Match response to validation request | Accuracy of response | 11 |
| | Correct errors | Clarity, accuracy, and completeness of documentation<br>Accuracy and complete of help desk information | 12, 15–16 |
| Follow up on delayed pre-order activities | Contact pre-ordering help desk | Timeliness of answer<br>Availability of support | 10, 15 |
| | Request status of response | Timeliness, accuracy, and completeness of response | 11, 16 |
| | Escalate request for information | Accuracy and completeness of procedures<br>Compliance to procedures | 18–19 |
| Request pre-order transaction population support | Contact appropriate help desk | Timeliness of answer<br>Availability of support | 10, 15 |
| | Ask question | Timeliness, accuracy, and completeness of response | 10–11, 15–16 |
| Request pre-order error correction support | Contact appropriate help desk | Timeliness of answer<br>Availability of support | 10, 15 |
| | Ask question | Timeliness, accuracy, and completeness of response | 11, 16 |

Test Target Areas and Measures - Order

| Process Areas | Sub-Process Areas | Measures | Criteria |
|---|---|---|---|
| Submit Order | Determine type of order to create | Clarity and accuracy of documentation | 1–3, 28 |
| | Create order transaction(s) | Clarity, accuracy, and completeness of documentation | 1–3 |
| | Send order in LSR format | Accessibility of Interface | 4–6 |
| | Send order in ASR format | Accessibility of Interface | 4–6 |
| | Receive acknowledgment of valid request (LSR) | Timeliness and accuracy, | 10–11 |
| | Receive acknowledgment of valid request (ASR) | Timeliness and accuracy | 10–11 |
| | Match response to transaction | Accuracy of response | 11 |
| | Receive error/reject message | Timeliness, accuracy, clarity, and completeness | 10–12 |
| | Correct errors | Clarity, accuracy, and completeness of documentation | 12, 15–16 |
| | | Accuracy and completeness of help desk information | |
| | Re-submit order | Accessibility of Interface | 4–6 |
| | Verify response receive | Accuracy and completeness of response | 11 |
| | Determine status of transaction response | Accuracy and completeness of capability | 9 |
| Supplement order | Create supplement transaction(s) | Clarity, accuracy, and completeness of documentation | 1–3 |
| | Send supplement | Accessibility of Interface | 4–6 |
| | Receive confirmation of receipt | Timeliness and accuracy | 10–11 |
| | Match response to transaction | Accuracy of response | 11 |
| | Receive error/reject message | Timeliness, accuracy, clarity, and completeness | 10–12 |
| | Correct errors | Clarity, accuracy, and completeness of documentation | 12, 15–16 |
| | | Accuracy and completeness of help desk information | |
| | Re-submit supplement | Accessibility of interface | 4–6 |
| | Determine status of transaction response | Accuracy and completeness of capability | 9 |
| | Verify response received | Accuracy and completeness of capability | 11 |
| | Determine status of transaction response | Accuracy and completeness of capability | 9 |
| Cancel order | Create cancel transaction | Clarity, accuracy, and completeness of documentation | 1–3 |
| | Send cancel | Accessibility of interface | 4–6 |
| | Receive confirmation | Timeliness and accuracy | 10–11 |
| | Match response to transaction | Accuracy of response | 11 |
| | Receive error/reject message | Timeliness, accuracy, clarity, and completeness | 10–12 |
| | Verify response received | Accuracy and completeness of response | 11, 13 |
| | Determine status of transaction response | Accuracy and completeness of capability | 9 |
| Expedite order | Request expedited due date | Clarity, accuracy, and completeness of documentation | 1–3 |
| | Receive acceptance of expedited due date | Timeliness and accuracy | 10–11 |
| | Receive rejection of expedited due date request | Timeliness and accuracy | 10–11 |
| Request order status | Create order status transaction | Clarity, accuracy, and completeness of documentation | 1–3 |
| | Submit order status transaction | Accessibility of interface | 6, 9 |
| | | Accuracy and completeness of capability | |
| | Receive current status | Timeliness and accuracy | 10–11 |
| View completed order | Inquire on completed order | Accuracy and completeness of | 9, 14 |

-continued

Test Target Areas and Measures - Order

| Process Areas | Sub-Process Areas | Measures | Criteria |
|---|---|---|---|
| information | | functionality | |
| | | Consistency with retail capability | |
| Follow up on delayed order activities | Contact ordering help desk | Timeliness of answer | 15–16 |
| | | Availability of support | |
| | Request status of response | Timeliness, accuracy, and completeness | 10–11 |
| | Escalate request for information | Accuracy and completeness of procedures | 18–19 |
| | | Compliance to procedures | |
| | Monitor closure of request | Completeness and accuracy of follow-up | 9–10 |
| | | Timeliness of answer | |
| Request order population support | Contact appropriate help desk | Timeliness of answer | 15 |
| | | Availability of support | |
| | Ask question | Timeliness, accuracy, and completeness | 10–11, 17 |
| Request order error correction support | Contact appropriate help desk | Timeliness of answer | 15–16 |
| | | Availability of support | |
| | Ask question | Timeliness, accuracy, and completeness | 10–11, 17 |

Test Target Areas and Measures -- Provisioning

| Process Areas | Sub-Process Areas | Measures | Criteria |
|---|---|---|---|
| Receive order confirmation | Receive LSR confirmation | Timeliness of response | 20–21 |
| | | Timeliness of dates | |
| | | Accuracy of data | |
| | Receive ASR commitment | Timeliness of response | 20–21 |
| | | Timeliness of dates | |
| | | Accuracy of data | |
| | Match response to transaction | Accuracy of response | 11 |
| | Receive error/reject message after original confirmation | Timeliness and accuracy of response | 12, 20 |
| | | Accuracy and completeness of error message | |
| | | Applicability of order flow-through | |
| | Correct errors | Clarity, accuracy, and completeness of documentation | 16 |
| | | Accuracy and completeness of help desk information | |
| | Re-submit order | Accessibility of interface | 4–6 |
| | Verify response received | Accuracy and completeness of response | 9 |
| | Determine status of transaction response | Accuracy and completeness of capability | 11 |
| Receive design documents | Receive circuit layout (CLR) | Timeliness of response | 10–11 |
| | | Timeliness of dates | |
| | | Accuracy of data | |
| | Receive design layout (DLR) | Timeliness of response | 10–11 |
| | | Timeliness of dates | |
| | | Accuracy of data | |
| | Match response to transaction | Accuracy of response | 9 |
| | Verify response received | Accuracy and completeness of response | 9 |
| | Determine status of transaction response | Accuracy and completeness of capability | 11 |
| Receive completion notification | Receive completion notification transaction | Timeliness of response | 27 |
| | | Timeliness of dates | |
| | | Accuracy of data | |
| | Match response to transaction | Accuracy of response | 11 |
| | Verify response received | Accuracy and completeness of response | 11 |
| | Determine status of | Accuracy and completeness of | 9 |

-continued

Test Target Areas and Measures -- Provisioning

| Process Areas | Sub-Process Areas | Measures | Criteria |
|---|---|---|---|
| | transaction response | capability | |
| | Test service | Accuracy of provisioning | 24 |
| Receive delay notification | Receive delay notification transaction | Timeliness of response Timeliness of dates Accuracy of data Frequency of delay | 26 |
| | Match response to transaction | Accuracy of response | 11 |
| | Identify reason for delay | Accuracy of response | 11 |
| Follow up on delayed provisioning activities | Contact provisioning help desk | Timeliness of answer Availability of support | 15, 29 |
| | Request status of response or delay | Timeliness, accuracy, and completeness | 11, 29 |
| | Escalate request for information | Accuracy and completeness of procedures Compliance to procedures | 18–19, 30 |
| | Escalate request for provisioning | Accuracy and completeness of procedures Compliance to procedures | 19, 30 |
| | Monitor to closure | Timeliness of closure Compliance to procedures | 26, 30 |

Based on evaluation checklists or otherwise, test results may be generated ("Satisfied," "Not Satisfied," etc.) and comments provided for each of the evaluation criteria used in the particular instance of the test.

F. POP Manual Order Process Test

This test is designed to evaluate the manual order handling processes of ILEC 14. These processes are implemented within the manual interface 34, which may be associated in an ILEC operations center. The test involves structured interviews with ILEC personnel involving questions tailored to the evaluation criteria, structured walk throughs for direct observation of ILEC personnel, and documentation review to evaluate whether the ILEC's processes provide a framework for the efficient receipt, review, and execution of manual orders. The test involves a procedural evaluation of the ILEC's established processes for handling manual orders. Actual performance of manual order operations may be tested in one or more POP Domain functional tests. In one embodiment, the test is conducted in connection with the POP EDI Interface and GUI Interface Functional Tests described above. Orders are submitted manually if a test scenario calls for an order type that cannot be submitted electronically or the electronic submission of an order fails for some reason.

In one embodiment, test target areas for this test include such things as the receiving of manual orders, processing of manual orders (including entry into SOP), status tracking and reporting, problem escalation, capacity management and planning, and process management and improvement. Evaluation criteria relating to these test target areas include such things as the accuracy and completeness of manual order logs; the completeness and consistency of manual order processes, order reporting and tracking processes, and problem escalation processes; and the completeness and consistency of operating management practices (including controllability, efficiency, and reliability of management processes).

Test target areas and associated evaluation measures are summarized in the table below. The last column of the table indicates how particular evaluation criteria may, in one embodiment, correspond to particular evaluation measures. Evaluation criteria may include, in any suitable combination and without limitation: (1) manual processes are clearly defined and well documented for telephone, fax, and electronic manual orders; (2) internal ownership of manual orders is clearly delineated and tracked throughout the process; (3) the process incorporates clear, documented, and available procedures to track performance, address errors, escalate problems, and resolve exceptions; (4) performance measures are defined, measured, and reviewed; (5) manual order intake logs are complete, consistent, and kept updated; (6) CLECs 16 can readily initiate a manual order; (7) CLECs 16 can access the status of orders; (8) capacity is available to scale for unexpected peaks in demand; (9) process status is tracked and reported to management; (10) the capacity management process includes adequate, complete, and consistent procedures; (11) business and transaction volume (e.g., orders submitted, calls received) measures are clearly defined and are tracked for capacity management purposes; (12) the business scenarios and conditions under which capacity adjustments would be made are defined during capacity planning; (13) the capacity management process incorporates forecasting and trend analyses of business volumes and resource utilization; (14) contingency plans are documented and steps taken to mitigate the impact of unexpected changes in capacity, business volumes, and resource utilization (including whether service quality objectives and workload fluctuations are considered in workforce scheduling); and (15) production and service quality objectives are defined for capacity planning and management. Considerations relevant to one or more evaluation criteria may include whether the process is documented and followed, whether documentation is available to CLEC and ILEC personnel, whether data is available and verifiable, whether algorithms for data analysis are defined and documented, and whether reports are available.

| Test Target Areas and Measures | | | |
|---|---|---|---|
| Process Area | Sub-Process Area | Measures | Criteria |
| Receive manual order | Telephone and fax manual order logging | Accuracy and completeness of log<br>Completeness and consistency of process | 5 |
| | Electronic manual order logging | Accuracy and completeness of log<br>Completeness and consistency of process | 5 |
| Process manual order | Entry of manual order into order processor | Completeness and consistency of process | 3 |
| Send order response | Delivery of error messages and queries | Completeness and consistency of process | |
| | Delivery of confirmations and completions | Completeness and consistency of process | |
| Status tracking and reporting | Status tracking and reporting | Completeness and consistency of process | 1–2, 9 |
| Problem escalation | User-initiated escalation | Completeness and consistency of process | 3 |
| Capacity management | Capacity planning process | Adequacy, completeness, and consistency | 10–15 |
| Process management | General management practices | Completeness and consistency of operating management practices | 6 |
| | Performance measurement process | Controllability, efficiency, and reliability of process | 3, 9 |
| | Process improvement | Completeness of process improvement practices | 3 |

Based on evaluation checklists or otherwise, test results may be generated ("Satisfied," "Not Satisfied," etc.) and comments provided for each of the evaluation criteria used in the particular instance of the test.

G. POP Metrics Test

The test provides a comprehensive evaluation of ILEC systems and processes used to capture metrics associated with its retail and wholesale POP operations. In one embodiment, the focus is on the capture, tracking, and reporting of POP metrics required by the regulatory entity. The test includes the following key components, without limitation: (1) metrics replication, using ILEC data and its algorithms to re-calculate metric values for a specified time period to determine the accuracy of the ILEC calculations, (2) a data integrity evaluation that focusing on ILEC processes used to filter raw data for use in calculating metric values, and (3) statistical analysis to compare the metric values for the ILEC's wholesale operations with the values for the ILEC's retail operations or with suitable standards. In one embodiment, this test may be conducted as a part of, or supplemented by, a comprehensive Performance Metrics Test that evaluates ILEC systems, processes, and other operational elements associated with its support for performance metrics, most preferably across multiple domains.

Metrics generation typically involves ILEC 14 gathering raw data concerning transactions, filtering the data as appropriate, storing the filtered data in one or more databases, and generating reports based on the stored data. In one embodiment, the ILEC 14 implements a system that uses one or more emulation programs to monitor order processor 44. These programs may submit pre-order and order transactions to order processor 44 as if the transactions were from CLECs 16 (which might require the transactions to pass through one or more OSS access system 20) or from retail customers of ILEC 14 (which may require the transactions to flow through to order processor 44). The programs preferably submit the transactions according to pre-defined scripts that attempt to replicate typical patterns as to type and volume. The system monitors and records response times for the submitted transactions in one or more databases. ILEC 14 then uses this information to generate metrics for reporting to the regulatory entity or otherwise. ILEC 14 may maintain data for all orders that are confirmed, completed, or rejected during the test period and for all outstanding orders that were confirmed during the test period but were not completed or rejected at the end of the test period.

For example only and not by way of limitation, pre-ordering metrics may include the elapsed time (e.g., in seconds) between submission of a pre-order request and receipt of a response. Ordering metrics might include the elapsed time (e.g., in hours) between receipt of a valid order request and the distribution of a confirmation or rejection, the percentage of orders rejected, the percent of such confirmations sent on time, the elapsed time between the notice to ILEC 14 of the order completion date and distribution of the order completion notification, the percentage of notifications sent on time, the percentage of orders that flow-through, and any other appropriate metrics. Provisioning metrics might include the interval (e.g., in days) between the receipt date for an order and due date for completion of the order, the interval (e.g., in days) between the receipt date and the actual completion date (preferably excluding CLEC delays or other delays not the fault of ILEC 14), the interval (e.g., in days) between the due date and the actual completion date, the percentage of commitments missed (preferably excluding those not the fault of ILEC 14), and any other suitable metrics. These are just examples; the present invention contemplates any suitable metrics according to the data available and particular needs.

Metrics Replication

To determine whether the ILEC 14 accurately calculates and properly reports its POP metrics, the testing entity attempts to re-create these metrics using ILEC 14 filtered data, ILEC 14 algorithms, and ILEC 14 descriptions of the metrics. For this purposes, ILEC 14 may develop its own software that implements ILEC algorithms. Once the metrics have been generated, the testing entity can determine whether the calculated results match the results that ILEC 14 has reported.

Data Integrity

Since the metrics replication component uses filtered data, the testing entity may design and implement statistical samples to determine whether the filtered data used to calculate the metrics was correctly generated from the raw data. Due to the complexity of the information systems involved and the filtering processes used, it may not be possible to investigate all the systems and processes in the time available for testing. As a result, it may be desirable for the testing entity to determine whether a sufficiently reasonable level of confidence in the integrity of the ILEC filtered data can be established.

In one embodiment, the data integrity investigation involves the following steps, without limitation: (1) identify one or more fields in the filtered data that are used most often in the metric calculations (this determination may be made separately for each of the pre-ordering, ordering, and provisioning metrics); (2) request that the ILEC 14 identify where the earliest records of the data in these fields is located and which ILEC personnel can best explain the records; (3) drawing on interviews with suitable ILEC personnel, determine which of these records to inspect; (4) identify a random sample of pre-order, order, and provisioning transactions and request ILEC 14 to provide copies of the associated records (each sample might be "stratified" to ensure a representative cross-section); (5) treating the data in these records as the raw data with which the filtered data may be compared, compare the raw data with the filtered data for each sample; and (6) request ILEC 14 to research and explain any unexpected entries encountered in the raw data.

The testing entity may trace the progress of transactions from pre-order to order to provisioning over the duration of the test period. For example, the testing entity may request data for all order transactions submitted near the beginning of the test period and filtered data for all provisioned and still pending orders for the entire test period. The testing entity may compare the data for the submitted orders with the filtered data for the provisioned and pending orders to ensure there no unexpected disappearances or appearances. As for sample-based comparisons described above, ILEC 14 may be given an opportunity to research and explain such discrepancies. If no significant unexplained discrepancies are found, a reasonable level of confidence has been attained.

Statistical Analysis

Using statistical techniques, the testing entity compares correctly calculated ILEC wholesale metrics (which may be the metrics generated by the testing entity rather than those generated by ILEC 14) with ILEC retail metrics or other suitable standards. Since the testing entity primarily relies on data collected during the test period, test period conditions should be statistically similar to conditions outside of the test period. Furthermore, although the testing entity may verify certain ILEC-supplied data and probe data integrity in general, the testing entity may largely need to rely on the ILEC 14 to provide accurate test period data. Accordingly, the testing entity should have discussions with ILEC 14 personnel to understand how data is collected and processed so as to determine whether the data will allow for correct overall inferences (barring some deliberate tampering with the data). Other factors that may cause differences between the test and retail data, such as geography (as reflected in the area code), number of lines in the order, and type of order, should be accounted for to the extent possible. For example, one geographic area may receive a higher level of service than another or might have a higher concentration of CLECs 16 than another, such that ILEC 14 may be in parity within the area yet out of parity overall (or vice versa).

Test target areas and associated evaluation measures are summarized in the table below. The last column of the table indicates how particular evaluation criteria may, in one embodiment, correspond to particular evaluation measures. Evaluation criteria may include, in any suitable combination and without limitation:

Pre-ordering: (1) ILEC metrics are logically the same as those outlined in applicable industry guidelines; (2) the ILEC's software and algorithms are consistent with the metrics outlined in applicable industry guidelines; and (3) ILEC reported metrics are correct;

Ordering: (4) ILEC metrics are logically the same as those outlined in any applicable industry guidelines; (5) the ILEC's software and algorithms are consistent with the metrics outlined in applicable industry guidelines; (6) the ILEC's reported metrics are correct; (7) selected filtered data used to generate metrics is consistent with the corresponding raw data; (8) the metric values reported satisfy requirements according to statistical analyses; and (9) metric values reported are consistent with data collected; and Provisioning: (10) ILEC metrics are logically the same as those outlined in any applicable industry guidelines; (11) ILEC software and algorithms are consistent with the metrics outlined in applicable industry guidelines; (12) the ILEC's reported metrics are correct; (13) selected filtered data used to generate metrics is consistent with the corresponding raw data; and (14) metric values reported satisfy requirements according to statistical analyses.

Test Target Areas and Measures

| Process Area | Sub-Process Area | Measure | Criteria |
| --- | --- | --- | --- |
| Validate the information gathering processes | Identify control points where measurements are taken | Applicability and measurability of control points | 1, 4, 10 |
| | Identify data sources for each reported metric | Applicability and completeness of data sources | 1–2, 4–5, 10–11 |
| | Identify tools ILEC 14 uses to collect data | Applicability and reliability of tools | 1, 4, 10 |
| Validate metric values generated | Evaluate calculations | Accuracy and applicability of calculations | 2–3, 5–7, 11–13 |
| | Evaluate tools used in the calculations | Accuracy, security, and controllability of data housed in the tools | 7, 13 |
| Validate metric values reported | Evaluate report format | Consistency of reported results with data collected | 9 |

-continued

| Process Area | Sub-Process Area | Measure | Criteria |
|---|---|---|---|
| | Evaluate report content | Accuracy of metrics reporting and completeness and applicability of measures | 8, 14 |

Based on evaluation checklists or otherwise, test results may be generated ("Satisfied," "Not Satisfied," etc.) and comments provided for each of the evaluation criteria used in the particular instance of the test.

H. POP Documentation Test

This test evaluates the ILEC documentation developed to support CLECs 16 with questions, problems, and issues relating to POP Domain activities. This test involves a high level review to determine whether ILEC documentation in this area is prepared and distributed subject to acceptable management and business practices. Although the test does not attempt to comprehensively evaluate the accuracy of the contents of ILEC documentation, a more detailed review may be warranted where documents are essential to the establishment of electronic interfaces, performance of transaction testing, or other critical activities. Portions of the ILEC documentation relating to M&R, Billing, RMI, or other activities may be reviewed in an analogous manner in connection with corresponding tests described below.

In one embodiment, operational analysis techniques are used for purposes of this test. Prior to initiation of the test, evaluation checklists are created to facilitate a structured review of ILEC documentation based on suitable evaluation criteria. The review may include accessing one or more websites through which documentation is made available to CLECs 16. The testing entity may evaluate certain documentation in the context of functional tests described above to determine its utility in a more realistic business environment. Inconsistencies, errors, unclear language, and other content deficiencies that may impact the ability of the testing entity to successfully conduct the POP Domain testing described above are noted and used as input to this document review. Interviews with pseudo-CLEC and ILEC personnel during such testing may complement these records. As for all the tests, exceptions may be raised where issues are deemed to have a potentially significant impact on the ability of CLECs 16 to conduct business operations.

Test target areas and associated evaluation measures are summarized in the table below. The last column of the table indicates how particular evaluation criteria may, in one embodiment, correspond to particular evaluation measures. Evaluation criteria may include, in any combination and without limitation: (1) responsibilities and procedures for developing, updating, and correcting documentation are clearly defined; (2) the responsibilities and procedures for maintaining distribution lists and distributing documentation are clearly defined, (3) distribution procedure allows the latest document version to be made available to interested parties in electronic and paper versions in a timely manner, (4) training is provided for using documentation, (5) document version is indicated within each document and is clear throughout the document, (6) documents provide cross-references and have clear citations directing readers to relevant sources of additional information, (7) documents instruct users how to notify ILEC 14 about errors or omissions, (8) documents correctly indicate scope and purpose, (9) documents contain table of contents, (10) documents are logically organized with clear page numbering and section labeling; (11) documents contain an adequate glossary of terms, including explanations of relevant acronyms; (12) documents contain methods and procedures to correctly execute processes; (13) documents identify the inputs and outputs of processes; (14) documentation includes the expected results of process and cycle times; (15) the documentation adequately describes the exception handling process; (16) documents provide useful contact lists and help desk numbers; (17) documents correctly describe the setup and access of relevant systems; (18) documents clearly define how to navigate within systems (e.g., use of GUI screen prints); (19) documents correctly define all data fields; (20) the documents clearly and accurately explain acceptable formats for data in data fields; (21) documents correctly distinguish between required and optional data fields; (22) documents define possible options after data entry (i.e. save, send, and cancel); (23) documents adequately describe expected system responses and outputs; and (24) the documents provide adequate description of error messages and the possible steps for error resolution.

| Test Target Areas and Measures | | | |
|---|---|---|---|
| Process Areas | Sub-Process Areas | Measures | Criteria |
| Acquire documentation | Receive current documentation | Availability of up to date documentation | 14 |
| Evaluate documentation | Evaluate documentation format | Organization of documentation | 5–11 |
| | Evaluate documentation content | Clarity, accuracy, and completeness of documentation | 12–24 |
| | | Compliance to standards | 20–21 |

Based on evaluation checklists or otherwise, test results may be generated ("Satisfied," "Not Satisfied," etc.) and comments provided for each of the evaluation criteria used in the particular instance of the test.

I. POP Help Desk Test

This test provides a comprehensive operational analysis of ILEC help desk processes supporting CLECs 16 with questions, problems, and issues relating to POP Domain activities. For example, help desk 50 may support CLECs 16 as to issues relating to creating and submitting pre-order and order transactions, issues relating to orders that have already been submitted, and issues relating to EDI interface 30 or GUI interface 32 (e.g., as to connectivity, access, and security). Help desk 50 may refer CLECs 16 to other SMEs outside help desk 50 if appropriate. This test may evaluate functionality, performance, escalation procedures, management oversight, security, or any other aspects of help desk 50. In one embodiment, the test includes two parts: (1) a procedural review of ILEC procedures for performing and managing help desk functions; and (2) a subsequent analysis of help desk performance based upon interaction between pseudo-CLEC 18 and help desk 50 during POP Domain testing described more fully above.

For the procedural evaluation, operational analysis techniques are preferably used. The testing entity first generates evaluation checklists to facilitate structured walk-throughs of help desk processes and interviews with help desk personnel and management to discuss these processes. The testing entity also reviews the relevant ILEC documentation and may solicit input from one or more CLECs 16 as to the ILEC's help desk performance.

Observation targets for the walk-throughs may include, without limitation: (1) help desk logs containing information relating to help desk inquiries received; (2) contact information for help desk 50 or appropriate management personnel; (3) an electronic "suggestion box" possibly associated with GUI interface 32 for receiving CLEC input; (4) read-only viewing of HTML pages or other files presented to the CLECs 16 in association with GUI 38, for example, to verify that appropriate error messages are conveyed to CLECs 16; (5) a training packet or other suitable reference documentation that provides help desk personnel with descriptions of all the error messages that may be generated and basic problem solving techniques to be used in relation to each such error message.

CLEC participation may be solicited in several ways. In one embodiment, CLECs 16 receive surveys requesting feedback on particular interactions with the help desk 50 concerning POP Domain issues. For example, the testing entity may record the particular help desk 50 (of possibly multiple help desks 50) that CLEC 16 contacted, the CLEC's description of procedures ILEC 14 followed in responding to issues, and the CLEC's qualitative assessment of the level of support that ILEC 14 provided. In addition, CLECs 16 may be invited to participate in walk-throughs, to observe CLEC interaction with help desk 50, to participate in related discussions, or to have other suitable involvement.

The performance evaluation relies on a qualitative and quantitative analysis of selected data collected during POP Domain transaction testing. In one embodiment, the testing entity establishes its own help desk within pseudo-CLEC 18 to interface with the ILEC's help desk 50. When issues arise during transaction testing, testers direct their inquiries to the pseudo-CLEC help desk, which in turn places calls to the ILEC help desk 50 to evaluate its performance in terms of responsiveness, timeliness of resolution, and accuracy of resolution. Such calls preferably encompass a variety of suitable test scenarios, but generally fall into two categories—calls that relate to specific error messages received in response to submitted pre-orders and orders and calls that relate to status checks or other questions unrelated to specific errors.

Interactions with the help desk 50 are logged, typically including the date the issue was referred to help desk 50, the particular transaction and issue, the outcome, the resolution date if any, and an error reason assigned following resolution of the issue. If immediate resolution of the issue is not achieved, the issue status may be tracked until resolution. Once a resolution is received at the pseudo-CLEC's help desk, it is communicated to a tester who may then, for example, make modifications necessary to re-submit an associated transaction. To evaluate the ILEC's help desk performance, information in the issue logs is analyzed and organized by transaction type, error reason, or otherwise. In addition, interviews with the pseudo-CLEC help desk personnel regarding their qualitative experience with the ILEC's help desk 50 may be conducted.

Test target areas and associated evaluation measures are summarized in the table below. More specific evaluation measures may be used to evaluate test target areas that pertain to specific pre-ordering, ordering, and provisioning activities. The last column of the table indicates how evaluation criteria may, in one embodiment, correspond to particular evaluation measures. Evaluation criteria may include, in any combination and without limitation: (1) all help desk responsibilities are defined; (2) scope of help desk services covers all key customer requirements; (3) the scope and objectives of help desk 50 are clearly defined, documented, and communicated to customers; (4) complete (i.e. beginning-to-end) description of the help desk process is documented; (5) the help desk process includes procedures for addressing errors and exceptions; (6) help desk 50 is responsive to CLEC telephone calls; (7) information provided by help desk 50 is accurate; (8) the help desk 50 provides timely resolution of issues; (9) the help desk process incorporates complete and consistent call intake procedures (i.e. logging and acknowledgment); (10) help desk process defines criteria and procedure for severity coding help desk calls; (11) help desk process includes procedures for referral (both into and out of help desk); (12) the help desk process includes complete and consistent procedure for closure logging; (13) the help desk process includes complete and consistent procedure for issue status tracking and for reporting to management; (14) help desk process includes complete and consistent procedure for escalating user issues and problems; (15) help desk process includes complete and consistent procedures for capacity planning; (16) the help desk process includes procedures for maintaining data security and integrity; (17) any electronic help desk interfaces are easy to use; (18) the responsibilities for tracking help desk performance are assigned; (19) help desk process performance measures are defined and measured; (20) help desk process improvement procedures are defined and the responsibilities are assigned.; and (21) the CLECs 16 can readily interface with help desk 50.

| Test Target Areas and Measures | | | |
|---|---|---|---|
| Process Areas | Sub-Process Areas | Measures | Criteria |
| Respond to help desk call | Answer call | Timeliness of call<br>Completeness and consistency of process | 2, 6 |
| | Interface with user | Availability and usability of user interface | 2–3, 6, 19 |
| | Log call | Accuracy and completeness of call logging | 4, 8 |
| | Record severity code | Compliance of call logging severity coding | |
| Process help desk call | Access to systems to observe user problems | Ability to access user records and transactions | 1, 7, 16 |
| | Resolve user question problem or issue | Completeness and consistency of process<br>Accuracy of response | 1–2, 4–5, 7–8, 10–11 |
| | Record follow-up is required | Accuracy and consistency of process | |
| | Follow-up on commitments | Measurability of adherence to response time<br>Complete and accurate follow-up | 19 |
| Close help desk call | Log closure information | Completeness, consistency, and timeliness of process<br>Accuracy of logging | 11–12 |
| Monitor status | Track status | Accuracy and completeness of status tracking capability<br>Consistency and frequency of follow-up activities<br>Availability of jeopardy notification | 8–9, 10, 13, 17 |
| | Report status | Completeness and consistency of reporting process<br>Accuracy, timeliness, and accessibility of status report | 4, 10, 13 |
| Request escalation | Manage escalations | Completeness and consistency of procedure | 13–14 |
| Manage workforce capacity | Provide management oversight | Completeness and consistency of process | 15 |
| | Review staffing plans | Scalability of staff volume | 15 |
| Provide security and integrity | Provide secured access | Completeness and applicability of security procedures, profiles, and restrictions<br>Controllability of intra-company access | 16 |
| Manage the help desk process | Provide management oversight | Completeness and consistency of operating management practices<br>Controllability, efficiency and reliability of process<br>Completeness of process improvement practices | 5, 12–13, 15–16, 18 |
| Capacity management | Capacity management process | Adequacy and completeness of process | 6–8, 15 |

Considerations relevant to particular evaluation criteria may include, without limitation (consideration for a criterion being listed after the number of the criterion): (1) the process is completely documented, ownership is defined for each process, and documentation is readily available to CLEC and ILEC personnel; (2) key customer requirements are defined, scope of help desk responsibilities is documented, and key customer requirements are met or exceeded by the documented responsibilities; (3) documentation available to CLECs 16 contains a complete description of the process and contacts, documentation is readily available to CLECs 16, and documentation and training are readily available to the help desk personnel; (4) the process is formally documented, documented process is available to ILEC management and staff, ILEC managers and staff are trained in documented process, and requisite contact numbers are available in the documentation; (5) process for handling an error or exception is defined and documented, error/exception processes are communicated to CLECs 16, process includes criteria for determining an error or exception, and ILEC help desk personnel are evaluated on their handling of errors and exceptions; (6) standards for timeliness exist, timeliness measures are aligned with the generally accepted industry standards, timeliness of the process is measured by help desk management, and help desk personnel are evaluated on their response timeliness; (7) help desk personnel performing the process are trained, any documentation required to resolve issues is available to help desk personnel, the personnel are evaluated on the accuracy of the information provided, and the personnel are evaluated on the timeliness of the issue resolution; (8) suitable timeliness standards are defined, the timeliness of the process is measured, and timeliness measures are reported and managed; (9) a system for tracking calls exists, the procedures for logging calls are defined and documented, procedures are taught in training, and personnel are evaluated on their performance and timeliness of call logging and tracking activities; (10) severity codes are defined, standards for determining severity codes are defined, specific actions are associated with specific severity codes, and personnel are evaluated on their assignment and tracking of severity codes; (11) referral procedure is documented, documentation is available to proper ILEC and CLEC personnel, processes for the timely updating of contact/referral information exist, and personnel are evaluated on the performance of referrals to and from help desk 50; (12) a system for tracking calls exists, system has functionality for closure posting, criteria which must be satisfied to close a call are established and documented, personnel are evaluated on the performance of closure posting, and process includes procedures for obtaining CLEC agreement of closure; (13) status of the process can be tracked, a system for tracking the process exists, responsibility for tracking the process and performance of issue resolution is defined, performance reporting responsibilities are defined, and the responsible personnel are evaluated based on the timeliness of issue resolution; (14) escalation procedures are defined and documented, process includes appropriate standards for escalation, and documentation of the procedures is available to ILEC and CLEC personnel; (15) a capacity plan exists, data related to capacity is collected, monitored, and reported, responsibility for data analysis is adequately defined and documented, algorithms for data analysis are defined and documented, actions to change capacity are defined and documented, criteria for taking action are defined and documented, and responsibility for taking action is assigned; (16) security controls are documented, penalties for not conforming to these security controls are documented, and security procedures and penalties are taught and enforced; (17) performance measures are documented and can be tracked, a system for tracking performance exists, periodic measurements of process performance are made, standards for performance are defined, actions to be taken when standards are not met are defined and documented, responsibility for tracking performance is assigned, and performance influences capacity management decisions; (18) CLEC and internal (ILEC) suggestions are solicited and collected, procedures for evaluating suggestions are defined and documented, the process for making changes is defined and documented, the responsibility for acknowledging, evaluating and responding to suggestions is assigned, and responsible personnel are evaluated on timeliness of responses to and implementation of suggestions; and (21) process is documented, process is followed, and documentation is available to CLEC and ILEC personnel.

Based on evaluation checklists or otherwise, test results may be generated ("Satisfied," "Not Satisfied," etc.) and comments provided for each of the evaluation criteria used in the particular instance of the test.

J. POP Provisioning Parity Test

The test evaluates the ILEC systems, interfaces, and processes that provide provisioning for CLEC 16 orders to determine the degree to which this provisioning environment is in parity with provisioning for the ILEC's retail orders. The focus of the evaluation is on activities occurring downstream of order entry through service activation. As described above with respect to FIG. 12, the provisioning process typically begins with the successful entry of an order into order processor 44. CLEC orders may be entered in order processor 44 after flowing through EDI interface 30 and/or GUI interface 32 in whole, in part (order shell created in order processor 44 with manual entry required to complete the order), or not all (manual entry required for entire order at manual interface 34).

Once populated in order processor 44, the orders may flow to provisioning systems 46, which may include an order control system that controls the progress of orders through the provisioning process, distributes the orders to other provisioning systems 46 as appropriate, and returns status messages to order processor 44. From the order control system, the orders may flow through or be manually assigned to a translation process, which attempts to load translations associated with the orders in the appropriate ILEC CO switches. Where an error arises with respect to an order, one or more sub-systems and sub-processes may be used to resolve the error so as to place the order in condition for handling within the translation process. Within the translation process, one or more sub-systems and sub-processes may contribute to loading of translations to complete provisioning of the orders. Pre-order service inquiry, loop qualification, and other tasks may be needed for digital subscriber line (xDSL) orders. Although any evaluation measures and evaluation criteria particular to xDSL orders are not described below, additional evaluation measures and criteria analogous to those described below may be used in connection with xDSL orders to the extent that those described below would be insufficient.

In one embodiment, operational analysis techniques may be used. The testing entity conducts structured walk-throughs of systems involved in the provisioning process, interviews appropriate associated ILEC personnel, and reviews associated ILEC documentation. In addition, ILEC sample order files and other supplemental information may be reviewed.

Test target areas and associated evaluation measures are summarized in the table below. The last column of the table indicates how evaluation criteria may, in one embodiment, correspond to particular evaluation measures. For purposes of the evaluation measures, the following sub-process definitions may be used: (1) internal order entry involves the flow of orders into order processor from EDI interface 30, GUI interface 32, and/or manual interface 34 and, where necessary, administration of orders within an associated operations center; (2) workflow management includes administering the flow of orders in and between the components of the provisioning process; (3) workforce management includes prioritizing order-related activities and apportioning activities to ILEC personnel; (4) assignment includes activities in the provisioning process required to assign and/or reserve necessary facilities for the order; (5) service activation includes creating translations and loading them into or otherwise programming the ILEC CO switches accordingly, testing the service, and "turning up" the service for operation; and (6) service design includes defining the facilities, activities, and other components needed for the service.

| Test Target Areas and Measures | | | |
|---|---|---|---|
| Process Areas | Sub-Process Areas | Measures | Criteria |
| Provisioning process parity | Evaluate ILEC's internal order entry process | Consistency and repeatability as compared to retail | 1–4, 12–13, 19–20 |
| | Evaluate workflow management | Consistency and repeatability as compared to retail | 5–10, 14–15, 23–26 |
| | Evaluate workforce management | Consistency and repeatability as compared to retail | 1, 3, 5, 7, 9, 21–22 |
| | Evaluate assignment and translation process | Consistency and repeatability as compared to retail | 5–6, 15, 24–25 |
| | Evaluate service activation process | Consistency and repeatability as compared to retail | 7–11, 16–18, 25, 27 |
| | Evaluate service design process | Consistency and repeatability as compared to retail | 9–10, 17, 26 |

In one embodiment, this test may evaluate three dimensions of parity in the provisioning process: (1) parity in provisioning systems; (2) parity in provisioning procedures; and (3) parity in provisioning process execution. As described above, comparison of the provisioning times for the ILEC's wholesale and retail operations may be evaluated in connection with the POP Metrics Evaluation Test. Evaluation criteria for this test may include any one or more of the following, in any suitable combination and without limitation:

Provisioning Systems: (1) work volumes within the order processor 44 are consistently administered between retail and wholesale; (2) systems for processing and distributing orders from and within order processor 44 are consistent between retail and wholesale; (3) the work volumes within the ILEC operations center are consistently administered between retail and wholesale; (4) systems for processing and distributing orders from and within the ILEC operations center are consistent between retail and wholesale; (5) the work volumes within systems associated with the assignment and translation process are consistently administered between retail and wholesale; (6) systems for processing and distributing orders in connection with the assignment and translation process are consistent between retail and wholesale; (7) the work volumes within the systems used for service activation are consistently administered between retail and wholesale; (8) the systems for processing orders in connection with service activation are consistent between retail and wholesale; (9) work volumes within the systems used for handling special services are consistently administered between retail and wholesale; (10) the systems for processing orders in connection with any special services are consistent between retail and wholesale; and (11) systems used within the CO are consistent and comparable to retail. Suitable considerations for each of these criteria may include whether the systems are in fact identified with the task for which they are used, whether the system or associated process is complete, whether correct usage of the system or associated process is documented, and whether such correct usage is followed. Where different systems and/or associated processes are used for retail and wholesale, findings based on these criteria and considerations may be compared to determine parity.

Provisioning Procedures. (12) methods and procedures associated with the order processor 44 are consistent, repeatable, and comparable between wholesale and retail; (13) methods and procedures exist to support the ILEC operations center and interaction with internal ILEC systems, (14) methods and procedures associated with the ILEC order control center are consistent, repeatable, and comparable between wholesale and retail; (15) methods and procedures associated with assignment and translation are consistent, repeatable, and comparable between wholesale and retail; (16) the methods and procedures associated with service activation are consistent, repeatable, and comparable between wholesale and retail; (17) the methods and the procedures associated with handling special services are consistent, repeatable, and comparable between wholesale and retail; and (18) methods and procedures used in the CO are consistent, repeatable, and comparable between wholesale and retail. For each of these criteria, suitable considerations may include whether the methods and procedures are defined, complete, documented, and followed. Where differences are present between the retail and wholesale methods and procedures, findings based on these criteria and considerations may be compared to determine parity.

Provisioning Execution: (19) execution associated with order processor 44 is consistent with that of the ILEC retail's order centers; (20) execution associated with the ILEC operations center is consistent with that of its retail order centers; (21) the operations center is staffed with similar abilities, advantages, and skill sets as the retail order centers; (22) the operations center has similar hours of operation as the retail order centers; (23) execution associated with the ILEC order control system is consistent, comparable, and repeatable between wholesale and retail; (24) assignment and translation are executed in a consistent, comparable, and repeatable manner between wholesale and retail; (25) translation loading is executed in a consistent, comparable, and repeatable manner between wholesale and retail; (26) processes for special services are executed in a consistent, comparable, and repeatable manner between wholesale and retail; and (27) the processes in the CO are executed in a consistent, comparable, and repeatable manner between wholesale and retail. For certain criteria, such as criteria 19–20 and 23–27, suitable considerations may include whether work volumes are managed, whether the process is complete, whether the process is different for different work volumes, and whether the process is followed. Although criteria 21–22 relate specifically to the ILEC operations center associated with order processing, similar criteria may apply to any appropriate ILEC center in which provisioning related processes may be performed. Where different processes are used for retail and wholesale, findings based on these criteria and considerations may be compared to determine parity.

Based on evaluation checklists or otherwise, test results may be generated ("Satisfied," "Not Satisfied," etc.) and comments provided for each of the evaluation criteria used in the particular instance of the test.

K. POP Provisioning Coordination Test

This test evaluates the ILEC's processes and operational environment used to support coordinated provisioning with CLECs 16. The evaluation addresses products and services that require coordinated provisioning to minimize customer disruption. The objectives are to evaluate the completeness and consistency of the provisioning coordination process, determine whether the process is well documented, and evaluate the accuracy and completeness of measures for tracking performance.

In one embodiment, ILEC 14 supports a CLEC coordination center (CCC) to serve as the focal point for the coordinated provisioning process, which begins when the CCC receives order requiring provisioning coordination. Personnel associated with the CCC typically verify the order orders to evaluate performance and effectiveness of the coordination process and the extent to which approved coordination procedures are practiced in the field.

This test may involve any appropriate test scenarios according to particular needs. In a particular embodiment, the test uses scenarios 29, 41, 49–51, 57, 59–60, 62, 70, 85, 91–94, 96–97, 102, 117, and 127–132 listed in Appendix A. The test will preferably include one or more scenarios involving the migration of circuits from ILEC 14 to CLECs 16 and one or more scenarios involving the installation of new circuits.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Evaluation Measures | Criteria |
|---|---|---|---|
| Support provisioning coordination process | Identify orders requiring coordination with CLECs | Availability, consistency, repeatability, and comparability with retail | 9 |
| | Request coordination | Consistency, repeatability, and comparability with retail | 8 |
| | Receive notification of provisioning schedule | Consistency, repeatability, and comparability with retail Timeliness of notification | 10–11 |
| | Manage coordinated provisioning cases | Consistency, repeatability, and comparability with retail Completeness and consistency of operating management practice Controllability, efficiency and reliability of process Completeness of process improvement practices | 1–7, 13–14 | and contact CLEC 16 to confirm important order information such as the due date, order type, and number of lines involved. During actual provisioning, the CCC may direct the appropriate ILEC provisioning personnel (e.g., technicians in the CO and switch translation personnel) through the process. Following provisioning, the CCC may contact CLEC 16 again to confirm completion.

In one embodiment, the testing entity conducts operational analyses involving the following activities, without limitation: (1) targeted interviews of ILEC personnel associated with its operations center regarding the hand-off between the operations center and the CCC and regarding important activities such as UNE cutovers, LNP, order processing, and the like; (2) targeted interviews of ILEC personnel associated with the CCC regarding work assignment and coordination procedures with CLECs 16 and with other ILEC systems involved in the provisioning process, regarding the CCC procedures to measure and track coordination procedures, and regarding the management oversight of process improvements; (3) targeted interviews of the ILEC personnel associated with its COs regarding work assignment and CCC coordination procedures involved with provisioning activities required, for example, at the main distribution frames (MDFs) of its CO, provisioning activities required outside COs, translations required at the switches, or other important activities; (4) a review of the ILEC provisioning coordination documentation; and (5) review of test scenarios and case studies involving historical Evaluation criteria for this test may include any one or more of the following, in any suitable combination and without limitation: (1) a complete (i.e. beginning-to-end) description of the coordination process is defined; (2) coordination procedures are consistent; (3) the procedures are documented, maintained, and published; (4) the procedures are practiced in the field reliably; (5) the procedures are practiced in the field efficiently; (6) process performance measures are defined, measured, tracked, maintained, and controlled; (7) process improvement practices are complete; (8) the procedures to request coordination for an order are complete and consistent; (9) the procedures for identifying orders requiring coordination are complete and consistent; (10) the procedures for notification of the provisioning schedule are complete and consistent; (11) the notification is timely; (12) manual coordination procedures with CLECs 16 and internal ILEC systems are defined; (13) procedures for addressing errors and exceptions are defined; and (14) escalation procedures are defined.

In one embodiment, system and processes used in the CO pertain to cutovers from ILEC switches to collocated or other CLEC switches. Such cutovers may fall into three primary categories: (1) orders submitted by the pseudo-CLEC 18 under the aegis of a participating CLEC 16, these orders typically not involving live customers but possibly involving LNP; (2) orders submitted by pseudo-CLEC 18 not under the aegis of a participating CLEC 16, these orders typically having ILEC simulated dial tone but not involving live customers or LNP; and (3) orders submitted by CLECs 16 involving live customers and possibly LNP. The primary purposes of observing the cutover is to verify that ILEC 14 complies with its internal policies and procedures, that ILEC 14 completes the work on the requested due date and time, and that ILEC 14 provisions the order correctly. To accomplish these objectives typically requires the coordinated efforts of several testing entity personnel at different locations, for example, at a NOC associated with CLEC 16 and at the ILEC CO in which the cutover will occur. Similarly, ILEC personnel associated with the CCC and the CO will typically be involved.

In a particular embodiment, pseudo-CLEC personnel involved in the cutover may include a coordinator, an initiator, an implementation contact, one or more MDF observers, and one or more CLEC observer and/or pseudo-CLEC NOC observer. A person may in certain cases fulfill two or more of these duties. For example, the coordinator is typically one of the MDF observers. A checklist may be provided to each participant detailing the responsibilities of the participant and any observation targets, which may improve consistency from test to test. Particular responsibilities may vary depending on the nature of the cutover. For example, a cutover involving an xDSL circuit might be conducted at least partially differently, and therefore tested at least partially differently, than a cutover involving a DS3 circuit. The participant checklists may be customized to each type of cutover (e.g., different checklists for xDSL and DS3 circuits) to improve the corresponding test.

Coordinator responsibilities may include, without limitation: (1) identify the ILEC cutover contact; (2) determine the total number of cutover lines for the CLEC 16 associated with the cutover; (3) obtain billing account numbers, company codes, carrier and customer name abbreviations, customer terminal locations, facility data, and any other suitable information from CLEC 16; (4) provide the collected CLEC information to the initiator, who is responsible for creating the associated orders; (5) collect, review, and understand ILEC documentation describing ILEC policies and procedures for cutovers and LNP implementation, recording any deficiencies in the documentation; (6) generate an initial cutover schedule and provide it to the initiator, with a PON associated with each test instance; (7) provide the initial cutover schedule to CLEC 16 and request the CLEC 16 to install switch translations; (8) forward an updated schedule received from the initiator to CLEC 16 and request subscription record staging; (9) interface with the implementation contact and assist in escalating lack of dial tone, improper staging, or other issues to CLEC 16; (10) notify the ILEC cutover contact a specified time (e.g., two days) prior to the cutover execution for access to the ILEC CO; (11) coordinate the efforts of the remaining team members in during cutover execution (i.e. MDF observer and CLEC NOC and/or pseudo-CLEC NOC observers); (12) following cutover execution, generate a list of LNP telephone numbers, including the PON, the date ported, and other suitable information; and (13) create a provisioning verification report that documents pertinent observations and anomalies associated with the coordinated cutover.

Iniator responsibilities may include, without limitation: (1) writing the order corresponding to the cutover; (2) receiving the initial schedule from the coordinator; (3) informing the coordinator and implementation contact of schedule changes and updating the schedule accordingly; and (4) submitting the order to the ILEC 14 and verifying the information on the confirmation from ILEC 14.

The implementation contact is the interface between the ILEC CCC, CLEC 16, and the coordinator. The implementation contact responsibilities may include, without limitation: (1) logging planned calls from the CCC for each cutover order (e.g., two days prior, one hour prior, and following execution for closure) and calls from the CCC to report a lack of dial tone, unstaged subscription records, or other issues; and (2) refer information received in CCC calls to the coordinator and the CLEC NOC observer.

MDF observer responsibilities may include, without limitation: (1) under the direction of the coordinator, observe ILEC personnel performing the cutover within the ILEC CO and note any pass/fail criteria from appropriate test templates (e.g., five minute circuit monitoring, correct power level reading, head-to-head testing to verify the coding and framing, error detection, all circuits are tagged and identifiable, etc.); (2) notify the CLEC NOC observer that the MDF portion of the cutover is complete; and (3) following notification from the CLEC NOC observer that the subscription record is active, verify one or more ILEC trigger translations.

CLEC NOC observer responsibilities may include, without limitation: (1) at some time (e.g., one day) before the cutover is executed, visit the CLEC NOC and review with CLEC personnel the procedures the CLEC NOC observer will observe and perform; (2) in response to notification that the MDF portion of the cutover is complete, request the CLEC 16 to activate the subscription record; and (3) initiate a test call and inform the MDF observers of the "call treatment" received (e.g., call the donor switch to verify application of non-conditional trigger).

Figure 13:
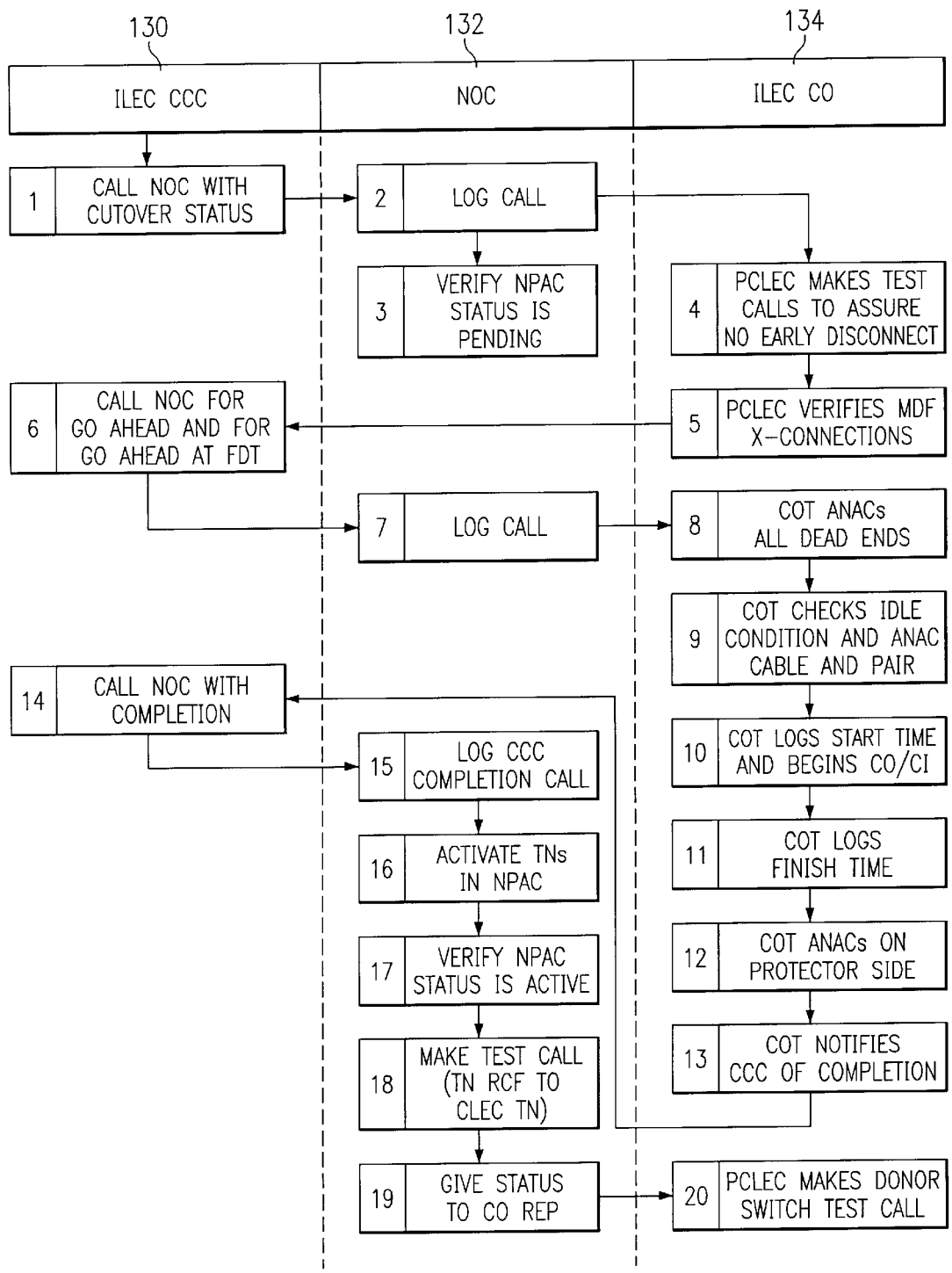
FIG. 13 illustrates an example coordinated cutover process.

FIG. 13 illustrates an example process for performing such a coordinated cutover in the context of the POP Provisioning Coordination Test. Activities that occur within the ILEC CCC are indicated in a first column 130, activities occurring within the CLEC NOC or pseudo-CLEC NOC are shown in a second column 132, and activities occurring within an ILEC CO are shown in a third column 134. The illustrated process may supplement or combine with the description above in any suitable manner according to particular needs.

Aspects of the POP Provisioning Parity and Provisioning Coordination Tests may be combined, if appropriate, into an overall POP Provisioning Process Test that evaluates: (1) parity of the complete set of processes, procedures, systems, and tools used by ILEC 14 when provisioning services for CLECs 16; and (2) the processes, procedures, systems, and tools used in supporting coordinated provisioning with the CLECs 16. Organizations within ILEC 14 that contribute to the provisioning process are tested. Such organizations may include order processing, translations, facilities management, dispatch, inventory, problem resolution, engineering systems, and any other suitable organizations. The objectives of this test may include: (1) determine the completeness and consistency of ILEC provisioning processes and verify that the processes and systems used to provision retail and wholesale orders are in parity; (2) determine whether the provisioning processes are correctly documented, maintained, and published; (3) determine the accuracy, completeness, and functionality of ILEC procedures for measuring, tracking, projecting, and maintaining provisioning process performance; (4) ensure that the provisioning coordination processes have effective management oversight; and (5) ensure responsibilities for provisioning coordination processes performance improvement are defined and assigned.

The testing methodology initially consists of interviewing ILEC SMEs in the provisioning processes, reviewing ILEC documents that describe internal processes and procedures, and verifying the ILEC's adherence to processes, procedures, and confirming parity. The interviews provide insight into the contributions of various ILEC organizations. Requests for data are made to these organizations to supplement the interviews. Data may include documentation or sample output from systems or tools used. Furthermore, discussions may be conducted with one or more CLECs 16 to understand their experiences and issues with the provisioning processes. When appropriate, data may be collected from CLECs 16. Data may include documented issues, documents and deliverables from ILEC 14, schedules, and internal CLEC documents. Information from the CLECs 16 may be used as secondary sources in assisting the testing entity in preparing interview questions. CLEC data may also be cross-referenced against suitable ILEC systems to confirm ILEC adherence to and consistency with its stated processes and level of parity. Specific test scenarios may be created to test specific process operations. Collected information is analyzed and assessed based on defined test objectives and criteria. If necessary, further requests for interviews and/or data are made to assist in the analysis. Once the analysis is complete, the testing entity prepares a report summarizing its findings. The process areas, sub-process areas, evaluation measures, evaluation criteria, and considerations used in this test may include any appropriate combination of those from the POP Provisioning Parity and Provisioning Coordination Tests described above, together with any other that may be appropriate.

Based on evaluation checklists or otherwise, test results may be generated ("Satisfied," "Not Satisfied," etc.) and comments provided for each of the evaluation criteria used in the particular instance of the test.

L. POP Scalability Test

This test evaluates certain architectural and operational aspects of the ILEC's OSSs 12 relating to the access CLECs 16 are provided to the OSSs 12 in connection with POP Domain activities. This test seeks to determine the degree to which this CLEC access environment can be scaled to accommodate future order of magnitude increases in transaction volumes and users. This may include a review of certain ILEC business processes as to their ability to support scaling of the CLEC access environment. Such business processes may include business forecasting, capacity planning, software development methodology, vendor selection methodology, or any other suitable business processes.

The environment to be reviewed encompasses ILEC OSS access system 20, including EDI interface 30, GUI interface 32, and manual interface 34 for the POP Domain functions. The primary architectural components of these systems that are evaluated may include, without limitation: (1) network infrastructure; (2) hardware infrastructure; and (3) software infrastructure, including one or more applications, tools, packages, middleware, databases, or other software components. Performance and utilization metrics may be reviewed to determine the present utilization of each architectural component. Appropriate business and application growth projections may be reviewed to determine the expected growth of each architectural component. ILEC-preferred vendors may be evaluated with respect to continuous improvement, service level, industry leadership, market position, or other drivers that might affect their ability to provide scalable products to meet future capacity projections.

The sources of data for this test may include walk-throughs, interviews with associated ILEC personnel, review of associated ILEC documentation, and any other information sources. More particularly, activities might include, without limitation: (1) identifying interface, process, and system objects for evaluation, identifying all documentation concerning these evaluation objects that is available for review; (2) conduct structured interviews with appropriate key ILEC development and support personnel using interview guides and questionnaires; (3) review documentation for evaluation objects and capacity planning processes, tools, and reports using one or more appropriate checklists; (4) inspect the physical evaluation objects using one or more appropriate checklists; (5) review findings in light of the results from stress volume testing of EDI interface 30 to supplement conclusions; and (6) summarize finding and generate report.

Test target areas and their associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
| --- | --- | --- | --- |
| POP scalability | Evaluate mechanized interfaces | Capacity of the interface to support volumes. Scalability of the interface including, where applicable, qualities that may affect scalability such as modularity, maintainability, supportability, recoverability, and fault tolerance | 1–5, 28, 30 |
| | Evaluate manual processes | Capacity of the manual processes to support volumes Scalability of the manual processes, including, where applicable, qualities that may affect scalability such as flexibility, supportability, and reliability | 6–16, 19–22, 28, 30, 36 |
| | Evaluate systems | Capacity of the systems to support volumes Scalability of the systems | 20–28, 32–34 |
| Managing capacity | Identify and evaluate | Availability and completeness | 29–48 |

-continued

Test Target Areas and Measures

| Process Areas | Sub-Process Areas | Measures | Criteria |
| --- | --- | --- | --- |
| planning | procedures | of procedure Applicability and reliability of tools | |
| | Review staffing plans | Scalability of staff volume | 29–48 |

Evaluation criteria for this test may include any one or more of the following, in any suitable combination and without limitation:

Mechanized Interfaces: (1) EDI interface 30 is Y2K compliant; (2) an EDI migration path exists; (3) there are scalable connections between CLECs 16 and the ILEC's servers; (4) the network is sized for current and projected usage; and (5) the ILEC 14 supports appropriate network protocols for current and projected usage.

Manual processes: (6) ILEC 14 has the capability to handle fax and other paper source documents arriving from CLECs 16; (7) the number of paper source documents arriving from CLECs 16 per day is manageable with existing or planned process and staff; (8) there are plans to eliminate or replace the function of receiving paper source documents from the CLECs 16; (9) there is an established process for confirming to CLECs 16 the receipt of paper source documents; (10) there is an established process and sufficient number of people for collecting and distributing CLEC faxes; (11) there is an established process for addressing exception processing; (12) the number of persons entering data through CLEC access system is adequate; (13) there is an established process for entering information from source documents via the appropriate ILEC OSS 12; (14) there is an established process for getting access to procedures associated with manual processes; (15) there is an established process for collecting and monitoring performance metrics; (16) performance is in fact monitored; (17) performance monitoring metrics are accessible by ILEC staff; (18) there is an established process for forecasting of expected business growth; and (19) there is an established process for reviewing forecasts for accuracy.

Systems: (20) the operating systems in use will scale up to support projected growth; (21) the total amount of disk space per server is sufficient; (22) there is an established capacity planning methodology; (23) there are redundant sites used for processing orders; (24) there is an established disaster planning methodology; (25) tape back-up facilities are available; (26) there is an established process for capacity planning and design; (27) there is an established methodology for maintaining and improving current service levels; and (28) there is an established methodology for monitoring the abilities of vendors to scale.

Capacity Planning: (29) there is an established process of obtaining data to determine future growth patterns; (30) capacity planning procedures exist; (31) there is an established process for development of the capacity planning procedures and their use in support of scalability; (32) there is an established process for budgeting funds and resources to support capital initiatives; (33) quality is ensured during the capacity planning process; (34) scalability is accounted for in capacity planning; (35) capacity planning process is based on the use of industry best practices; (36) there is an established approach to scalability; (37) system growth and capacity is monitored and needs analysis is performed; (38) there is an established business-forecasting process to support capacity planning; (39) performance is monitored at acceptable levels; (40) performance monitoring software or utilities are used at each site; (41) databases are accounted for in the capacity planning process; (42) databases are ISO 9000 and Y2K compliant; (43) operating system metrics are routinely collected; and (44) capacity planning documentation is developed and available.

Staffing: (45) the number and timing of staff shifts for each working day is consistent with the workload; (46) physical limitations for future staffing, such as office space, equipment, or personnel are identified; (47) staff receives continuous training and/or cross training; and (48) there is an established approach to staffing management during peak volume periods.

Based on evaluation checklists or otherwise, test results may be generated ("Satisfied," "Not Satisfied," etc.) and comments provided for each of the evaluation criteria used in the particular instance of the test.

Instead of or in addition to the POP Scalability Test, a separate POP Capacity Management Test may be conducted. This test provides a detailed review of the safeguards and procedures in place to plan for, and manage, projected growth in use of the EDI interface 30, GUI interface 32, or any other shared systems for pre-order and order processing. The test will evaluate these functions for transaction volume tracking and forecasting, resource utilization tracking and forecasting, performance management procedures, and capacity management. The objective of the test is to determine the extent to which procedures to accommodate increases in the pre-order and order transaction volumes and users are being actively managed.

Operational analysis techniques will be used to test the pre-order and order capacity management processes. Structured interviews may be conducted with ILEC system administration personnel responsible for the operation of EDI interface 30, GUI interface 32, or any other shared systems for pre-order and order processing. These interviews may be supplemented with analysis of ILEC capacity management procedures and evidence of related activities such as periodic capacity management reviews; system reconfiguration and load balancing, and volume-increase induced upgrades. In one embodiment, test activities may include, without limitation: (1) review procedural and other documentation related to pre-order and order capacity management; (2) conduct interviews with key systems administration and support personnel as appropriate; (3) document findings; and (4) resolve exceptions.

Evaluation criteria for this test may include one or more of the following, in any suitable combination and without limitation:

Data Collection and Reporting of Business Volumes, Resource Utilization, and Performance Monitoring: (1) there is an established process to capture business and transaction volumes; (2) there is an established process for capturing resource utilization; (3) resource utilization is monitored for appropriate system components and elements; (4) there is reasonable use of instrumentation and other tools to collect resource utilization data; (5) performance is monitored at all applicable levels (e.g., network, database server, application server, client, etc.); and (6) there is reasonable use of instrumentation and other tools to monitor performance.

Data Verification and Analysis of Business Volumes, Resource Utilization, and Performance Monitoring: (7) there is an established process to forecast business volumes and transactions; (8) business volume tracking and forecasting data is at a suitable level of detail to use for capacity management; (9) there is an established process to review performance of the business and transaction volume forecasting process; (10) there is an established process for verifying and validating performance data; and (11) performance monitoring results are compared to appropriate service level agreements and other metrics System and Capacity Planning: (12) capacity management process is defined and documented; (13) resource utilization and capacity is considered in the planning process for capacity management; (14) performance monitoring results are considered in the planning process for capacity management; and (15) the capacity management procedures define performance metrics to trigger the addition of capacity, one or more load rebalancing operations, or system tuning.

Based on evaluation checklists or otherwise, test results may be generated ("Satisfied," "Not Satisfied," etc.) and comments provided for each of the evaluation criteria used in the particular instance of the test.

M&R Domain

The general purpose of testing within the M&R Domain is to evaluate the systems, processes, and other operational elements associated with the ILEC's support of certain M&R activities affecting its wholesale customers—CLECs 16. The M&R Domain testing is designed to evaluate ILEC functionality, evaluate its compliance with measurement agreements, and provide a basis for comparison with the parallel M&R systems, processes, and operational elements supporting the ILEC's own retail operations. The report generated by the testing entity should preferably allow the regulatory entity to assess the net impact of M&R Domain issues that it identifies on the ability of the CLECs 16 to operate in an open competitive environment for local telecommunications services in the particular jurisdiction of interest.

In one embodiment, the M&R Domain may be broken down into a number of primary test target areas including, without limitation, key M&R systems, the M&R process, M&R performance measurement, M&R system and process documentation, M&R help desk support, network surveillance support, and the coordination of joint meetings with CLECs 16. Each primary test target areas may be broken down into increasingly discrete process and sub-process areas that identify particular areas to be tested and the types of measures that apply to each area. According to the present invention, tests have been developed to evaluate each test target area based on the scope of testing to be performed in each area. Particular exempla process and sub-process areas for each test target area, with exempla associated evaluation measures and evaluation criteria, are described in more detail below.

There need not be a one-to-one correspondence between test target areas and specific tests. In one embodiment, the M&R Domain tests may include one or more of the following, in any suitable combination and without limitation: (1) a MRTAS Functionality Test, (2) a MRTAS Performance Test, (3) a MRTAS Scalability Test, (4) a Performance Measurement Test, (5) a Process Test, (6) a Documentation Test, (7) a Help Desk Test, (8) a Network Surveillance Support Test, and (9) a CLEC Joint Meeting Coordination Test. Example embodiments of these tests are described in detail below.

A. M&R MRTAS Functionality Test

Figure 14:
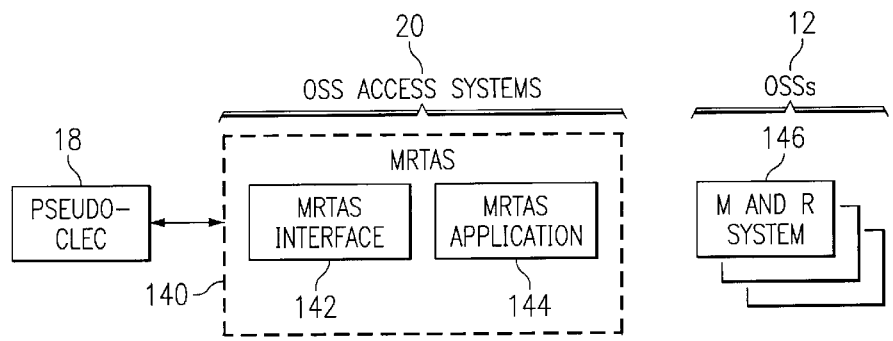
FIG. 14 illustrates an example system for maintenance and repair testing.

As described above with reference to FIG. 1, OSS access system 20 serve as a gateway between CLECs 16 and ILEC OSSs 12, providing pre-processing operations and an interface to "downstream" operations supported at these OSSs 12. In one embodiment, referring to FIG. 14, the OSS access system 20include a maintenance, repair, and trouble administration system (MRTAS) 140 providing a MRTAS application 142 and a web-based or other suitable MRTAS interface 144. CLECs 16, and thus pseudo-CLEC 18, may use MRTAS interface 144 as a front end to interface with the ILEC's "core factory" M&R systems 146, which are particular OSSs 12. In general, MRTAS 140 is meant to replace manual processes for testing circuits and for creating, monitoring, modifying, and closing any outstanding trouble tickets within the ILEC's M&R systems 146.

In one embodiment, MRTAS interface 142 includes a GUI that CLECs 16 may use to access MRTAS application 144 and, through MRTAS application 144, M&R systems 146. MRTAS interface 142 may support various screens (masks) for entering M&R transactions, which may include but are not limited to initiating a circuit test, creating a trouble ticket, checking the status of a trouble ticket, modifying a trouble ticket, closing a trouble ticket, accessing a trouble history, or any other appropriate M&R transaction. While MRTAS interface 142 is described primarily as web-based, communicating pages in HTML or XML over HTTP format for example, MRTAS interface 142 may support any suitable communications format according to particular needs. In general, MRTAS application 144 receives the M&R transactions from MRTAS interface 142, routes the transactions to the appropriate M&R systems 146 for processing, and returns responses received from the M&R systems 146 to MRTAS interface 142 for communication to the CLECs 16. MRTAS 140 may not actually perform any M&R functions itself.

Since multiple CLECs 16 may likely share MRTAS 140, several layers of security may be provided to limit unauthorized use and preserve data confidentiality. At the user level, the MRTAS 140 preferably limits access to users with at least a valid user ID and password. An additional level of security may be used to validate each M&R transaction. As an example, a transaction to modify a trouble ticket may require that the trouble ticket already have been created and communicated to M&R systems 146 for processing.

In general, this test evaluates whether: (1) the ILEC's MRTAS 140 performs as documented in ILEC reference documentation; and (2) MRTAS functionality is comparable to the functionality of systems used to support the ILEC's own retail customers. In one embodiment, this test is conducted in two corresponding phases, which may proceed in any suitable sequence or concurrently according to particular needs and capabilities.

In the first phase, existing MRTAS functionality is compared to the MRTAS functionality described in the ILEC's MRTAS reference documentation. To evaluate MRTAS 140, scenarios suitable for M&R testing are selected and MRTAS reference documentation is reviewed to determine how MRTAS 140 should process each of these M&R scenarios. As part of this process, the testing entity may consider the completeness, clarity, and usability of the MRTAS reference documentation. For each screen (mask) available through MRTAS interface 142 and appropriate for one or more selected scenarios, M&R transactions are submitted manually using a GUI and responses from the ILEC 14 are collected. Each of the functions available via MRTAS interface 142 are preferably performed. During the data entry process, any ILEC business rules for required or other fields may be validated, for example, to ensure that fields actually need to be completed and that invalid entries are flagged correctly. In one embodiment, scenarios selected for this test may include one or more of the scenarios listed in Appendix A, in any suitable combination and without limitation. In a particular embodiment, these scenarios may include scenarios 5, 7, 18–19, 30, 32, 37, 42, 86, 88–89, 91, 94, 99, 106, and 108–113. However, any suitable scenarios may be used according to particular needs.

In a particular embodiment, on submitting a transaction, the tester is notified via an acknowledgement that a server associated with MRTAS interface 142 has received the data. After the transaction has been routed by MRTAS 142 to the proper M&R system 146 and processed, a response is returned to the server and replaces the acknowledgement. In this case, timeliness of an acknowledgement depends of the timeliness of MRTAS interface 142 only, while timeliness of a response depends on the combined timeliness of MRTAS interface 142, MRTAS application 144, and the M&R system 146 exercised by the transaction. The testing entity verifies that each MRTAS function behaves properly (i.e. as documented), noting any anomalies or discrepancies between the MRTAS documentation and its actual behavior.

Trouble tickets created as a result of submitted transactions are preferably assigned a special "handle code" that MRTAS 140 interprets so as to prevent the dispatch of ILEC technicians without altering the manner in which the trouble tickets are processed within MRTAS 140. This may help to allow rigorous testing without disrupting the ILEC's regular business operations. Underlying causes of any errors are preferably analyzed. For example, an error might result from unclear MRTAS reference documentation, a tester error in entering data or in completing the wrong screen (mask), or a functional deficiency of MRTAS 140. Transactions involving user errors are preferably re-submitted. At the completion of the first phase of the test, the testing entity preferably ensures that all trouble tickets entered into MRTAS 140 have been canceled.

In the second phase, the existing MRTAS functionality is compared to the functionality of other systems supporting M&R activities for the ILEC's own retail customers. In one embodiment, the testing entity may conduct structured interviews of ILEC SMEs according to a previously prepared interview guide or questionnaire. In addition to prepared questions, ILEC SMEs may be asked to "talk through" how the ILEC personnel would handle particular scenarios. Information required for the ILEC personnel to process the scenarios may then be compared to the information required when these same scenarios are processed using MRTAS 140. Additional relevant information (e.g., additional capabilities) should be noted. The testing entity may also observe ILEC personnel performing their normal duties in supporting the ILEC's retail customers. During walk through inspections, testing entity personnel should observe any trouble report activities identified on a checklist provided, note the presence and behavior of functions identified on the checklist, identify anomalies relative to functions being observed, and note any functions available for ILEC retail operations that are not available through MRTAS 140. On-site visits and interviews may be supplemented with a review of relevant ILEC documentation or other suitable information.

Outputs from the test may include: (1) completed checklists from the first and second phase activities; (2) completed interview summaries; (3) summary reports of findings from each phase of the test, including discussion of anomalies and relevant observations as to the usability and timeliness of MRTAS interface 142 and its retail counterparts; and (4) a summary report comparing the functionality of MRTAS 142 with its retail counterparts, highlighting differences and contrasting ease of use in performing the functions tested.

Test target areas and their associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Access to test capability | Initiate circuit test | Functionality exists as documented | 1 |
| | | Timeliness | 2 |
| | | MRTAS usability | 3 |
| | | Document usability | 5 |
| | | Conformance to industry standards | 8 |
| Trouble reporting | Create/enter trouble report | Functionality exists as documented | 1 |
| | | Timeliness | 2 |
| | | MRTAS usability | 3 |
| | | Document usability | 5 |
| | | Conformance to industry standards | 8 |
| | Add information to trouble report | Functionality exists as documented | 1 |
| | | Timeliness | 2 |
| | | MRTAS usability | 3 |
| | | Document usability | 5 |
| | | Conformance to industry standards | 8 |
| | Modify trouble report | Functionality exists as documented | 1 |
| | | Timeliness | 2 |
| | | MRTAS usability | 3 |
| | | Document usability | 5 |
| | | Conformance to industry standards | 8 |
| | Retrieve trouble report status | Functionality exists as documented | 1 |
| | | Timeliness | 2 |
| | | MRTAS usability | 3 |

-continued

Test Target Areas and Measures

| Process Areas | Sub-Process Areas | Measures | Criteria |
|---|---|---|---|
| | | Document usability | 5 |
| | | Conformance to industry standards | 8 |
| | Cancel/close trouble report | Functionality exists as documented | 1 |
| | | Timeliness | 2 |
| | | MRTAS usability | 3 |
| | | Document usability | 5 |
| | | Conformance to industry standards | 8 |
| Trouble history | Retrieve trouble history | Functionality exists as documented | 1 |
| | | Timeliness | 2 |
| | | MRTAS usability | 3 |
| | | Document usability | 5 |
| | | Conformance to industry standards | 8 |
| General | Usability of MRTAS and associated documentation | MRTAS usability | 4–4 |
| | | Document usability | 5–6 |
| Functional equivalence | Functional equivalence | M & R functionality, process, and responsiveness for ILEC retail systems not materially different from MRTAS | 7 |

Evaluation criteria for this test may include, in any suitable combination and without limitation: (1) whether the user is able to submit the transaction or perform the operation using MRTAS 140 and receive a satisfactory response; (2) whether the user receives timely acknowledgements and responses; (3) whether MRTAS 140 is user-friendly with respect to the transaction or operation; (4) whether MRTAS 140 is user-friendly system for interacting with M&R systems 146 generally; (5) the ILEC reference documentation is adequate in relation to the transaction or operation; (6) ILEC reference documentation is adequate in relation to interactions with the M&R systems 146 generally; (7) MRTAS 140 provides functionality, process, and response times equivalent (at least not materially different from) M&R systems available to support the ILEC's retail customers; and (8) MRTAS 140 provides functionality in conformance to industry standards.

Based on evaluation checklists or otherwise, test results may be generated ("Satisfied," "Not Satisfied," etc.) and comments provided for each of the evaluation criteria used in the particular instance of the test.

B. M&R MRTAS Performance Test

This test evaluates the responsiveness of MRTAS 140 to CLECs 16 under normal and stress conditions. Performance may be measured with respect to any suitable historical, current, or projected transaction volumes. In one embodiment, if MRTAS 140 shares hardware, software, and other resources with ILEC provisioning systems, the execution of this test may be coordinated with appropriate POP Domain performance testing described above. Because this test is not designed to evaluate MRTAS functionality (see the M&R MRTAS Functionality Test described above) or the ILEC's M&R process (see the M&R Process Test described below), preferably only valid transactions are submitted and a special handle code (described above) is used to prevent dispatch of ILEC technicians.

Due to the high transaction rate required for MRTAS performance testing, interaction with MRTAS interface 142 is preferably automated using a scripting tool. For example, a scripting tool might include software that polls an instruction table for transactions to be submitted, collects appropriate information for these transactions from a data table, and sends transactions to MRTAS interface 142 in the appropriate sequence at a pre-defined rate. Transactions may be generated. and submitted using transaction engine 36 described above or a similar system designed specifically for M&R transactions as opposed to POP transactions.

Figure 15:
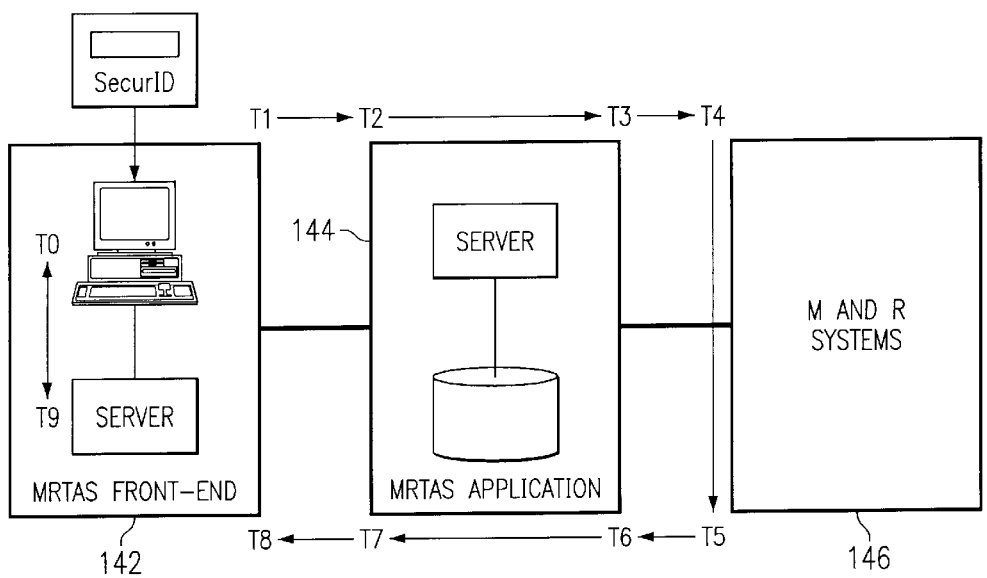
FIG. 15 illustrates an example data flow associated with maintenance and repair testing.

In one embodiment, from a tester perspective, trouble administration using MRTAS 140 is a two step process. Referring to FIG. 15, in a first step, M&R transactions are submitted to M&R systems 146 using an appropriate GUI (through MRTAS interface 142 and MRTAS application 144) and responses are returned to a server associated with MRTAS interface 142. This is illustrated using arrows T1 through T7. Subsequently, a separate query is used to retrieve responses from the server, illustrated using arrow T9. The time "T1T8" is a function of the combined responsiveness of the MRTAS interface 142, the MRTAS application 144, and the M&R systems 146 and the connectivity between them. Because the purpose of this test is to test MRTAS performance only, a suitable time interval for this test may be defined as time "T2T7"—the interval from receipt of an instruction by MRTAS application 144 to exit of a response from MRTAS application 144. Use of this interval to measure MRTAS performance might not be appropriate unless the links providing connectivity between MRTAS application 144 and the M&R systems 146 have sufficient capacity to prevent bottlenecks or any other sources of delay during testing. In the preferred case, times "T3T4" and. "T5T6" are substantially constant and substantially independent of transaction volume. In addition, the responsiveness of M&R systems 146 (time "T4T5") should be substantially unaffected by changes in wholesale volumes, which typically account for only a small percentage of the total M&R volumes. In one embodiment, time "T0T9" is not evaluated, since it depends on the connectivity between the CLEC front-end GUI and the server associated with MRTAS interface 142, which may be vary among CLECs 16. For example, some CLECs 16 might have 56 kbps access to the server while others might have much faster T1 access. In addition, CLECs 16 might have the option to bypass MRTAS interface 142 in favor of other mechanisms for submitting transactions. However, time "T0T9" may be evaluated where appropriate.

Specific activities for this test may include, without limitation: (1) create test cases based on M&R scenarios, each of which may support testing of a number of MRTAS functions, preferably so that all scenarios are represented and all functions are covered; (2) after the test cases have been created, develop and document a test approach and expected results for each test case using MRTAS documentation (the actual test results may be subsequently compared with this document); (3) use these documents to provide the data to execute the test (where the exact data required to perform certain functions cannot be predetermined, due to the logic embedded in the MRTAS 140 or otherwise, ILEC MRTAS documentation may also be used during test execution and any errors or discrepancies in the documentation noted as input to the M&R Documentation Test); (4) feed transaction sets to MRTAS 140 using the transaction engine 36 or otherwise; (5) periodically exercise MRTAS functionality manually during test execution, in addition to use of the transaction engine 36, and evaluate accessibility of MRTAS interface 142 where appropriate; (6) observe and record all performance, operability, and other information relevant to the evaluation criteria for the test, preferably automatically capturing certain performance data using MRTAS 140 and transaction engine 36; (7) ILEC 14 preferably monitors MRTAS interface 142 to identify any bottleneck conditions; (8) ensure all generated trouble tickets are canceled/closed; (9) request the ILEC 14 to reset the test bed for the next test (if appropriate) or clean up ILEC production databases; (10) analyze execution, observation, and performance reports; and (11) document the findings and generate summary report. Activities (1) through (3) may be considered to be entrance criteria for the test, along with all global entrance criteria having been satisfied. Exit criteria may be limited to global exit criteria.

Similar to the POP EDI Interface Functional Test described above, MRTAS responsiveness is preferably tested under three conditions: (1) present day loads, (2) projected future loads, and (3) stress loads. In an example embodiment, each day consists of eleven base hours and one peak hour, transaction volume for a peak hour being 150% of transaction volume for a base hour. In a pure test environment, the stress test might evaluate MRTAS performance under exponentially or otherwise increasing transaction volumes until the point of failure. However, where MRTAS testing is conducted in a production environment, it may be desirable to simply scale the peak volumes by 150% for the stress test. Any appropriate relationship between the base, peak, and stress volumes may be established. The present invention also contemplates testing only a single volume (e.g., peak) rather than multiple volumes (e.g., peak and stress) that are higher than normal. In a particular embodiment, the test involves approximately four hours of normal volume testing, an approximately thirty minute ramp up to the peak volumes, approximately one hour of peak volume flow, and an approximately thirty minute ramp down to the normal volumes. The process may be repeated as often as desired, for example, executing this pattern on two successive days.

As just one example, a present transaction volume for purposes of this test may be computed as follows: (1) determine the total number of circuits leased from ILEC 14; (2) based on the historical rate of trouble reports as a percentage of leased circuits, determine the number of trouble reports generated per month; (3) using the assumption that a certain percentage of all these trouble reports occur on weekdays, determine the average number of daily trouble reports per weekday; (4) assuming each day consists of eleven base hours and one peak hour at 150% of the base hour volume, determine the base hour and peak hour trouble report rates; (5) determine a suitable distribution of transactions among the various M&R transaction types using historical data or in another suitable manner; (6) determine the rates for each type of transaction; (7) if the test will be executed in the ILEC's production environment, reduce the rates by the estimated rates of live transactions that will also be processed during the test; (8) where the rates for certain types of transactions are less than one per hour, adjust the rates such that at least one transaction of each transaction type will be submitted each hour; and (9) where the rate for any specialized transaction must match the rate for some other transaction, adjust the rates accordingly. Where there are multiple types of lessees of leased ILEC circuits, these or other suitable calculations may be separately applied to each type of circuit. The projected future loads and stress loads may be determined analogously, using suitable forecasts and scaling factors, respectively. It may be desirable to conduct stress testing at a time when the number of live transactions is relatively minimal, such as in the evening or on a weekend (the estimated number of live transactions being adjusted downward accordingly).

Test target areas and their associated evaluation measures are summarized in the table below. The last column of the table indicates how evaluation criteria may, in one embodiment, correspond to particular evaluation measures.

| Test Target Areas and Measures | | | |
|---|---|---|---|
| Process Areas | Sub-Process Areas | Measures | Criteria |
| Access to test capability | Conduct circuit test | Performance degradation | 1–8 |
| Trouble reporting | Create trouble ticket | Performance degradation | 1–8 |
| | Status trouble ticket | Performance degradation | 1–8 |
| | Modify trouble ticket | Performance degradation | 1–8 |
| | Cancel/close trouble ticket | Performance degradation | 1–8 |
| Trouble history access | Access trouble history | Performance degradation | 1–8 |

Evaluation criteria for this test may include, in any suitable combination and without limitation: (1) correctness of the response at normal volumes; (2) correctness of the response at peak volumes; (3) correctness of response at stress volumes; (4) timeliness of the response at normal volumes as compared to ILEC specifications or other standards; (5) timeliness of the response at peak volumes volumes as compared to ILEC specifications or other standards; (6) timeliness of response at stress volumes; (7) timeliness of response at stress volumes as compared to ILEC specifications or other standards; and (8) MRTAS performance does not degrade significantly at peak volumes versus performance at normal volumes. Results may be expressed as raw data or may be expressed using any appropriate statistical techniques (e.g., median, mean, standard deviation, variance, etc.).

Based on evaluation checklists or otherwise, test results may be generated ("Satisfied," "Not Satisfied," etc.) and comments provided for each of the evaluation criteria used in the particular instance of the test.

C. M&R MRTAS Scalability Test

This test evaluates the technical and operational environment associated with the ability of CLECs 16 to access ILEC OSSs 12 in connection with M&R activities. The test is designed to determine the degree to which this technical and operational environment can be scaled up to accommodate order of magnitude increases in the transaction volumes and users. The test focuses on MRTAS 140, including MRTAS interface 142 and MRTAS application 144. Aspects of ILEC M&R process are also evaluated in terms of their ability to support such scaling (the overall M&R process may be evaluated in the M&R Process Test, as described below). No actual system testing is conducted as part of this evaluation—conclusions about the ILEC's ability to scale its M&R environment is based on inspections, interviews with ILEC subject matter experts, review of pertinent ILEC documentation, and the like. This test may be performed as part of a more comprehensive scalability evaluation of OSS access system 20. Moreover, instead or in addition to this test, a separate M&R Capacity Management Test may be performed, analogous to the POP Capacity Management Test described above.

In general, this test is designed to provides a detailed review of a variety of MRTAS features relating to scalability, including but not limited to: (1) its overall modularity; (2) the architectures and designs of its associated network, databases, hardware, software, and other resources; (3) associated development methodologies and practices; (4) performance monitoring and management capabilities; and (4) the associated personnel. Entrance criteria may include that all global entrance criteria have been satisfied, an appropriate test-specific interview guide or questionnaire has been developed, interviewees have been identified and scheduled, and a detailed evaluation checklist has been completed. Test activities are preferably conducted by experienced Information Technology (IT) professionals and may include: (1) collect appropriate information; (2) perform walkthrough inspection of ILEC facilities that may be relevant to scalability; (3) perform structured interviews and documentation reviews; (4) evaluate current performance and utilization metrics for each technical component within the environment to determine its present level of utilization; (5) determine the extent to which each technical component can scale based on industry experience, appropriate benchmarks, vendor declarations, and any other information; (6) evaluate any business and other suitable growth projections to determine what growth may be expected for each technical component; (7) evaluate the pertinent business processes to determine their ability to support the scaling of the technical components; (8) complete the evaluation checklist and interview summaries; and (9) develop and document findings in report. Exit criteria may be limited to global exit criteria.

Test target areas and their associated evaluation measures are summarized in the table below. The last column of the table indicates how evaluation criteria may, in one embodiment, correspond to particular evaluation measures.

Test Target Areas and Measures

| Process Areas | Sub Process Areas | Measures | Criteria |
|---|---|---|---|
| MRTAS Scalability | | Scalability<br>In addition to scalability, the components are evaluated, where applicable, for these qualities that can affect scalability:<br>Modularity<br>Maintainability<br>Supportability<br>Recoverability<br>Fault tolerance | 1–10 |

Evaluation criteria for this test may include any one or more of the following, in any suitable combination and without limitation: (1) scalability is a key driver in determining capacity planning; (2) scalability is performed at all stages during life of an initiative; (3) volumes being processed are monitored regularly; (4) processes for business forecasting are in place and are used to determine long range capacity; (5) ISO-9000 compliance is certified; (6) the software is designed and developed using a formal methodology; (7) software architecture is flexible, including loosely coupled but cohesive components that scale independently of one another; (8) the routing of requests is data-driven (e.g., table- or file-driven) as opposed to manual; (9) ILEC 14 has defined software maintenance process according to which software is monitored regularly; and (10) interfaces to CLECs 16 conform to industry standards.

Based on evaluation checklists or otherwise, test results may be generated ("Satisfied," "Not Satisfied," etc.) and comments provided for each of the evaluation criteria used in the particular instance of the test.

D. M&R Metrics Test

The test provides a comprehensive evaluation of ILEC systems and processes used to capture metrics associated with its retail and wholesale M&R operations. In one embodiment, the focus is on the capture, tracking, and reporting of M&R metrics required by the regulatory entity. The test provides a structured review of the M&R data processing, metrics calculation, and metrics reporting systems and processes, which may focus on: (1) metrics replication, using ILEC data and algorithms to re-calculate metric values for a specified time period to determine the accuracy of the ILEC calculations, (2) a data integrity evaluation that focusing on ILEC processes used to filter raw data for use in calculating metric values, and (3) statistical analysis to compare metric values for the ILEC's wholesale operations with the values for the ILEC's retail operations or with suitable standards. In one embodiment, this test may be conducted as a part of, or supplemented by, a more comprehensive Performance Metrics Test that evaluates ILEC systems, processes, and other operational elements associated with its support for performance metrics, most preferably across multiple domains.

Metrics generation typically involves ILEC 14 gathering raw data concerning transactions, filtering the data as appropriate, storing the filtered data in one or more databases, and generating reports based on the stored data. In one embodiment, this test may include: (1) surveillance of the ILEC's trouble report processing activities associated with its M&R systems 146; (2) review of ILEC M&R documentation; (3) structured interviews with ILEC SMEs; (4) re-calculating ILEC M&R metrics for a specified time period, using the ILEC's data and algorithms to attempt to replicate the ILEC's metric values; (5) verifying that filtered data used to calculate ILEC metrics was correctly generated from the raw data; and (6) statistically comparing the metrics generated during testing to standards or the ILEC's retail metrics, depending on the metric. The testing entity may also observe CLEC activities and interview CLEC personnel to further validate one or more of these test components.

Surveillance

Surveillance of the ILEC's trouble report processing activities, reviewing its documentation, and interviewing its SMEs may all be performed in an effort to accurately capture the M&R process flows, in the form of diagrams, descriptions, or otherwise. These M&R process "maps" are then preferably submitted to ILEC 14 to confirm their accuracy. Following confirmation of their accuracy, the maps may be used to identify differences between ILEC M&R systems and processes for retail and wholesale operations, as described more fully below in connection with the M&R Process Parity Test. Differences identified prior to the completion of the structured interview component may be incorporated into interviews, for example, to allows ILEC 14 to explain the reasons for such differences.

Metrics Replication

To determine whether the ILEC 14 accurately calculates and properly reports its M&R metrics, the testing entity attempts to re-create these metrics using ILEC 14 filtered data, ILEC 14 algorithms, and ILEC 14 descriptions of the metrics. For this purposes, ILEC 14 may develop its own software that implements ILEC algorithms. Once the metrics have been generated, the testing entity can determine whether the calculated results match the results that ILEC 14 has reported.

Data Integrity

Since the metrics replication component uses filtered data, the testing entity may design and implement statistical samples to determine whether the filtered data used to calculate the metrics was correctly generated from the raw data. Due to the complexity of the information systems involved and the filtering processes used, it may not be possible to investigate all the systems and processes in the time available for testing. As a result, it may be desirable for the testing entity to determine whether a sufficiently reasonable level of confidence in the integrity of the ILEC filtered data can be established.

In one embodiment, the data integrity investigation involves the following steps, without limitation: (1) identify one or more fields in the filtered data that are used most often in the metric calculations (this determination may be made separately for each M&R function); (2) request that ILEC 14 identify where the earliest records of the data in these fields is located and which ILEC personnel can best explain the records; (3) drawing on interviews with suitable ILEC personnel, determine which of these records to inspect; (4) identify a random sample of transactions and request ILEC 14 to provide copies of the associated records (each sample may be "stratified" to ensure a representative cross-section); (5) treating the data in these records as the raw data with which the filtered data may be compared, compare this raw data with the filtered data for each sample; and (6) request the ILEC 14 to research and explain any unexpected entries encountered in the raw data.

The testing entity may trace the progress of transactions over the duration of the test period. For example, the testing entity may request data for all transactions submitted near the beginning of the test period and filtered data for all still pending requests for the entire test period. The testing entity may compare the data for the submitted transactions with the filtered data for the closed and pending requests to ensure there no unexpected disappearances or appearances. As for the sample-based comparisons described above, ILEC 14 may be given an opportunity to research and explain such discrepancies. If no significant unexplained discrepancies are found, a reasonable level of confidence has been attained.

Statistical Analysis

Using statistical techniques, the testing entity compares correctly calculated ILEC wholesale metrics (which may be the metrics generated by the testing entity rather than those generated by ILEC 14) with ILEC retail metrics or other suitable standards. Since the testing entity primarily relies on data collected during the test period, test period conditions should be statistically similar to conditions outside of the test period. Furthermore, although the testing entity may verify certain ILEC-supplied data and probe data integrity in general, the testing entity may largely need to rely on the ILEC 14 to provide accurate test period data. Accordingly, the testing entity should have discussions with ILEC 14 personnel to understand how data is collected and processed so as to determine whether the data will allow for correct overall inferences (barring some deliberate tampering with the data). Other factors that may cause differences between the test and retail data, such as geography or complexity of issues, should be accounted for to the extent possible. For example, one geographic area may receive a higher level of service than another or might have a higher concentration of CLECs 16 than another, such that the ILEC 14 may be in parity within the area yet out of parity overall (or vice versa).

Test target areas and their associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
| --- | --- | --- | --- |
| Retail metrics | Network trouble report rate measurements and process | Accuracy | 1 |
| | Percentage of subsequent reports measurements and process | Accuracy | 1 |
| | Missed appointments measurements and process | Accuracy | 1 |
| | Repair interval measurements and process | Accuracy | 1 |
| Wholesale metrics | Network trouble report rate measurements and process | Accuracy | 1 |
| | Percentage of subsequent reports measurements and process | Accuracy | 1 |
| | Missed appointments measurements and process | Accuracy | 1 |
| | Repair interval measurements and process | Accuracy | 1 |

Evaluation criteria for this test include whether the metric at issue is reported accurately using proper metric calculation algorithms and data for which integrity has been properly maintained.

Based on evaluation checklists or otherwise, test results may be generated ("Satisfied," "Not Satisfied," etc.) and comments provided for each of the evaluation criteria used in the particular instance of the test.

E. M&R Process Test

This test evaluates the equivalence of the ILEC's end-to-end M&R processes for its retail and wholesale operations. In one embodiment, the test includes several parts, including but not limited to: (1) using M&R process flow "maps" to determine whether substantive differences exist between the ILEC's retail and wholesale M&R processes; (2) observing the ILEC trouble handling process from the perspective of one or more CLECs 16; and (3) executing selected test scenarios to analyze ILEC trouble handling performance for these scenarios.

For part one of the test, ILEC M&R process flows are mapped as described above in connection with the M&R Performance Metrics Test. As examples, the testing entity may create maps for M&R processes such as reactive maintenance for retail and wholesale single line POTS service. ILEC personnel may be interviewed using an appropriate interview guide or questionnaire in developing suitable process maps, as described above. The testing entity compares the process flows for ILEC retail and wholesale M&R operations to identify any differences and determine the business implications of such differences.

For part two of the test, the ILEC's trouble handling process is observed from the perspectives of one or more CLECs 16. As an example, testing entity personnel may spend a period of time, weeks for example, within CLEC network operations centers to monitor the end-to-end trouble handling process from the perspective of CLECs 16 for trouble tickets created during the time period. The testing entity is thereby able to identify issues and problems CLECs 16 encounter with respect to the ILEC's trouble handling process. Appropriate CLEC personnel associated with these network operation centers may be interviewed to discuss such issues and problems. ILEC reports for trouble tickets that the observed CLECs 16 create during the test period may also be analyzed in relation to observations made at CLEC NOCs.

For part three, selected test scenarios are executed using the ILEC's test bed circuits to obtain a sample of ILEC M&R service performance measures for certain types of trouble repair scenarios. In one embodiment, test scenarios appropriate for this test may include scenarios 86–89, 94, 99, 106, 108, 110, and 113–114 listed in Appendix A. However, the present invention contemplates any suitable scenarios being used. The testing entity provisions the test bed circuits to execute the selected scenarios and has ILEC 14 insert faults, corresponding to the requirements of the particular scenarios, into the test bed circuits. After insertion of the faults, the testing entity creates trouble tickets using the MRTAS 140 to cause ILEC technicians to be dispatched to repair the faults.

Resolutions of the inserted faults are tracked through the ILEC M&R process. All contacts with the ILEC 14, activities of its personnel, and significant events are preferably observed and recorded (e.g., test request time, dispatch decision, dispatch rationale, dispatch time, trouble report submission time, time the trouble was cleared, time notice of completion was received, CLEC notifications, etc.). Upon receiving notification of a completed repair from ILEC 14, the testing entity will preferably physically, visually, or otherwise verify that the inserted fault was actually repaired. The testing entity analyze the ILEC trouble handling performance for the particular M&R scenarios tested, which preferably allow certain inferences to be made as to ILEC performance generally. Interested CLECs 16 may be invited to participate in the fault insertion, repair, and reporting process, the testing entity managing CLEC involvement to ensure that ex parte CLEC-ILEC contact (i.e. direct contact between CLEC 16 and ILEC 14 not involving the testing entity) is avoided.

Test target areas and their associated evaluation measures are summarized in the table below. The last column of the table indicates how evaluation criteria may, in one embodiment, correspond to particular evaluation measures.

| Test Target Areas and Measures | | | |
|---|---|---|---|
| Process Areas | Sub-Process Areas | Measures | Criteria |
| End to end process - resale | Process flows | Comparison of wholesale with retail | 1 |
| End to end process - UNE-P | Process flows | Comparison of wholesale with retail | 2 |
| End to end process - UNE-L | Process flows | Comparison of wholesale with retail | 3 |
| End to end process - Resale | M & R scenario testing | Timeliness and accuracy | 4 |
| End to end process - UNE-P | M & R scenario testing | Timeliness and accuracy | 4 |
| End to end process - UNE-L | M & R scenario testing | Timeliness and accuracy | 4 |

Evaluation criteria for this test may include one or more of the following, in any suitable combination and without limitation: (1) parity between the ILEC retail and resale M&R processes; (2) parity between ILEC retail M&R processes and ILEC M&R processes for UNE-P; (3) parity between ILEC retail M&R processes and ILEC M&R processes for UNE-L; and (4) ILEC 14 repairs a fault in a test bed circuit for a specified scenario within a specified time after ILEC 14 receives the trouble ticket from the testing entity via MRTAS 140, the time to clear possibly depending on the particular scenario. Considerations relevant to the first three evaluation criteria may include, without limitation: (1) ILEC 14 meets commitment times to CLECs 16; (2) on repair completion, ILEC 14 reports correct disposition code to CLEC 16; (3) upon initiation by CLEC 16 of a designed trouble report, ILEC 14 provides a trouble ticket number; (4) upon initiation by CLEC 16 of a trouble report, ILEC 14 provides an estimated time to repair; (5) the ILEC 14 provides CLECs 16 large business user trouble report priority handling as may be done with the ILEC's large business user trouble reports; (6) the ILEC 14 provides status information on a trouble ticket upon request from CLEC 16; (7) the ILEC 14 provides escalation of a trouble report upon request from CLEC 16; (8) ILEC 14 notifies CLECs 16 upon resolution of trouble reports; (9) ILEC 14 notifies CLECs 16 of missed repair appointments at parity with the ILEC's retail customers, using the same time frames it uses for its own end users, itself, or other entities; (10) ILEC 14 will initiate a dispatch upon request from CLEC 16; (11) ILEC 14 will contact CLECs 16 to authorize premise visits; (12) ILEC 14 will quote to CLEC 16 time and charges applicable at the completion of a premise visit; (13) ILEC 14 will notify CLECs 16 if a subsequent premise visit is necessary; (14) ILEC 14 will verify and repair CO features and functions on trouble reports communicated to ILEC 14 by telephone; and (15) the ILEC 14 will transfer a call or provide the telephone number for the duty supervisor in the repair center if requested by CLEC 16.

Based on evaluation checklists or otherwise, test results may be generated ("Satisfied," "Not Satisfied," etc.) and comments provided for each of the evaluation criteria used in the particular instance of the test.

F. M&R Documentation Test

This test evaluates ILEC documentation that CLECs 16 use to interact with ILEC 14 with respect to their M&R activities. The test is designed to evaluate the structure and content of the M&R documentation and M&R sections of other ILEC documentation in terms of clarity, accuracy, and completeness. The test may also evaluate document management processes associated with such documentation, for example, production, distribution, revision, and quality control processes for M&R related documentation. The evaluation of whether M&R functionality matches the functionality described in the ILEC documentation is preferably evaluated as part of the M&R MRTAS Functionality Test described above.

Entrance criteria for the test may include all global entrance criteria having been satisfied, an appropriate test-specific interview guide or questionnaire having been developed, interviewees having been identified and scheduled, and a detailed document evaluation checklist having been developed. Test activities may include, without limitation: (1) collect all appropriate information; (2) perform interviews and review documentation; (3) evaluate the quality of the ILEC's M&R documentation; (4) complete the evaluation checklist and interview summaries; and (5) develop and document findings. Exit criteria may be limited to global exit criteria. The ILEC's M&R documentation reviewed may include, for example, internal ILEC documents, CLEC "handbooks," CLEC "student guides," or any other suitable documents. The interviewees are preferably SMEs with direct responsibility for and knowledge of targeted documentation. CLEC representatives may also be interviewed to validate various observations made during other parts of the test.

Test target areas and their associated evaluation measures are summarized in the table below. The last column of the table indicates how evaluation criteria may, in one embodiment, correspond to particular evaluation measures.

methods for CLECs 16 to indicate errors or omissions in documentation.

Document Structure and Format: (6) version is indicated in each document and is clear throughout document; (7) documentation provides cross-references and has clear citations directing readers to relevant sources of additional information; (8) documentation indicates scope and purpose; and (9) the documentation is logically organized (e.g., clear page numbering and section labeling, table of contents, glossary of terms, explanation of acronyms, etc.).

Document Content: (10) the documentation describes how to access MRTAS related systems; (11) the documentation clearly defines how to navigate the MRTAS related systems (e.g., use of screens (masks)); (12) documentation defines data entry fields for creating, checking status, modifying, and closing trouble tickets; (13) the documentation defines data entry fields for diagnostic testing; (14) documentation explains the acceptable formats for data fields; (15) the documentation distinguishes between required and optional fields; (16) documentation defines possible options after data entry (e.g., save, send, cancel, etc.); (17) documentation describes expected system responses and outputs; and (18) documentation provides descriptions of error messages and possible steps for resolution.

Evaluation criteria relating to the MRTAS on-line help facility may include one or more of the following, in any combination and without limitation: (19) the facility defines data entry fields for diagnostic testing and creating, checking status, modifying, and closing trouble tickets; (20) the facility provides descriptions of error messages and possible

Test Target Areas and Measures

| Process Areas | Sub-Process Areas | Measures | Criteria |
|---|---|---|---|
| M & R documentation | MRTAS reference documentation for CLECs | Adequacy of procedures for addressing document production, distribution, revision, and quality control | 1–5 |
| | | Structure and format of document | 6–9 |
| | | Content in terms of clarity, accuracy, completeness | 10–18 |
| | MRTAS on-line help | Structure and format of document | 21–22 |
| | | Content in terms of clarity, accuracy, completeness | 19–20 |
| | CLEC handbook (M & R sections) | Structure and format of document | 23–29 |
| | | Content in terms of clarity, accuracy, completeness | 30–36 |
| | CLEC student guide (M & R sections) | Structure and format of document | 23–30 |
| | | Content in terms of clarity, accuracy, completeness | 31–36 |
| | Management of M & R documentation generally | Adequacy of procedures for addressing document production, distribution, revision, and quality control | 37–43 |

Evaluation criteria relating to MRTAS reference documentation may include one or more of the following, in any combination and without limitation:

Document Management: (1) responsibilities and procedures for developing, updating, and correcting documentation are clearly defined; (2) responsibilities and procedures for maintaining distribution lists and for distributing documentation are clearly defined; (3) distribution procedures allow latest versions of documentation to be made available to interested parties in timely manner; (4) training is provided for use of documentation; and (5) ILEC 14 provides steps for resolution; (21) user navigation guides are provided as part of or in association with the facility; and (22) the facility provides cross-references to other sources for completeness.

Evaluation criteria relating to CLEC handbooks or CLEC student guides may include one or more of the following, in any appropriate combination and without limitation:

Document Structure and Format: (23) the documentation states the scope and purpose of M&R activities; (24) the documentation is logically organized (e.g., clear page numbering and section labeling, table of contents, glossary of terms, explanation of acronyms, etc.); (25) the documentation describes M&R sub-processes for which it is applicable; (26) documentation provides M&R contact list; (27) documentation provides cross-references to other sources for completeness; (28) the documentation provides procedures for the CLECs 16 to submit corrections or omissions; and (29) CLEC training is offered with documentation.

Document Content: (30) the documentation adequately describes the M&R process; (31) the documentation includes M&R process map; (32) the documentation contains methods and procedures to execute the M&R process; (33) the documented methods and procedures contain enough detail and clarity to execute M&R process; (34) the documentation includes expected results of the M&R process and its cycle time; (35) the documentation describes the exception handling process and provides contact information for unusual occurrences; and (36) the documentation identifies suppliers and customers (inputs/outputs) of the M&R process.

Evaluation criteria relating to the management of M&R documentation may include one or more of the following, in any combination and without limitation: (37) responsibilities and procedures for maintaining distribution lists and for distributing documentation are clearly defined; (38) documentation is distributed in a regular and timely fashion, ensuring that all process and procedural changes are captured; (39) training is provided along with documentation; (40) the distribution procedure allows latest document version to be made available to interested parties in electronic and paper versions in a timely manner; (41) responsibilities and procedures for developing and updating documentation are clearly defined; (42) document version annotations are clearly visible on the documentation and are consistently applied; and (43) the responsibilities and procedures for correcting errors made during M&R document production are clearly defined.

Based on evaluation checklists or otherwise, test results may be generated ("Satisfied," "Not Satisfied," etc.) and comments provided for each of the evaluation criteria used in the particular instance of the test.

G. M&R Help Desk Test

This test provides a comprehensive operational analysis of ILEC help desk processes supporting CLECs 16 with questions, problems, and issues relating to the M&R Domain activities. For example, the help desk may receive trouble calls from CLECs 16, may support CLECs 16 as to issues relating to trouble reports that have already been submitted, and may answer CLEC questions relating to M&R issues. The M&R help desk may be wholly or partially integrated with POP Domain help desk 50 described above and may refer CLECs 16 to other SMEs outside the help desk if appropriate. This test may evaluate the functionality, performance, escalation procedures, management oversight, security, or other aspects of the help desk.

In a particular embodiment, the test includes two parts: (1) procedural review of ILEC procedures for performing and managing help desk functions; and (2) an analysis of help desk performance based upon interaction between pseudo-CLEC 18 and the help desk during M&R Domain testing described more fully above. For the procedural evaluation, operational analysis techniques are used. The testing entity generates evaluation checklists to facilitate structured walk-throughs of the help desk processes and interviews with help desk personnel and management to discuss these processes. The testing entity also reviews ILEC documentation and may solicit input from CLECs 16 as to the ILEC's help desk performance.

Observations made during structured walk throughs of the ILEC help desk, structured interviews, and reviews of process documentation and historical call logs provide the primary sources of data for this part of the test. Walk throughs may provide the testing entity with a first-hand understanding of the responsibilities and performance of help desk personnel. ILEC process documentation provides further insight into the ILEC's operational processes. Historical call logs should allow the testing entity to assess the root cause of issues and the accuracy and timeliness of ILEC responses. Observations and interviews of appropriate CLEC personnel may increase knowledge as to help desk processes, provide an understanding of CLEC expectations for M&R support, and highlight M&R processes for scrutiny.

Observation targets for the walk-throughs may include, without limitation: (1) help desk logs containing information relating to help desk inquiries received; (2) contact information for certain help desk or management personnel; (3) an electronic "suggestion box" possibly associated with MRTAS interface 142 for receiving CLEC input; (4) read-only viewing of HTML pages or other files presented to CLECs 16 in association with MRTAS interface 142, for example, to verify that appropriate error messages are conveyed to CLECs 16; and (5) a training packet or other appropriate reference documentation that provides help desk personnel with descriptions of the error messages that may be generated and basic problem solving techniques to be used in relation to each such error message.

CLEC participation may be solicited in several ways. In one embodiment, CLECs 16 receive surveys requesting feedback on particular interactions with the help desk concerning M&R Domain issues. As an example, the testing entity may record the particular help desk (of possibly multiple help desks) that the CLEC 16 contacted, the CLEC's description of procedures ILEC 14 followed in responding to issues, and the CLEC's qualitative assessment of the level of support that ILEC 14 provided. In addition, CLECs 16 may be invited to participate in walk-throughs, to observe CLEC interaction with the help desk, to participate in related discussions, or to have other suitable involvement.

The performance evaluation relies on qualitative and quantitative analysis of selected data collected during M&R Domain transaction testing. In one embodiment, the testing entity establishes its own help desk within pseudo-CLEC 18 to interface with the ILEC's help desk. When issues arise during transaction testing, testers may direct their inquiries to the pseudo-CLEC help desk, which in turn places calls to the ILEC help desk to evaluate its performance in terms of responsiveness, timeliness of resolution, and accuracy of resolution. Interactions with the help desk are logged, typically including the date the issue was referred to the help. desk, the particular trouble report (if any) and issue, the outcome, the resolution date if any, and an error reason assigned following issue resolution. If immediate resolution is not achieved, the issue status may be tracked until resolution. Once a resolution is received at the pseudo-CLEC's help desk, it is communicated to a tester who may then take any appropriate action. To evaluate the ILEC's help desk performance, information in the issue logs is analyzed and organized by type or otherwise. In addition, interviews with pseudo-CLEC help desk personnel regarding their qualitative experience with the ILEC's help desk may be conducted.

Where MRTAS interface 142 is unavailable, M&R activity may instead be initiated by calling the ILEC help desk, where help desk personnel manually create a trouble ticket. Responsibility for the trouble ticket may then be transferred to ILEC personnel who identify the type of trouble and the affected network element, verify that the trouble ticket was entered correctly, and manage the M&R process to closure. Help desk personnel may access historical information about closed trouble tickets in performing these duties. Help desk personnel may also be tasked with coordinating M&R activities among the ILEC's technicians, CLEC technicians, and the help desk itself.

Test target areas and associated evaluation measures are summarized in the table below. More specific evaluation measures may be used to evaluate test target areas that pertain to specific trouble reporting or other M&R activities. The last column of the table indicates how the evaluation criteria may, in one embodiment, correspond to particular evaluation measures.

Test Target Areas and Measures

| Process Areas | Sub-Process Areas | Measures | Criteria |
|---|---|---|---|
| Call processing | Documentation | Clarity, accuracy, and completeness | 1–3 |
| | Call answer, logging, and prioritization | Existence, timeliness, and accuracy | 1–2, 4–10, 14–15 |
| Problem tracking and resolution | Documentation | Clarity, accuracy, and completeness | 1–3 |
| | Identify and resolve | Timeliness and accuracy | 1, 5, 18 |
| | Track problem, log status, close trouble ticket, and notify CLEC | Existence, timeliness, and accuracy | 1–2, 11 |
| Expedite and escalation procedures | Documentation | Clarity, accuracy, and completeness | 1–3 |
| | Identify and resolve | Timeliness and accuracy | 1, 5, 12–13, 18 |
| | Track problem, log status, close trouble ticket, and notify CLEC | Existence, timeliness, and accuracy | 1–2, 11, 14 |
| Help desk procedures in general | | Clarity, accuracy, and completeness | 1–2, 4, 11, 13, 16–19 |

Evaluation criteria for this test may include one or more of the following, in any combination and without limitation: (1) help desk process responsibilities and activities are clearly defined and understood; (2) the scope and objectives of the help desk process are clearly defined and understood; (3) a substantially complete (i.e. beginning-to-end) description of help desk process is clearly defined; (4) standard procedures are in place to handle with CLEC trouble calls; (5) help desk personnel know how to handle CLEC inquiries; (6) help desk personnel are aware of the ILEC procedures for logging trouble calls; (7) each trouble call is logged; (8) trouble calls are categorized into various types with standard responses for each type; (9) the help desk identifies and tracks the number of each different type of trouble; (10) the help desk tracks the number of repeat trouble calls; (11) the ILEC M&R technicians and help desk supervisors have processes for tracking various types of reported troubles; (12) help desk personnel know when to escalate complaints to a supervisor; (13) the help desk process includes handling of expedites and escalations; (14) the escalated trouble calls are logged in an acceptable format; (15) the trouble ticket entry process includes procedures for addressing any errors and exceptions made by the help desk personnel; (16) process performance measures are defined and measured; (17) the responsibilities for tracking performance are assigned to management personnel; (18) help desk process includes identifying and resolving CLEC problems; and (19) help desk process includes appropriate security measures.

Based on evaluation checklists or otherwise, test results may be generated ("Satisfied," "Not Satisfied," etc.) and comments provided for each of the evaluation criteria used in the particular instance of the test.

H. M&R Network Surveillance Support Test

This test evaluates the network surveillance and network outage notification processes and the associated operational elements of the ILEC 14, comparing these capabilities for the ILEC's wholesale products with those for retail counterparts sold to CLECs 16. ILEC 14 typically implements its network surveillance and network outage notification processes using one or more NOCs or the like.

In one embodiment, network elements available for sale to CLECs 16 and evaluated in this test may include, for example, inter-office facilities (IOFs) between COs, dedicated trunk ports on unbundled ILEC switches connecting them to CLEC collocations, Intelligent Network (IN) components, SS7 or other signaling links, and other suitable network elements. In general, outages are the result of unusual events, conditions, or situations that affect (or may be expected to affect) ILEC equipment, service capability, or personnel. The test contemplates ILEC 14 using any suitable systems to monitor its network, the constituent network elements, and appropriate associated capabilities.

Entrance criteria for the test may include all global entrance criteria having been satisfied, an appropriate test-specific interview guide or questionnaire having been developed, interviewees having been identified and scheduled, documentation having been obtained for all outage notification and network surveillance processes for wholesale, and a detailed evaluation checklist having been developed. The test activities may include, without limitation: (1) collect all appropriate information; (2) review documentation, including any network outage notification and related trouble administration documentation and CLEC reference documentation (e.g., to determine the degree of compliance with service level agreements); (3) perform interviews of ILEC personnel; (4) conduct operational analysis at ILEC NOCs or other relevant facilities, observing ILEC network surveillance and outage notification procedures; (5) complete the evaluation checklist and interview summaries; (6) interview CLEC personnel to validate the conclusions developed during the test; and (7) develop and document findings in report. Exit criteria may be limited to global exit criteria.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Network surveillance | Surveillance of appropriate network elements | Existence and reliability | 1 |
| Outage notification | Outage process documentation | Clarity, accuracy, and completeness | 2 |
| | Notification procedures | Timeliness, accuracy, and completeness | 3 |

Evaluation criteria for this test may include one or more of the following, in any combination and without limitation: (1) surveillance exists and is reliable; (2) documentation is clear, accurate, and complete; and (3) procedure is timely, accurate, and complete.

Based on evaluation checklists or otherwise, test results may be generated ("Satisfied," "Not Satisfied," etc.) and comments provided for each of the evaluation criteria used in the particular instance of the test.

I. M&R CLEC Coordination Test

This test evaluates ILEC procedures associated with meetings and other coordination activities between the ILEC 14, one or more CLECs 16, and possibly third party vendors relating to M&R operations. For example, such joint meetings might be needed to resolve chronic issues, conduct joint activities on ILEC switch circuits, isolate faults that are difficult to locate, verify diagnoses relating to current troubles, or otherwise rectify complicated M&R issues. Joint meetings may take place at any location within or outside an ILEC CO. In one embodiment, dispute resolution, escalation, consistency of M&R activities, and coordination with third parties are primary aspects evaluated. Sources of data for this test may include observation of joint meetings and other coordination activities, and interviews with ILEC, CLEC, and third party personnel involved in these activities. Interviews may be beneficial to establish facts and gain a better understanding of the purpose of the joint meetings, current meeting procedures, and the effectiveness of the procedures. Any appropriate ILEC documentation may also be reviewed.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Joint meet procedures | Process documentation | Clarity, accuracy, and completeness | 2 |
| | Notification procedures | Timeliness and accuracy | 1, 3–17 |
| Coordinated testing | Process documentation | Clarity, accuracy, and completeness | 2 |
| | Notification procedures | Timeliness and accuracy | 1, 3–17 |

Evaluation criteria for this test may include one or more of the following, in any suitable combination and without limitation: (1) suitable procedures for M&R coordination are in place; (2) the joint meeting procedures are documented; (3) joint meetings occur infrequently; (4) the responsibilities for scheduling joint meetings are clearly defined; (5) joint meetings are conducted with fully qualified ILEC M&R personnel; (6) ILEC coordination personnel are familiar with and have received the appropriate training relating to any ILEC network element needing attention; (7) all equipment training coordination personnel receive is certified to ILEC standards; (8) joint meetings are conducted when important M&R issues must be jointly resolved (i.e. issues that, if not rectified quickly, can seriously hinder the ability of a CLEC 16 to provide service to its customers); (9) ILEC coordination personnel have sufficient seniority to handle joint meetings with CLECs 16 and/or third party vendors; (10) ILEC 14 ensures that the appropriate SMEs from CLECs 16 participate in the joint meetings; (11) joint meetings lead to reasonably timely solutions that do not result in long down time for customers of CLECs 16; (12) joint meetings occur in the correct locations; (13) the majority of joint meetings do not lead to escalations to higher management (i.e. are resolved at the coordination level); (14) third party vendors, when participation is appropriate, are informed of the location, time, and nature of joint meeting; (15) third party vendors do not hinder the successful resolution of the joint meeting; (16) chronic issues do not require repeated joint meetings; and (17) the ILEC's joint meeting process includes identifying and resolving troubles that initially are not clearly associated with ILEC or CLEC equipment.

Billing Domain

The general purpose of testing within the Billing Domain is to evaluate the systems, processes, and other operational elements associated with the ILEC's support of certain billing activities affecting its wholesale customers—CLECs 16. Billing Domain testing is designed to evaluate the accuracy and timeliness of billing related information that ILEC 14 provides to CLECs 16, evaluate the ability of ILEC 14 to provide support for CLEC billing operations, and evaluate the ILEC's compliance with measurement agreements. The report generated by the testing entity should preferably allow the regulatory entity to assess the net impact of Billing Domain issues that it identifies on the ability of CLECs 16 to operate in an open competitive environment for local telecommunications services in the particular jurisdiction of interest.

In one embodiment, the Billing Domain is broken down into a number of primary test target areas that may include, without limitation, billing metrics, billing documentation, billing help desk support; daily usage feed (DUF), and carrier bills. Each primary test target area may be further broken down into increasingly discrete process and sub-process areas that identify the particular areas to be tested and the types of measures that apply to each area. According to the present invention, tests have been developed to evaluate each test target area based on the scope of testing to be performed in each of the areas. Particular example process and sub-process areas for each test target area, with example associated evaluation measures and evaluation criteria, are described in more detail below.

There need not be a one-to-one correspondence between test target areas and specific tests. In one embodiment, Billing Domain tests may include one or more of the following, without limitation: (1) Process Metrics Test, (2) Documentation Test, (3) Help Desk Support Test, (4) Resale Bill Certification Process Test, (5) Usage Returns Process Test, (6) Functional Usage Test, and (7) Functional Bill Cycle Test. Example embodiments of these tests are described in detail below.

Some of the tests are transaction-based, involving the creation and processing of predefined transactions (e.g., usage test calls and POP scenarios). In general, transaction-based tests are designed to establish a structured operational environment for submission of billing-related transactions and, using this environment, to assess whether CLECs 16 receive accurate, complete, and timely billing information. For example, billing-related information may include usage flowing through the ILEC's billing process and onto a CLEC's DUF, billing charges flowing through the ILEC's billing process and onto a CLEC's bill, or any other suitable information. Other tests are process-based, involving walk-through inspection of ILEC operational processes and practices, structured review of the ILEC's procedures and related documentation, structured interviews with ILEC SMEs, or other suitable information. One or more tests may include both transaction-based and process-based aspects. Billing Domain testing may implement a "black box" testing approach that is not concerned with the behavior or structure of internal component, but is instead focused on whether input information appears accurately on the outputs (e.g., DUFs and carrier bills).

A. Billing Process Metrics Test

This test provides an end-to-end operational analysis of the systems and processes ILEC 14 uses to generate wholesale billing information and communicate that information to CLECs 16. The objectives of the test are to evaluate the billing metrics ILEC 14 uses, the method ILEC 14 uses for determining metric values, and the ILEC's dissemination of metric values to CLECs 16. In one embodiment, the test focuses primarily on two such billing metrics: (1) DUF timeliness, and (2) carrier bill timeliness. Both are used to evaluate the quality of the ILEC's service to CLECs 16, which in turn use the DUF and carrier bill data to bill their own customers.

This test was developed to evaluate the validity (in terms of completeness, applicability, and security) of measurements corresponding to these billing metrics and to assess the strength of procedures and documentation supporting the taking of these measurements. Arrangements are preferably made with ILEC SMEs to walk through the relevant procedures such that the testing entity can fully evaluate these procedures. The walk-throughs for the DUF and carrier bill timeliness metrics may be performed concurrently or in any order. Summaries of these walk-throughs are preferably created and circulated to ILEC 14 and to the regulatory entity.

In one embodiment, processing of the DUF and carrier bill timeliness metrics includes the following common steps, without limitation (1) acquiring data from the usage processing and billing systems, (2) processing this usage and billing data to develop the results, and (3) distributing the data and the results. The data collected is analyzed in reference to the evaluation criteria provided below.

Test target areas and associated evaluation measures are summarized in the table below. The last column of the table indicates how evaluation criteria may, in one embodiment, correspond to particular evaluation measures.

Test Target Areas and Measures

| Process Area | Sub-Process Area | Evaluation Measures | Evaluation Criteria |
| --- | --- | --- | --- |
| Validate metrics information gathering process | Identify control points where measurements are taken | Applicability and measurability of control points | 3–4, 11 |
| | Identify data sources for each reported metric | Applicability and completeness of data sources | 3, 5–6, 9, 11 |
| | Identify each tool used by ILEC to collect data | Applicability and reliability of tools | 5–6, 9, 11 |
| Evaluate quality of metric reported | Evaluate calculation | Accuracy and applicability of calculations | 6–7, 9–11 |
| | Evaluate tools | Accuracy, security and controllability of data housed in tools | 5–7, 9, 11 |
| Evaluate reports | Evaluate report format | Consistency of reporting results with data collected | 12–13 |
| | Evaluate report content | Accuracy of metrics reporting | 12–13 |

Evaluation criteria may include the following, without limitation. The same evaluation criteria may be used for both DUF and carrier bill evaluations.

Definitions: (1) the purpose of taking the metric is defined; and (2) the metric and the conditions under which it is applicable are specified.

Measurement Process: (3) the location at which the measurement is taken is defined; (4) the time at which the measurement is taken is defined; (5) the hardware, software, and other instrumentation for taking, processing, and communicating the measurement are defined; (6) steps for taking, processing, and communicating the measurement are defined; and (7) the mathematical and statistical algorithms to be applied are defined.

Performance Standards and Norms: (8) the desired level of attainment for the metric is identified; (9) the measures of attainment are reviewed for accuracy on a timely basis; (10) the persons responsible for achievement of performance standards are identified; and (11) procedures for making changes to the metric or performance standard are defined.

Publication and Distribution: (12) the measurement results are published and distributed, and (13) the published results are readily understandable.

Based on evaluation checklists or otherwise, test results may be generated ("Satisfied," "Not Satisfied," etc.) and comments provided for each of the evaluation criteria used in the particular instance of the test.

B. Billing Documentation Test

This test provides an operation analysis of the billing documentation CLECs 16 use to accept and process the DUF and carrier bill output they receive from ILEC 14. ILEC 14 will typically provide wholesale customers with certain documentation regarding its billing procedures, bill content, and related interactions with ILEC 14. The primary repositories for this documentation are typically handbooks, which may be acquired from ILEC 14 through a website or otherwise. The purpose of this test is to evaluate the quality of ILEC documentation and to determine how well it supports ILEC customers in pursuit of their own business interests.

In one embodiment, this test includes two sub-tests. The first evaluates the processes and procedures by which ILEC 14 produces billing documentation. The basis for this sub-test is the idea that consistent production of quality documentation will be unlikely unless well-defined, comprehensive, and well-managed production processes are in place. This procedural sub-test may be conducted according to a process evaluation checklist that contains evaluation criteria for processes governing document production.

The second sub-test relies on an independent document evaluation by the testing entity. Although this may well introduce additional subjectivity into the test, the personnel evaluating the billing documentation have preferably been users of the documentation in constructing and carrying out various other billing and usage tests described below, and are therefore well positioned to make such judgements. This sub-test may be conducted in one or more sessions.

In one embodiment, the test process proceeds as follows. First, a list of the required billing and usage topical coverage requirements is developed. Such topical areas may include, without limitation: (1) validating bills; (2) validating usage; (3) processing credits, adjustments, and usage returns; (4) primary billing operations and supporting technical information; (5) contact information for help on billing issues; and (6) miscellaneous billing documentation such as forms, glossaries, and certain industry mailings.

Second, ILEC documentation concerning billing procedures is reviewed for each of the topical areas. This may include handbooks, industry mailings, and any other suitable documentation.

Third, ILEC documentation is evaluated for topical coverage, usability, and accuracy. Specific evaluation criteria are preferably developed in these categories. The evaluation of topical coverage may involve evaluating the breadth and depth of processes, explanations, and data definitions in the documentation. Evaluation of usability may involve evaluating the organization and flow, references and indexes, and style of documentation. Evaluation of accuracy may involve creating a list of "errors" that provide examples of where and how the documentation does not agree with practice.

Fourth, evaluation findings are recorded for each content coverage category. The data collected is then analyzed in reference to the evaluation criteria provided below. As described above, a test result of "Satisfied" is assigned to an evaluation criterion if no deficiencies are observed. A result of "Satisfied, with qualifications" or another more negative result may be assigned if deficiencies were observed. The extent to which documentation deficiencies may result in serious adverse business impact, and may therefore give rise to an exception, is addressed below in connection with the transaction-based Billing Domain tests. Instances where ILEC billing and usage documentation conflicts with actual findings (i.e. "errors") may be noted as a further indication of billing documentation quality, possibly without generating a test result or further investigating the source of the discrepancy.

Finally, an overall summary of the billing documentation review test results by topical area is developed.

Test target areas and associated evaluation measures are summarized in the table below. The last column of the table indicates how evaluation criteria may, in one embodiment, correspond to particular evaluation measures.

| Test Target Areas and Measures | | | |
|---|---|---|---|
| Process Areas | Sub-Process Areas | Measures | Criteria |
| Acquire documentation | Receive current documentation | Availability of up-to-date documentation | 1 |
| Evaluate documentation | Evaluate documentation format | Organization of documentation Ease of use of documentation | 7 |
|  | Evaluate documentation content | Comprehensiveness of documentation Accuracy of documentation | 1–6 |

Evaluation criteria for this test may include one or more of the following, in any combination and without limitation: (1) responsibilities of ILEC personnel and procedures for developing, updating, correcting, and distributing documentation are clearly defined; (2) responsibilities of ILEC personnel and procedures for ensuring quality documentation are clearly defined and documented; (3) the procedures are carried out in compliance with the ILEC's internal documentation; (4) step-by-step instructions for are provided for customers to interact with ILEC 14; (5) explanations are provided for customers to use where interaction with ILEC 14 is not required; (6) definition, format, medium, and applicable standards are provided for data elements; and (7) the usability, organization and flow, navigation and reference, and style are acceptable. Within each primary evaluation criterion, the topical areas described above may be evaluated.

Based on evaluation checklists or otherwise, test results may be generated ("Satisfied," "Not Satisfied," etc.) and comments provided for each of the evaluation criteria used in the particular instance of the test.

C. Billing Help Desk Support Test

This test provides an operational analysis of the ILEC's help desk processes supporting CLECs 16 with respect to their usage-related and billing-related issues. The test evaluates the ILEC's key billing support process elements, including the receipt, processing, monitoring, escalation, and management of claims and of help desk calls involving questions, problems, or other issues. The scope of the services evaluated may include, without limitation: (1) responding to customer questions and problems regarding ILEC-provided usage and billing information, and (2) evaluating and processing customer requests for usage adjustments and billing corrections. The ILEC billing help desk may be wholly or partially integral to help desk 50 described above in connection with POP Domain testing or the help desk described above in connection with M&R Domain testing.

In one embodiment, this test includes two sub-tests. The first evaluates the ILEC processes used to provide help desk services. This procedural evaluation will preferably focus on ILEC processes for initiating, processing, closing, tracking, and managing customer requests for information, adjustments, and corrections. A "walk-through" of relevant procedures is preferably conducted with ILEC SMEs. Since the billing help desk responsibilities for resale and UNE offerings may potentially be vested in separate organizations within ILEC 14, separate walk-throughs may need to be conducted depending on the internal structure of ILEC 14.

The second sub-test involves placing test calls to the help desk to provide an understanding of the effectiveness and integrity of the processes described above. The test questions may be formulated to include some general procedural and policy questions in addition to more specific questions drawn from the actual usage records and carrier bills. This sub-test is designed to evaluate: (1) accessibility of the ILEC help desk function (i.e. timeliness of call answer); (2) timeliness of the response (i.e. interval between initial question and final response); and (3) the quality of the ILEC response (i.e. how well the response matches or can be reconciled with the expected response). Questions may be determined in part using CLEC input solicited using structured questionnaires distributed to CLECs 16, in which CLECs 16 are asked to provide recent inquiries. A standard set of questions to be placed to the ILEC help desk may be formulated in any suitable manner.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Receive help desk call | Answer call | Timeliness of call | 1–2, 6–7, 36 |
| | Interface with user | Availability and usability of interface | 1–3, 7 |
| | Log call | Existence and accuracy of call logging | 1–2, 6–7 |
| | Record severity code | Compliance of call logging - severity coding | 1–2, 8 |
| Process help desk call | Resolve user question, problem or issue | Completeness and consistency of process | 1–2, 5–9, 11, 13, 36–38 |
| | | Accuracy of response | |
| Receive claim | File claim | Completeness and consistency of process | 1–2, 29, 32 |
| | | Accuracy of response | |
| | Process claim | Completeness, consistency, and timeliness of process | 1–2, 30–31, 36–38 |
| | Issue adjustment, when necessary | Completeness an consistency of process | 1–2, 30–31 |
| | Disposition claim | Accuracy, completeness, and reliability of disposition report | 1–2, 30–31, 35 |
| Close help desk call | Post closure information | Completeness, consistency, and timeliness of process | 1–2, 11, 27, 30, 35 |
| | | Accuracy of posting | |
| Monitor status | Track status | Existence of status tracking capability | 1–2, 27, 33–34 |
| | | Consistency and frequency of follow-up activities | |
| | | Availability of jeopardy notification | |
| | Report status | Completeness and consistency of reporting process | 1–2, 12–13 |
| | | Accuracy and timeliness or report | |
| | | Accessibility of status report | |
| Request escalation | Identify escalation procedure | Existence of procedure | 1–2, 15 |
| | Evaluate escalation procedure | Completeness and consistency of process | 1–2, 14, 21–28 |
| Manage workforce capacity | Identify work force planning procedures | Existence of procedure | 1–2, 15 |
| | Evaluate work force planning procedures | Completeness of procedure | 1–2, 15 |
| | Review staffing plans | Scalability of staff volume | 1–2, 15 |
| Provide security and integrity | Provide secured access | Completeness and applicability of security procedures, profiles, and restrictions | 1–2, 16 |
| | | Controllability of intra-company access | |

-continued

| Process Areas | Sub-Process Areas | Measures | Criteria |
|---|---|---|---|
| Manage help desk process | Provide management oversight | Completeness and consistency of operating management practices<br>Controllability, efficiency and reliability of process<br>Completeness of process improvement practices | 1–2, 11–14, 17–20, 27–28, 35 |

Evaluation criteria for the second sub-test may include one or more of the following, in any suitable combination and without limitation:

Procedural Consistency and Clarity: (1) responsibilities and activities are clearly defined; (2) scope of help desk services covers key CLEC requirements; (3) scope and objectives of help desk are clearly defined, documented, and communicated to CLECs 16; (4) a complete (i.e. beginning-to-end) description of help desk process is documented; (5) help desk process includes procedures for addressing errors and exceptions; (6) help desk process includes procedures for resolving issues in timely and efficient manner; (7) the help desk process includes complete and consistent call intake procedures (i.e. logging and acknowledgement); (8) help desk process defines criteria and procedure for severity coding help desk calls; (9) the help desk process includes procedures for referral and tracking of referral (in and out of the help desk); (10) the help desk process includes complete and consistent procedures for jeopardy notification; (11) help desk process includes complete and consistent procedures for closure posting; (12) help desk process includes complete and consistent procedure for status tracking and management reporting; (13) the help desk process includes complete and consistent procedure for documenting unresolved help desk calls; (14) help desk process includes complete and consistent procedure for escalating issues and problems; (15) the help desk process includes complete and consistent procedure for capacity planning; and (16) the help desk process includes procedures to maintain security and integrity of data access controls.

Performance Measurement and Reporting: (17) the help desk process includes procedures for obtaining CLEC feedback on effectiveness of help desk; (18) the help desk process performance measures are defined and measured; (19) responsibilities for tracking performance are assigned; and (20) the help desk process improvement procedures are defined and responsibilities assigned.

Escalation Specific Scope: (21) overall escalation flow procedures exist; (22) each step has one or more associated criteria for escalation; (23) each step has one or more responsible parties and documented contact information; (24) the information requirements and information transmission for each step are defined; (25) each step has documented time limitations or parameters; (26) the problem submitter is kept informed of progress, lack of progress, and issues affecting resolution; (27) problem status is tracked and tracking information is readily accessible; and (28) an escalation process owner is responsible for overall performance and improvement.

Adjustment Specific Scope: (29) the procedures for accepting any adjustment requests are documented; (30) help desk process includes complete and consistent procedures for issuing adjustments; (31) the responsibilities, process routing, process intervals, and adjustment authorization levels are defined and documented; (32) the adjustment requests and transmission requirements are suitably documented and are readily available to CLECs 16; (33) CLECs 16 have convenient access to status of adjustment requests; (34) CLECs 16 are proactively notified of the status of schedule changes and corresponding reasons or open issues; and (35) escalation procedures beyond the help desk (i.e. to account management and beyond) are well defined and documented.

Evaluation criteria for the second sub-test may include one or more of the following, in any suitable combination and without limitation: (36) the timeliness of call answer—whether responsible ILEC representative is reached on initial call, reached on call back or follow-up in a specified time period, reached according to some other satisfactory arrangement, reached otherwise, or not reached at all; (37) timeliness of response—whether response is returned during call, response or an acknowledgment with a justifiable due date is returned in a specified time period, neither response nor an acknowledgment is received in specified time period or due date is not justifiable, or response is not received; and (38) quality of the answer—whether the response matches the expected response in substantially all respects or where discrepancies exist a full explanation is provided, the response had minor un-addressed or unclear elements but would be generally acceptable to a customer, or response either is not provided or did not address issue or would not be generally acceptable to a customer.

Since relevant industry performance standards or norms may not be defined, evaluation criteria for the second sub-test may be defined based on certain help desk considerations deemed generally appropriate in a variety of environments. For this reason, however, results are preferably considered only in conjunction with findings made during the first sub-test described above.

Based on evaluation checklists or otherwise, test results may be generated ("Satisfied," "Not Satisfied," etc.) and comments provided for each of the evaluation criteria used in the particular instance of the test.

D. Billing Usage Returns Test

This test is an analysis of the procedures and related documentation that the ILEC 14 uses to process usage returns. A CLEC 16 may return usage when usage records received on DUFs are believed to contain errors. Returning usage is a sub-process of the broader usage claims process. If a CLEC 16 believes one or more usage items contain errors, CLEC 16 may initiate a usage claim. ILEC 14 may then be obligated to resolve the claim by correcting the usage, issuing an adjustment, or determining that the claim is not valid. ILEC 14 might require CLEC 16 to transmit the erred usage back to ILEC 14 with reason codes so that ILEC 14 can investigate the errors. The procedures ILEC 14 follows in the United States may be generally described in the Exchange Message Interface (EMI) guidelines of the Ordering and Billing Forum (OBF). However, as noted above, ILEC 14 may be any incumbent carrier in any appropriate jurisdiction.

The processes differ depending on the nature of the claim. In a first case, CLEC 16 determines that the DUF contains duplicate records, invalid records, or records with invalid or incorrect data. In this case, CLEC 16 may be responsible for notifying ILEC 14, repackaging the erred records (including the original headers and trailers), and returning these records to the ILEC 14. CLEC 16 may also need to adjust fields on each returned record to indicate that the record is being returned and the reason for the return. The fields that may need to be changed and their possible values are described, for example, in the EMI guidelines. If CLEC 16 has already processed the records with allegedly incorrect data, ILEC 14 may be obligated to investigate and resolve the erred records within two weeks of receipt. If the claim is resolved in the CLEC's favor, ILEC 14 either issues a billing adjustment or sends a series of records that correct the error. These records typically include records that nullify the previous charges and records that correct the charges. These records are commonly known as "killer records," and are described in the EMI guidelines. If a claim is not resolved to the CLEC's satisfaction, CLEC 16 may escalate the claim as appropriate.

A second case occurs when the usage charge amount is in dispute. In this case, a claim may need to be filed. Depending on the size and severity of the claim, ILEC 14 may require usage to be returned in order to process the claim. If the claim is resolved in the CLEC's favor, a correction may be issued on the CLEC's bill, for example, as an "Other Charge and Credit". CLEC 16 has full discretion as to how it will transfer this correction to its overcharged customer. If a claim is not resolved to the CLEC's satisfaction, CLEC 16 may escalate the claim as appropriate.

In one embodiment, this test includes a procedural sub-test and a transaction-based sub-test. For the procedural sub-test, arrangements are preferably made for ILEC SMEs to "walk through" the relevant procedures with testing entity personnel. A summary of the walk-through may be created and circulated to ILEC 14 and the regulatory entity. The transactional sub-test traces the activities that occur when a CLEC 16 makes a usage claim that requires usage to be returned, to assess whether the ILEC procedures described during the procedural sub-test are in fact followed in practice. The data sources for this test may include ILEC walk-through participants, suitable walk-through documentation, and usage data generated during execution of the Billing Functional Usage Test described below. CLEC input may be solicited as appropriate.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
| --- | --- | --- | --- |
| Usage return process | ILEC receives erred usage | Clarity and completeness of usage return procedures | 1–4, 7–9, 16 |
| | ILEC sends corrections when necessary | Accuracy, completeness, and timeliness of corrections | 1–6, 11–14, 17–18 |
| | ILEC provides item status for all returned records | Accuracy, timeliness, and completeness of status report | 10, 15, 17 |

Evaluation criteria for the procedural sub-test may include one or more of the following, in any suitable combination and without limitation:

Procedural Consistency and Clarity: (1) scope and objectives of the process are clearly defined; (2) the responsibilities for carrying out the process are clearly assigned; (3) a complete (i.e. beginning-to-end) description of the process is defined; and (4) the procedure for processing usage returns is documented.

Performance Measurement and Reporting: (5) suitable process performance measures are defined and measured; (6) responsibilities for tracking performance are assigned; (7) ILEC 14 assists CLECs 16 with submitting usage returns; (8) incoming requests are logged and any necessary trouble tickets are opened; (9) investigation procedures are communicated to CLECs 16; (10) CLECs 16 are kept informed of status; (11) usage complaints are investigated using a process with built in quality control components; (12) usage complaints are responded to; (13) the ILEC 14 sends corrected records to the CLECs 16 when necessary; (14) the ILEC 14 issues billing adjustments when necessary; and (15) trouble tickets are closed when appropriate.

Evaluation criteria for the transactional sub-test may include one or more of the following, without limitation: (16) the ILEC 14 assists CLEC 16 with returning usage and accepted the returned usage; (17) ILEC 14 follows established procedures in investigating and resolving claims; and (18) resolution was appropriate.

Based on evaluation checklists or otherwise, test results may be generated ("Satisfied," "Not Satisfied," etc.) and comments provided for each of the evaluation criteria used in the particular instance of the test.

E. Billing Functional Usage Test

This test provides an operational and systems analysis of the ILEC's ability to process usage such that the usage appears on the DUFs provided to CLECs 16 in a timely and accurate manner.

Usage charges typically represent an important source of revenue for CLECs 16. Usage information is recorded at the usage port of a switch. A facilities-based CLEC 16 may own the usage port, in which case CLEC 16 records usage information without any ILEC involvement. When ILEC 14 owns the usage port, however, as in resale and UNE situations, ILEC 14 records usage information. This test looks at the second situation, where ILEC 14 is responsible for providing a copy of the usage information to CLECs 16 in a timely and accurate manner. In one embodiment, at least for purposes of this test, the testing entity establishes two test CLECs in the ILEC's production environment—one providing resale services and one providing UNE services. These test CLECs may be the same as or different than the pseudo-CLEC 18, in whole or in part. The ILEC's switches generate events as they process calls. Such calling information is recorded in a file and, each day, ILEC 14 receives calling information from its switches. If calling information is for calls billable to a wholesale customer such as a CLEC 16, or if the calling information includes Inter-Exchange Carrier (IXC) access records, a DUF file is created. The ILEC 14 typically creates a DUF for each CLEC 16 and delivers the DUFs to CLECs 16 using cartridge tapes or appropriate software.

In one embodiment, the test includes five parts: (1) evaluate ILEC procedures used to ensure the accuracy and completeness of the DUF; (2) evaluate procedures used to ensure the reliability and timeliness of the delivery of usage records to the CLECs 16 through the DUFs; (3) place calls from one or more locations within the ILEC calling region, log these calls, and compare information from the call logs to records actually received in the DUFs; (4) count the number of billable records on delivered DUF cartridge tapes to ensure that no empty tapes were sent; and (5) the observe CLEC requests to retransmit DUFs.

Both procedural and transaction-based evaluation methods may be used. The first two parts listed above constitute procedural evaluations. For these evaluations, arrangements are made for ILEC SMEs to "walk through" ILEC procedures with the testing entity, according to a structured checklist. A walk-through summary may be provided to ILEC 14 and the regulatory entity. Sources of data for the procedural sub-tests include ILEC walk-through participants and associated documentation, in combination with any other suitable sources.

Parts three, four and five listed above are transaction-based evaluations that focus on appropriate customer situations through the use of test scenarios. In one embodiment, the most common test scenario involves the migration of an ILEC retail customer to one of the test CLECs. To ensure that the test calling activities include migrating customers, the calling activities are preferably coordinated with the POP GUI Interface Functional Test described above. In that case, orders that are placed during the POP GUI Functional Test should preferably be placed shortly before the test calling period of this test so that the orders can complete during the test calling period. The sources of data for the transaction-based tests may include the test calls, cartridge tapes containing DUFs that ILEC 14 delivers to the testing entity, and any electronic or other written descriptions of interactions between the ILEC 14 and a CLEC 16 regarding retransmission of non-current DUFs.

The first transaction-based test (part three of the five-part approach described above) involves data generation. In a particular embodiment, the testing entity uses specifically designed call matrices referred to as "test activity tools." These tools provide instructions for placing calls to specific numbers in specific ways. As an example, a certain test activity tool may provide an electronic or other spreadsheet (e.g., MICROSOFT ACCESS database) containing the specific phone numbers that are to be called and any instructions designed to ensure a variety of call types and call lengths. The testing entity may record actual call information in the spreadsheet and communicate the spreadsheet to a central database (e.g., every night following test calling). For example, a tester may place a number of calls according to a test script reflected in a spreadsheet, record associated call information in the spreadsheet, and forward the spreadsheet to a testing manager for further review or to the central database. The testing entity preferably logs all calls attempted, whether or not the calls are completed.

To generate test calls of sufficient variety, the testing entity will preferably dispatch its testers to a number of locations in the ILEC calling region. In one embodiment, the following statistical approach is used. A large number of calls are made for customers belonging to six COs. For purposes of organization, each CO is examined separately. Calls are made in three categories: (1) "Local" calls (made to destinations within the local calling area, charged using standard measured service or monthly flat fee); (2) "Toll" calls (made to destinations outside of the local calling region but still in the same Local Access and Transport Area (LATA), carrying an additional charge); and (3) "Other" calls (such as operator assisted calls, directory assisted calls, special service calls, and calls carried by IXCs). For each of the six COs, a sample of thirty calls is selected from the spreadsheet for each of the three categories, totaling ninety calls per CO or five-hundred forty calls overall. The calls selected preferably vary widely in type and represent most call types present in the retail call population. The customer telephone numbers used to place the calls may belong to ILEC 14 or to a test CLEC as appropriate. Testers within or outside the ILEC calling region may additionally place third party billing and collect calls from non-test telephones to test telephones. Although particular numbers of COs, calls, and categories are described, any suitable number of COs, calls, and categories may be used according to particular needs.

In one embodiment, the testing entity compiles into a database all the usage records it receives using DUFs. Each call is examined to determine whether the call should appear in the DUF. The database is also examined to determine whether the DUF includes records for calls that should not appear in the DUF. For the calls that should have appeared, the testing entity examines the database to locate valid records meeting the specifications of the calls as they were recorded in the call logs. A DUF file may be considered accurate upon verification that the values of specific fields in each record type in the DUF that is generated from test calls match expected results. Specific fields may include, for example create date, time, record category, record group, record type, billed number, terminating number, and one or more indicatory values. Determining accuracy may also involve verifying that the header and trailer records in the DUF accurately record the number of usage files contained the file transmission and the individual DUF records. If a unique record cannot be identified as a match to the call log, the record is designated as missing. A DUF may be considered complete when all the billable incoming and outgoing test calls made by testers are captured on the DUF. Expected results may be developed for each test script, against which DUFs may be compared in determining accuracy.

Typically, testers record information concerning the test calls (e.g., originating number, terminating number, duration, etc.) manually, on paper or perhaps using a personal computer or other device. This manually entered information, however, is typically not formatted the same as bills that test CLEC receives as a result of the calls, making comparison more difficult, less efficient, and less reliable. To reduce such disadvantages, the testing entity may establish a front-end processor supporting software designed to automatically generate test call information in response to the test call being placed and then format the test call information such that it matches or at least more closely resembles the bills received from ILEC 14. This may allow manual comparison to be performed more efficiently and reliably. More preferably, this may allow the comparison to be performed substantially automatically, further increasing efficiency and reliability.

In one embodiment, the information collected in connection with test calls may be parsed for use in validating bills during the Billing Functional Bill Cycle Test described below. Each ILEC 14 may bill usage in a different manner, according to the ILEC's particular rate structure. As just an example, a first ILEC 14 in a first jurisdiction may assign seven billable elements to a toll call, but a second ILEC 14 in a second jurisdiction may assign five billable elements to the same toll call (one having the same pertinent characteristics). As a result of such differences, the testing entity must organize information it collects into seven fields in evaluating the first ILEC 14, but must organize information it collects into only five fields in evaluating the second ILEC 14.

To improve testing efficiency and reliability where the testing entity may be evaluating multiple ILECs 14 in multiple jurisdictions, the test call information is preferably parsed into items that collectively form the billable elements for all the ILECs 14 in a group, which may include all ILECs 14. The number of items is preferably greater than or equal to the largest number of billable elements the testing entity might expect to encounter in evaluating any ILEC 14 within the group. For example, the testing entity might be able to parse the test call information into nine items available for use in generating ILEC billable elements. Using the example above, these nine items might be used to generate the seven billable elements for the first ILEC 14 by collapsing the first three items into the first billable element under the first ILEC's billing structure. Similarly, these nine items might also be used to generate the five billable elements for the second ILEC 14, by collapsing the first three items into the first billable element under the second ILEC's billing structure, and collapsing the last three items into the fifth billable element under the second ILEC's billing structure. Items into which the test call information is parsed may be selected in any suitable manner using domain experience or otherwise. As a result of such parsing, the testing entity may more easily replicate this test with respect to multiple ILECs 14.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
| --- | --- | --- | --- |
| DUF | Balancing and reconciliation of usage feed | Completeness of balancing and reconciliation procedures | 1–8 |
| | Route usage | Controllability of usage | 1–4, 9–14 |
| Transmit DUF | Send direct connect | Completeness, consistency and timeliness of process | 17–30 |
| | Send cartridge tape | Completeness, consistency and timeliness of process | 17–21, 23–24, 28–30 |
| Maintain usage history | Create usage backup | Reliability of repeatable process | 15–16 |
| | Request backup data | Availability of data | 35–37 |
| Status Tracking and Reporting | Track valid usage | Completeness and accuracy of data Timeliness of DUF | 31–33 |
| | Account for no usage | Completeness of data | 34 |

Test results for evaluation criteria may be categorized according to the five-part testing structure described above. Evaluation criteria for part one may include, without limitation:

Procedural Consistency and Integrity: (1) scope and objectives of the process are clearly defined; (2) responsibilities for carrying out process are clearly assigned; (3) a complete (i.e. beginning-to-end) description of process is defined; and (4) the process is documented.

Performance Measurement and Reporting: (5) process performance measures are defined and measured; and (6) the responsibilities for tracking performance are assigned.

Process Elements: (7) control points enable identification of out-of-balance conditions; (8) procedures exists for correcting and investigating any out-of-balance conditions; (9) the ILEC 14 tracks CLEC usage from the ILEC's originating switch through message processing and onto the DUF; (10) the procedures for DUF creation include analysis for usage gaps and duplicates; (11) the ILEC 14 interfaces with a centralized message distribution system; (12) an error and exception process exists, for handling switch data without a valid guide rule; (13) the format of the DUF meets EMI industry guidelines; (14) the guide file is updated frequently; (15) backup files are stored securely for the number of days specified in regulatory or other applicable requirements; and (16) disaster recovery procedures exist.

Evaluation criteria for part two may include, without limitation:

Methodology: (17) ILEC 14 has a well-documented interface development methodology that addresses the design, testing, and implementation of usage data transmission, and (18) the interface development methodology defines how quality is to be assured.

Interface Specifications: (19) interface specifications define security (security measures are built into transport mechanism); (20) the interface specifications define applicable business rules; (21) the interface specifications define data formats and definitions (e.g., variable definition and context); (22) interface specifications define relevant transmission protocols (e.g., hardware, software, or network requirements); (23) the responsibilities and procedures for developing, updating, and distributing interface specification documentation are clearly defined; and (24) procedures for the updating of interface specifications are integrated with formal change management procedures involving customers.

Interface Testing: (25) functioning test environments are available to CLECs 16 for the billing usage interface; (26) on-call technical support is provided for the production interfaces; (27) on-call support is provided to CLECs 16 for interface testing; and (28) CLECs 16 are provided with documented specifications for active test environments.

Interface Support: (29) production performance is monitored; and (30) the procedures for addressing errors and exceptions are defined.

Evaluation criteria for part three may include, without limitation: (31) records for calls made from retail, resale, and UNE customer telephones appear on the DUF when appropriate and the data appearing in the DUF is complete; (32) data in the DUF is accurate; and (33) call records appear on the DUF in a timely manner. In one embodiment, the test results for DUF accuracy may be organized by category and by calling location. DUF timeliness may be measured, for example, according to the number of business days between the day a call was made and the day the call record appeared on the DUF, excluding the day the call was made and the time it took the DUF to reach the test CLEC.

Evaluation criteria for part four may include, without limitation: (34) whether all DUF cartridges sent to the testing entity contain at least one billable record.

Evaluation criteria for part five may include, without limitation: (35) ILEC 14 accepts requests from CLECs 16 to resend historical DUF files; (36) if the requested DUF files were originally sent no more than a specified number (e.g., forty-five) of days before the CLEC request, then ILEC 14 fills the request; and (37) if requested DUF files were originally sent more than a specified number (e.g., forty-five) of days prior to the CLEC request, then the ILEC 14 notifies CLEC 16 that ILEC 14 is not obligated to or cannot fill the request.

Based on evaluation checklists or otherwise, test results may be generated ("Satisfied," "Not Satisfied," etc.) and comments provided for each of the evaluation criteria used in the particular instance of the test.

F. Billing Functional Bill Cycle Test

This test provides an operational and systems analysis of the ILEC's ability to bill usage, monthly recurring, and non-recurring charges on the appropriate type of bill in an accurate and timely manner. This test examines the contents of carrier bills ILEC 14 delivers to test CLECs, the ILEC procedures for cycle balancing and bill delivery, and the ILEC's ability to manage historical billing data (e.g., archives and resends). As described above, at least one reseller test CLEC and at least one unbundler test CLEC are preferably established, although one or more test CLECs may be organized in any suitable manner and may be wholly or partially integrated with pseudo-CLEC 18.

In general, ILEC 14 generates bills for reseller CLECs 16 and unbundler CLECs 16 that purchase products and services from ILEC 14. Such carrier bills are the primary revenue collection mechanism for the ILEC's wholesale services. ILEC 14 generates and distributes many types of bills over the course of a monthly billing period, each covering an associated set of products and services. ILEC 14 typically generates bills using two billing systems, one system for reseller CLECs 16 and one system for unbundler CLECs 16. In general, the ILEC's bills are designed to provide information to CLECs 16 about the products and services purchased during the prior month. The bills are not designed to be passed along "as is" to the customers of CLECs 16. CLECs 16 are responsible for billing their customers directly using a CLEC-maintained billing system.

Reseller CLECs 16 may be served by the same system used to service the ILEC's retail customers, since the retail and resale billing processes may typically be similar. While retail customers each receive a single bill listing all services, CLECs 16 receive aggregated bills for all their customers in the particular calling area served by ILEC 14.

The resale and retail billing processes are both driven by the bill cycle, which is a code assigned to customers according to their originating CO. As a result, all the ILEC's resale and retail customers associated with a particular CO are billed on the same date, known as the bill cycle date. Each reseller CLEC 16 has an associated resale identifier. Charges associated with the same resale identifier are aggregated in a single CLEC bill for the bill cycle. Once billing begins, ILEC retail customers may be served using an ILEC retail billing process, while the reseller CLECs 16 may be served using an alternative ILEC reseller billing process. Across the ILEC calling region, multiple bill cycle dates may be used and multiple COs might share a single bill cycle date. When a reseller CLEC 16 operates in multiple COs, billing may take place over several bill cycles, depending on the cycle dates assigned to the COs in which the reseller CLEC 16 operates.

In addition to billing the reseller CLECs 16 for charges incurred by their customers, the reseller system also generates bills based on the products and services the reseller CLECs 16 order for themselves. For example, a CLEC 16 will typically receive an administrative bill shortly after the first of the month containing charges attributable to CLEC 16 rather than to customers of CLEC 16. For example, DUF delivery charges are among the charges found on this type of bill.

Unbundler CLECs 16 are primarily served by the ILEC's alternative billing system. Unbundler CLECs 16 may receive multiple bills from ILEC 14 depending on the products ordered. Similar to the reseller system, the unbundler system separates products into specific bills—in this case generated on a per LATA basis.

In one embodiment, this test is organized into four parts, including but not limited to: (1) evaluating carrier bill content, (2) evaluating bill delivery timeliness, (3) evaluating bill cycle balancing procedures, and (4) evaluating the procedures for managing historical billing data (including resending prior bills to CLECs 16 upon request). Once the test bed is established, test CLECs 18 begin to receive bills from ILEC 14. These bills are the basis for evaluation for parts one and two above, with charges being examined for both resale and UNE billing. Structured interviews are the basis for evaluation for parts three and four above. Summaries of the interviews may be provided for comment to ILEC 14 and the regulatory entity.

The analysis of carrier bill content (part one of the test) uses a data-driven approach to evaluate the completeness and accuracy of charges that should appear on the bill based on staged input data. This evaluation is dependent on the successful execution of corresponding ordering and provisioning scenarios during POP Domain testing. Staged input data may include data in the original test bed, modifications to the test bed associated with certain test scenarios, and usage information generated in connection with the Billing Functional Usage Test described above.

In one embodiment, to evaluate carrier bills, the testing entity first develops a thorough understanding of bill structure and content. The testing entity preferably reviews appropriate portions of an ILEC handbook relating to bill structure, content, and elements for each of the relevant bill types. In addition, the testing entity may conduct work sessions with one or more ILEC SMEs to review relevant bill types in more detail.

The testing entity constructs detailed evaluation materials, including suitable test cases, worksheets, and procedures, for evaluating each of the bill types involved in the test. In doing so, the testing entity may develop a framework to accommodate the wide variety of test cases suitable for use in evaluating carrier bills. These test cases may be based on any of the scenarios used in connection with POP Domain testing or any other suitable scenarios. CLEC-level (aggregate) billing tests cases are designed to examine the wide variety of billing situations reflected on the summary and administrative bills that CLECs 16 receive. The remaining billing test cases are designed to examine customer-level billing situations. Certain test cases may focus on customers for which no changes were made during the billing period, while others may focus on customers for which changes were made.

The testing entity defines expected results for each test case and test cycle. This may include selecting scenarios in connection with POP Domain testing and performing data collection activities during POP Domain activities for later use in analyzing carrier bill content. Data collection may include collecting ordering data, completion notifications, CSRs, DUFs containing usage data generated during the execution of the Billing Functional Usage Test, or any other suitable information. The testing entity analyzes the collected data to formulate expected results against which carrier bills are evaluated.

For example, after a change occurs during POP Domain testing, ILEC 14 may generate a completion notification and communicate it to test CLEC 18. In general, completion notifications describe changes to customer accounts and charges ILEC 14 generates when making the changes. These one-time charges may also be referred to as non-recurring billing information. Billing test cases often focus on the bills that ILEC 14 generates following its generation of completion notifications to ensure that any resulting charges are applied and prorated correctly. Thus, after a completion notification is received, the testing entity may create a test activity tool (described above) for the associated customer account. The testing entity may also obtain the CSR for the customer account to formulate expected results for the carrier bill. The CSR contains recurring billing information. The testing entity may further examine DUFs, consult ILEC documentation, and review publicly available tariffs to formulate the expected results.

The expected results may be expressed in the form of mock bills or in another suitable manner, according to particular needs. In one embodiment, the creation of a mock bill helps to substantially reduce or eliminate any bias that might result from attempts to reconstruct, with the benefit of hindsight and perhaps giving ILEC 14 the benefit of any doubt, the manner in which ILEC 14 generated the bill. The testing entity may extract data from the fields of orders, completion notifications, CSRs, or any other electronically available sources and automatically populate one or more appropriate fields of the mock bill with the extracted information.

ILEC 14 generates carrier bills in either paper or electronic form and then communicates the bills to test CLECs 18. After a bill is received, the testing entity compares the bill content with the expected results according to suitable evaluation criteria and notes any discrepancies. In one embodiment, the fields of an electronic bill may be compared automatically with the corresponding fields of an electronic mock bill to improved reliability and efficiency. Where manual comparisons are used, standardized worksheets may be created for each bill type to provide the tester with the objectives of the test or a portion thereof, define the data to be compared for the test or test portion, provide detailed procedures the tester is to follow in making the comparisons for the test or test portion, and other detailed information. Use of such worksheets preferably improves consistency for a particular test and across all testers and therefore the reliability of the test results.

The testing entity may examine CLEC-level (aggregate) billing information, as well as customer-level billing information. As an example, aggregated billing information may include totals for a particular calling area. The testing entity may count the number of test calls placed in the particular area during a particular time period and then compare the counts appearing on the bills to the number of test calls actually made. As another example, the testing entity might count the number of cartridge tapes a test CLEC 18 receives and compare this to the number of cartridge tape delivery charges appearing on the CLEC administrative bill. For customer-level test cases, the testing entity examines all products and services associated with the customer account to verify that products and services the customer ordered appear on the bill and were billed accurately. The testing entity might further examine the bill format to determine whether all of the required charge types (e.g., prorates, recurred charges, usage charges, etc.) appear on the bill.

The relationships between various components that may be used for part one of the test are illustrated in FIG. 16. Although FIG. 16 is provided as an example, the present invention contemplates one or more of these components being absent or used in a different manner according to particular needs.

In a particular embodiment, a work plan suitable for this test might include the following sequence of activities, although any suitable activities and sequence may be used according to particular needs: (1) meet entrance criteria, (2) document the test schedule and participation, (3) meet with ILEC SMEs to review sample bills, (4) determine appropriate billing scenarios and quantity, (5) determine CSR information needed for completion, (6) obtain tariff, EMI, and informational material, (7) collect telephone and circuit ID information for test cases, (8) review billing information from the ILEC 14 and perform walkthrough of bills, (9) obtain telephone and circuit numbers for usage test, (10) develop detailed test cases, (11) create backup detail for test cases (TNs, products, usage types), (12) identify any modifications to evaluation criteria if necessary, (13) identify key fields required to validate evaluation criteria, (14) define requirements for usage totaling, (15) develop test package, (16) submit test package for peer review, (17) define records for different bill types to be tested, (18) obtain reliable CSR information for billing orders, (19) collect bills for first and second consecutive cycles for each bill type, (20) validate bills for first and second cycles for each bill type, (21) identify discrepancies and exceptions from validated test cases, (22) create and update issues log, (23) develop logging procedures for bills received and log all bills, (24) log all work papers and documentation, (25) compile final results, (26) write final report, and (27) submit final report for peer review as part of exit review process.

Analysis of bill delivery timeliness (part two of the test) involves examining procedures the ILEC 14 uses to generate carrier bills and send the bills to CLECs 16. The testing entity may also rely upon interviews with ILEC SMEs and review of associated documentation. In one embodiment, the bill timeliness analysis has two primary components. The first component is a statistical analysis of the bill dates in comparison to the dates the bills are received. As bills are received, dates of receipt and the bill dates are recorded and the numbers of elapsed business days calculated. This data is statistically analyzed to determine timeliness. The second component involves comparing data collected from the interviews and documentation with the appropriate evaluation criteria.

Analysis of cycle balancing procedures (part three of the test) and analysis of procedures for managing historical data (part four of the test) involve interviewing ILEC SMEs and examining associated documentation to determine whether adequate controls exist, based on appropriate evaluation criteria. The latter analysis may also include an evaluation of events associated with actual requests for historical billing data. In this case, for example, the testing entity (acting as pseudo-CLEC 18) may request that ILEC 14 resend historical billing data in the form of prior carrier bills or otherwise.

Test target areas and associated evaluation measures are summarized in the table below. The last column of the table indicates how evaluation criteria may, in one embodiment, correspond to particular evaluation measures.

Test Target Areas and Measures

| Process Areas | Sub Process Areas | Measures | Criteria |
|---|---|---|---|
| Maintain bill balance | Carry balance forward | Accuracy of bill balance | 82–93, 101–106, 109–110, 118–124, 129–134 |
| Verify billing accounts | Verify billing accounts | Completeness and accuracy of extraction | 1–3, 12–17, 24–29, 33–35, 58–63, 69–71, 128 |
| Billing accuracy | Verify normal recurring charges | Completeness and accuracy of data | 18–23, 64–67, 72–75, 107 |
| | Verify one-time charges | Completeness and accuracy of data | 4, 7, 21–23, 36–39, 68–71, 76–81, 108, 125, 127 |
| | Verify prorated recurring charges | Completeness and accuracy of data | 5–6, 8–11, 22–23, 40–57, 69–71, 125 |
| | Verify Usage Charges | Completeness and accuracy of data | 95–100, 112–117, 126 |
| | Verify discounts | Completeness and accuracy of data | 4–11, 18–21, 36–57, 64–75 |
| | Verify adjustments (debits and credits) | Completeness and accuracy of data | 30–32, 135 |
| | Verify late charges | Completeness and accuracy of data | 94, 111 |
| Balance cycle | Define cycle balancing and reconciliation procedures | Completeness and effectiveness of balancing and reconciliation procedures | 144–146, 150–156 |
| | Produce Control Reports | Completeness and accuracy in generation of control elements | 147–149 |
| | Release cycle | Compliance with balancing and reconciliation procedures | 152–153 |
| Deliver bill | Deliver Bill Media | Timeliness and controllability of media delivery | 136–143 |
| Maintain bill history | Maintain billing information | Timeliness and controllability of billing information | 157–160 |
| | Access billing information | Accessibility and availability of billing information | 161–162 |
| Request resend | | Timeliness and Accuracy of the delivery | 163–164 |

Evaluation criteria for bill content may include one or more of the following, without limitation:

Analysis of CABS Bill Content

| Criteria | Description |
|---|---|
| | Other Charges and Credits/Service Order Level |
| 1 | Service Order Completion Date = Expected Completion Date |
| 2 | PON = Test Case PON |
| 3 | Expected TNs = Actual TNs |
| 4 | Beginning and thru dates for services correspond to the expected result |
| 5 | USOC/Actual services listed match expected |
| 6 | New services/disconnect services appear as fractional charges |
| 7 | One time charges are labeled |

-continued

| Criteria | Description |
|---|---|
| 8 | Zone matches expected result |
| 9 | Amount matches expected result |
| 10 | Quantity matches expected result |
| 11 | Rate matched expected rate |
| | Customer Service Record (CSR)/TN Level |
| 12 | Customer service address = test case address |
| 13 | PIC matches expected result |
| 14 | LPIC matches expected result |
| 15 | TNs listed for the CSR match the expected TNs in the test case |
| 16 | Activity dates for TNs correspond to the expected activity dates. |
| 17 | All expected USOC/services per TN are listed |
| 18 | The quantities per TN/USOC = expected result |
| 19 | The amount = expected amount for monthly recurring charge |
| 20 | Other Features match expected |
| | Other |
| 21 | Service Order ID Matches Completion |
| 22 | All expected USOCs appear |
| 23 | No unexpected USOCs appear |

Analysis of CRIS Resale Bill Content

| Criteria | Description |
|---|---|
| | Bill Content Service Order Charges and Credits |
| | BTN/TN Information: |
| 24 | BTN/TN ID = expected BTN/TN ID |
| 25 | BTN/TN = expected BTN/TN |
| | Completion Date, Order ID, PON: |
| 26 | Begin Order ID = expected Begin Order ID |
| 27 | Completion Date = expected Completion Date |
| 28 | Order ID = expected Order ID |
| 29 | PON = expected PON |
| | Detail of Adjustments with Charges: |
| 30 | Adjustment Info ID = expected Adjustment Info ID |
| 31 | Adjustment Phrase = expected Adjustment Phrase |
| 32 | Adjustment Charge = expected Adjustment Charge |
| | USOC Information: USOC From And Thru Date: |
| 33 | USOC Information ID = expected USOC Information ID |
| 34 | From date = expected From date |
| 35 | Thru date = expected thru date |
| | USOC Name, Quantity, and Charge Amount: |
| 36 | USOC Information ID = expected USOC Information ID |
| 37 | USOC Name = expected USOC Name |
| 38 | Quantity = expected Quantity |
| 39 | Amount = expected Amount |
| | Bill Content Local Calls, Mass Announcements, and Directory Assistance: |
| 40 | Non-Itemized Usage ID = expected Non-Itemized Usage ID |
| 41 | Originating # = expected Originating # |
| 42 | Quantity = expected Quantity |
| 43 | Rate = expected Rate |
| 44 | Total Amount = expected Total Amount |
| 45 | Initial/Additional Ind. |
| 46 | Call Region/Call Type = expected Call Region/Call Type |
| | Itemized Convenience Calls |
| 47 | Itemized Usage ID = expected Itemized Usage ID |
| 48 | Telephone # = expected Telephone # |
| | Bill Content Service Order Charges and Credits |
| 49 | Date = expected Date |
| 50 | Call From Location = expected Call From Location |

-continued

| Criteria | Description |
|---|---|
| 51 | From Number = expected From Number |
| 52 | Call To Location/Type of Call = expected Call To Location/Type of Call |
| 53 | Terminating # = expected Termination # |
| 54 | Time = expected Time |
| 55 | AM/PM = expected AM/PM |
| 56 | Duration Min/Sec = expected Duration Min/Sec |
| 57 | Amount = expected Amount |
| | Bill Content TN Level Checks for CSR: |
| | BTN: |
| 58 | CSR ID = expected CSR ID |
| 59 | BTN = expected BTN |
| | USOC Name, PIC, LPIC: |
| 60 | USOC Info ID = expected USOC Info ID |
| 61 | USOC Name = expected USOC Name |
| 62 | PIC = expected PIC |
| 63 | LPIC - expected LPIC |
| | USOC Quantity and Monthly Rate: |
| 64 | CSR Info ID = expected CSR Info ID |
| 65 | Quantity = expected Quantity |
| 66 | Monthly Rate = expected Monthly Rate |
| 67 | Charged Amount = expected Charged Amount |
| | USOC General |
| 68 | USOC General |
| | Other Charges and Credits/Service Order Level/Order Level |
| 69 | PON = Expected PON |
| 70 | Order From and Through Dates = Expected From and Through Dates |
| 71 | Actual Circuit ID associated with an order |
| | Circuit ID Level |
| 72 | Actual services listed match expected services |
| 73 | Per month charges for the specified service match the expected monthly charge |
| 74 | Amounts for the specified service match the expected amount |
| 75 | Order from and through dates match to expected dates for each service. |

Analysis of CRIS Administrative Bill Content

| Criteria | Description |
|---|---|
| | Other Charges and Credits: |
| 76 | Records Processed counts listed match expected results |
| 77 | Dates for Records Processed listed match expected results |
| 78 | Local Usage Transmission counts match expected results |
| 79 | Dates for Local Usage Transmission match expected results |
| 80 | Tape Cartridge counts match expected results |
| 81 | Dates for Tape Cartridges match expected results |

Analysis of Format, Bill Calculation and Cross Checks for CRIS Administrative, CRIS Abbreviated, CRIS Loop, CRIS Loop Summary, CABS Y40, and CRIS Summary Listing Bills

| Criteria | Description |
|---|---|
| | Bill Format Sections Validation |
| 82 | Bill Format Sections |
| 83 | Page Headers |
| 84 | Remittance Section |
| 85 | Summary of Accounts |
| 86 | Summary of Bill total Amount |

-continued

| Criteria | Description |
|---|---|
| 87 | Customer Service Section |
| 88 | Summary of ILEC Charges |
| 89 | Monthly Service-Detail |
| 90 | Itemization of Charges |
| 91 | Other Charges and Credits |
| 92 | Address Page Mailing Page |
| 93 | Total of Balance Due |
| 94 | Total of Late Payment Charges |
| 95 | Detail of Usage Charges |
| 96 | Detail Summary of Usage Charge |
| 97 | Summary of Usage Charges |
| 98 | Detail of Usage Statistics |
| 99 | Detail Summary of Usage Charge for All End Office |
| 100 | Summary of All Usage Charges |
| 101 | Detail of Tax |
| 102 | Detail of Surcharge |
| 103 | Customer Service Section |
| 104 | Summary Bill Total Amount |
| 105 | Summary of Account |
| 106 | Summary of ILEC Charges |
| 107 | Monthly Service-Detail |
| 108 | Other Charges and Credits |
| 109 | Itemization of Charges |
| 110 | Detail of Balance Due |
| 111 | Detail of Late Payment |
| 112 | Detail of Usage Charges |
| 113 | Detail Summary of Usage Charge |
| 114 | Summary of Usage Charges |
| 115 | Detail of Usage Statistics |

-continued

| Criteria | Description |
|---|---|
| 116 | Detail Summary of Usage Charge for All End Office |
| 117 | Summary of All Usage Charges |
| 118 | Detail of Tax |
| 119 | Detail of Surcharge |
| 120 | Customer Service Records |
| | Bill Cross Check |
| 121 | Remittance Page and Summary of Accounts |
| 122 | Summary of Account |
| 123 | Summary of Charges |

Analysis of Format, Bill Calculation, and Cross Checks for CRIS Resale Bill on BOS BDT

| Criteria | Description |
|---|---|
| | Bill Record ID Validation: |
| 124 | Control Records |
| 125 | OC&C Records |
| 126 | Usage Records |
| 127 | Surcharge Records |
| 128 | CSR Records |
| | Elements for Verification in Record IDs |
| 129 | Elements for Verification in Record IDs |
| 130 | Record ID: 10050501 |
| 131 | Record ID: 40100500 |
| | Bill Calculations |
| 132 | Local Billed Amount = Monthly Charges Total |
| 133 | OC&C Amount Local = Total Other Charges and Credits |
| 134 | Local Subtotal = Local Total |
| 135 | Adjustment Amount = Total Credit Adjustment |

Evaluation criteria for bill delivery timeliness may include one or more of the following, in any suitable combination and without limitation:

Procedural Consistency and Integrity: (136) the bill delivery responsibilities are clearly defined; (137) the scope and objectives for bill delivery are clearly defined, documented, and communicated to ensure accurate and timely billing; (138) the process includes procedures to ensure creation of customer bills on the appropriate medium; and (139) the process includes procedures to ensure that billing media are transmitted or shipped per established schedules to correct locations.

Performance Measurement and Reporting: (140) suitable process performance metrics are defined and measured; (141) responsibilities for tracking performance are assigned; (142) process improvement procedures are defined and responsibilities assigned; and (143) bills are timely, as defined in industry guidelines or otherwise (bill timeliness may be expressed according to the cumulative percentage of bills arriving within a specified number of business days, for example, thirteen percent in three business days, forty-two percent in four business days, and so on).

Considerations relevant to particular evaluation criteria may include, without limitation (consideration for a criterion being listed after the number of the criterion): (136) organization charts, job descriptions, responsibility charters, process flows and procedures, inputs and outputs; (137) scope includes timely creation and delivery of customer bill on the correct medium, objectives are clearly defined, documented, and communicated to CLECs 16, scope of support defined, access to services is defined and appropriate, customer responsibilities and customer-provided data requirements defined; (138) maintenance of customer media selection, verification of production quality checks; (139) scheduling and execution, verification of correct receipt, event logging and follow-up, standard intervals, sign-offs, escalation; (140) existence of measures and measurement processes; (141) responsibilities assigned, management reviews, management intervention; and (142) historical performance improvement activities, responsibilities assigned, management review.

Evaluation criteria for bill cycle balancing procedures may include one or more of the following, in any suitable combination and without limitation:

Procedural Consistency and Integrity: (144) these responsibilities are clearly defined; and (145) scope and objectives of bill cycle balancing are clearly defined, documented, and communicated to ensure accurate and timely billing.

Balance Bill Cycle Process: (146) an internal change management procedure is in place to document process changes; (147) process includes procedures to ensure all customer data (e.g., service orders, address changes, usage) has been properly introduced and applied; (148) the process includes procedures to ensure all payments and adjustments have been properly introduced and applied; (149) process includes procedures to ensure customer data has been rolled forward from previous bill cycle; (150) the process includes reasonability checks to catch errors not susceptible to predetermined balancing procedures; (151) process provides for visual check of printed bills; (152) procedures and checks are in place to assure all stages within the billing process are valid; and (153) the process includes procedures for requesting, tracking, and escalating remedial actions.

Performance Measurement and Reporting: (154) process performance metrics have been defined and measured; (155) responsibilities for tracking performance are assigned; and (156) process improvement procedures are defined and responsibilities assigned.

Considerations relevant to particular evaluation criteria may include, without limitation (consideration for a criterion being listed after the number of the criterion): (144) organization charts, job descriptions, responsibility charters, process flows and procedures, inputs and outputs; (145) scope includes creation of accurate customer bill, objectives are clearly defined, documented, and communicated to customers, the scope of support is defined, access to services is defined and appropriate, customer responsibilities and customer provided data requirements are defined; (146) test beds and test data, control accounts, control totals, user sign-off; (147) control reports, error logs, error recycling, feed back messages, "go/no go" decisions; (148) control reports, error logs, error recycling, feed back messages, "go/no go" decisions; (149) control reports, error logs, error recycling, feed back messages, "go/no go" decisions; (150) cycle to cycle comparisons on dollars or usage, verification of key accounts; (151) visual checks for format, print quality; (153) event logging and follow-up, standard intervals, sign-offs, escalation; (154) existence of measures and associated measurement processes; (155) responsibilities assigned, management reviews and intervention; and (156) historical performance improvement activities, responsibility assigned, management reviews.

Evaluation criteria procedures for managing historical billing may include one or more of the following, in any suitable combination and without limitation:

Procedural Consistency and Integrity: (157) bill history maintenance and bill resend responsibilities and activities are clearly defined, documented, and communicated to ensure availability and timely delivery of prior period billing information to customer; (158) a complete description of the process is defined and documented; (159) process includes procedures to ensure bill history retention requirements are operationally satisfied; and (160) process includes procedures to define, initiate, track, and manage retrieval and transmission of customer requested billing information;

Request Resend Process: (161) customers are provided with instruction on how to request, track, and expedite billing resends; (162) the process includes procedures to log requests and communicate request status to customers; (163) ILEC 14 accepts requests from CLECs 16 to resend historical billing files; and (164) ILEC 14 resends historical billing files in a reasonable period of time.

Considerations relevant to particular evaluation criteria may include, without limitation: (157) organization charts, job descriptions, responsibility charters, process flow and procedures, inputs and outputs; (158) scope includes timely re-creation and re-issuance of previous period customer bill, objectives are defined, documented, and communicated to customers; (159) retention rules, archiving process, off-site storage, disaster recovery; (160) data retrieval, special programming requirements, medium selection and creation, transmission or delivery, event logging and follow-up, standard intervals, sign-off, escalation; (161) documentation, telephone support; and (162) scope of support is defined, access to services is defined and appropriate, customer responsibilities and customer provided data requirements are defined.

Due to the nature of this test, instead of generating particular exceptions for each evaluation criteria mismatch, discrepancies for the various test cases may be grouped into categories of exceptions. In one embodiment, the exception categories may include, without limitation: (1) system-wide billing issues, (2) validation billing issues, and (3) specific content issues. System-wide issues are repeatable and occur consistently throughout the test cases such that they are likely to be global in nature. Validation issues affect the ability of CLECs 16 to validate billing data, including but not limited to carrier bills received from ILEC 14. These issues may include bill presentation and documentation issues that hinder the ability of CLECs 16 to validate the charges on the bills. Specific content issues occur in specific bills, with only one test case for example, and are not identified as being system-wide in nature. While this exception may identify only one occurrence, the issue may be present system-wide and should preferably be investigated under that assumption.

Based on evaluation checklists or otherwise, test results may be generated ("Satisfied," "Not Satisfied," etc.) and comments provided for each of the evaluation criteria used in the particular instance of the test.

RMI Domain

The general purpose of testing in the RMI Domain is to evaluate the systems, processes, and other operational elements associated with the ILEC's establishment and maintenance of business relationships with its wholesale customers—CLECs 16. RMI Domain testing is designed to evaluate the ability of the ILEC 14 to provide ongoing operational support to CLECs 16 in a manner that is both adequate to CLEC business needs and comparable to that provided to the ILEC's retail operations. The report generated by the testing entity should preferably allow the regulatory entity to assess the net impact of RMI Domain issues that it identifies on the ability of CLECs 16 to operate in a competitive environment for local telecommunications services in the particular jurisdiction of interest.

In one embodiment, the RMI Domain may be broken down into the following key test target areas: (1) change management; (2) interface development; (3) account establishment and management; (4) network design, collocation, and interconnection planning; (5) system administration help desk; (6) CLEC training; and (7) forecasting. Each primary test target area may be further broken down into increasingly discrete process and sub-process areas that identify the particular areas to be tested and the types of evaluation measures that apply within each area. According to the present invention, tests have been developed to evaluate each test target area based on the scope of testing to be performed in each area. Particular example process and sub-process areas for each test target area, with example associated evaluation measures and evaluation criteria, are provided below.

There need not be a one-to-one correspondence between test target areas and specific tests. In one embodiment, RMI Domain tests include one or more of the following, without limitation: (1) Change Management Practices Test; (2) Interface Development Test; (3) Account Establishment and Management Test; (4) Network Design, Collocation, and Interconnection Planning Test; (5) System Administration Help Desk Functional Test; (6) System Administration Help Desk Performance Test; (7) System Administration Help Desk Validation Test; (8) CLEC Training Test; and (9) Forecasting Test. Example embodiments of these tests are described in detail below.

A. RMI Change Management Practices Test

This test evaluates the ILEC's overall policies and practices for managing change in the systems, processes, and any other operational elements necessary for establishing and maintaining effective relationships with CLECs 16. The objectives of the test are to determine the adequacy and completeness of ILEC procedures for developing, publicizing, conducting, and monitoring change management. Change management processes provides a framework by which interested parties such as CLECs 16 can communicate desired changes to ILEC 14 and by which ILEC 14 can communicate subsequent changes to these interested parties. Typically, the process will govern all aspects of ILEC/CLEC relationships—all changes to documentation, interfaces, business rules, and other functions are subject to time frames, tracking, logging, and coding procedures of the change management process.

In one embodiment, changes are organized by the following types, without limitation: (1) emergency changes, reserved for modifications required immediately to continue doing business; (2) changes that are specified by regulatory requirements or otherwise arise from regulatory activity; (3) changes that are specified by industry standards or otherwise arise from industry activity; (4) ILEC initiated changes, which may or may not affect ongoing CLEC operations; and (5) CLEC requested changes. The process is initiated through submission of a change request having any of the types listed above. The submitting entity may provide a priority for the request in addition to specifying its type. ILEC 14 then determines the overall priority for the request. ILEC change management documentation should specify required intervals for evaluating and, when appropriate, implementing changes of each type. ILEC 14 should make any modified documentation available for review for a suitable period prior to implementation of non-emergency changes.

Sources of data for the test may include structured interviews with ILEC and industry SMEs conducted according to interview guides, suitable ILEC and industry documentation relating to change management, any actual change requests ILEC 14 makes available to the testing entity, the ILEC change management database, and any other information sources. The testing entity may evaluate ILEC compliance with required or targeted notification, documentation, and functionality roll-out intervals for each type of change request. For example, an ILEC initiated change may require notification of CLECs 16 and distribution of documentation to CLECs 16 specified numbers of days prior to implementation. Analysis of actual change requests that ILEC 14 provides in response to a data request may include determining whether suitable change notifications and documents were generated and communicated to interested parties. Instead or in addition, the testing entity (acting as pseudo-CLEC 18) may submit changes requests to ILEC 14 and then monitor the notifications and documentation that ILEC 14 generates in response to the requests.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Change management | Developing change proposals | Completeness and consistency of change development process | 1–8 |
| | Evaluating change proposals | Completeness and consistency of change evaluation process | 1–2, 4, 7–8 |
| | Implementing change | Completeness and consistency of change implementation process | 1–8 |
| | Intervals | Reasonableness of change interval | 3–8 |
| | Documentation | Timeliness of documentation updates | 3–4, 6 |
| | Tracking change proposals | Adequacy and completeness of change management tracking process | 1, 3, 5–6 |

Evaluation criteria for this test may include one or more of the following, without limitation: (1) change management process responsibilities and activities are clearly defined; (2) the essential elements of the change management process are in place and adequately documented; (3) the change management process includes a framework to evaluate, categorize, and prioritize proposed changes; (4) the change management process includes procedures for allowing input from all interested parties; (5) change management process has clearly defined and reasonable intervals for considering and notifying interested parties with respect to proposed changes; (6) documentation regarding proposed changes is distributed in a timely manner; (7) adequate procedures and systems exist to track information such as descriptions of proposed changes, important notification dates, and change status; and (8) criteria are defined for the prioritization systems and severity coding.

Based on evaluation checklists or otherwise, test results may be generated ("Satisfied," "Not Satisfied," etc.) and comments provided for each of the evaluation criteria used in the particular instance of the test.

B. RMI Interface Development Test

This test is designed to evaluate key aspects of the ILEC's approach to the development and maintenance of interfaces that enable ILEC-CLEC relationships. This may include evaluating the existence and operation of the ILEC's systems and processes for developing, publicizing, conducting, managing, and monitoring certain interface development and associated support activities for CLECs 16.

As described more fully above, for example, CLECs 16 may access ILEC systems for ordering, pre-ordering, and other services using EDI interface 30 or GUI interface 32. A CLEC 16 intending to interface with ILEC 14 is typically instructed to initiate its efforts through an ILEC account manager, who assigns one or more interface development specialists to assist CLEC 16 in accessing and using one or more appropriate interfaces. The work required to facilitate CLEC access to EDI transaction interface 30 in particular may be extensive. In general, ILEC 14 will be responsible for working with the CLEC 16 to establish EDI or other appropriate connectivity and for providing access to non-production systems so that CLEC 16 may test its interface capabilities prior to live implementation (similar to the efforts described above in connection with the POP EDI Interface Certification Test). The work required to facilitate CLEC access to GUI interface 32 may be less extensive, but will still generally require the ILEC 14 to provide the CLEC 16 with training, documentation, necessary security hardware, passwords, and the like.

The sources of data for this test may include interviews with ILEC SMEs according to one or more interview guides, review of relevant ILEC documentation, and any other appropriate information sources. Test activities may include, without limitation: (1) gather appropriate information; (2) review the interface development products to assess whether their successful completion was performed as anticipated with respect to timeliness, accuracy, or other criteria; (3) perform the interviews and documentation reviews; (4) complete evaluation checklists and interview summaries; and (5) develop and document findings in report.

Several aspects of the test may warrant multiple iterations. For example, during the initial phase of testing, the testing entity might identify concerns about carrier-to-carrier testing procedures, availability of adequate test environments, or other issues. As a result, retest activities may be warranted to validate proposed and implemented corrective actions.

For example, the testing entity may review defined testing procedures and conduct preliminary test activities to assess the existence and functionality of the ILEC's implemented and proposed test environments. Such activities may include, without limitation: (1) establishing security and user authentication for carrier-to-carrier testing; (2) sending and receiving pre-validated EDI test transactions; (3) confirming test environment availability, capabilities, and capacity; (4) receiving test bed information (such as a listing of test accounts for which pre-ordering transactions can be developed); (5) obtaining standard sets of test cases and transactions that have been pre-validated to work; (6) following the ILEC's established testing protocols, such as working within standard schedules for CLEC access to testing environments and support; and (7) logging and reporting issues encountered during testing.

As another example, the testing entity may assess the reasonableness of a development process for joint carrier-to-carrier test planning. The testing entity may also verify that proposed and implemented test environments adequately resemble production environments, including but not limited to assessing the procedure for conducting object library comparisons between test and production environments, confirming publication of ILEC internal regression testing results using a published test bed, and verifying the existence of a published test account database and any associated modifications or additions. The testing entity might further assess the procedures for notifying CLECs 16 of changes to test environments and test tools, including confirming that schedules for changes affecting the test environments and test tools were followed and confirming that changes made to test environments and test tools were distributed as specified. Any appropriate retest activities may be conducted according to particular needs.

Test target areas and associated evaluation measures are summarized in the table below. The last column of the table indicates how evaluation criteria may, in one embodiment, correspond to particular evaluation measures.

Evaluation criteria for this test may include one or more of the following, in any suitable combination and without limitation:

Methodology: (1) development responsibilities and activities clearly defined; (2) ILEC 14 has a software/interface development methodology which addresses the definition, design, development, testing, and implementation of requirements and specifications; and (3) the methodology defines how quality will be assured.

Interface Specifications: (4) responsibilities and procedures for developing and updating interface specification documents are clearly defined; (5) the interface specifications that define applicable business rules, data formats and definitions, and transmission protocols are made available to CLECs 16; (6) on-call customer support for interface specifications is available to CLECs 16; and (7) procedures for updating specifications are integrated with formal change management procedures.

Carrier-to-carrier testing: (8) ILEC 14 has a methodology for planning and conducting carrier-to-carrier testing with CLECs 16 seeking to interconnect, including process descriptions for establishing security and user authentication, for establishing test accounts, and for sending and receiving test transactions; (9) functioning test environments and appropriate descriptions are made available to CLECs 16 for all supported interfaces; (10) test environments are stable and segregated from ILEC production environments; (11) on-call support is available for interface testing; (12) CLECs 16 are provided with documented specifications for test connectivity and for administration of tests; (13) active test environments are subject to version control, and CLECs 16 are notified before version changes are made in test environments; (14) procedures are defined to log software "bugs," errors, omissions in specifications, and other issues discovered during carrier-to-carrier testing; (15) on-call support is available for ILEC production interfaces; and (16) regular communication forums (e.g., meetings, newsletters, workshops) are held for the benefit of CLEC interface developers.

Release Management: (17) ILEC 14 has software and interface development methodology that defines the release Test Target Areas and Measures

| Process Areas | Sub-Process Areas | Measures | Criteria |
|---|---|---|---|
| Interface development methodology | Software development | Adequacy and completeness of methodology | 2 |
| | Interface development | Adequacy and completeness of methodology | 1–3 |
| | Provision of specifications and related documentation | Adequacy and completeness of documentation distribution procedures | 4–7 |
| Enabling and testing interfaces | Interface enabling and testing methodology | Adequacy and completeness of carrier-to-carrier enabling and testing procedures | 7, 9, 11, 13 |
| | Availability of test environments and technical support to CLECs | Availability and adequacy of functioning test environments, testing protocols, production cutover protocols, and technical support for all supported interfaces | 9, 11, 13 |
| Installing interfaces | Implementation | Compliance with planned schedule of development | 2–3 |
| Maintaining interfaces | Release management | Adequacy and completeness of interface enhancement and software release protocols | 2–4, 13, 17–20 |
| Capacity management | Capacity management | Adequacy and completeness of capacity management practices for interfaces and gateway systems | 8, 10, 12, 21–23 | management and control process; (18) business rules and software change logs exist, are updated, and are shared with CLECs 16 in a timely manner; (19) technical and business processes for software testing, bug fixes, release notification, and the like exist and are adhered to throughout CLEC interface development and pre-production testing; and (20) measures exist for contingency planning within release management.

Capacity Management: (21) there are defined business scenarios, conditions, or transactions volumes that will trigger the addition of capacity, load-balancing, or system tuning; (22) resources and procedures are in place to adjust for changes in demand of services; and (23) contingency plans for production interfaces exist for mitigating the impact of unexpected changes in business and transaction volume.

Considerations relevant to particular evaluation criteria may include, without limitation (consideration for a criterion being listed after the number of the criterion): (1) organization charts, job descriptions, and responsibility charts exist; (2) process is implemented and guidelines are followed, process is documented, documentation is available, adequate, clear, and relevant, all results from pre-production testing are documented and available, all results from acceptance testing are documented and available; (3) quality control processes, quality testing and audits, acceptance testing is performed to demonstrate that the software satisfies its requirements, defects and required changes are identified and tracked during pre-production testing, methods and procedures are defined to ensure that changes found during all phases of testing are incorporated into all instances of software code; (4) framework and guidelines exist, documentation is complete and available, and changes are communicated both internally and to customers; (5) procedures are clearly defined, documentation is complete, transmission specifications are published, and project plans are available; (6) support process is documented, contact data is published, support personnel are well trained and able to respond to information requests; (7) proposed changes are pro-actively made available, distribution is via email or other rapid delivery medium, intervals are aligned with generally accepted industry standards; (8) methodology is documented, procedures are available, network connectivity assistance is available, information is readily available to CLECs 16; (9) test environments are available, guidelines are clearly communicated to CLECs 16, assistance is available; (10) tools and documentation exist, project plan review; (11) procedures are followed, support contact information is provided, support personnel have the knowledge and the tools necessary to provide required support, communication guidelines are followed; (12) documentation is made available, customer requirements (business rules, technology requirements) are a guide for software development; (13) notification process exists, sufficient time is allowed for CLEC reaction to changes in test environments; (14) procedures exist, personnel are assigned to correct, carriers are notified; (15) support is available, contact information is provided, procedures and support documentation is available; (16) the process is clearly stated, meeting schedules are made available, ILEC 14 actively and regularly solicits input; (17) process is the same as the one described for evaluation criteria (3), process is documented; (18) database exists for logging all proposed activity, customer requests are answered and tracked, a process is in place for considering CLEC input, in addition to escalation procedures in cases where a resolution cannot be reached; (19) future releases are released on schedule basis, acceptance testing of all new releases allows adequate time for CLECs 16 to develop changes, test bed for new releases is available to CLECs 16, earlier versions are supported for predefined period, notification is given before ILEC support is withdrawn, process is in place that prioritizes needs for changes; (20) procedures on dealing with major software errors or incompatibilities in a production environment are documented, methods for regression to prior releases are adequately documented and available; (21) capacity limits or metric thresholds are defined and documented; (22) development, testing, and production environments have detailed procedures for adjusting maximum capacity, resources are available for dynamic allocation and load balancing, technical development support has procedures and resources to handle changes in demand, ILEC documentation describes general capacity management procedures, a capacity management methodology is documented; and (23) back-up plans and procedures exist and are documented for emergency system failures related to increased transaction volume or number of interface users.

Based on evaluation checklists or otherwise, test results may be generated ("Satisfied," "Not Satisfied," etc.) and comments provided for each of the evaluation criteria used in the particular instance of the test.

C. RMI Account Establishment and Management Test

This test evaluates ILEC policies and practices for establishing and managing account relationships between ILEC 14 and CLECs 16. ILEC account management teams serve as the primary points of contact for the CLECs 16 that interact with the ILEC 14. Responsibilities include introducing new CLECs 16 to ILEC products and services, distributing documentation and contact lists to CLECs 16, communicating routine and emergency notifications to CLECs 16, scheduling and leading network planning meetings, and interfacing with other ILEC units. The ILEC procedures for certain account management activities (e.g., returning CLEC calls) is typically set forth in the ILEC's pre-filing commitment with the regulatory entity. The objectives of this test are to determine the adequacy and completeness of the ILEC's procedures for developing, publicizing, conducting, and monitoring account management.

Sources of data for this test include structured interviews with ILEC SMEs, review of relevant ILEC documentation, and any other appropriate sources. In one embodiment, this test includes four broad components: (1) a procedural evaluation; (2) an evaluation of the ILEC's compliance with its pre-filing commitments; (3) an evaluation of the management and structure of documentation made available to the CLECs 16; and (4) a performance evaluation concerning the ILEC's timeliness in responding to CLEC inquiries and requests.

In measuring responsiveness in connection with the performance evaluation, the testing entity may rely on historical data obtained from ILEC 14, one or more CLECs 16, or both. As an example, ILEC account managers may maintain weekly logs of incoming calls from CLECs 16 and the timeliness of their response to those calls. In one embodiment, the testing entity: (1) submits a formal data request to ILEC 14 for all these call logs for a specified time period; (2) reviews the call logs; (3) separates data for calls received while account manager(s) are in the office from data for calls received while account manager(s) are out of the office or otherwise unavailable; (4) for each set of data, determines the number and percentage of calls returned the same day, the next business day, and later than the next business day; (5) compares the results with the ILEC's call return policy, as specified in its pre-filing commitment or other documentation; and (6) generates test results accordingly. In addition, limited CLEC verification of the ILEC data may be obtained for this test. Specifically, input may be solicited from CLECs 16 using written questionnaires and requests for contact names. For the CLECs 16 that respond with contact names, the testing entity interviews the contacts regarding their interaction with ILEC account managers and determines whether the CLEC-provided information is consistent with the data received from ILEC 14.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Establishing an account relationship | Staffing | Appropriate roles and responsibilities | 1–3, 7 |
| | | Capacity, coverage, and account allocation | 1–2 |
| Maintaining an account relationship | Escalation | Adequacy and completeness of escalation procedures | 1, 5–6 |
| | Communications | Compliance with pre-filing commitment for industry letters and conferences | 9–22 |
| | | Adequacy and completeness of emergency communications and notifications | 1, 8 |
| Documentation - CLEC handbook(s) | Document development and distribution | Adequacy and completeness of CLEC handbook development and distribution procedures | 23–33 |
| | Document structure | Adequacy and completeness of CLEC handbook structure | 23–33 |
| Maintaining an account relationship | Response to inquiries and requests for assistance | Timeliness of response | 34–35 |

Evaluation criteria may include one or more of the following, in any suitable combination and without limitation:

Procedural Evaluation: (1) responsibilities and activities are clearly defined; (2) account management staff are organized to provide appropriate account coverage; (3) a complete description of the account establishment and management process is documented; (4) instructions for contacting account managers are clearly defined and published; (5) the procedures for receiving, managing, and resolving CLEC inquiries are defined; (6) the procedures for escalating critical, time-sensitive, and unresolved customer issues are defined; (7) procedures for making routine communications to customers are defined; and (8) procedures for making emergency notifications and communications to customers are defined.

Compliance Evaluation: (9) comprehensive ILEC account management guide describes roles and responsibilities of the account manager; (10) account managers interact with other ILEC units on behalf of CLECs 16; (11) ILEC 14 has formal procedures for alternative account manager coverage in the event of primary account manager's absence for vacation, illness, training, or the like; (12) ILEC 14 designates and notifies each CLEC 16 about its alternative account manager and provides voice mail greetings indicating when the alternative account manager should be contacted; (13) account manager responsibilities are posted on the ILEC's website; (14) account managers are equipped with laptop computers, pagers, and cell phones; (15) ILEC 14 has senior management and technical support staff to support account managers; (16) procedures are formalized to return CLEC calls in a timely manner (e.g., on the day received if the account manager is available and in no event later than next business day); (17) performance measures (as defined in the ILEC pre-filing) used to allocate account managers and evaluate whether to add account managers; (18) the account managers sponsor and actively participate in a user group for facilities-based CLECs 16; (19) ILEC 14 provides notification of "quiet periods" (resulting from tandem switch software upgrades or switch replacements) as they occur and at least thirty days in advance of any such period; (20) ILEC 14 provides notification of urgent situations impacting "quiet period" schedules as soon as ILEC 14 becomes aware of the need to modify the quiet period schedule; (21) CLECs 16 are notified thirty days in advance of cutovers when CO switches are replaced; and (22) ILEC 14 provides and updates a list of COs with known physical collocation space constraints and COs with only unconditioned space remaining.

Documentation Evaluation: (23) the ILEC responsibilities and procedures for developing, updating, and correcting documentation are clearly defined; (24) the responsibilities and procedures for maintaining distribution lists and for distributing documentation are clearly defined; (25) the distribution procedure allows the latest document versions to be made available to interested parties in electronic and paper format in a timely manner; (26) training is provided for use of documentation; (27) the document version is indicated clearly throughout each document; (28) document provides cross-references and has clear citations directing readers to relevant sources of additional information; (29) documents instruct users how to notify ILEC 14 about document errors or omissions; (30) documents indicate their scope and purpose; (31) documents contain tables of contents; (32) documents are logically organized with clear page numbering and section labeling; and (33) documents contain glossaries of terms, including explanations of acronyms.

Performance Evaluation: (34) whether CLEC calls are returned in a timely manner (e.g., on the same day they are received) when the account manager is in the office; and (35) whether CLEC calls are returned in a timely manner (e.g., no later than the following business day) when the account manager is out of the office or otherwise unavailable.

Considerations relevant to particular evaluation criteria may include, without limitation (consideration for a criterion being listed after the number of the criterion): (1) organization/team chart, responsibilities and roles are defined, responsibilities are documented; (2) list of account managers assigned to CLECs 16, "buddy" system is utilized to backup other account managers, documentation on account management staff is made available; (3) internal document establishing guidelines and procedures for account managers, the process for addressing roles and responsibilities of account managers are documented; (4) different means of addressing questions/concerns are available, other account manager contact information available if primary account manager is absent; (5) tracking system for responding to CLEC calls, procedures for addressing inquiries documented; (6) account manager knowledgeable in resolving issues, account manager familiar with proper resources in addressing CLEC issues; (7) process in communicating with CLEC 16 is documented, different mediums used in communicating with CLECs 16 effectively; (8) notifications to the CLECs 16 are communicated are executed in an effective manner, emergency notifications are sent out to the proper persons; (9) roles and responsibilities of account managers are documented and accessible by CLECs 16; (10) account manager acts on behalf of CLEC 16 to address any UNE concerns, account manager has working knowledge of UNE; (11) procedures for coverage are documented and available to CLECs 16, contact information for backup is made available to CLECs 16; (12) procedure for handling alternative account managers is documented, contact list of the alternative account managers exists; (13) the responsibilities are available and documented on website, accurate and current contact information; (16) call logs are maintained in a database, process is documented, turn around on returning calls meets documented guidelines and expectations; (17) regular performance metrics in place; process of performance evaluation is documented; (23) specific teams and roles are responsible for updating documentation, process of reviewing, and integrating teams for shared knowledge is in place; (24) distribution list is maintained and updated in a database, personnel are responsible for interacting with the CLECs 16 for current information, different means (e.g., Internet, e-mail) in place for distributing documentation; (25) most recent updates are available and current to the CLECs 16, notifications are sent out to distribution list for latest document updates; and (26) information is readily accessible and is arranged in a logical manner, electronic versions of documentation available for performing quick search queries.

Based on evaluation checklists or otherwise, test results may be generated ("Satisfied," "Not Satisfied," etc.) and comments provided for each of the evaluation criteria used in the particular instance of the test.

D. RMI NDR, Collocation, and Interconnection Planning Test

This test evaluates certain key aspects of the ILEC's network design request (NDR), collocation, and interconnection planning procedures. ILEC 14 is typically required to provide these services to any facilities-based CLECs 16 to support the provisioning of UNEs. In one embodiment, the test includes an NDR evaluation and a collocation and interconnection planning evaluation.

In general, the NDR process involves ILEC 14 gathering information from a CLEC 16 concerning its desired service offerings, jointly determining with CLEC 16 a network design suitable for establishing its presence in the ILEC's network, and initiating the establishment of CLEC services based on the CLEC's desired product offerings (e.g., determining Line Class Codes, collocation and trunking requirements, operator services and billing preferences, etc.).

Virtual or physical collocation may be required for any CLECs 16 wishing to offer UNE services such as local loop or interoffice facilities. Virtual collocation involves a CLEC 16 purchasing equipment that the ILEC 14 then administers and maintains within its CO according to CLEC instructions. Although the equipment is dedicated to the CLEC's use, CLEC 16 will not typically have physical access to the equipment. Physical collocation involves ILEC 14 providing a secure location in its CO for the CLEC 16 to install, maintain, and administer equipment. The collocation process generates a number of issues. For example, for virtual collocation, CLEC 16 must procure and deliver the equipment in a timely manner, ILEC 14 must identify rack space for storing the equipment, CLEC 16 must have orders provisioned on the equipment to determine that it is fully functional, and ILEC 14 must adequately maintain the equipment. For physical collocation, ILEC 14 must determine space availability and the cost to prepare the space for collocation, must prepare the space for collocation, and must conduct one or more meetings to turn the collocation cage over to CLEC 16. Although the test is described as if collocation is the manner in which CLECs 16 must gain access to UNEs, other appropriate ILEC products (e.g., Enhanced Local Loop (EEL)) and interconnection for other suitable purposes (e.g., network-to-network interconnection with a long distance carrier) may be examined according to particular needs.

The sources of data for this test may include interviews with ILEC SMEs according to predetermined interview guides, review of relevant ILEC documentation, observation of ILEC activities, and any other suitable information sources. The test objectives may include: (1) determining whether CLEC 16 has sufficient information to adequately prepare for NDR, collocation and interconnection planning activities; (2) determine whether the NDR planning process is sufficiently well structured and managed to yield the desired results; (3) determine whether the collocation planning process is sufficiently well structured and managed to yield the desired results; and (4) determine whether the interconnection planning process is also sufficiently well structured and managed to yield the desired results.

Test target areas and associated evaluation measures are summarized in the table below. The last column of the table indicates how evaluation criteria may, in one embodiment, correspond to particular evaluation measures.

| Process Areas | Sub Process Areas | Measures | Criteria |
|---|---|---|---|
| NDR process | Preparation for NDR meetings | Usability and completeness of NDR forms | 8 |
| | NDR meetings | Adequacy and completeness of process | 1–7 |

Test Target Areas and Measures

| Process Areas | Sub Process Areas | Measures | Criteria |
|---|---|---|---|
| Collocation | Collocation requirements forecasting | Usability and completeness of collocation forecast forms | See results from Test I 9–23 |
| | Evaluation of collocation requirements process | Adequacy and completeness of process | 9–23 |
| | Forecast analysis | Availability of results to commission and CLECs | See results from Test I |
| Interconnection planning | Interconnection planning information requirements | Completeness and usability of instructions for preparing for the interconnection planning meeting | 9–12, 14–23 |
| | Evaluation of Interconnection Planning process | Adequacy and completeness of process | 9–12, 14–23 |

Evaluation criteria for the NDR evaluation may include, without limitation: (1) NDR responsibilities and activities are well defined; (2) scope and objectives of NDR are clearly defined and documented; (3) essential elements of NDR process are in place and adequately documented; (4) the NDR process includes procedures for addressing any errors and exceptions; (5) the NDR process defines key meetings and milestones; (6) processing intervals for NDR are established; (7) an escalation and problem resolution method is established; and (8) forms and templates are provided facilitating data collection for NDR.

Evaluation criteria for the collocation and interconnection planning evaluation may include, without limitation:

Procedural Consistency and Integrity: (9) collocation projects are planned and executed according to a documented and structured methodology; (10) the ILEC and CLEC collocation responsibilities are clearly defined; (11) collocation methodology specifies key meetings and milestones; (12) a common tracking system is used to track collocation projects; (13) decisions are documented and communicated to all key ILEC and CLEC participants; (14) procedures are defined to ensure that the CLECs 16 have access to facilities as required; (15) collocation process includes a dispute resolution and escalation process; (16) procedures are defined to ensure that qualified personnel are assigned to a project; and (17) procedures are defined to ensure that project staff are available to collaborate and are empowered to resolve issues at the working level.

Scope, Schedule, and Cost Management: (18) procedures are established to define the scope of each collocation project; (19) formal procedures are followed to change scope and changes in scope are quantified and tracked; (20) the sequence and duration of collocation activities are defined and documented, including establishing list of due dates for deliverables for CLECs 16 and ILEC 14; (21) deviations from planned schedule are tracked and managed; (22) costs of collocation activities are estimated and documented; and (23) procedures are in place to manage the costs of collocation activities and collocation price changes that may affect a CLEC 16 are communicated before they are incurred.

Based on evaluation checklists or otherwise, test results may be generated ("Satisfied," "Not Satisfied," etc.) and comments provided for each of the evaluation criteria used in the particular instance of the test.

E. RMI System Administration Help Desk Functional Test

This test evaluates certain key aspects of the ILEC's system administration help desk procedures for processing, closing, tracking, and escalating calls from CLECs 16 regarding the connectivity and administration of their system interfaces to ILEC 14. Depending on the nature of the call, the issue may be resolved during the course of the call, referred to another technician for communication with CLEC 16, or referred to a more appropriate ILEC help desk (e.g., POP Domain help desk 50) for further processing. ILEC management practices for capacity planning, performance measurement, and process improvements are also evaluated.

The sources of data for this test may include structured interviews with ILEC SMEs according to interview guides, review of the relevant ILEC documentation, observation of ILEC activities, and any other appropriate information sources. The test objectives may include, without limitation: (1) determining the completeness and consistency of overall system administration help desk process; (2) determine whether the escalation procedures are correctly maintained, documented, and published; (3) determining the existence and functionality of procedures for measuring, tracking, projecting, and maintaining system administration help desk performance; (4) ensure existence of reasonable measures to ensure integrity of system administration help desk data and the ability to restrict access to parties with specific access permissions; and (5) ensure the overall effort has effective management oversight.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Receive help desk call | Resolution of user question, problem, or issue | Completeness and consistency of process | 1–3, 6–8, 10–1 |
| Close help desk call | Closure posting | Completeness and consistency of process | 1, 4, 8–10 |
| Status tracking and reporting | Status tracking and reporting | Completeness and consistency of reporting process | 1, 8–11 |
| Problem escalation | User initiated escalation | Completeness and consistency of process | 1, 4, 11 |
| Capacity management | Capacity planning process | Completeness and consistency of process | 1, 12, 14, 16 |
| Security and integrity | Data access controls | Safety of process | 1, 6, 13 |
| Process management | General management practices | Completeness and consistency of operating management practices | 1, 10, 12, 14–16 |
| | Performance measurement process | Controllability, efficiency and reliability of process | 1, 14–15 |
| | Process improvement | Completeness of process improvement practices | 1, 16 |

Evaluation criteria for this test may include one or more of the following, in any suitable combination and without limitation:

Procedural Consistency and Integrity: (1) responsibilities and activities are clearly defined; (2) scope of services includes all key CLEC requirements; (3) the scope and objectives are clearly defined, documented, and communicated to CLECs 16; (4) a complete (i.e. beginning-to-end) description of the help desk process is documented; and (5) the help desk process includes procedures for addressing errors and exceptions;

Procedural Elements: (6) help desk process includes complete and consistent call intake procedures (e.g., for logging and acknowledgement); (7) the help desk process defines criteria and procedure for severity coding of help desk calls; (8) the help desk process includes procedures for referral; (9) the help desk process includes complete and consistent procedure for closure posting; (10) the help desk process includes complete and consistent procedures for status tracking and management reporting; (11) the help desk process includes complete and consistent procedures for escalating issues/problems; (12) help desk process includes complete and consistent procedures for capacity planning; and (13) help desk process includes procedures for maintaining security and integrity of data access controls.

Performance Measurement and Reporting: (14) suitable process performance measures are defined and measured; (15) responsibilities for tracking performance are assigned; and (16) process improvement procedures are defined and responsibilities assigned.

Considerations relevant to particular evaluation criteria may include, without limitation (consideration for a criterion being listed after the number of the criterion): (1) organization charts, job descriptions, responsibility charters, documentation exists, documentation available to CLEC and ILEC personnel, process flows; (2) access to help desk is defined and appropriate, customer responsibilities and customer provided data requirements defined, ILEC actively and regularly solicits input, procedures are clear, documented, and followed; (6) call answering and routing, data logging, call-backs, the procedures are clear, documented, and followed; (7) call answering and routing, call logging data requirements, priorities and severity codes, procedures are clear, documented, and followed; (9) time and causes are posted, criteria established to close a call, procedures are clear, documented, and followed; (10) setting target dates, regular status reporting, status access, management oversight; (11) the process includes standards for escalation, procedures are clear, documented, and followed, documentation made available to CLEC and ILEC personnel; (12) load measurement, load projection, work force requirements plans, actions to change capacity defined, criteria for action defined, responsibility for capacity action is assigned, procedures are clear, documented, and followed; (13) safeguards against unauthorized access to data, data audits, procedures are clear, documented, and followed; (14) representative training, SME support, process flows, work instructions and business rules, tools, logs, timeliness standards, timeliness measures are aligned with generally accepted standards, timeliness of process is measured, the procedures are clear, documented, and followed, existence of measures, measurement processes, management reviews, management interventions; and (15) responsibility assigned, historical performance improvement activities, process for making changes defined and documented.

Based on evaluation checklists or otherwise, test results may be generated ("Satisfied," "Not Satisfied," etc.) and comments provided for each of the evaluation criteria used in the particular instance of the test.

F. RMI System Administration Help Desk Performance Test

This test evaluates the performance of the system administration help desk process in terms of timeliness from inception (i.e. receipt of call) to closure (i.e. resolution of issue). This test may rely primarily on the analysis of performance data concerning closed trouble tickets maintained in an ILEC database. Information may be obtained from one or more CLECs 16 and used to validate such ILEC-provided data where appropriate.

ILEC procedures typically instruct system administration help desk personnel to log all incoming calls in an appropriate database. In one embodiment, each such call is assigned a unique trouble ticket number in the database. The date the trouble ticket was opened, relevant CLEC information, and a description of the issue and its resolution are logged in the database. Each trouble ticket may also be assigned a severity code (e.g., critical, major, minor, enhancement, informational). The ILEC procedures also typically require these trouble tickets to be "closed" upon resolution and their closure dates to be logged in the database. The database may maintain the "age" of each trouble ticket, for example, the number of days the trouble ticket has remained open.

In one embodiment, the testing entity creates a closed trouble ticket database using the information in the system administration help desk database, for example, by extracting the trouble ticket number, severity code, age, and date opened from the system administration help desk database for all records having a closed ticket status. To measure the timeliness of the ILEC's closure posting process, the testing entity may then perform the following operations, without limitation: (1) review the closed trouble ticket database for records with obvious data anomalies and exclude such records from the analysis; (2) sort the records in the closed trouble ticket database by severity code; (3) review the records to determine the length of time between the inception and closure for each record (i.e. the age of the trouble ticket at closure); (4) sort the records according to their ages at closure, for example, in intervals of one or more days; and (5) generate test results reflecting the ages at closure for the trouble tickets of each severity code. The records might be further sorted according to the dates the trouble tickets were opened to provide information about how performance may have changed over time.

In addition, limited CLEC verification of selected ILEC data may be used. Specifically, input may be solicited from CLECs 16 using written questionnaires and requests for contact names. For the CLECs 16 that respond with contact names, the testing entity interviews these contacts and reviews relevant information regarding their interaction with the ILEC system administration help desk. The testing entity then determines whether the CLEC-provided information is consistent with the data obtained from ILEC 14.

Test target areas and associated evaluation measures are summarized in the table below. The last column of the table indicates how evaluation criteria may, in one embodiment, correspond to particular evaluation measures.

| Test Target Areas and Measures | | | |
|---|---|---|---|
| Process Areas | Sub-Process Areas | Measures | Evaluation Criteria |
| Close Help Desk Call | Closure posting | Timeliness of process | Specified percentage of trouble tickets are closed within specified number of days following inception |

Based on evaluation checklists or otherwise, test results may be generated ("Satisfied," "Not Satisfied," etc.) and comments provided for each of the evaluation criteria used in the particular instance of the test.

G. RMI System Administration Help Desk Validation Test

This test evaluates call logging, severity coding, closure posting, and other practices of the ILEC's system administration help desk against internal ILEC rules and procedures such as those described above in connection with the RMI System Administration Help Desk Functional Test.

In one embodiment, the testing entity performs the following steps, without limitation: (1) conduct one or more walk-throughs of the system administration help desk to observe ILEC activities and discuss procedures with ILEC SMEs; (2) review appropriate ILEC documentation; (3) review suitable information contained in the system administration help desk database; and (4) analyze a subset of information in the system administration help desk database (e.g., all trouble ticket records opened during a selected time period) to spot-check evaluations of one or more measures, for example, severity coding accuracy and call logging completeness. The information analyzed should preferably provide a representative sample to increase the reliability of the test results. Where CLEC participation is available, it may be desirable to validate the accuracy of the responses provided to CLECs 16 and the accuracy of closure postings.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Initiate help desk call processing | User interface | Ease or use or user interface | 1 |
| Process help desk call | Call logging | Accuracy and completeness of call logging | 2 |
| | Severity coding | Accuracy and completeness of severity coding | 3 |

Evaluation criteria for this test may include one or more of the following, in any suitable combination and without limitation: (1) the help desk interface is clearly and logically organized; (2) call logging procedures are complete; and (3) calls are completely and accurately severity coded in compliance with the ILEC's documented procedures.

Based on evaluation checklists or otherwise, test results may be generated ("Satisfied," "Not Satisfied," etc.) and comments provided for each of the evaluation criteria used in the particular instance of the test.

H. RMI CLEC Training Test

This test evaluates certain aspects of the ILEC's CLEC training program to determine the existence and operation of its procedures for developing, publicizing, conducting, managing, and monitoring CLEC training. A CLEC training program will typically offer training courses concerning various ILEC products and services available to CLECs 16. Training opportunities, along with specific dates, times, and locations of training sessions, may be publicized through various media. CLECs 16 are preferably able to request on-site and customized training from ILEC 14. The ILEC's CLEC training function may be responsible for holding classes, developing courses and curricula, monitoring instructors, and evaluating training effectiveness, among other suitable activities.

Sources of data for this test may include structured interviews with ILEC SMEs according to interview guides, review of the relevant ILEC documentation and databases, observation of ILEC activities, and any other suitable information sources. The test objectives may include, without limitation: (1) determining the existence and functionality of procedures for developing, publicizing, conducting, and monitoring CLEC training; and (2) ensuring that the ILEC's CLEC training effort has effective management oversight.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Training program development | Develop curriculum | Completeness of training curriculum and forums | 1–3, 7, 9 |
| | | Adequacy of procedures to respond to information about training quality and utilization | 1, 4–6, 8–9, 11–12 |
| | | Adequacy of procedures to accept CLEC input regarding training curriculum | 1, 6, 8–9, 12 |
| | Publicize training opportunities | Availability of information about training opportunities | 1, 10 |
| Training program quality assurance | Attendance/ utilization tracking | Adequacy of process to track utilization and attendance of various training tools and forums | 1, 3, 8, 11, 14 |
| | Session effectiveness tracking | Adequacy of process to survey training recipients on effectiveness of training | 1, 3, 8–9, 12 |
| | Instructor oversight | Adequacy of procedures to monitor instructor performance | 1, 3, 5–6, 9, 12–13 |
| Process management | Performance measurement process | Controllability, efficiency and reliability of process | 1, 5–6, 8, 12 |
| | Process improvement | Completeness of process improvement practices | 1, 4, 8, 12–14 |

Evaluation criteria for this test may include one or more of the following, in any suitable combination and without limitation, without limitation:

Procedural Consistency and Integrity: (1) training process responsibilities and activities are clearly defined; (2) the scope and objectives of the training process are clearly defined and documented; (3) essential elements of the process are in place and adequately documented; and (4) the process includes procedures for addressing errors and exceptions.

Procedural Elements: (5) the scope of training services covers all key CLEC requirements; (6) process includes adequate procedure for responding to feedback about training quality and utilization; (7) process includes adequate procedures for accepting CLEC input regarding training curriculum; (8) process includes procedures for publishing information about CLEC training opportunities; (9) process includes procedures to track utilization and attendance of training tools and forums; (10) the process includes procedures to survey training recipients on training effectiveness; (11) process includes procedures to monitor instructor performance; and (12) training offerings are scalable in response to additional demand (e.g., increased class size and number of instructors).

Performance Measurement and Reporting: (13) training process performance measures are defined and measured; and (14) responsibilities for tracking training-related performance are assigned.

Considerations relevant to particular evaluation criteria may include, without limitation (consideration for a criterion being listed after the number of the criterion): (1) organizational structure exists, process is documented, roles and responsibilities are defined; (2) training process is documented and available to instructors, objectives of courses are defined and training session covers all defined objectives; (3) course descriptions, availability of courses, feedback mechanisms as to course material and instructor; (4) the responsibilities are clearly defined for addressing errors, feedback mechanisms for notifying errors, communicating updated documentation to CLECs 16; (5) customized classes made available, training/support is made available after training sessions; (6) feedback mechanisms on course material and instructor exist, significant means of tracking feedback from trainees, database contains up to date surveys per course and instructor; (7) CLEC feedback is conveyed through proper channels, different media are available for feedback; (8) course offerings are readily accessible, scheduling of courses is capable of meeting enrollment demands; (9) the tracking of attendance exists, database contains relevant data for tracking attendance, database capable of identifying attendance based on specific criteria; (10) procedures are in place to allow trainees to comment on curriculum, surveys are distributed to trainees for feedback; (11) process provides feedback to instructor on a regular basis, there are alternative methods of approaching and preparing course material to refine instructor performance, evaluations of course materials and instructor provided by management and trainees, knowledge and teaching methodologies of instructors are considered in evaluations; (12) sufficient coverage exists for demand of instructors and meeting class requirements, course offerings are arranged in a logical sequence with pre-requisite requirements; (13) specific performance metrics used to monitor progression of instructors and the course curriculum; and (14) performance tracking methodologies and responsibilities are in place.

Based on evaluation checklists or otherwise, test results may be generated ("Satisfied," "Not Satisfied," etc.) and comments provided for each of the evaluation criteria used in the particular instance of the test.

I. RMI Forecasting Validation Test

This test evaluates the ILEC's CLEC forecasting process to determine the existence and functionality of procedures for developing, publicizing, conducting, and monitoring forecasting efforts and for ensuring that the overall forecasting effort has effective management oversight. ILEC 14 will typically use its CLEC forecasting process to obtain information from relevant CLECs 16 regarding historical, current, forecasted, or other local demand to allow ILEC 14 to better anticipate future needs. ILEC 14 may review CLEC information to develop its own marketing assumptions, product assumptions, and demand forecasts to allow ILEC 14 to properly size and locate network resources, anticipate capacity requirements for its OSSs 12 and other operational elements, and the like.

Sources of data for this test may include structured interviews with ILEC SMEs according to interview guides, review of the relevant ILEC documentation and databases, observation of ILEC activities, and any other suitable information sources. The test objectives may include, without limitation: (1) determining the existence and functionality of procedures for developing, publicizing, conducting, and monitoring forecasting efforts; and (2) ensuring that the overall forecasting effort has effective management oversight.

Test target areas and associated evaluation measures are summarized in the table below. The last column of the table indicates how evaluation criteria may, in one embodiment, correspond to particular evaluation measures.

Test Target Areas and Measures

| Process Areas | Sub-Process Areas | Measures | Criteria |
|---|---|---|---|
| Forecasting | Forecast development | Compliance with documented ILEC forecasting procedures | 1–5, 8 |
| | Forecast publication and confirmation | Availability of published forecast summaries | 5–9 |

Evaluation criteria for this test may include one or more of the following, in any suitable combination and without limitation:

Procedural Consistency and Integrity: (1) forecasting process responsibilities and activities are clearly defined; (2) scope and objectives of the process are clearly defined; (3) essential elements of the process are in place and adequately documented; and (4) the process includes procedures for addressing errors and exceptions; and Procedural Elements: (5) forms and templates are provided to facilitate data collection from CLECs 16; (6) the data provided by each CLEC 16 is confirmed and verified; (7) ILEC summaries of forecasts are distributed to the CLECs 16; (8) the process includes requirements for periodic forecast revisions; and (9) procedures are in place to preserve the confidentiality of proprietary CLEC information.

Considerations relevant to particular evaluation criteria may include, without limitation (consideration for a criterion being listed after the number of the criterion): (1) responsibilities for processing forecasting, CLEC responsibilities for submitting information; roles and responsibilities of ILEC personnel, organizational charts; (2) documentation check, ILEC interview; (3) process review, documentation check, ILEC interview, account manager responsibilities; (4) documentation check, ILEC interview, account manager responsibilities; (5) website check, any industry updates, account manager responsibilities; (6) documentation check for the procedures, ILEC interview, account manager responsibilities, process verification for CLEC data; (7) confidentiality issues associated with CLEC-specific market information of ILEC, ILEC interview; (8) internal improvements, workshops, any industry updates; and (9) ILEC code of conduct information, roles and responsibilities of ILEC personnel in this regard, ILEC interview.

Based on evaluation checklists or otherwise, test results may be generated ("Satisfied," "Not Satisfied," etc.) and comments provided for each of the evaluation criteria used in the particular instance of the test.

Cross-Domain Evaluation

In one embodiment, the testing entity may perform a live, end-to-end cross-domain evaluation to represent the real CLEC experience rather than by proxy using test bed accounts as for many of the tests described above. For example, this cross-domain evaluation may focus on business digital, residential analog, or other lines. The objective of the test is to evaluate the ILEC's POP, M&R, and Billing Domain systems in real world conditions. The testing entity may use the results of this test as a control by comparing it to information obtained from domain-specific testing. This may allow the testing entity to validate the results of its domain-specific testing and therefore provide an important technical advantage. An example process for cross-domain testing is illustrated in FIG. 17, where "TE" refers to the testing entity and associated personnel.

For the POP activities, the testing entity may place pre-orders and orders for new lines and migrations at actual business and resident locations. Order interfaces including EDI, GUI, and manual, may be employed to submit these service requests to ILEC 14. Commonly requested line types and features will preferably be ordered, possibly involving numerous scenarios. Pre-orders will be evaluated for timeliness, accuracy, and completion. The testing entity will evaluate ordering and provisioning of lines by verifying the timeliness and accuracy of each installation or migration. Volume performance, documentation, help desk support, capacity management, and perhaps other POP Domain activities fall outside of the scope of this test and are preferably tested using specific POP Domain tests described above.

For the M&R activities, physical damage may be intentionally generated on selected lines to initiate the M&R process. This should allow the testing entity to assess the M&R process on the customer end. The testing entity may evaluate the M&R function based on response time, time the trouble is resolved, and accuracy of trouble resolution. MRTAS-related processing and performance, documentation, help desk support, and perhaps other M&R Domain activities fall outside the scope of this test and are preferably tested using specific M&R Domain tests described above.

For the billing activities, the testing entity should evaluate the accuracy and completeness of the bills attributed to each line based on the line type and features provisioned by installing various types of lines having a variety of features. The testing entity may develop unique usage scripts for each line in order to test billing activities. Usage scripts may be developed with predetermined call destinations, call times, and call durations to ensure the accuracy of billing assessment. The billing activities preferably cover approximately two complete billing cycles, although this may be adjusted according to particular needs. Billing metrics, documentation, and cycle fall outside the scope of this test and are preferably tested using specific Billing Domain tests described above.

For business lines, for example, the testing entity may request approximately ten individual lines of varying types and features to be installed (all under separate business accounts). Selected new lines that will be added as a result of this test may be migrated. Upon connection or subsequent migration, the lines will be verified to assess whether the type of line and the features ordered were in fact provisioned in a timely manner. After installation, testers will make a number of calls (e.g., over two billing cycles) following predetermined usage scripts. These business lines will be used solely for the purposes of the Cross-Domain Evaluation. Bills will be evaluated to determine that the correct fees and pricing have been applied based on the type of line and features ordered and provisioned. Accuracy and completeness of the bills based on usage are also evaluated. At various points during the test, selected lines may be intentionally damaged. Test testing entity will report the service problem to initiate the ILEC's M&R process; document the ILEC response time, resolution time, and accuracy of problem resolution; and again test the line for functionality. All business lines will be disconnected after the usage scripts have been completed and M&R tests have been performed. The testing entity will review the final business bills to determine that correct fees and pricing have been applied based on the type of line and features.

Performance Metrics Review

In general, the Performance Metrics Review involves a series of tests to be undertaken in evaluating the systems, processes, and other operational elements that are associated with the ILEC's support for performance metrics. The testing entity preferably performs these tests in addition to domain-specific metrics tests described more fully above. The report generated by the testing entity should allow the regulatory entity to assess the net impact of any metrics-related problems that it identifies on the ability of CLECs 16 to operate in an open competitive environment in the state or other jurisdiction of interest.

In one embodiment, the Performance Metrics Review may be broken down into a number of test target areas which collectively encompass, without limitation, standards and definitions, data processing, and data retention. Each of these target areas may be further broken down into increasingly discrete process and sub-process areas that identify particular areas to be tested and types of measures that apply to each area. According to the present invention, one or more tests are developed to evaluate each test target area based on the scope of testing to be performed in each area. There may not be a one-to-one correspondence between test target areas and specific tests designed to evaluate test target areas. In a particular embodiment, the Performance Metrics Review tests may include: (1) a Data Collection and Storage Test, (2) a Metrics Definition Documentation and Implementation Test, (3) a Metrics Change Management Test, (4) a Metrics Data Integrity Test, (5) a Metrics Calculation and Reporting Test, and (6) a Statistical Evaluation of Transactions Test. Example embodiments of these tests are described below.

A. Data Collection and Storage Test

This test evaluates key policies and practices for collecting and storing raw and target data necessary for the creation of performance metrics. Both procedures for data used in the calculation of the reported metrics and for data required in the calculation of retail analogs are included. The test may rely primarily on interviews, document reviews, and inspections. The objectives of this test are to determine the adequacy and completeness of key ILEC policies and procedures for collecting and storing performance data.

Entrance criteria for the test may include all global entrance criteria having been satisfied, an appropriate test-specific interview guide or questionnaire having been developed, interviewees having been identified and scheduled, and a detailed evaluation checklist having been completed. Test activities may include, without limitation: (1) collect appropriate information; (2) review the collection and storage policies and procedures for both CLEC data and data used in calculations of retail analogs; (3) perform walkthrough inspection of ILEC facilities that are relevant to production of performance measurements; (4) perform interviews and documentation reviews; (5) complete evaluation checklist and interview summaries; and (6) develop and document findings. Exit criteria may be limited to global exit criteria.

Test target areas and associated evaluation measures are summarized in the table below. The last column of the table indicates how particular evaluation criteria may, in one embodiment, correspond to particular evaluation measures.

Test Target Areas and Measures

| Process Areas | Sub Process Areas | Measures | Criteria |
|---|---|---|---|
| Collection of data | Collection policies and procedures for | Adequacy and completeness of | 1–3 |

-continued

Test Target Areas and Measures

| Process Areas | Sub Process Areas | Measures | Criteria |
|---|---|---|---|
| | CLEC and retail data | collection policies and procedures | |
| | Identified collection points | Applicability of and measurability from control points | 4 |
| | Collection tools | Adequacy and scalability of data collection tools | 5–6 |
| | Internal controls | Adequacy and completeness of the internal control process | 7–8 |
| Storage data | Storage policies and procedures for CLEC and retail data | Adequacy and completeness of storage policies and procedures | 9–11 |
| | Identified storage sites | Applicability of and measurability from control points | 12 |
| | Storage tools | Adequacy and scalability of data storage tools | 13–14 |
| | Internal controls | Adequacy and completeness of the internal control process | 15–16 |

Evaluation criteria for these measures may include, in any combination and without limitation: (1) roles and responsibilities of data collectors are clearly defined and documented; (2) policies and procedures for data collection are clearly defined and documented; (3) technical guides describing the data collected are available; (4) the ILEC 14 is able to identify the exact points of data collection; (5) ILEC 14 has adequate capacity to collect data; (6) ILEC 14 has a clearly defined plan for future capacity to collect data; (7) the ILEC 14 has clearly defined and documented error checking mechanisms for collection of data; (8) the ILEC 14 has an adequate and documented security process to collect data; (9) roles and responsibilities of data storage personnel are clearly defined and documented; (10) policies and procedures for data storage are clearly defined and documented; (11) technical guides describing data storage are available; (12) ILEC 14 is able to identify the exact points for data storage; (13) ILEC 14 has adequate capacity to store data; (14) ILEC 14 has a clearly defined plan for future capacity to store data; (15) ILEC 14 has clearly defined and documented error checking mechanisms for storing data; and (16) ILEC 14 has an adequate and documented security process for data storage.

Based on evaluation checklists or otherwise, test results may be generated ("Satisfied," "Not Satisfied," etc.) and comments provided for each of the evaluation criteria used in the particular instance of the test.

B. Metrics Definition Documentation and Implementation Test

This test evaluates the overall policies and practices for documenting and implementing metrics definitions. This may include policies and practices associated with both CLEC and retail measurements. The test may rely primarily on interviews and document reviews. The objectives are to determine the adequacy, completeness, accuracy, and logic of performance metrics documentation. Implementation of the definitions in this test may cover both the exclusions and business rules applied in creating the raw data and any exclusions and business rules applied in calculating metrics from raw data. In one embodiment, this goes beyond determining whether metrics as produced by ILEC 14 are consistent with the documented definitions, as described above in connection with the POP Metrics Test for example.

Entrance criteria for the test may include all global entrance criteria having been satisfied, an appropriate test-specific interview guide or questionnaire having been developed, interviewees having been identified and scheduled, and a detailed evaluation checklist having been completed. Test activities may include, without limitation: (1) collect all appropriate information; (2) perform interviews and review documentation; (3) evaluate the adequacy and appropriateness of the measures set forth in the ILEC's metrics documentation; (4) complete the evaluation checklist and interview summaries; and (5) develop and document findings in report. Exit criteria may be limited to global exit criteria.

Test target areas and associated evaluation measures are summarized in the table below. The last column of the table indicates how particular evaluation criteria may, in one embodiment, correspond to particular evaluation measures.

Test Target Areas and Measures

| Process Areas | Sub Process Areas | Measures | Criteria |
|---|---|---|---|
| Metrics definition | Documentation of metrics definitions | Adequacy and completeness of metrics definitions | 1–2, 5 |
| | Documentation of calculation of metrics | Accuracy and logic of the documented calculation of metrics | 3 |
| | Implementation of exclusions and business rules in creating raw data and calculating metrics. | Consistency between documented exclusions and business rules, and exclusions and business rules used | 4 |
| | Validity of instructions for calculation of metrics | Consistency between documented definitions and documented instructions for calculation | 6–7 |

Evaluation criteria for these measures may include, in any combination and without limitation: (1) the process to develop and document metrics definitions is complete and consistent; (2) the metrics definitions are consistent with the intent of metrics as reflected in their titles; (3) documented metrics calculations are consistent with documented metrics definitions; (4) all the documented metrics exclusions are appropriate; (5) metrics definitions are made available in accordance with required distribution guidelines; (6) the process to develop and document metrics standards is complete and consistent; and (7) metrics standards are made available in accordance with required distribution guidelines.

Based on evaluation checklists or otherwise, test results may be generated ("Satisfied," "Not Satisfied," etc.) and comments provided for each of the evaluation criteria used in the particular instance of the test.

C. Metrics Change Management Test

This test evaluates the ILEC's overall policies and practices for managing changes in its production and reporting of metrics. The changes of concern relate to the management of, and communication to CLECs 16 and the regulatory entity of, appropriate metrics definitions and standards, information systems, reports, raw data, documentation, and any related processes. The policies and practices involved may relate to both CLEC measurements and, where the standards are retail analogs, retail measurements. This test may rely primarily on interviews and document reviews. The objectives of this test are to determine the adequacy and completeness of key ILEC procedures for developing, implementing, monitoring, and publicizing changes concerning performance metrics.

Entrance criteria for the test may include all global entrance criteria having been satisfied, an appropriate test-specific interview guide or questionnaire having been developed, interviewees having been identified and scheduled, and a detailed evaluation checklist having been completed. Test activities may include, without limitation: (1) collect all appropriate information; (2) perform interviews and review documentation; (3) evaluate the ILEC's change management practices relating to metrics; (4) complete evaluation checklist and interview summaries; and (5) develop and document findings. Exit criteria may be limited to global exit criteria.

Test target areas and associated evaluation measures are summarized in the table below. The last column of the table indicates how particular evaluation criteria may, in one embodiment, correspond to particular evaluation measures.

Test Target Areas and Measures

| Process Areas | Sub Process Areas | Measures | Criteria |
|---|---|---|---|
| Change management | Developing change proposals | Completeness and consistency of change development process | 1 |
| | Evaluating change proposals | Completeness and consistency of change evaluation process | 2 |
| | Implementing change | Completeness and consistency of change implementation process | 3 |
| | Intervals | Reasonableness of change interval | 4 |
| | Documentation | Timeliness of documentation updates | 5–6 |
| | Tracking change proposals | Adequacy and completeness of change management tracking process | 7 |

Evaluation criteria for these measures may include, in any combination and without limitation: (1) ILEC 14 has a complete and consistent process for developing metrics change proposals; (2) the ILEC 14 has a complete and consistent process for evaluating metrics change proposals; (3) the ILEC 14 has a complete and consistent process for implementing metrics change proposals; (4) the interval for developing, evaluating, and implementing metrics changes is reasonable; (5) ILEC 14 updates its documentation in a timely and complete manner; (6) ILEC 14 has an adequate and complete notification process about metrics changes and errors; and (7) ILEC 14 has an adequate and complete process for tracking metrics changes.

Based on evaluation checklists or otherwise, test results may be generated ("Satisfied," "Not Satisfied," etc.) and comments provided for each of the evaluation criteria used in the particular instance of the test.

D. Metrics Data Integrity Test

This test evaluates the overall policies and practices for processing the data used by ILEC 14 in producing reported performance metrics and standards. This test may rely primarily on document reviews, inspections, and comparison of samples of data from different stages of processing. Historical CLEC-aggregate and retail data are the subjects of the test. The objective of this test is to determine the integrity of the key ILEC procedures for processing the data necessary to produce performance metrics.

Entrance criteria for the test may include all global entrance criteria having been satisfied, an appropriate test-specific interview guide or questionnaire having been developed, interviewees having been identified and scheduled, and a detailed evaluation checklist having been completed. Test activities may include, without limitation: (1) collect appropriate documentation; (2) perform interviews and review documentation; (3) complete the evaluation checklist and interview summaries; (4) gather data samples; (5) analyze data; (6) evaluate the ILEC data processing policies and practices relating to metrics; and (7) develop and document findings in report. Exit criteria may be limited to global exit criteria.

Test target areas and associated evaluation measures are summarized in the table below. The last column of the table indicates how particular evaluation criteria may, in one embodiment, correspond to particular evaluation measures.

Test Target Areas and Measures

| Process Areas | Sub Process Areas | Measures | Criteria |
|---|---|---|---|
| Data integrity | Transfer of data from point(s) of collection, with emphasis on inappropriate deletions | Adequacy and completeness of the data transfer process | 1 |
| | Conversion of data from unprocessed to processed form with emphasis on distortions | Adequacy and completeness of the conversion policies and procedures | 2 |
| | Data transfer policies and procedures for CLEC and retail data | Adequacy and completeness of data transfer policies and procedures | 3 |
| | Internal controls | Adequacy and completeness of the internal control process | 4 |

Evaluation criteria for these measures may include, in any combination and without limitation: (1) ILEC's transfer of unprocessed records to processed records is complete; (2) the ILEC 14 did not add inappropriate records to processed data; (3) unprocessed data was transformed accurately to processed data; and (4) ILEC 14 has a complete and consistent internal control process to ensure that data is transferred and transformed properly.

Based on evaluation checklists or otherwise, test results may be generated ("Satisfied," "Not Satisfied," etc.) and comments provided for each of the evaluation criteria used in the particular instance of the test.

E. Metrics Calculation and Reporting Test

This test evaluates the processes used to calculate performance metrics and retail analogs. The test will rely on re-calculating CLEC-aggregate metrics and retail analogs from historical raw data and reconciling discrepancies to verify and validate the reporting of the metrics. The test may rely primarily on document reviews and inspections. The objectives of the test are to determine the accuracy of recent (or other historical) metrics calculations and reports.

Entrance criteria for the test may include all global entrance criteria having been satisfied, having access to the ILEC's target database as verified by the Data Collection and Storage Test described above, ILEC definitions and standards having been verified by the Metrics Definition and Documentation Test described above, an appropriate test-specific interview guide or questionnaire having been developed, the interviewees having been identified and scheduled, and a detailed checklist having been completed.

Entrance criteria may also include successful completion of the Metrics Change Management Test described above. The test activities may include, without limitation: (1) collect all appropriate documentation; (2) perform interviews and review the documentation; (3) complete the evaluation checklist and interview summaries; (4) gather the historical data; (5) recreate performance metrics based on target data; (6) evaluate ILEC metrics calculations; and (7) develop and document findings in report. Exit criteria may be limited to global exit criteria.

Test target areas and associated evaluation measures are summarized in the table below. The last column of the table indicates how particular evaluation criteria may, in one embodiment, correspond to particular evaluation measures.

Test Target Areas and Measures

| Process Areas | Sub Process Areas | Measures | Criteria |
|---|---|---|---|
| Metrics calculation | Replication of metrics calculations | Agreement between re-calculated and reported metrics values | 1–2 |
| | Reconciliation of discrepancies | Reconciliation of re-calculated and reported metric values | 3 |
| | Implementation of instructions for calculation of metrics | Consistency between documentation calculation and calculation performed | 4–5 |

Evaluation criteria for these measures may include, in any combination and without limitation: (1) ILEC-reported and re-calculated metrics values agree; (2) the ILEC provided data to calculate metrics values is adequate and complete; (3) ILEC carrier-to-carrier metrics reports are accurate and complete; (4) ILEC implemented metrics calculations are consistent with the documented calculations; and (5) ILEC implemented metrics exclusions are consistent with documented exclusions.

Based on evaluation checklists or otherwise, test results may be generated ("Satisfied," "Not Satisfied," etc.) and comments provided for each of the evaluation criteria used in the particular instance of the test.

F. Statistical Evaluation of Transactions Test

This test evaluates the ILEC's service performance for the pseudo-CLEC 18 using statistical techniques to make comparisons to parity and benchmark standards. The test will rely on statistical methods deemed appropriate by the testing entity, ILEC 14, and other interested parties. Comparisons are preferably not conducted for performance measures for which a retail analog or benchmark is not established. In one embodiment, the test compares ILEC performance metrics generated for pseudo-CLEC 18 with metrics for the ILEC's retail analogs or with another predetermined standard.

Entrance criteria for the test may include all global entrance criteria having been satisfied, having access to the ILEC's target database as verified by the Data Collection and Storage Test described above, ILEC definitions and standards having been verified by the Metrics Definition and Documentation Test described above, an appropriate test-specific interview guide or questionnaire having been developed, the interviewees having been identified and scheduled, and a detailed checklist having been completed. Entrance criterion may also include successful completion of the Metrics Calculation and Reporting Test described above. The test activities may include, without limitation: (1) collect all the appropriate documentation; (2) perform documentation review; (3) complete evaluation checklist; (4) gather appropriate data; (5) calculate statistics based on performance metrics; and (6) develop and document findings in report. Exit criteria may be limited to global exit criteria.

Test target areas and associated evaluation measures are summarized in the table below. The last column of the table indicates how particular evaluation criteria may, in one embodiment, correspond to particular evaluation measures.

Test Target Areas and Measures

| Process Areas | Sub Process Areas | Measures | Criteria |
|---|---|---|---|
| Statistical evaluation | Calculate and compare test statistic to critical value, depending on metric | Test statistic exceeds critical value | Quantitative |

Based on evaluation checklists or otherwise, test results may be generated ("Satisfied," "Not Satisfied," etc.) and comments provided for each of the evaluation criteria used in the particular instance of the test.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims. Furthermore, the present invention is not intended to be limited in all embodiments to a comprehensive testing methodology that spans multiple domains, multiple tests within a particular domain, or multiple process areas, sub-process areas, evaluation measures, evaluation criteria, or other elements within a particular test. Those skilled in the art will readily appreciate that any chosen element or combination of elements taken from the above description is sufficient to define a distinct invention. For example, even a particular consideration relevant to a particular evaluation criteria for a particular test may comprise a distinct invention for which patent protection may be sought and obtained, subject only to the teachings of the prior art. That said, it is anticipated that many distinct inventions described above may involve multiple elements, for example, multiple test domains, multiple tests within one or more domains, multiple process areas, sub-process areas, evaluation measures, evaluation criteria, considerations, or other elements for one or more tests. Moreover, it is anticipated that Applicants will select various aspects of their inventions to claim at various time over the life of this application and other applications based on this application. Those skilled in the art will appreciate that a decision not to claim a certain aspect at a certain time does not in any way preclude that aspect from being claimed at a later time.

APPENDIX A

Example Test Scenarios

| Scenario | Description |
|---|---|
| 1 | Migration "as is" of BA-NY small business customer to CLEC UNE platform. |
| 2 | Migration "as is" of BA-NY residential customer to CLEC UNE platform. |
| 3 | Partial Migration of BA-NY residential customer's line to CLEC resale/UNE Platform. |
| 4 | A new small business customer orders service from a CLEC with dispatch required. |
| 5 | A new residential customer orders service from a CLEC with dispatch required. |
| 6 | Migration with change of a BA-NY small business customer to CLEC UNE Platform. |
| 7 | A CLEC's existing small business customer moves. |
| 8 | Add a feature to CLEC's small business customer. |
| 9 | Disconnection of CLEC small business customer migrating back to Bell Atlantic. |
| 10 | Migrate CLEC resale small business customer to CLEC UNE Platform. |
| 11 | Change PIC. |
| 12 | Small business adds 3 lines to existing 3 line hunt group with due date change. |
| 13 | Disconnection of CLEC small business customer. |
| 14 | Add features to CLEC's residential customer. |
| 15 | Migration "as is" of BA-NY small business customer's ISDN line and business line to CLEC. |
| 16 | Migration "as specified" of BA-NY residential customer to CLEC UNE Platform. |
| 17 | Migration "as specified" of BA-NY small of business customer to UNE Platform. |
| 18 | Migration "as specified" of BA-NY small business customer's ISDN line(s) to CLEC UNE Platform. |
| 19 | Migration "as is" of BA-NY medium business customer's digital Centrex to CLEC. |
| 20 | Add line with features to Scenario 19 customer. |
| 21 | Second order for Scenario 19 customer -- Five of 11 lines in hunt group. |
| 22 | An existing CLEC residential customer moves. |
| 23 | Order for a residential line with a directory listings. |
| 24 | Order for a residential line with a directory listing with an existing telephone number. |
| 25 | Seasonal suspension/restoration of service for a CLEC residential customer. |
| 26 | Change telephone number of a CLEC residential customer. |
| 27 | Change directory listing of a CLEC's residential customer. |
| 28 | Resale of an ISDN basic line to CLEC's residential customer. |
| 29 | Move of residence service within the same building. |
| 30 | Change CLEC residential customer's line from POTS to ISDN. |
| 31 | Migration "as specified" of BA-NY residential customer to CLEC residential POTS with an unlisted number. |
| 32 | Add hunting to CLEC's small business customer line. |
| 33 | Migration "as is" of BA-NY residential customer to CLEC residential POTS with unlisted number. |
| 34 | Migration "as is" of BA-NY residential customer to CLEC residential POTS with unlisted number. |
| 35 | Migration "as is" of a reseller residential customer to a CLEC. |
| 36 | Migration "as is" of BA-NY small business customer to resale. |
| 37 | Migration with changes of BA-NY small business customer to resale. |
| 38 | Migration "as specified" of BA-NY small business customer's lines with a change to hunt groups. |
| 39 | Migration of CLEC large business customer with a DS1 Special Access circuit to UNE Loop and UNE IOF. |
| 40 | Migration "as is" of a BA-NY large business customer with a DS1/DS3 circuit and 3/1 Multiplexor to UNE Loop and UNE IOF. |
| 41 | Convert four BA-NY DS1s to UNE loops cross-connected to CLEC CoLo |
| 42 | Migration "as is" of 50 BA-NY Centrex stations for CLEC Centrex resale. |
| 43 | Migration 20 out of 8 BA-NY Centrex stations for CLEC Centrex resale. |
| 44 | Add pick-up group to existing re-sold Centrex. |
| 45 | Migration "as is" of 10 business lines. |
| 46 | A small business moves 4 resale lines across the street. |
| 47 | 23 Special Access DS1s with 3/1 MUX to DS3 converted to UNE Loop and UNE IOF. |
| 48 | 16 Special Access DS1s converted to UNE Loop and UNE IOF. |
| 49 | DS1 UNE loop MUXed to DS3 UNE IOF. |
| 50 | DS1 UNE loop MUXed to DS3 and cross connected to CoLo. |
| 51 | DS1 loop cross-connected to CoLo, MUXed to DS3, cross-connected in BA-NY SWC to DS3. |
| 52 | DS1 trunk from CLEC CO to BA-NY Access Tandem. |
| 53 | DS3 UNE IOF from CLEC to BA-NY SWC. |
| 54 | Migrate "as is" 10 DID, 10 DOD, 4 two-way PBX trunks. |
| 55 | Add 10 new DOD trunks to support telemarketing campaign to Scenario 54 customer. |
| 56 | Arrange 20 DID trunks into 2 pick-up groups. |
| 57 | Convert 75 PBX trunks to UNE loops, cross connect at CLEC CoLo for connection to CLEC Centrex. |
| 58 | Migrate "as is" 4 ISDN lines. |
| 59 | Convert resale/platform lines to unbundled loops. |
| 60 | Convert 8 ILEC ISDN lines to 2-wire digital loops for cross connection to CLEC CoLo ADSL modems. |
| 61 | A CLEC has a re-sold Centrex Customer, and buys 3-way calling to be added to 40 stations. |
| 62 | A CLEC buys 8 existing DS1s for transfer and connection to CLEC CoLo as UNE 4W digital loops. |

APPENDIX A-continued

Example Test Scenarios

| Scenario | Description |
| --- | --- |
| 63 | A CLEC buys 20 new Centrex stations connected to the customer via the CLEC CoLo and CLEC facility. |
| 64 | Centrex customer orders a new caption listing. |
| 65 | Custom 800 with 2 lines serving each of 10 locations. |
| 66 | Customer changes complex caption listing. |
| 67 | Convert 4 existing special access DS3s connecting customer's premise with two CLEC Central Offices to UNE Loops and UNE IOF. |
| 68 | A CLEC orders access from CLEC Central Office to ILEC LIDB. |
| 69 | A CLEC orders interconnection from 5 CLEC Central Offices to ILEC "Custom 800" SCP. |
| 70 | A portion of a customer's existing BA-NY service is converted to a CLEC using EEL. |
| 71 | A CLEC orders a CoLo mini-cage. |
| 72 | A CLEC orders a virtual CoLo. |
| 73 | CLEC orders dedicated DS1 trunk port with dedicated DS1 IOF ordered as a new UNE combination. |
| 74 | A CLEC orders 10 new DS1s for interconnection trunks from ILEC CO to CLEC CO. |
| 75 | A CLEC customer buys 20 existing line ports for cross-connection to CLEC facility at CLEC CoLo. |
| 76 | Obtain Customer Service Records (CSR). |
| 77 | Base Scenario 77: TN Inquiry. |
| 78 | Base Scenario 78: TN Reservation/Release. |
| 79 | Feature Availability Inquiry. |
| 80 | Due Date Selection |
| 81 | Address Validation |
| 82 | DID Number Block Availability |
| 83 | DID Trunk Inquiry |
| 84 | Available PIC Inquiry |
| 85 | A business customer's new service is provided by the CLEC using EEL. |
| 86 | Resale POTS customer cannot originate or receive calls on CLEC line. |
| 87 | Small Business POTS UNE-P customer cannot receive or originate calls. |
| 88 | Business customer reports failure of one of four 4-wire DS1 UNE digital loops. |
| 89 | Residential POTS UNE-P customer can no longer use Repeat Dialing. |
| 90 | A large business customer reports outage on DS1 UNE loop MUXed to DS3 UNE IOF. |
| 91 | CLEC busy six new 4-wire digital DS1 UNE loops for a medium-sized ISP in NYC. |
| 92 | A CLEC buys 25 new 2-wire analog loops for a branch of a national company. |
| 93 | Small business customer migrates to CLEC, served by CLEC switch and 4 UNE loops, keeps 4 TNs. |
| 94 | Small business customer migrates to CLEC, served by CLEC switch and 4 UNE loops, keeps 4 TNs. |
| 95 | Small business customer converts from Interim Number Portability to Long Term Number Portability. |
| 96 | Residential customer migrates to CLEC, served by CLEC switch and 2 UNE loops, keeps 2 TNs. |
| 97 | Residential customer migrates to CLEC, served by CLEC switch and 2 UNE loops, keeps 2 TNs. |
| 98 | Residential customer converts from Interim Number Portability to Long Term Number Portability. |
| 99 | CLEC Resale customer finds that call waiting no longer works. |
| 100 | Small CLEC business customer, served by CLEC switch and 4 UNE loops can not receive calls after migration from ILEC to CLEC with LNP. |
| 101 | Small business customer served by CLEC via UNE Loops, with LNP, can originate calls but cannot receive calls. |
| 102 | Small business customer disconnects part of their UNE loops. |
| 103 | Customer with 2 lines requests a telephone number change on the auxiliary line. |
| 104 | Customer with 2 lines requests a telephone number on the BA-NY BTN. |
| 105 | Customer with a resold line changes their class-of-service. |
| 106 | Business customer reports failure of one of four 4-wire DS1 UNE digital loops. |
| 107 | CLEC customer disconnects their Centrex service. |
| 108 | Resale POTS customer reports noisy line and cross-talk to CLEC. |
| 109 | Small business customer now on CLEC UNE Platform reports NDT on one of his three lines. |
| 110 | Pick-up group order on existing re-sold Centrex did not process correctly. Customer reports problem to CLEC. |
| 111 | Customer with 4 ISDN lines reports he is unable to send packet data over the "D" channel lines. |
| 112 | CLEC issues a request for Trouble History on all four lines for a small business customer. |
| 113 | CLEC residential customer reports NDT on both of his lines. |
| 114 | CLEC ISDN Customer served by a Bell Atlantic line port reports that calls cannot be originated on his second line. |
| 115 | Business customer reports high bit-error-rates on one of three 4-wire DS0 UNE premium loops. |
| 116 | CLEC purchases and resells digital private line services to one of its existing small business customers. |
| 117 | CLEC adds lines to an existing customer. |

APPENDIX A-continued

Example Test Scenarios

| Scenario | Description |
|---|---|
| 118 | CLEC customer disconnects some of its POTS lines. |
| 119 | Existing CLEC customer adds POTS lines. |
| 120 | CLEC customer disconnects all ISDN BRI lines. |
| 121 | CLEC customer moves its ISDN BRI line. |
| 122 | CLEC customer adds an ISDN BRI line. |
| 123 | Migration "as is" of BA-NY customer ISDN PRI lines to CLEC. |
| 124 | CLEC customer disconnects an ISDN PRI line. |
| 125 | CLEC customer adds a new leg to multi-point circuit. |
| 126 | CLEC customer disconnects a private line circuit. |
| 127 | Migration of BA-NY customer's POTS service to CLEC UNE loops without NP. |
| 128 | CLEC customer moves UNE - analog loop. |
| 129 | CLEC customer addes new digital loops. |
| 130 | Migrate customer to CLEC using EEL. |
| 131 | CLEC customer to disconnect service provided in EEL. |
| 132 | Medium CLEC ISP customer disconnects 2 of 8 4-wire digital DS1 UNE loops. |
| 133 | CLEC customer experiences trouble on one of his private lines provided in part by an ILEC 4-wire DSO digital loop. |

Example Flow Through Test Cases

| Scenario for Case | Description |
|---|---|
| 27 | Change residual listing from unlisted to listed. |
| 27 | Change business listing from unlisted to listed. |
| 27 | Change residential listing from unpublished to listed (UNE-p) |
| 27 | Change business listing from unpublished to listed |
| 27 | Change residential listing from listed to unlisted/unpublished (UNE-p) |
| 27 | Change business listing from listed to unlisted/unpublished (UNE-p) |
| 70 | A portion of a customer's existing BA-NY service is converted to a CLEC 16 using EEL. UNE |
| 85 | A business customer's new service is provided by the CLEC 16 using EEL. |
| 85 | A business customer's new service is provided by the CLEC 16 using EEL. |
| 85 | CLEC 16 provisions residential customer with at least two lines via EEL. |
| 92 | CLEC 16 buys 25 new 2 wire analog loops for a new customer to the area. (With DL) |
| 92 | CLEC 16 buys 1 new 2-wire analog loop for a new residence customer to the area. (With DL) |
| 92 | CLEC 16 buys 112-wire analog loops for new business customer to the area. (With DL) |
| 92 | CLEC 16 buys additional 1 loops for existing business CLEC 16 customer (With DL) |
| 92 | CLEC 16 buys 1 additional loop for existing residence CLEC 16 customer (With DL) |
| 94 | Small business customer migrates to CLEC 16. Customer is served by the CLEC 16 switch and 4 UNE loops. The TNs are ported using INP LINE (With change to DL) |
| 94 | Same as above except customer ports 2 TNs, not all 4. (With change to DL) |
| 96 | Residential customer migrates 1 line to CLEC 16 and is provisioned off of CLEC 16 switch. Customer pons the 1 TN to the CLEC 16 switch. CLEC 16 ports via LNP (long term # portability). LINE |
| 97 | Residential customer migrates to CLEC 16. CLEC 16 purchases 2 UNE loops. Customer retains TNs through interim # portability. (With DL) |
| 102 | Small business customer disconnects his UNE loop. UNE |
| 102 | Residence customer served by CLEC 16 via UNE loop(s) disconnects her service. |
| 102 | Business customer w/UNE digital loop disconnects part of her service. |
| 117 | CLEC 16 adds lines to an existing customer using EEL UNE |
| 127 | BA-NY customer migrates 1 line to CLEC 16. CLEC 16 purchases 1 UNE loop from BA. Customer changes to CLEC 16 TN. Business Customer. (With DL) |
| 127 | BA-NY customer migrates 1 line to CLEC 16. CLEC 16 purchases 1 UNE loope from BA. Customer changes to CLEC 16 TN. Residence customer. (With DL) |
| 127 | BA customer migrates 1 of 5 existing lines to CLEC 16. CLEC 16 purchases 1 UNE loop from BA. Customer changes to CLEC 16 TN. Business Customer. (With DL) |
| 130 | Migrate residential customers to CLEC 16 using EEL without number portability. UNE |
| 130 | Migrate business customs to CLEC 16 using EEL without number portability. UNE |

-continued

Example Flow Through Test Cases

| Scenario for Case | Description |
|---|---|
| 131 | CLEC 16 customer to disconnect service provided via EEL. 2-line residential customers. UNE |
| 131 | CLEC 16 customer to disconnect service provided via EEL. 2-line residential customers. UNE |

What is claimed is:

1. A method for testing one or more operational support systems (OSSs) of an incumbent provider for compliance with a regulatory scheme, the method performed by an independent testing entity attempting to emulate a competitive provider that would access the OSSs in attempting to compete with the incumbent provider in an open competitive market, the method comprising:
   conducting active testing of the OSSs with respect to one or more variables;
   evaluating performance of the incumbent provider during active testing with respect to the one or more variables according to predetermined evaluation criteria comprising one or more performance metrics, evaluation of incumbent provider performance comprising:
      for performance metrics requiring the incumbent provider to meet a particular performance standard, using a one-sample t-test for continuous variable performance metrics and a binomial test for discrete variable performance metrics; and
      for performance metrics requiring parity between incumbent provider performance for operations of the incumbent provider associated with its interaction with competitive providers and incumbent provider performance for its internal operations, using a two-sample t-test for continuous variable performance metrics and a hyper-geometric test for discrete variable performance metrics;
   generating test results according to the evaluation; and
   issuing a final report comprising the test results and providing a sufficient basis for a regulatory entity administering the regulatory scheme to determine compliance of the incumbent provider with the regulatory scheme.

2. The method of claim 1, wherein the testing is performed to allow the regulatory entity to consider whether and to what extent the incumbent provider provides competitive providers non-discriminatory access to, use of, and support in connection with the OSSs relative to that available to the incumbent provider in its internal operations.

3. The method of claim 1, wherein:
   the incumbent provider comprises an incumbent local exchange carrier (ILEC);
   the competitive providers comprise competitive local exchange carriers (CLECs);
   the regulatory entity is associated with a State within the United States of America; and
   the regulatory scheme comprises Section 271 of The Telecommunications Act of 1996, codified in the laws of the United States of America at 47 U.S.C. §§151 et seq.

4. The method of claim 1, wherein:
   a continuous variable performance metric comprises time; and
   a discrete variable performance metric comprises whether an event occurred.

5. The method of claim 1, wherein:
   incumbent provider operations associated with its interaction with competitive providers comprise retail operations; and
   internal incumbent provider operations comprise wholesale operations.

6. The method of claim 1, wherein for continuous variable performance metrics where the sample size is relatively small according to a predetermined scale, evaluation of incumbent provider performance further comprises using a permutation test.

7. The method of claim 1, wherein the test results comprise a p-value representing a significance level.

8. A method for testing one or more operational support systems (OSSs) of an incumbent provider for compliance with a regulatory scheme, the testing being associated with metrics capture, tracking, and reporting activities of the incumbent provider with respect to a particular operational domain, the method being performed by an independent testing entity attempting to emulate a competitive provider that would access the OSSs in attempting to compete with the incumbent provider in an open competitive market, the method comprising for testing of an OSS:
   within a data integrity testing component during active testing, to determine whether filtered data the incumbent provider uses to calculate values for each of one or more metrics is accurately derived from raw data the incumbent provider collects in connection with transactions associated with the OSS:
      identifying one or more fields in the filtered data that the incumbent provider uses in calculating values for the metric;
      identifying a random sample of transactions associated with the OSS;
      obtaining from the incumbent provider copies of records associated with the identified transactions, the records containing raw data for these transactions from which filtered data for these transactions in the identified fields was derived; and
      for each identified field, determining whether the filtered data for the identified transactions in the identified field is consistent with the raw data for the identified transactions contained in the associated records;
   within a metrics replication testing component during active testing, for each of one or more metrics for which the incumbent provider has calculated values:
      obtaining from the incumbent provider a description of the metric, filtered data on which the incumbent provider based its calculation of values for the metric, and an algorithm according to which the incumbent provider made its calculation of values for the metric, the filtered data being associated with a specified time period, the filtered data being derived from raw data the incumbent provider collected in connection with transactions associated with the OSS;

re-calculating values for the metric according to the description, data, and algorithm obtained from the incumbent provider; and determining whether the re-calculated values are consistent with the values calculated by the incumbent provider;

evaluating performance of the incumbent provider during active testing according to predetermined evaluation criteria;

generating test results according to the evaluation; and issuing a final report comprising the test results and providing a sufficient basis for a regulatory entity administering the regulatory scheme to determine compliance of the incumbent provider with the regulatory scheme.

9. The method of claim 8, wherein the testing is performed to allow the regulatory entity to consider whether and to what extent the incumbent provider provides competitive providers non-discriminatory access to, use of, and support in connection with the OSSs relative to that available to the incumbent provider in its internal operations.

10. The method of claim 8, wherein:

the incumbent provider comprises an incumbent local exchange carrier (ILEC);

the competitive providers comprise competitive local exchange carriers (CLECs);

the regulatory entity is associated with a State within the United States of America; and the regulatory scheme comprises Section 271 of The Telecommunications Act of 1996, codified in the laws of the United States of America at 47 U.S.C. §§151 et seq.

11. The method of claim 8, wherein the regulatory entity requires the incumbent provider to calculate values for the metrics and report calculated values for the metrics to the regulatory entity for oversight purposes.

12. The method of claim 8, wherein:

the operational domain comprises a pre-ordering, ordering, and provisioning domain;

the OSS is associated with pre-ordering, ordering, and provisioning activities of the incumbent provider; and the transactions comprise orders for local telecommunications services.

13. The method of claim 12, wherein the orders comprise Local Service Requests (LSRs).

14. The method of claim 8, wherein the identified fields are those the incumbent provider uses relatively often in calculating values for the metric.

15. The method of claim 8, wherein identifying the records within the data integrity testing component comprises:

requesting the incumbent provider to provide a location of the records; and requesting the incumbent provider to identify one or more incumbent provider personnel to explain the records, determination of which identified records to inspect being based at least in part on interaction with the identified incumbent provider personnel.

16. The method of claim 8, further comprising within the data integrity testing component, requesting the incumbent provider to research and explain any discrepancies between the filtered data and corresponding raw data before evaluating the performance of the incumbent provider with respect to the data integrity testing component.

17. The method of claim 8, wherein:

the operational domain comprises a pre-ordering, ordering, and provisioning domain;

the OSS is associated with pre-ordering, ordering, and provisioning activities of the incumbent provider;

the transactions comprise orders for local telecommunications services; and the method further comprises tracking progress of orders during a test period encompassing the active testing and activities of the testing entity occurring before the active testing, the testing entity requesting from the incumbent provider raw data for orders submitted to the OSS during an initial portion of the test period and filtered data generated for provisioned and pending orders during substantially all of the test period, the testing entity comparing filtered data for provisioned and pending orders with raw data for corresponding submitted orders to determine whether the filtered data is consistent with the raw data.

18. The method of claim 8, further comprising developing one or more software components to implement the obtained algorithms at a computer system of the testing entity.

19. The method of claim 8, further comprising within a statistical analysis testing component during active testing:

accessing correctly calculated values for one or more metrics associated with internal operations of the incumbent provider and correctly calculated values for these metrics associated with operations of the incumbent provider involving competitive providers;

interacting with one or more incumbent provider personnel to determine how data on which the correctly calculated values are based is collected and processed at the incumbent provider to confirm that this data can be expected to allow for correct inferences based on comparisons of correctly calculated values;

statistically comparing the correctly calculated values for internal operations with the correctly calculated values for operations involving competitive providers; and according to the statistical comparison, drawing one or more inferences as to parity between the correctly calculated values for internal operations and the correctly calculated values for operations involving competitive providers.

20. The method of claim 19, wherein the correctly calculated values are calculated using data collected during an active testing period under conditions that are statistically similar to conditions outside of the active testing period.

21. The method of claim 19, wherein the correctly calculated values are calculated by the testing entity rather than the incumbent provider.

22. The method of claim 19, wherein:

the internal operations comprise wholesale operations; and the operations involving competitive providers comprise retail operations.

23. The method of claim 19, further comprising accounting for differences in one or more of geography, transaction size, and transaction type between the correctly calculated values for internal operations and the correctly calculated values for operations involving competitive providers in drawing one or more inferences as to parity.

24. The method of claim 8, wherein the operational domain comprises a maintenance and repair domain, the OSS is associated with maintenance and repair activities of the incumbent provider, and the transactions comprise trouble reports associated with local telecommunications services.

25. The method of claim 8, further comprising in a surveillance testing component during active testing:
   observing incumbent provider activities within the operational domain;
   reviewing incumbent provider documentation within the operational domain;
   interviewing incumbent provider personnel identified as being familiar with the operational domain;
   generating a process map associated with the operational domain according to the observing, reviewing, and interviewing;
   submitting the process map to the incumbent provider for confirmation that the process map is accurate;
   upon confirmation that the process map is accurate, using the process map to identify any differences between a process of the incumbent provider used for its wholesale operations within the operational domain and a process of the incumbent provider used for its retail operations within the operational domain; and
   evaluating process parity between the wholesale and retail operations of the incumbent provider according to any identified differences.

26. A method for testing one or more operational support systems (OSSs) of an incumbent provider for compliance with a regulatory scheme, the testing being associated with performance metrics capture, tracking, and reporting activities of the incumbent provider across a plurality of operational domains, the method performed by an independent testing entity attempting to emulate a competitive provider that would access the OSSs in attempting to compete with the incumbent provider in an open competitive market, the method comprising:
   conducting a metrics data collection and storage test during active testing to evaluate incumbent provider policies and practices for collecting and storing data used for calculating performance metric values, both for internal operations of the incumbent provider and for operations of the incumbent provider associated with its interaction with competitive providers;
   conducting a metrics definition documentation and implementation test during active testing to evaluate incumbent provider policies and practices for documenting and implementing performance metric definitions, implementation of performance metrics definitions comprising applying exclusions and business rules in calculating performance metric values based on raw data;
   conducting a metrics change management test during active testing to evaluate incumbent provider policies and practices for developing, implementing, monitoring, and reporting changes concerning performance metrics;
   conducting a metrics data integrity test during active testing to evaluate incumbent provider policies and practices for processing data necessary to calculate performance metric values;
   conducting a metrics calculation and reporting test during active testing to evaluate policies and practices of the incumbent provider for calculating performance metric values, this test comprising:
      accessing calculated performance metric values for operations of the incumbent provider associated with its interaction with competitive providers, these values having been calculated by the incumbent provider and thereafter reported to the regulatory entity;
      re-calculating the accessed performance metric values;
      comparing the re-calculated values with the accessed values to identify any discrepancies;
      attempting to reconcile any identified discrepancies between the re-calculated values and the accessed values; and
      determining whether the incumbent provider calculated the accessed values consistent with documented instructions for doing so;
   conducting a statistical evaluation of transactions test during active testing to evaluate metrics-related service performance of the incumbent provider according to statistical techniques, this test comprising:
      accessing test performance metric values calculated based on interaction between the incumbent provider and the testing entity;
      accessing benchmark performance metric values calculated based on interaction between the incumbent provider and one or more competitive providers; and
      comparing the test performance metric values with the benchmark performance metric values according to statistical techniques to determine whether and to what extent parity exists between the compared values;
   evaluating performance of the incumbent provider during active testing according to predetermined evaluation criteria;
   generating test results according to the evaluation; and
   issuing a final report comprising the test results and providing a sufficient basis for a regulatory entity administering the regulatory scheme to determine a net impact of identified metrics-related issues on the ability of competitive providers to compete with the incumbent provider in an open competitive market.

27. The method of claim 26, wherein the testing is performed to allow the regulatory entity to consider whether and to what extent the incumbent provider provides competitive providers non-discriminatory access to, use of, and support in connection with the OSSs relative to that available to the incumbent provider in its internal operations.

28. The method of claim 26, wherein:
   the incumbent provider comprises an incumbent local exchange carrier (ILEC);
   the competitive providers comprise competitive local exchange carriers (CLECs);
   the regulatory entity is associated with a State within the United States of America; and
   the regulatory scheme comprises Section 271 of The Telecommunications Act of 1996, codified in the laws of the United States of America at 47 U.S.C. §§151 et seq.

29. The method of claim 26, wherein the regulatory entity requires the incumbent provider to calculate values for metrics and report calculated values for metrics to the regulatory entity for oversight purposes.

30. The method of claim 26, wherein the operational domains comprise one or more of:
- a pre-ordering, ordering, and provisioning domain, one or more OSSs being associated with pre-ordering, ordering, and provisioning activities of the incumbent provider;
- a maintenance and repair domain, one or more OSSs being associated with maintenance and repair activities of the incumbent provider;
- a billing domain, one or more OSSs being associated with billing activities of the incumbent provider; and
- a relationship management and infrastructure domain, one or more OSSs being associated with relationship management and infrastructure activities of the incumbent provider.

31. The method of claim 26, wherein the testing is conducted in addition to domain-specific metrics testing in one or more of the operational domains.

32. The method of claim 26, wherein:
- internal operations of the incumbent provider comprises wholesale operations; and
- operations of the incumbent provider associated with its interaction with competitive providers comprise retail operations.

* * * * *

UNITED STATES PATENT AND TRADEMARK OFFICE
CERTIFICATE OF CORRECTION

PATENT NO. : 6,636,585 B2
DATED : October 21, 2003
INVENTOR(S) : Alan J. Salzberg et al.

It is certified that error appears in the above-identified patent and that said Letters Patent is hereby corrected as shown below:

<u>Title page,</u>
Item [75], Inventors, after "Linda G. Blockus, Basking Ridge, NJ (US),"
please insert -- Andrew M. Walker, Jr., Fairfax, VA (US); Theodore S. Glickman, Chevy Chase, MD (US) --.

Signed and Sealed this

Twenty-fourth Day of February, 2004

JON W. DUDAS
*Acting Director of the United States Patent and Trademark Office*